United States Patent
Bourne et al.

(10) Patent No.: US 6,341,243 B1
(45) Date of Patent: *Jan. 22, 2002

(54) INTELLIGENT SYSTEM FOR GENERATING AND EXECUTING A SHEET METAL BENDING PLAN

(75) Inventors: David Allan Bourne; Duane Thomas Williams; Kyoung Hung Kim, all of Pittsburgh, PA (US); Sivaraj Sivarama Krishnan, Bangalore (IN); Kensuke Hazama, Buena Park, CA (US)

(73) Assignees: Amada America, Inc., Buena Park, CA (US); Amada Company, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/207,268

(22) Filed: Dec. 8, 1998

Related U.S. Application Data

(63) Continuation of application No. 08/386,369, filed on Feb. 9, 1995, now Pat. No. 5,969,973, which is a continuation of application No. 08/338,113, filed on Nov. 9, 1994, now abandoned.

(51) Int. Cl.[7] .............................................. G06F 19/00

(52) U.S. Cl. ...................... 700/165; 700/145; 700/206; 700/97; 72/420

(58) Field of Search ................................. 700/145, 165, 700/206, 97, 98; 72/250, 414, 420

(56) References Cited

U.S. PATENT DOCUMENTS

| | | | |
|---|---|---|---|
| 3,654,616 A | 4/1972 | Dunne et al. | 700/88 |
| 3,890,552 A | 6/1975 | Devol et al. | 318/568.14 |
| 4,111,027 A | 9/1978 | Bottomley | 72/320 |

(List continued on next page.)

FOREIGN PATENT DOCUMENTS

| EP | 0301527 | 2/1989 |
|---|---|---|

(List continued on next page.)

OTHER PUBLICATIONS

Bourne, David A., "Intelligent Manufacturing Workstations," which appeared in Knowledge–Based Automation of Processes, Session at the ASME Winter Annual Meeting, Nov. 1992.

(List continued on next page.)

*Primary Examiner*—Paul P. Gordon
(74) *Attorney, Agent, or Firm*—Greenblum & Bernstein, P.L.C.

(57) ABSTRACT

An intelligent sheet metal bending system is disclosed, having a cooperative generative planning system. A planning module interacts with several expert modules to develop a bending plan. The planning module utilizes a state-space search algorithm. Computerized methods are provided for selecting a robot gripper and a repo gripper, and for determining the optimal placement of such grippers as they are holding a workpiece being formed by the bending apparatus. Computerized methods are provided for selecting tooling to be used by the bending apparatus, and for determining a tooling stage layout. An operations planning method is provided which allows the bending apparatus to be set up concurrently while time-consuming calculations, such as motion planning, are performed. An additional method or system is provided for positioning tooling stages by using a backgage guide member which guides placement of a tooling stage along the die rail the bending apparatus. A method is provided for learning motion control offset values, and for eliminating the need for superfluous sensor-based control operations once the motion control offset values are known. The planning system may be used for facilitating functions such as design and assembly system, which may perform designing, costing, scheduling and/or manufacture and assembly.

79 Claims, 79 Drawing Sheets

Microfiche Appendix Included
(1 Microfiche, 32 Pages)

U.S. PATENT DOCUMENTS

| | | | |
|---|---|---|---|
| 4,260,940 A | 4/1981 | Engelberger et al. | 318/562 |
| 4,309,600 A | 1/1982 | Perry et al. | 235/375 |
| 4,356,718 A | 11/1982 | Makino | 483/7 |
| 4,369,563 A | 1/1983 | Williamson | 72/389.4 |
| 4,455,857 A | 6/1984 | Salvagnini | 72/320 |
| 4,495,588 A | 1/1985 | Nio et al. | 400/251 |
| 4,501,135 A | 2/1985 | Chivens et al. | 72/302 |
| 4,509,357 A | 4/1985 | Zbornik | 72/384 |
| 4,517,653 A | 5/1985 | Tsuchihashi et al. | 700/252 |
| 4,571,694 A | 2/1986 | Inaba et al. | 700/253 |
| 4,602,345 A | 7/1986 | Yokoyama | 700/251 |
| 4,613,943 A | 9/1986 | Miyake et al. | 700/251 |
| 4,640,113 A | 2/1987 | Dieperink et al. | 72/16.2 |
| 4,658,625 A | 4/1987 | Koyama et al. | 72/322 |
| 4,698,766 A | 10/1987 | Entwistle et al. | 700/96 |
| 4,745,812 A | 5/1988 | Amazeen et al. | 73/862.041 |
| 4,802,357 A | 2/1989 | Jones | 72/17.3 |
| 4,912,644 A | 3/1990 | Aoyama et al. | 364/472 |
| 4,942,767 A | 7/1990 | Haritonidis et al. | 73/705 |
| 4,947,666 A | 8/1990 | Hametner et al. | 72/37 |
| 4,949,277 A | 8/1990 | Trovato et al. | 700/255 |
| 4,962,654 A | 10/1990 | Zbornik | 72/16.7 |
| 4,979,385 A | 12/1990 | Lafrasse et al. | 72/17.3 |
| 4,991,422 A | 2/1991 | Sartorio | 72/311 |
| 4,998,206 A * | 3/1991 | Jones et al. | 700/96 |
| 5,005,394 A | 4/1991 | Sartorio et al. | 72/18.1 |
| 5,007,264 A | 4/1991 | Haack | 72/17.3 |
| 5,009,098 A | 4/1991 | Van Merksteijn | 72/389.5 |
| 5,012,661 A | 5/1991 | Catti et al. | 72/21.1 |
| 5,029,462 A | 7/1991 | Wakahara et al. | 72/379.2 |
| 5,031,441 A | 7/1991 | Jones | 72/420 |
| 5,036,694 A | 8/1991 | Farney et al. | 72/389.2 |
| 5,042,287 A | 8/1991 | Sartorio | 72/422 |
| 5,058,406 A | 10/1991 | Sartorio et al. | 72/16.2 |
| 5,081,763 A | 1/1992 | Jones | 483/7 |
| 5,088,181 A | 2/1992 | Jeppsson | 29/563 |
| 5,089,970 A | 2/1992 | Lee et al. | 700/96 |
| 5,092,645 A | 3/1992 | Okada | 294/86.4 |
| 5,146,670 A | 9/1992 | Jones | 29/561 |
| 5,150,288 A | 9/1992 | Imai et al. | 700/3 |
| 5,187,958 A | 2/1993 | Prunotto et al. | 72/9 |
| 5,272,643 A | 12/1993 | Tokai | 364/76 |
| 5,287,433 A | 2/1994 | Prunotto et al. | 364/474.07 |
| 5,307,282 A * | 4/1994 | Conradson et al. | 700/103 |
| 5,315,522 A | 5/1994 | Kauffman et al. | 364/474.07 |
| 5,329,597 A | 7/1994 | Kouno et al. | 382/152 |
| 5,377,516 A | 1/1995 | Lipari | 72/37 |
| 5,390,283 A | 2/1995 | Eshelman et al. | 395/13 |
| 5,399,049 A | 3/1995 | Abe et al. | 409/132 |
| 5,478,301 A | 12/1995 | Takahashi | 483/11 |
| 5,494,385 A | 2/1996 | Abe et al. | 409/304 |
| 5,513,299 A * | 4/1996 | Terasaki et al. | 700/255 |
| 5,676,004 A | 10/1997 | Matsumoto et al. | 72/17.2 |
| 5,761,940 A | 6/1998 | Moore, Jr. | 72/19.4 |
| 5,799,530 A | 9/1998 | Nagasawa | 72/389.3 |
| 5,812,406 A | 9/1998 | Matsumoto et al. | 700/174 |
| 5,822,207 A | 10/1998 | Hazama et al. | 700/97 |
| 5,828,575 A | 10/1998 | Sakai | 700/182 |
| 5,835,684 A | 11/1998 | Bourne et al. | 700/255 |
| 5,844,146 A | 12/1998 | Murray et al. | 73/862.043 |
| 5,969,973 A | 10/1999 | Bourne et al. | 364/474.07 |

FOREIGN PATENT DOCUMENTS

| | | | |
|---|---|---|---|
| EP | 0335314 | | 10/1989 |
| EP | 0355454 | * | 2/1990 |
| JP | 3110018 | | 5/1991 |
| JP | 3110022 | | 5/1991 |
| JP | 3124318 | | 5/1991 |
| JP | 4309414 | | 11/1992 |
| JP | 6031345 | | 2/1994 |
| WO | 91/09696 | | 7/1991 |
| WO | 95/03901 | | 2/1995 |

OTHER PUBLICATIONS

Bourne et al., David A., "Feature Exchange Language Programmer's Guide," Robotics Institute Carnegie Mellon University (Jan. 1994).

Bourne et al., David A., "Using the Feature Exchange Language in the Next Generation Controller," Technical Report CMU–RI–TR–90–19, Robotics Institute, Carnegie Mellon University (Aug. 1990).

Bourne et al., David A., "The Operational Feature Exchange Language," Technical Report CMU–RI–TR–90–06, Robotics Institute, Carnegie Mellon University (Mar. 1990).

Center, Carnegie Mellon University (May 1991).

Gursoz et al., E. Levent, "Boolean Set Operations on Non–Manifold Boundary Representation Objects," *Computer Aided Design*, Butterworth–Heinenmann, Ltd., vol. 23, No. 1, (Jan. 1991).

"New Know–how on Sheet–Metal Fabrication Bending Technigue," Amada Sheet Metal Working Research Association, Machinists Publishing Company, Ltd., First Edition (May 1981).

Nilsson, Nils J., *Problem–Solving Methods In Artificial Intelligence*, McGraw–Hill Book Company, New York, Chapter 3, pp. 43–67 (1971).

Stewart et al., David B., *CHIMERA II, Real–Time Programming Environment*, Program Documentation, Version 1.02, Carnegie Mellon University, Pittsburgh, PA (1990).

Wang, Cheng–Hua, "A Parallel Design System for Sheet Metal Parts," Mechanical Engineering Report presented at the Mechanical Engineering Department, Carnegie Mellon University, Pittsburgh, PA (May 1992).

Wang et al., Cheng–Hua, "Concurrent Product/Process Design With Multiple Representations Of Parts," No. 1050–4729/93, IEEE, pp. 298–304 (1993).

Craig, John J., *Introduction to Robotics Mechanics and Control*, Second Edition, Addison–Wesley Publishing Co., Reading, MA (1989).

Hayes, Caroline, "Automating Process Planning: Teaching Machines from the Examples of Experienced Human Experts," which appeared in *Expert System in Manufacturing Design*, Jul. 1988, Ed. Andrew Kusiak.

Latombe, Jean–Claude, *Robot Motion Planning*, Kluwer Academic Publishers, Boston/Dordrecht/London (1991).

Lozano–Perez, Tomas, "Automatic Synthesis of Fine–Motion Strategies for Robots," *The International Journal of Robotics Research*, vol. 3, No. 1, Massachusetts Institute of Technology (Spring 1984).

Lozano–Perez, Tomas, "An Algorithm for Planning Collision–Free Paths Among Polyhedral Obstacles," *Communications Of The ACM*, vol. 22, No. 10, pp. 560–570 (Oct. 1979).

Lozano–Perez, Tomas, "Spatial Planning: A Configuration Space Approach," *IEEE Transactions On Computers*, vol. C–32, No. 2 (Feb. 1983).

Zussman et al., Eyal, "A Planning Approach for Robot–Assisted Multiple–Bent Profile Handling," *Robotics & Computer–Integrated Manufacturing*, vol. 11, No. 1, Elsevier Science, Ltd., Greta Britain, pp. 35–40 (1994).

Roger Allan, "Nonvision Sensors", *Electronic Design*, Jun. 27, 1985, pp. 103–115.

J.J. Carr, *Sensors and Circuits,* PTR Prentice Hall, Englewood, New Jersey, 1993, pp. 125–133.

Paolo Dario and Danilo De Rossi, "Tactile Sensors and the Gripping Challenge", IEEE Spectrum vol. 22, No. 8, Aug. 1985, pp. 46–52.

P. Dario, M. Bergamasco, and A. Fiorillo, "Force and Tactile Sensing For Robots", NATO ASI Series, vol. F43, "Sensors and Sensory Systems For Advanced Robots", Springer–Verlag, Berlin, 1988, pp. 153–185.

Akira Nomura et al., "Two Dimensional Tactile Sensor Using Optical Method", IEEE Transactions On Components, Hybrids, and Manufacturing Technology, vol. 8, No. 2, Jun. 1985, pp. 264–268.

Patent Abstracts of Japan, vol. 107, No. 126, Mar. 17, 1993.
Patent Abstracts of Japan, vol. 015, No. 298, Jul. 29, 1991.
Patent Abstracts of Japan, vol. 018, No. 239, May 9, 1994.
Patent Abstracts of Japan, vol. 015, No. 325, Aug. 19, 1991.

Ichikawa et al., Y., "A Heuristic Planner And An Executive For Mobile Robot Control", *IEEE Transactions on Man and Cybernetics,* vol. SMC–15, No. 4, pp. 558–563, New York, U.S.A. (Jul./Aug. 1985).

Zussman et al., E., "A Planning Approach For RobotAssisted Multiple–Bent Profile Handling", *Robotics and Computer–Integrated Manufacturing,* vol. 11, No. 1, pp. 35–40, Kidlington, Oxford, GB (Mar. 1994).

Huang et al., H., "Time–Optimal Control For A Robotic Contour Following Problem", *IEEE Journal of Robotics and Automation,* vol. 4, No. 2, pp. 140–149, New York, U.S.A. (Apr. 1988).

Hoermann, K., "A Cartesian Approach To Findpath For Industrial Robots", *NATA ASI Series,* vol. F29, pp. 425–450, Springer–Verlag Berlin Heidelberg, DE (1987).

Fink et al., B., "Schnelle Bahnplanung Fuer Industrieroboter MIT Veraenderlichem Arbeitsraum",*Automatisierungstechnik—AT,* vol. 39, No. 6, pp. 197–200, 201, 204, Munich, DE (Jun. 1991).

Shaffer et al., C. A., "A Real–Time Robot Arm Collision Avoidance System", *IEEE Transactions on Robotics and Automation,* vol. 8, No. 2, pp. 149–160, New York, U.S.A. (Apr. 1992).

Lee et al., C. T., "A Divide–And–Conquer Approach With Heuristics Of Motion Planning For A Cartesian Manipulator", *IEEE Transactions on Systems, Man and Cybernetics,* vol. 22, No. 5, pp. 929–944 New York, U.S.A., pp. 929–944 (Sep./Oct. 1992).

O'Donnell et al., P. A., "Deadlock–Free And CollisionFree Coordination Of Two Robot Manipulators", Proceedings of the 1989 IEEE International Conference on Robotics and Automation, vol. 1, pp. 484–489, Scottsdale, AZ (May 1989).

Weule et al., "Rechnerintegrierte Fertigung Von Abkantteilen", *V.A.I.–Zeitschrift* vol. 130, No. 9, pp. 101–106, Dusseldorf, W. Germany (Sep. 1988).

Reissner, V. J., "Innovationsschub Bei Rechnerintegrierten Umformsystemen", *Technische Rundschau,* vol. 85, No. 5, pp. 20–25, Bern, CH (Feb. 5, 1993).

Geiger et al., M., "Inferenzmaschine Fuer Ein Biegestadienplanungssystem", *ZWF CIM Zeitschrift Fur Wirtschaftliche Fertigung und Automatisierung,* vol. 87, No. 5, pp. 261–264, Munich, DE (May 1, 1992).

Database Dialog, Information Access Co., File 621, Access No. 0134529, Communigraphics Inc:"LVD Introduces New CNC/DNC/CAD/CAM Control System For Press Brakes At IMTS '86", & New Product Announcements, No. 0134529, Plainville, CT, U.S.A. (Jul. 1996).

* cited by examiner

1ST BEND

2ND BEND

INTELLIGENT SYSTEM FOR GENERATING AND EXECUTING A SHEET METAL BENDING PLAN

RELATED APPLICATION DATA

This application is a continuation of U.S. patent application Ser. No. 08/386,369, filed Feb. 9, 1995, U.S. Pat. No. 5,969,973, which is a continuation of U.S. application Ser. No. 08/338,113, filed Nov. 9, 1994, abandoned, the contents of both are expressly incorporated by reference in their entirety. The present disclosure is related to the disclosures provided in the following U.S. applications filed on Nov. 9, 1994: U.S. patent application Ser. No. 08/338,115, issued as U.S. Pat. No. 5,835,684; U.S. patent application Ser. No. 08/338,153, filed Nov. 9, 1994, now abandoned; and U.S. patent application Ser. No. 08/338,095, filed Nov. 9, 1994, now abandoned.

MICROFICHE APPENDIX

This application includes a microfiche appendix for appendices A–D. The microfiche appendix consists of one fiche including 32 frames.

Copyright Notice

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention is directed to methods and subsystems which may be provided in an intelligent bent sheet metal designing, planning and manufacturing system and the like.

2. Discussion of Background Information

FIGS. 1–3 illustrate, in a simplified view, an example conventional bending workstation 10 for bending a sheet metal part (workpiece) 16 under the control of a manually created program downloaded to various control devices provided within the workstation. The illustrated bending workstation 10 is a BM100 Amada workstation.

(a) The Hardware and Its Operation

FIG. 1 shows an overall simplified view of bending workstation 10. FIG. 2 shows a partial view of a press brake 29, positioned to perform a bend on a workpiece 16. The elements shown in FIG. 2 include a robot arm 12 having a robot arm gripper 14 grasping a workpiece 16, a punch 18 being held by a punch holder 20, and a die 19 which is placed on a die rail 22. A backgage mechanism 24 is illustrated to the left of punch 18 and die 19.

As shown in FIG. 1, bending workstation 10 includes four significant mechanical components: a press brake 29 for bending workpiece 16; a five degree-of-freedom (5 DOF) robotic manipulator (robot) 12 for handling and positioning workpiece 16 within press brake 29; a material loader/unloader (L/UL) 30 for loading and positioning a blank workpiece at a location for robot 12 to grab, and for unloading finished workpieces; and a repositioning gripper 32 for holding workpiece 16 while robot 12 changes its grasp.

Press brake 29 includes several components as illustrated in FIGS. 1–3. viewing FIG. 3, press brake 29 includes at least one die 19 which is placed on a die rail 22, and at least one corresponding punch tool 18 which is held by a punch tool holder 20. Press brake 29 further includes a backgage mechanism 24.

As shown in FIG. 2, robot arm 12 includes a robot arm gripper 14 which is used to grasp workpiece 16. As shown in FIG. 1, material loader/unloader 30 includes several suction cups 31 which create an upwardly directed suction force for lifting a sheet metal workpiece 16, thereby allowing L/UL 30 to pass workpiece 16 to gripper 14 of robot 12, and to subsequently retrieve a finished workpiece 16 from gripper 14 and unload the finished workpiece.

In operation, loader/unloader (L/UL) 30 will lift a blank workpiece 16 from a receptacle (not shown), and will raise and move workpiece 16 to a position to be grabbed by gripper 14 of robot 12. Robot 12 then maneuvers itself to a position corresponding to a particular bending stage located within bending workstation 10. Referring to each of FIGS. 1 and 3, stage 1 comprises the stage at the leftmost portion of press brake 29, and stage 2 is located to the right of stage 1 along die rail 22.

If the first bend is to be made at stage 1, robot 12 will workpiece 16 to stage 1, and as shown in FIG. 2, will maneuver workpiece 16 within press brake 29, at a location between punch tool 18 and die 19, until it reaches and touches a backstop portion of backgage mechanism 24. With the aid of barge mechanism 24, the position of workpiece 16 is adjusted by robot arm 12. Then, a bend operation is performed on workpiece 16 at stage 1. In performing the bend operation, die rail 22 moves upward (along a D axis), as indicated by the directional arrow A in FIG. 2. As punch tool 18 and die 19 simultaneously contact workpiece 16, so that workpiece 16 assumes a relatively stable position within press brake 29, gripper 14 will release its grasp on workpiece 16, and robot 12 will move gripper 14 away from workpiece 16. Press brake 29 will then complete its bending of workpiece 16, by completing the upward movement of die 19 until the proper bend has been formed.

Once die 19 is engaged against punch tool 18, holding workpiece 16 in its bent state, before disengaging die 19 by lowering press brake 29, robot arm 12 will reposition its robot arm gripper 14 to hold workpiece 16. Once gripper 14 is holding workpiece 16, die 19 will be disengaged by releasing press brake 29. Robot 12 then maneuvers and repositions workpiece 16 in order to perform the next bend in the particular bend sequence that has been programmed for workpiece 16. The next bend within the bend sequence may be performed either at the same stage, or at a different stage, such as stage 2, depending upon the type of bends to be performed, and the tooling provided within press brake 29.

Depending upon the next bend to be performed, and the configuration of workpiece 16, the gripping position of gripper 14 may need to be repositioned. Repositioning gripper 32, shown in FIG. 1, is provided for this purpose. Before performing the next bend, for which repositioning of robot gripper 14 is needed, workpiece 16 will be moved by robot 12 to repositioning gripper 32. Repositioning gripper 32 will then grasp workpiece 16 so that robot gripper 14 can regrip workpiece 16 at a location appropriate for the next bend or sequence of bends.

(b) The Control System

The bending workstation 10 illustrated in FIG. 1 is controlled by several control devices which are housed separately, including an MM20-CAPS interface 40, a press brake controller 42, a robot controller 44, and a load/unload unit controller 46. Press brake controller 42 comprises an NC9R press brake controller, and robot controller 44 comprises a 25B robot controller, which are each supplied by Amada. Each of press brake controller 42 and robot controller 44 have their own CPU and programming environments. Load/unload unit controller 46 comprises a stand alone Programmable Logic Controller (PLC), and is wired to respective consoles provided for press brake controller 42 and robot controller 44.

Each of controllers 42, 44, and 46 has a different style bus, architecture, and manufacturer. They are coordinated primarily by parallel I/O signals. Serial interfaces are provided for transporting bending and robot programs to the controllers, each of which is programmed in a different manner. For example, logic diagrams are used to program the PLC of the load/unload controller 46, and RML is used to program robot controller 44.

(c) The Design/Manufacture Process

The overall design/manufacture process for bending sheet metal includes several steps. First, a part to be produced is typically designed using an appropriate CAD system. Then, a plan is generated which defines the tooling to be used and a sequence of bends to be performed. Once the needed tooling is determined, an operator will begin to set up the bending workstation. After the workstation is set up, the plan is executed, i.e., a workpiece is loaded and operation of the bending workstation is controlled to execute the complete sequence of bends on a blank sheet metal workpiece. The results of the initial runs of the bending workstation are then fed back to the design step, where appropriate modifications may be made in the design of the part in view of the actual operation of the system.

In the planning step, a plan is developed for bending workstation 10 in order to configure the system to perform a sequence of bending operations. Needed hardware must be selected, including appropriate dies, punch tools, grippers, and so on. In addition, the bending sequence must be determined, which includes the ordering and selection of bends to be performed by bending workstation 10. In selecting the hardware, and in determining the bending sequence, along with other parameters, software will be generated to operate bending workstation 10, so that bending workstation 10 can automatically perform various operations of the bending process.

A plan for a BM100 bending workstation includes generated software such as an NC9R press brake program and a 25B RML robot program. Each of these programs may be created with the use of an initial part design created from a CAD system. Both the robot program and the bending program must be developed manually, and are quite labor-intensive. Previously developed programs are classified by the number of bends and/or by the directions of the bends. Engineers examine each part style to determine if previously developed and classified programs may be used or whether a new program must be written. However, since each classified program typically supports only a narrow range of acceptable part dimensions, new programs must frequently be written by the engineers. The final RML robot program, when complete, is compiled and downloaded by the MM20-CAPS system 40 to robot controller 44. The bending program is entered and debugged on a control pendant provided on press brake controller 42. After entering the robot and bending programs into the system, an operator performs several manual operations to walk the system through the several operations to be performed. For example, an operator will manually operate a hand-held pendant of the robot controller to manually move the robot to the loading and unloading positions, after which the interface console 40 will store the appropriate locations into the final RML program to be compiled and downloaded to robot controller 44. In addition, in producing the bending program, the operator may control the system to follow the planned bend sequence, in order to determine the values for the backgage position (L axis) and the die rail position (D axis).

(d) Intelligent Manufacturing Workstations

Various proposals have been made in order to overcome many of the drawbacks with prior systems such as the BM100 Amada bending workstation, and research has been conducted in the area of intelligent manufacturing workstations. Some proposed features of intelligent sheet metal bending workstations included features such as open architecture, including open system configurations and distributed decision making, and enhanced computer aided design and geometric modeling systems.

A paper entitled "Intelligent Manufacturing Workstations" was presented at the 1992 ASME Winter Annual Meeting regarding Knowledge-Based Automation of Processes on Nov. 13, 1992 by David Alan Bourne; the content of the Paper is expressly incorporated herein by reference in its entirety. In the Paper, an intelligent manufacturing workstation is defined as a self-contained system that takes a new design for a part and manufactures it automatically. The process is stated to include automated setup, part programing, control, and feedback to design.

The Paper discusses several cooponents of an overall intelligent manufacturing workstation, including features such as open architecture, the use of software modules that communicate via a query-based language, part design, operations planning, workstation control, and geometric modeling.

(1) Open Architecture

It has been recognized that an effective intelligent manufacturing workstation should have open software, open controller and open mechanism architecture. That is, a machine tool user operating such a workstation should be able to add onto the software, the controller, and the mechanism architectures of the workstation in order to improve their functions.

(2) Software Modules Using Query-Based Language

Software modules have been suggested, in the above-noted paper by David Bourne, for use in an intelligent manufacturing workstation. Such modules would be split along knowledge boundaries which have been defined in industrial practice, including, e.g., tooling, operations, programming, planning and design. The software modules would be responsible for understanding commands and data specifications, and for answering questions in their own area of specialty. A particular module might be configured to request information from other modules so that it has adequate information to solve its designated problems, to communicate in a standard language, and to work on several problems at once. In addition, each module would know which otter module to ask for information and provide assistance in formulating a question for the receiving module. The general software a proposed in the above-noted Paper is illustrated in FIG. 4. The proposed architecture includes a designer 50, a bend sequence planner 52, a module 54 for sequence planning, execution and error handling, a modeler 56, a module 58 for sensor interpretation, and modules 60, 62 for process control and holding, and fixturing. Each of the modules for sensor interpretation 58, process control 60, and holding and fixturing 62 are coupled to external machine and sensor drives 64. A control subsystem 68 is formed by several of the modules, including sequence planning, execution and error handling module 54, modeler 56, and the modules for sensor interpretation 58, process control 60 and holding and fixturing 62. Control subsystem 68 is shown as being implemented within a Chimera operating system. All of the modules may be connected to other factory systems 66, including, e.g., systems for scheduling, operations, and process planning.

(3) Design Tools

Experimentation has been conducted with design tools that constantly manage the relationship between a stock part and a final part as it is applied to sheet metal bending, as noted in the above-referenced Paper, and as disclosed by C. Wang in "A Parallel Designer for Sheet Metal Parts," Mechanical Engineering Master's Report, Carnegie Mellon (1992), the content of which is expressly incorporated herein by reference in its entirety. The design information, which may be described in 3D, or as a 2D flat pattern, is automatically maintained (in parallel) with another representation of the developing part. In this way, a connection between each of the features of the initial stock part and the final part is maintained.

(4) The Planning System

Once the design is complete, a planner typically then, produces a plan which will later be used to execute the manufacturing process. The plan includes several instructions regarding the sequencing of machine operations to produce the desired part. An optial plan will result in a reduction of setup time, a reduction in the existence of scrap after production of the parts, an increase in part quality, and an increase in production rate. To promulgate such advantages, the above-noted Paper recommends that as much specific knowledge as possible be separated from the planner so that the planner can be easily adapted to different machines and processes. A "query-based" planning system is thus proposed which shifts the emphasis of the planner to asking expert questions, rather than attempting to act as a self-contained expert.

(5) Workstation Control

The above-noted Paper proposes that the controller use an off-the-shelf engineering UNIX workstation as the core computing resource. The workstation may include in its back-plane an extension rack of special-purpose boards and an additional CPU that runs with a real-time version of the UNIX operating system, called CHIMERA-II. See, e.g., STUART et al., Robotics Institute Technical Report, entitled "CHIMERA II: A Real-Time UNIX-Compatible Multiprocessor Operating System for Sensor Based Control Applications," Carnegie Mellon, CMU-RI-TR-89-24 (1989), the content of which is expressly incorporated by reference herein in its entirety.

(6) Geometric Modeling

Geometric modeling is an important component in intelligent-machining workstations. Several modelers have been experimented with during a project in the Robotics Institute at Carnegie Mellon University. A geometric modeler called "NOODLES" has been proposed for use as a modeler in an intelligent manufacturing workstation. The NOODLES modeler is discussed by GURSOZ et al., in "Boolean Set operations on non-manifold boundary representation objects," in *Computer Aided Design,* Butterworth-Heinenmann LTD., Vol. 23, No. 1, January, 1991, the content of which expressly incorporated by reference herein in its entirety. The NOODLES system makes far fewer assumptions about what constitutes valid edge topologies, and thus overcomes problems with other modeling systems, which would enter into infinite loops when the edge topology of a geometric model would violate system assumptions.

6. Term Definitions

For purposes of clarification, and to assist readers in an understanding of the present invention, the following terms and acronyms used herein are defined.

bending apparatus/banding workstation—a workstation or apparatus for performing modern sheet metal working functions, including bend operations.

bending sheets of malleable material—working of sheets of malleable material, such as sheet metal, including, and not limited to, up-action air bending, V bending, R bending, hemming, seaming, coining, bottoming, forming, wiping, folding type bending, custom bending, and so on.

operations plan—a sequence of operations to be performed by a part forming apparatus in order to form a finished part from a piece of unfinished material. In the context of bend sequence planning, an operations plan (bend sequence plan) comprises a sequence of operations to be performed by a bending apparatus for bending workpieces comprising sheets of malleable material, the sequence of operations including a bend sequence which includes all of the bends needed to form a finished bent workpiece.

subplan—a portion of a complete operations plan. In the context of bend sequence planning, a subplan comprises a part of the information needed to set up and/or control a bending workstation/apparatus.

SUMMARY OF THE INVENTION

In view of the above, the present invention, through one or more of its various aspects and/or embodiments, is thus presented to bring about one or more objects and advantages, such as those noted below.

Generally speaking, it is an object of the present invention to provide an intelligent bending workstation environment/system which may be easily upgraded and integrated with additional or alternate hardware and software modules. A further object is to provide such a system which can be used to economically produce very small batch sizes (of one or more workpieces) with high quality, and in a short amount of time. In addition, an object is to provide such a system that is flexible and that is able to accommodate new and different part styles in the design and manufacture process. The system of the present invention is intended to operate efficiently in large volume production, and to learn from initial production runs in order to maximize efficiency.

An additional object of the invention is to maintain quality of the produced parts throughout the process, and to avoid errors and collisions during execution of the process by the bending workstation. It is a further object of the present invention to provide an intelligent sheet metal bending workstation which makes small batches of sheet metal parts from CAD descriptions. In this regard, a process planner is provided that selects the necessary hardware (e.g., dies, punches, grippers, sensors) to be utilized by the bending workstation, determines bending sequences, and generates the necessary software to operate the bending machine.

It is a further object of the present invention to provide such an intelligent, automated bending workstation which first generates a process plan and then executes the generated plan using a real-time sensor-based control method. When the process is executed, the results thereof may be recorded for later review, so that the process may be refined to make it more efficient, and to reduce the occurrence of errors during execution.

An additional object of the present invention is to provide a system which can produce a plan for bending a sheet metal workpiece, in which the smallest number of tooling stages will be utilized to make the part. A further object is to provide a system that will efficiently and automatically produce the plan to be utilized by the bending workstation, set up the workstation, and execute the plan.

The present invention, therefore, is directed to several systems, methods and sub-components provided in connection with a system for generating a plan which comprises a sequence of operations to be performed by a bending apparatus for bending workpieces comprising sheets of malleable material. The bending apparatus has a gripper for gripping a workpiece while performing a bend, and the sequence of operation includes a set of N bends for forming a finished workpiece from a stock sheet of malleable material. The system includes a proposing mechanism for proposing, for an mth operation within the sequence of operations, a plurality of proposed operations including a plurality of proposed bends to be performed by the apparatus. In addition, the system includes a subplan mechanism for providing a proposed subplan that accompanies each proposed bend, and a generating mechanism for generating a plan including a sequence off bends from a first bend through an Nth bend, by choosing each bend in the sequence of operations based upon the proposed bends and the proposed subplan that accompanies each proposed bend.

The proposing mechanism may be designed so that it proposes bends among the complete set of N bends that are still remaining, or proposes bends among the complete set of bends that are still remaining less bends blocked due to constraints. In addition, the proposing mechanism may propose, for an mth operation, a repositioning of a gripper's hold on the workpiece.

In accordance with a specific aspect of the invention, the generated plan further includes at least part of the proposed subplans that accompany the chosen bends. The system may further include a mechanism for representing the mth operation as an mth level of a search tree. The proposed subplans may include setup and control information for the bending apparatus, and may further comprise final locations on the workpiece at which the gripper will grip the workpiece while performing the bends of the bend sequence. The proposed subplans may further include ranges of locations on the workpiece at which the gripper can grip the workpiece while performing the bends of the bend sequence. In addition, the proposed subplans may comprise: numbers representing a predicted number of repositionings of the gripper needed to complete the sequence of bends, indications that the next bend in the sequence cannot be performed unless the gripper is first repositioned, and/or locations on the workpiece at which a repositioning gripper (i.e., a repo gripper) will grip the workpiece while performing a repositioning operation. Additionally, the proposed subplans may include: tooling stages to be utilized to perform the bends in the bend sequence, positions along a tooling stage at which the workpiece will be loaded into the bending apparatus in order to perform the bends, and/or motion plans for maneuvering around tooling stages in performing the bends.

In accordance with a further aspect of the system, an estimating device is provided for estimating a cost to be associated with each proposed bend. In this regard, the generating mechanism may generate a plan including a sequence of bends from a first through an Nth bend, by choosing each bend in the sequence of operations based upon the proposed bend, the proposed subplan that accompanies each proposed bend, and the estimated costs associated with each proposed bend. The estimated costs associated with an nth bend in the sequence of N bends may comprise a k cost calculated based upon an estimated amount of time it will take the bending apparatus to complete one or more operations of the bend. The estimated costs associated with an nth bend in a sequence of N bends may comprise an h cost calculated based upon an estimated total amount of time it will take the bending apparatus to complete one or more operations of each of the rest of the bends in the bend sequence that follow the nth bend.

The one or more operations of the bend which will be timed in order to calculate the k and h costs may comprise moving the workpiece from a tooling stage location of a preceding bend to a tooling stage location of the given bend. The one or more operations of a given bend may also comprise installing, when setting up the bending apparatus, an additional tooling stage needed to perform the given bend. The one or more operations of a given bend may also comprise repositioning of the gripper's hold on the workpiece before performing the given bend.

In accordance with a further aspect of the present invention, the proposing mechanism and the generating mechanism collectively comprise a bend sequence planning module, and the subplan mechanism and the estimating mechanism collectively comprise a plurality of expert modules. The expert modules may each operate the subplan mechanism and the estimating mechanism when the proposing mechanism proposes a proposed operation for performance as the mth operation within the sequence of operations. The plurality of expert modules may comprise a holding expert module which is capable of operating the subplan mechanism to provide a proposed subplan, including information regarding a location on the workpiece at which the gripper can hold the workpiece while performing the bends of the bend sequence. The plurality of expert modules may comprise a holding expert module which is capable of operating the estimating mechanism to estimate a holding cost, calculated based upon whether a gripper's hold on the workpiece is to be repositioned before performing a given bend. In addition, the plurality of expert modules may comprise a tooling expert module which is capable of operating the subplan mechanism to provide a proposed tooling subplan that includes information regarding a position along a tooling stage at which the workpiece will be loaded into the bending apparatus in order to perform a given bend. The tooling expert may also be capable of operating the estimating mechanism to estimate a cost based upon an amount of time to install, when setting up the bending apparatus, an additional tooling stage needed to perform a given bend. The motion expert module may also be capable of operating the estimating mechanism to estimate a cost based upon a calculated travel time for moving the workpiece from a tooling stage location of one bend to a tooling stage location of a next bend.

In accordance with an additional aspect of the invention, the bend sequence planning module may be capable of querying each of the expert modules for a subplan and estimated costs. In addition, each of the expert modules. may be capable of responding to a query by returning a savelist to the bend science planning module, whereby the savelist includes a list of names of attributes, and values respectively corresponding to the attributes, to be saved by the bend sequence planning module.

As a further aspect of the invention, the system includes a prioritizing mechanism for prioritizing proposed bends in accordance with bend heuristics determined based upon the geometry of the workpiece. The generating mechanism may generate a plan, including a sequence of bends from a first through an Mth bend, by choosing each bend in the sequence of operations based upon the prioritized proposed bends and the proposed subplan that accompanies each proposed bend. The prioritizing mechanism may be provided with a mechanism for discounting an estimated cost of a bend having a high priority and increasing an estimated cost for a bend having a low priority.

In accordance with a further aspect of the invention, a determining mechanism may be provided for determining the time needed for, and the feasibility of, producing one or more parts with the bending apparatus based upon the generated plan. In addition, the system may be provided with a mechanism for performing calculations of the costs of producing a given batch of parts, based upon the time determined by the determining mechanism. In addition, or in the alternative, the system may be provided with a mechanism for redesigning the part based upon the time and the feasibility determinations made by the determining mechanism. The system may be further provided with a mechanism for scheduling manufacturing with the banding apparatus depending upon the determined amount of time for producing one or more parts.

In addition to the above-described system, the present invention is further directed to a computerized method for selecting a gripper for holding a workpiece. The gripper is selected for use in a bending apparatus for bending unfinished workpieces comprising sheets of malleable material. The method includes reading information describing the geometry of a library of grippers to be chosen from, forming a set of available grippers excluding grippers that have certain undesired geometric features, and choosing a gripper from a set of available grippers. The gripper is chosen as a function of the width of the gripper, the length of the gripper, and the knuckle height of the gripper. The gripper may include a gripper for holding the workpiece while loading and unloading the workpiece into and from a die space of the bending apparatus. In this regard, the method may include a step of predicting, for each gripper within the set of available grippers, a report number equal to an estimated number of times the bending apparatus will need to change the position at which the gripper is holding the workpiece in order to perform a complete sequence of bending operations on the workpiece. The smallest predicted repo number is then determined, and the set of available grippers is adjusted to include the available grippers having a repo number equal to the smallest predicted repo number, before choosing (from among the set of available grippers) a gripper as a function of the gripper's width, length, and knuckle height.

The gripper may alternatively comprise a repo gripper for holding the workpiece while a robot changes its grip on the workpiece. In this, the method may be further provided with a step of constructing data representations of the respective intermediate shapes of the workpiece when repo operations are to be performed by the bending apparatus, and utilizing the intermediate shapes to determine which grippers are excluded from the set of available grippers. The grippers that cannot securely grasp the workpiece, considering all of the constructed intermediate shape representations, are excluded from the set of available grippers.

In addition to the above-described system and method, the present invention is further directed to a computerized method for determining a location at which a gripper can hold a malleable sheet workpiece while a bending apparatus performs an mth operation on the workpiece. The bending apparatus performs a sequence of operations, including the mth operation, in accordance with a bending plan. The sequence of operations includes a sequence of bends from a first bend through an Nth bend, and the shape of the workpiece changes to several intermediate shapes as the bending apparatus progresses through the sequence of bends. A set of topographic representations is formed by repeatedly generating, along edges of the workpiece, as a variable i is varied, a graphic representation of areas on the workpiece within which the gripper location can be without hindering performance of an ith operation. A determination is made as to whether or not the performance of the ith operation will be hindered by taking into consideration the intermediate shape of the workpiece when the ith operation is performed. The method further includes the step of determining the intersection of all the geographic representations within the set to thereby determine the areas common to the given plurality of operations in the sequence of operations. The mth operation may include changing a robot's grip an the workpiece between bends in the sequence of bends, and/or performing a bend within the sequence of bends.

In addition to the above, the present invention may be directed to a computerized method for selecting tooling to be used in a bending apparatus for bending a workpiece comprising a sheet of malleable material. The tooling includes at least a die and a punch, and the bending apparatus performs, utilizing the selected tooling, a sequence of operations comprising a sequence of bends from a first bend through an Nth bend. The method comprises steps of reading information describing in the geometry of dies and punches, and forming sets of feasible dies and punches excluding dies and punches that have an insufficient force capacity to bend the workpiece and that are incapable of forming desired bends in the workpiece resulting in desired angles and desired inside radii. In addition, the method includes a stop of choosing an appropriate die and appropriate punch that most closely satisfies force, bend angle, and inside radii requirements, excluding punches that will likely collide with the workpiece as determined by failure of a geometric collision test.

The geometric collision test may be performed by modeling a finished 3D workpiece and, for each bend in the sequence of bends, aligning the modeled finished 3D workpiece between a model of each feasible punch and a model of a chosen die.

In addition to the above, the present invention may be directed to a computerized method for determining a layout of tooling stages along a die rail of a bending apparatus. The bending apparatus is adapted to bend workpieces comprising sheets of malleable material, by performing a sequence of operations comprising a sequence of bends from a first bend through an Nth bend. The method includes a step of deciding on an arrangement of a plurality of stages along the die rail and calculating lateral limits based upon the amount by which the workpiece extends beyond a side edge of a tooling stage for the bends of the sequence of bends. In addition, the method includes determining a largest lateral limited for each side of the stage, and spacing adjacently arranged stages to have a gap between adjacent side edges that is greater than or equal to the larger of the determined largest lateral limits of the adjacent side edges.

In addition to the above-described system and methods, the present invention may be directed to a system for generating a plan and for controlling a bending apparatus. As described above, the plan comprises a sequence of operations to be performed by the bending apparatus, and the bending apparatus is adapted to bend workpieces comprising sheets of malleable material. The sequence of operations includes a sequence of bends, from a first through an Nth bend, for forming a finished workpiece from a stock sheet of malleable material. The system includes a setup planning mechanism for generating the sequence of bends and a setup subplan that includes information regarding the manner in which the bending apparatus is to be set up before commencing the first bend in the sequence of bends. In addition, the system includes a forwarding mechanism for forwarding the setup subplan, once generated, to a signalling device for signalling commencement of setup operations to be performed in accordance with the setup subplan. A finalize mechanism is further provided for generating detailed subplan information to complete the plan after the setup subplan has been generated. At least part of the detailed subplan information is generated after the commencement of setup operations has been signalled by the signalling device. The setup Subplan may include one or more of the following types of information: information regarding the layout of tooling stages; information regarding tooling die and punch profiles to be utilized in the bending apparatus; positions of tooling stages along a die rail of the bending apparatus; information regarding what type of gripper to use for manipulating the workpiece through the bend sequence; and information regarding what type of repo gripper to use for holding the workpiece while a gripper changes its grasp on the workpiece in between bends of the bend sequence.

The forwarding device may include a device for forwarding instructions to a sequencer module which directs performance of automated setup operations on the bending apparatus. In addition, or in the alternative, the forwarding device may also, or in the alternative, create a visual representation of setup operations to be performed on the bending apparatus so that a human operator can thereby perform the setup operations.

In addition to the above-described systems and methods, the present invention may be directed to a system for performing setup operations on a bending apparatus so that the bending apparatus can be utilized to perform bending operations on workpieces comprising sheets of malleable material. The bending apparatus includes a die, a tool punch holding mechanist, and one or more tooling stages. Each tooling stage includes a die mounted on the die rail and a tool punch held by the punch holding mechanism. The system further includes a mechanism for receiving information regarding a location of each of the one or more tooling stages along the die rail, and a control mechanism for controlling a position of a guide member along at least one of a die rail and the tool punch holding mechanism based upon the received information so that at least one of the die and the tool punch can be aligned with reference to the guide member and so that the resulting tooling stage will be at a desired location along the die rail.

The control mechanism may be capable of positioning the guide member to be at a specified position along the die rail and to be within a certain distance from the die rail, whereby a die of a tooling stage to be aligned can be abutted against the guide member in order to properly position the tooling stage along the die rail. The guide member may include a backgage finger of a mechanism for performing backgaging when loading a workpiece into the bending apparatus.

In addition to the above-described systems and methods, the present invention may be directed to a system for executing a plan for controlling a bending apparatus for bending workpieces comprising sheets of malleable material. The plan includes a sequence of operations to be performed by the bending apparatus. A sensor-based control mechanism is provided for performing an operation, including moving a workpiece from one position to another, with the bending apparatus utilizing a sensor output to modify the movements of the workpiece. A measuring device measures an amount by which the movement of the workpiece was modified due to the sensor output, and a learned control mechanism performs the operation, including moving the workpiece from one position to another, without modifying the movement of the workpiece utilizing a sensor output. The learned control mechanism controls performance of the operation based upon the amount measured by the measuring device.

The above-listed and other objects, features, and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of illustrative embodiments of the present invention, in which like reference numerals represent similar parts throughout the several views of the drawings, and wherein.

BRIEF DESCRIPTION OF THE APPENDICES

Figure 14:
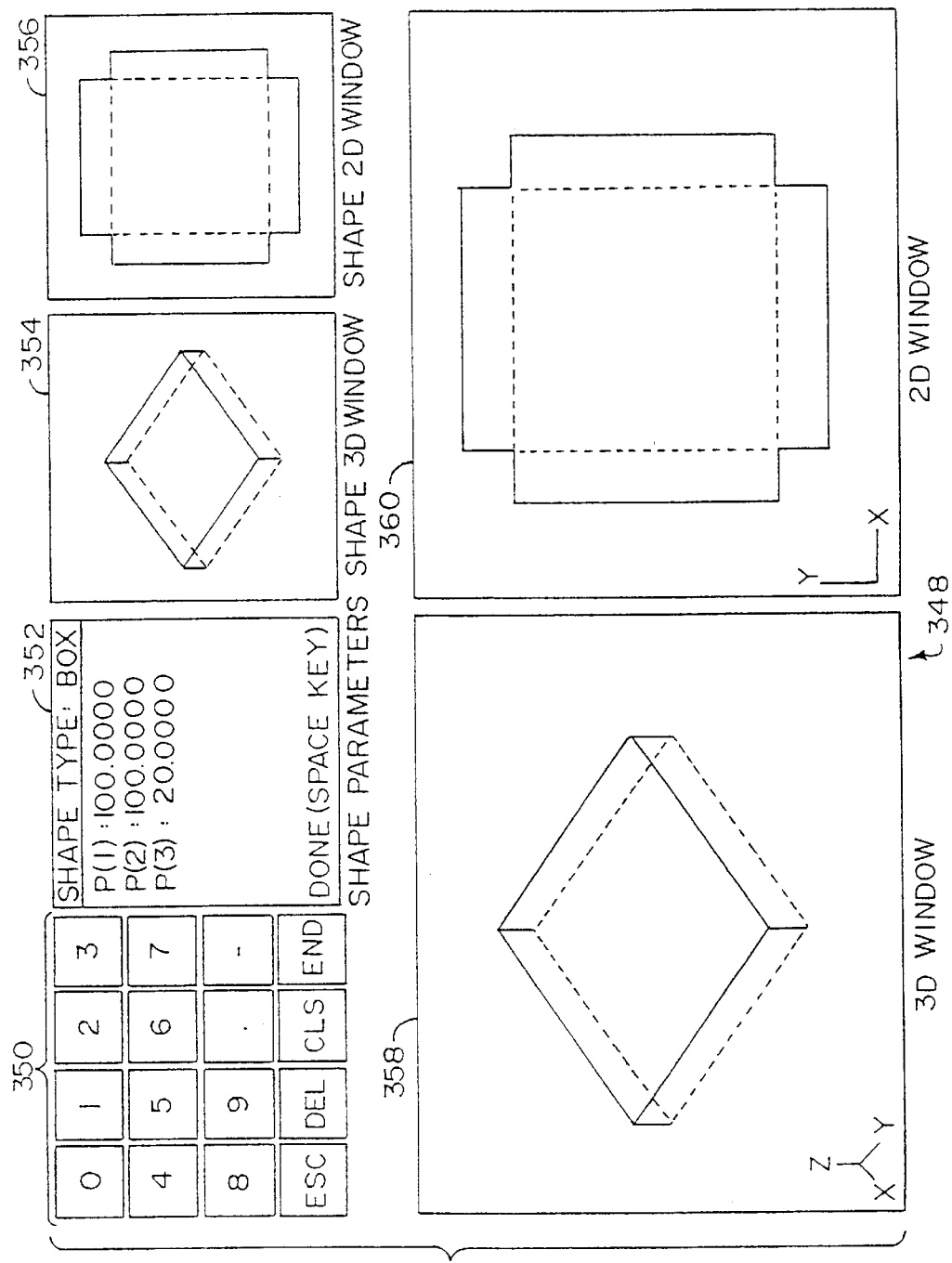
FIGS. 14A–14E illustrate an example graphic user interface of the CAD system provided in the illustrated embodiment, and the steps of designing a part utilizing such a graphic interface.
Figure 14B:
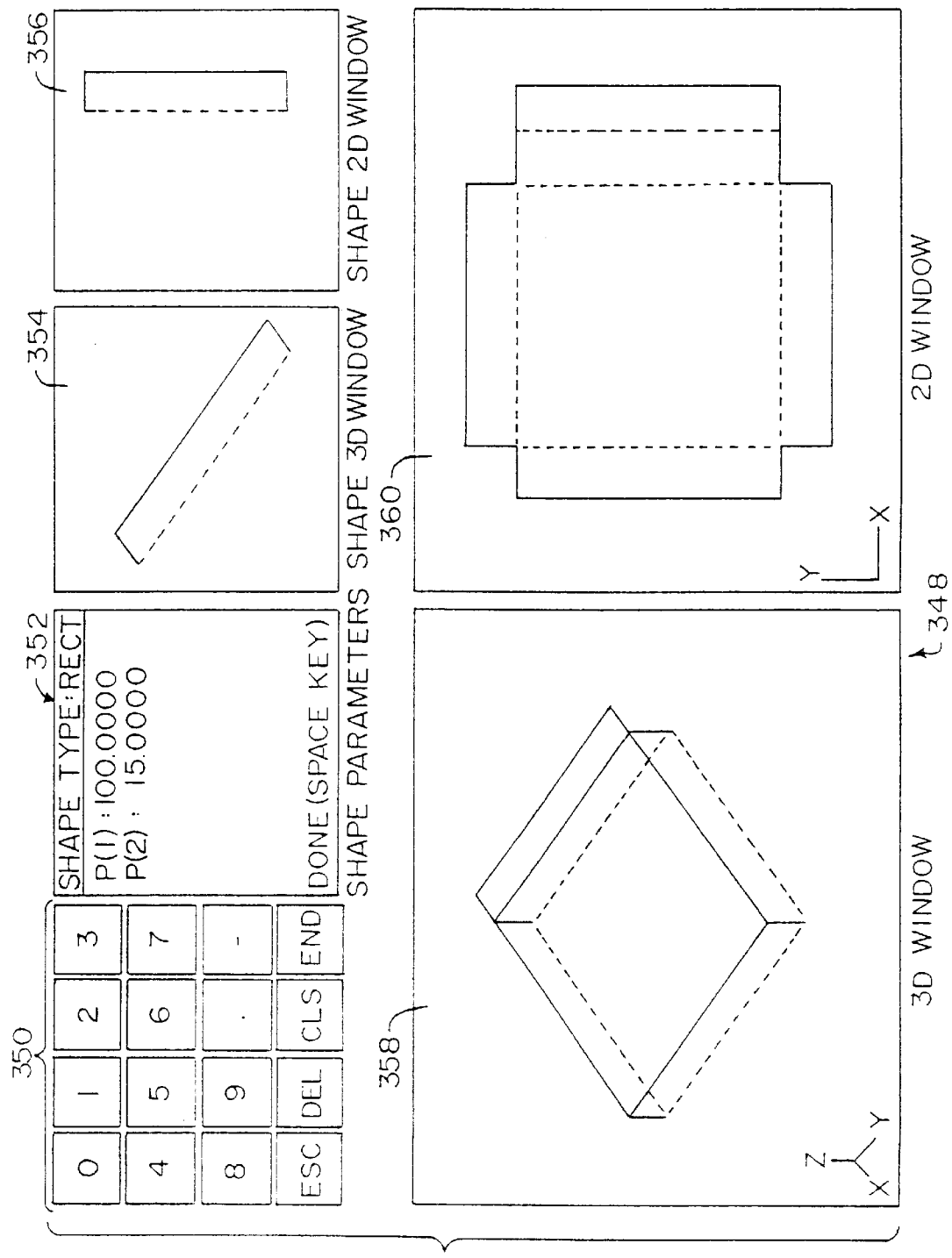
Figure 14C:
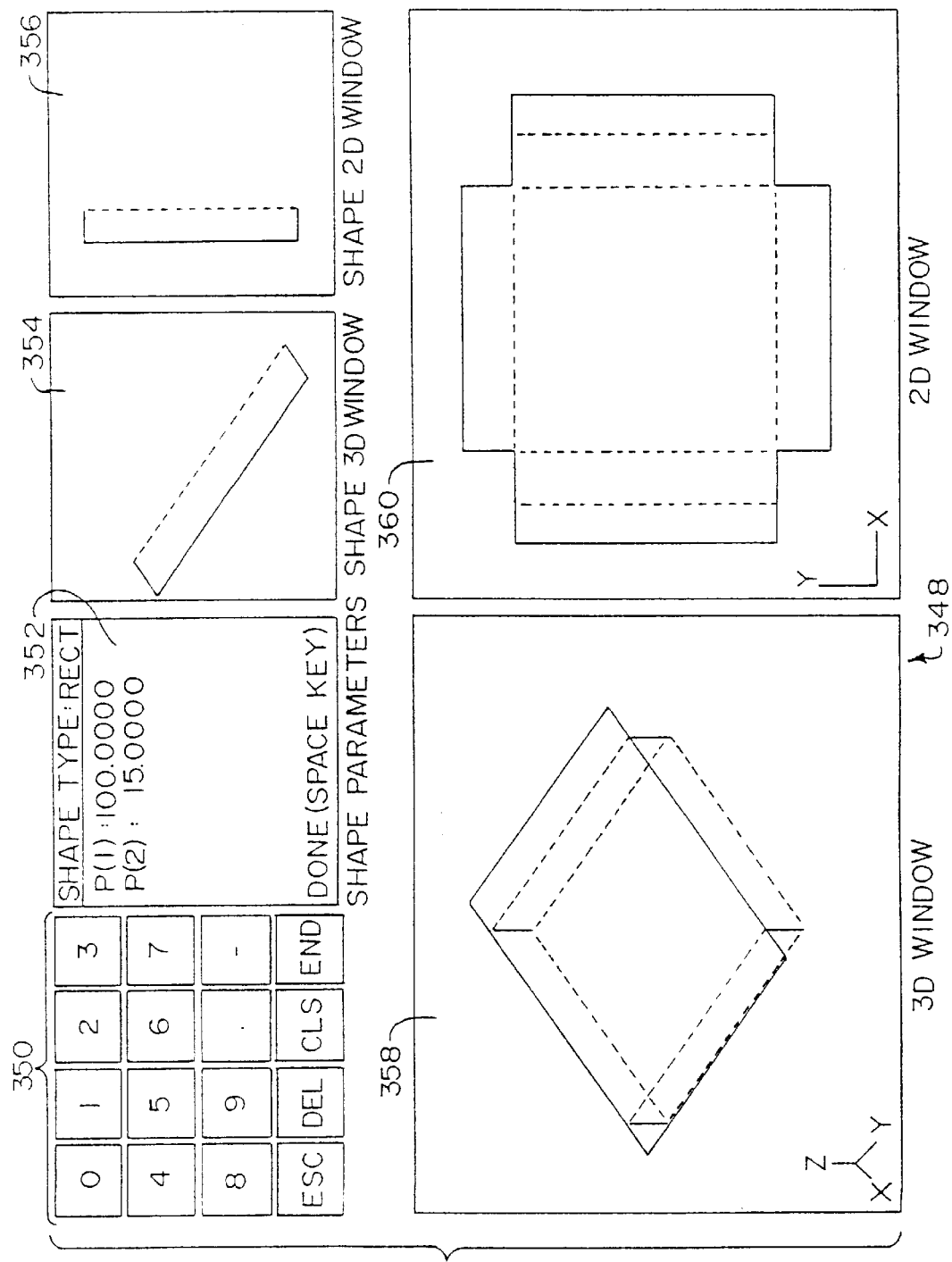
Figure 14:
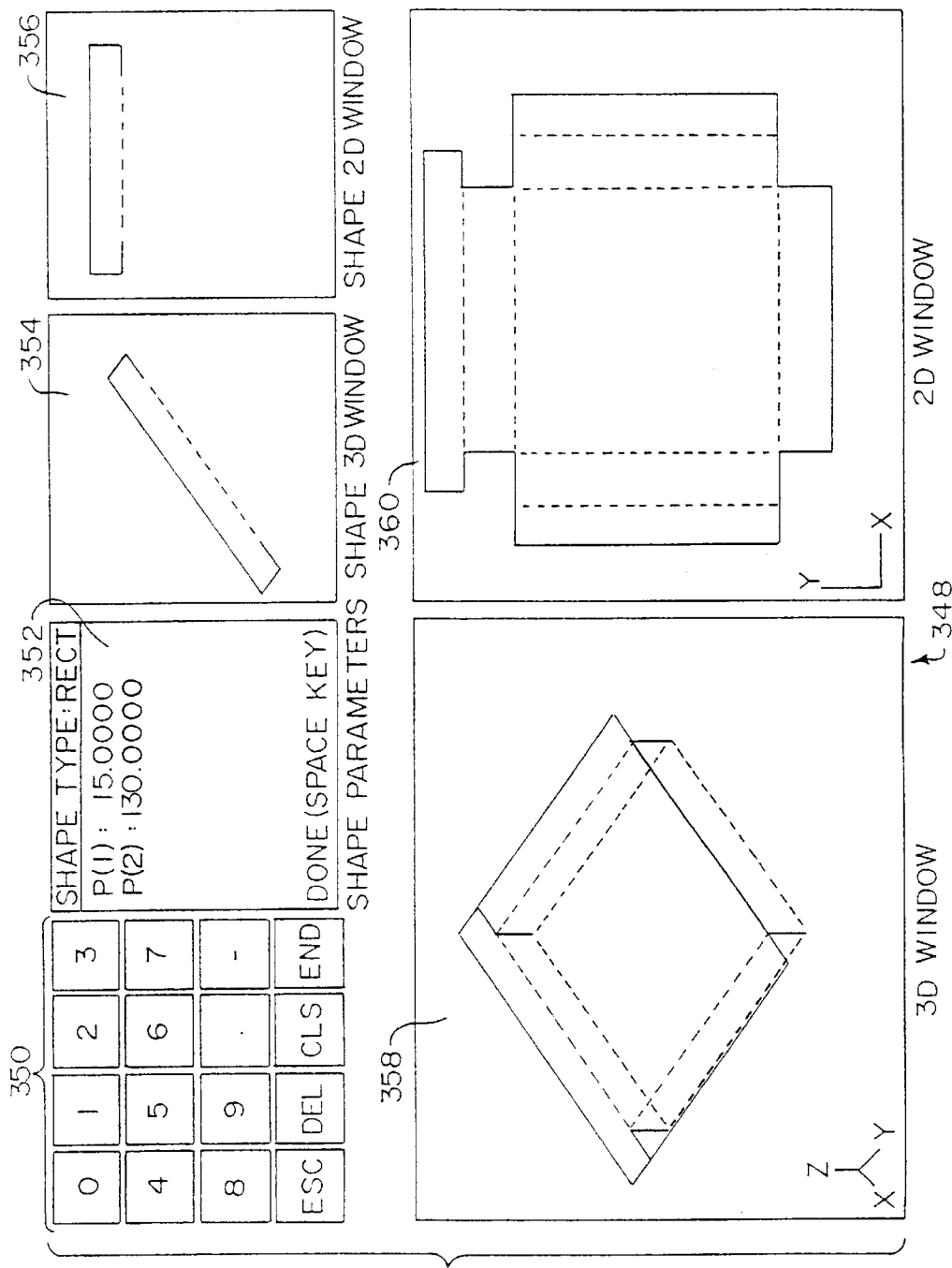
Figure 14E:
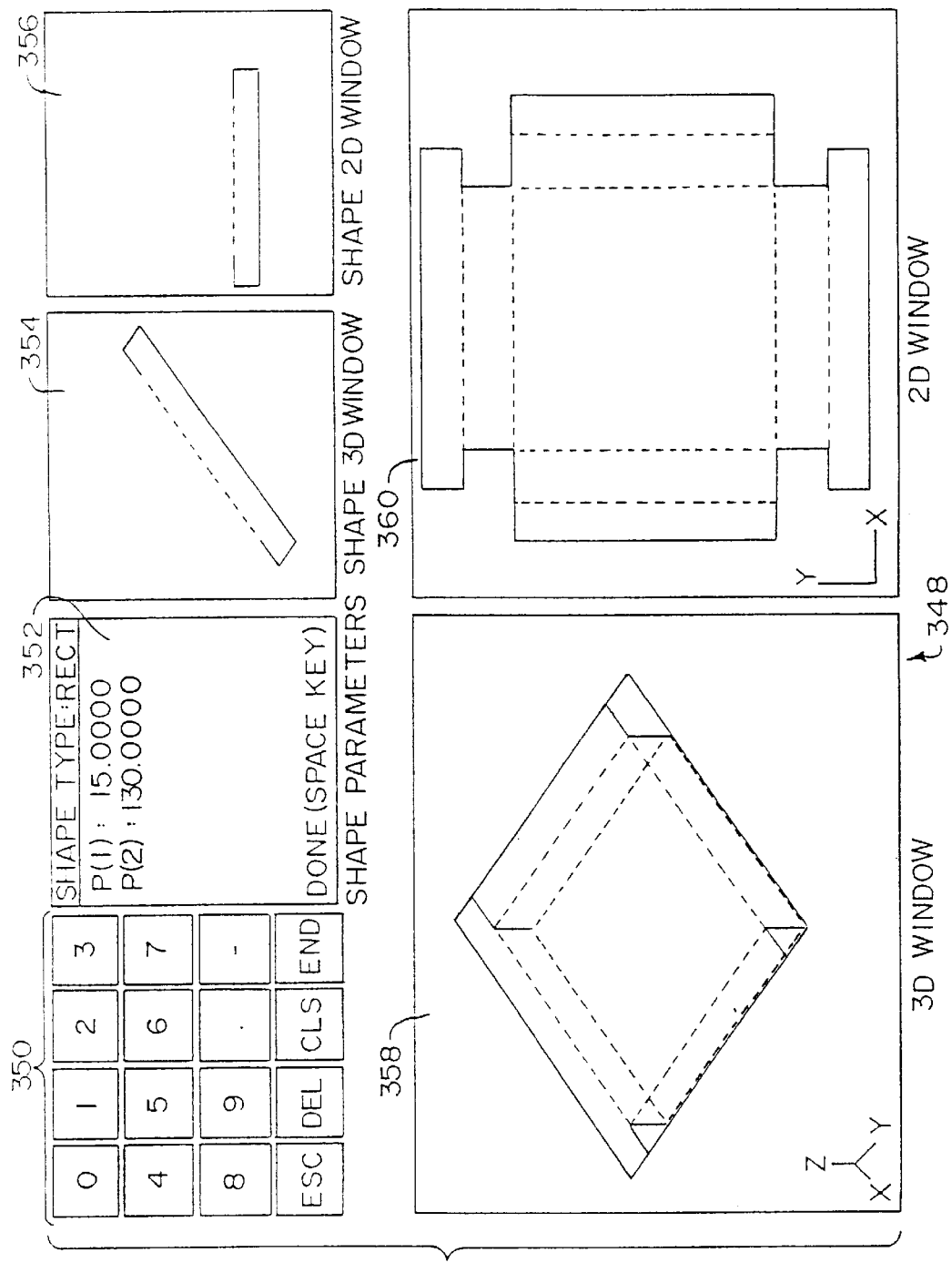

The present invention is further exemplified by a plurality of listings which are provided in the Appendices, wherein:

Appendix A is an output shape file produced by a CAD system which includes a geometric/topological data structure of a workpiece as illustrated in FIG. 14E;

Appendix B comprises an example bend graph listing formed from the geometric/topological data structure provided in the listing of Appendix A;

Appendix C is an exemplary listing,representing the FEL messages that may be generated and forwarded between the bend sequence planner and various experts during the planning process; and Appendix D is an example specification for a listing which represents the final plan in FEL which is forwarded from bend sequence planner to the sequencer of the planning and control 71 illustrated herein.

DETAILED DESCRIPTION OF THE ILLUSTRATED EMBODIMENTS

1. Planning, Setup and Control

Figure 5A:
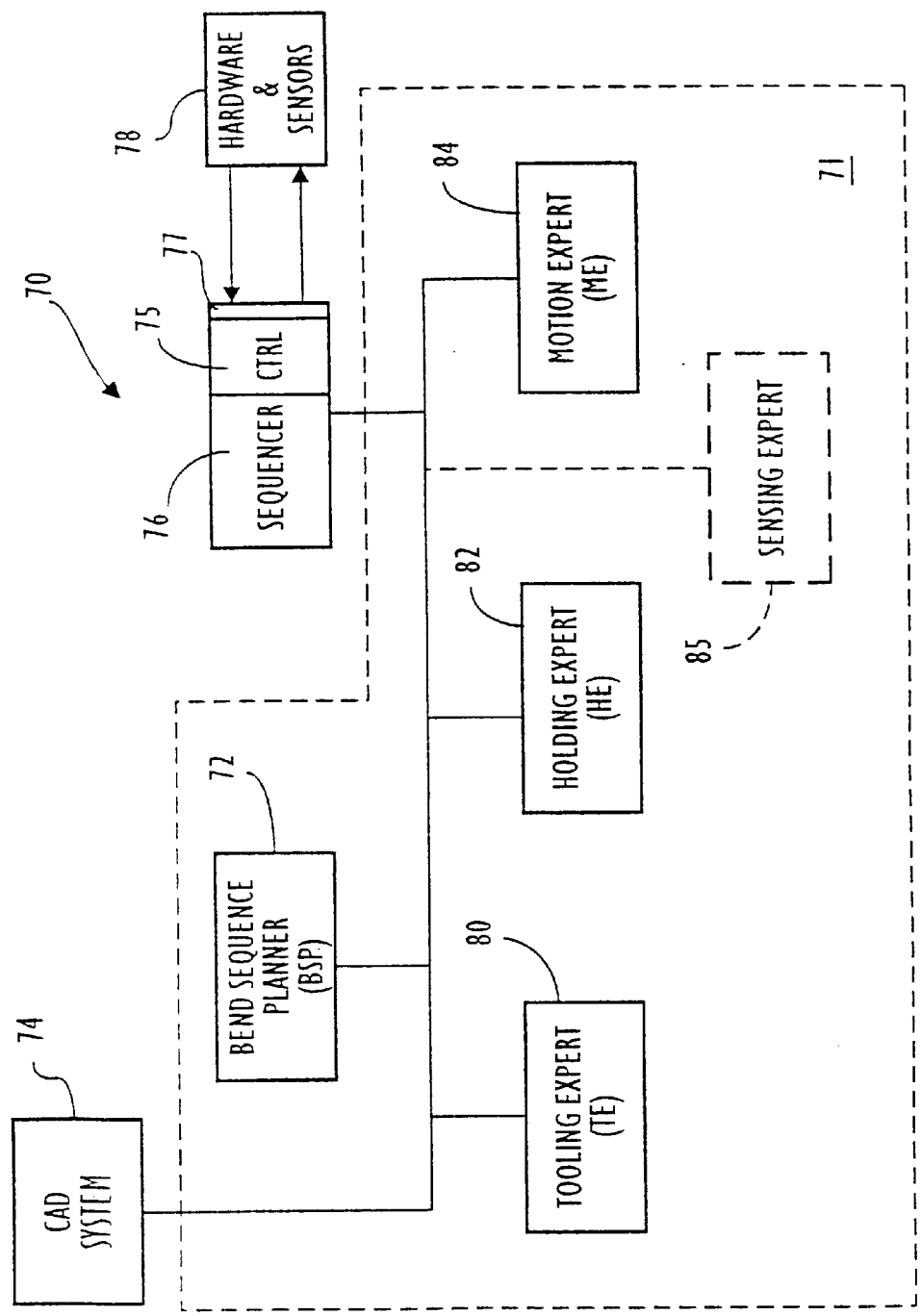
FIG. 5A illustrates a bend planning and control system provided in accordance with an illustrated embodiment of the present invention.
Figure 5B:
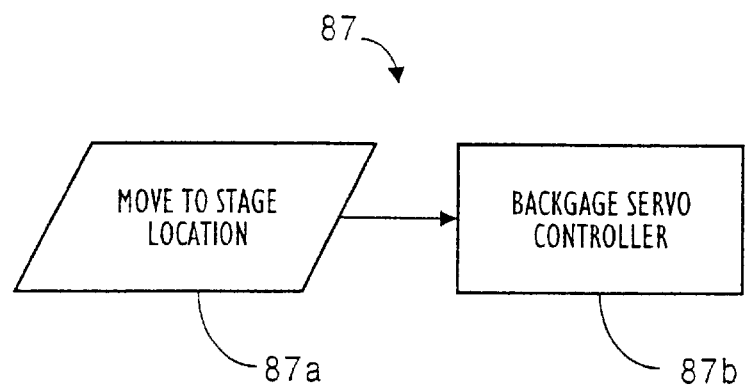
FIG. 5B illustrates a stage setup controlling system.

Referring now to the Figures in greater detail, FIG. 5 illustrates a block diagram of an embodiment of a planning and control system 70 for an intelligent manufacturing bending workstation. In the illustrated embodiment, planning and control system 70 includes a CAD system 74, a bend sequence planner 72, a plurality of experts (sub-planners), and a sequencer 76. Planning and Control System 70 is connected to hardware and sensors 78 via an interface 77.

The experts include a tooling expert 80, a holding expert 82 and a motion expert 84. Additional experts may be provided, such as sensing expert 85 illustrated in dotted lines. Bend sequence planner 72, experts 80, 82, and 84, and CAD system 74 may be implemented within a UNIX-compatible environment on a workstation computer such as a Sparc 10 Sun OS v.4.1.3. Sequencer 76 may be implemented within an additional CPU coupled to the Sun workstation via a bus adaptor. The bus adaptor may comprise a BIT 3 VME-to-VME bus adaptor which extends between the Sun workstation and a remote VME bus passive back-plane. The passive back-plane may hold several interface mechanisms such as VME (Virtual Memory tension) boards, which together form part of interface 77 as illustrated in FIG. 5. Sequencer 76 may be implemented within a real-time UNIX-compatible multiprocessor operating system such as CHIMERA, and may be run by the additional CPU which is provided in the computer workstation's back-plane. Accordingly, in the illustrated embodiment (shown in FIG. 5), CAD system 74, bend sequence planner 72, experts 80, 82, 84 (and 85) and sequencer 76 are each implemented primarily with software which controls the operations of a computer utilizing a UNIX-compatible operating system. Sequencer 76 is implemented within a real-time UNIX-compatible multiprocessor operating system such as ERA.

CAD system 74 is utilized to design a sheet metal 20 configuration, by defining the shape of a stock (flat) sheet metal part and the bends to be performed on the stock part to form a desired three-dimensional finished part. In designing the sheet metal part, CAD system 74 forms one or more information files which describe the part. As a three-dimensional part is designed, in a preferred embodiment, the CAD system maintains in memory, and visually, a three-dimensional representation of the sheet metal part in parallel with a two-dimensional representation of the part. The designer may modify the design by adding or removing details to or from either representation. CAD system 74 may also perform functions such as gathering and/or generating information needed for geometric modeling and requesting advice from bend sequence planner 72 as to whether certain design features can be implemented by the bending workstation.

Bend sequence planner 72 operates in cooperation with tooling expert 80, holding expert 82, motion expert 84, and any other experts (e.g., sensing expert 85) to produce a plan for complete part production by a bending workstation of the part designed with the use of CAD system 74. Bend sequence planner 72 performs functions such as proposing a particular bend in a hypothetical bend sequence, and determining what initial steps must be performed by the system in order to execute such a bend having a position within the hypothetical bend sequence. In determining the consequences of the proposed bend, bend sequence planner 72 may query tooling expert 80 as to what tooling would be needed to execute the proposed bend, querying holding expert 82 as to how the workpiece can be held while performing the proposed bend, and querying the motion expert 84 as to whether and to what extent the robot (which is holding the workpiece) can be manipulated to assist in making the bend. If a sensing expert 85 is provided, bend sequence planner 72 might query sensing expert 85 as to whether a particular sensor-based control strategy is needed in order to facilitate the execution of the proposed bend by the workstation and the costs associated with a particular sensor-based control strategy. Bend sequence planner 72 may be configured to continually propose bends from a first bend consecutively to a last bend in a complete bend sequence, thus resulting in a complete set of bends to perform the final workpiece. Once the successful final bend sequence has been generated in this manner, bend sequence planner 72 may be configured to generate a final plan (which includes a general list of steps and accompanying information needed to control execution of the various hardware elements of the workstation), and forward the plan to sequencer 76.

Sequencer 76 directs execution of the plan developed by bend sequence planner 72. Sequencer 76 interprets commands given by bend sequence planner 72 in the resulting plan, and controls timing of the various commands by parsing the commands and information accompanying the commands and placing them into queues provided for each of the main hardware elements of the sheet metal bending workstation.

Controller 75 comprises a plurality of tasks which correspond to the various hardware elements of the workstation. Each task is activated,by the sequencer in an appropriate manner in accordance with the plan forwarded by the planner.

(a) The Planning System Operations: Planner and Sub-planners

Bend sequence planner 72, and the several sub-planners including, e.g., tooling expert 80, holding expert 82 and motion expert 84, (and sensing expert 85), form a planning system 71.

Bend sequence planner 72 analyzes the designed part (Sheet metal workpiece), provided by CAD system 74, and offers a bend sequence to be performed by the bending workstation. Planner 72 utilizes a state-space search method in order to determine an efficient sequence of bend operations that can be utilized by the bending workstation. Planner 72 converses with tooling expert 80, holding expert 82 and motion expert 84 in order to obtain the information it needs to make its decisions.

Tooling expert 80 responds to queries made by planner 72, and provides information to the bend sequence planner such as which tools will be needed for a particular bend operation or bend sequence. In addition, tooling expert 80 may inform bend sequence planner 72 of the arrangement of tools within the workstation. Tooling expert, in conjunction with planner 72, will attempt to design a setup of tooling so that the fewest number of stages/toolings are utilized to make a particular part, i.e., to execute a complete bend sequence for making the part.

Holding expert 82 makes holding-related determinations, such as, e.g., whether the robot can hold the workpiece while a particular bend, specified by bend sequence planner 72, is being performed. Holding expert 82 may also determine the location at which the robot should hold the workpiece so that the workpiece may be maneuvered through a series of bends, without collision, and without the need to change the robot's grasp on the workpiece. In addition, holding expert 82 may determine the position at which the repositioning gripper should hold the workpiece when the robot's grasp is being changed, and where suction cups 31 of loader/unloader (L/UL) 30 should be placed during unloading and loading of the workpiece.

Motion expert 84 is responsible for generating a motion plan, i.e., the manner in which the robot should be maneuvered in order to move the workpiece through various spaces and along various routes as needed to execute the bends.

Bend sequence planner 72 and the respective experts may be modular to communicate with each other in a query-based manner. For example, before deciding to include a particular bend as part of the bend sequence, bend sequence planner 72 may query tooling expert 80 as to whether there are sufficient tools to handle the bend. Bend sequence planner 72 will then await a response from tooling expert 80. Tooling expert 80 will recognize the query from bend sequence planner 72, and will return with a response, e.g., indicating that there are sufficient tools to handle that particular bend noted by bend sequence planner 72. By way of example, bend sequence planner 72 may also ask holding expert 82 if robot arm gripper 14 can remain holding onto the workpiece during a particular bend operation without repositioning its grasp of the workpiece. Holding expert 82 will then respond to the query made by bend sequence planner 72, and bend sequence planner 72 will then utilize the information to perform its next determination.

Each of the modules of planning system 71 utilizes one or more functions provided by a geometric modeling library (not shown) in order to model the relative interactions and positions of each of the hardware components of the system as may be needed in making their determinations.

(b) System Setup

Once a plan is generated by the planning system, the system will perform a setup process. Mm setup process can be performed completely manually, or it may be automated in full or in part with the use of automated tool changers. The manual activities to be performed during the setup process may include downloading program data to dedicated controllers such as those illustrated in FIG. 1.

As shown in FIG. 5D, each stage (stage 1 and stage 2 as illustrated in FIG. 5D) must be set up by placing a plurality of die segments 810a, 810b, and 810c in stage 1, and 811a, 811b, and 811c for stage 2 along die rail 22. In order to gauge the location at which die segments for each stage will be placed, a human operator will typically measure the distance from the edge of the die rail 22 to a particular edge of the die corresponding to each stage. For example, a measurement may be made from the left edge of die rail 22 to the left edge of each die set for each stage in order to position the die segments corresponding to each stage. Pursuant to a particular embodiment of the present invention, a mechanism may be provided for automatically providing a guide that can be used by the setup operator to place the die segments at the appropriate location along die rail 22. Such a mechanism may comprise a backgage finger 88 which can be automatically positioned at a particular edge of each stage along die rail 22. For example, backgage finger 88 may be first located at location A for purposes of abutting first die segment 810a against backgage finger 88, and subsequent installment of second and third die segments 810b and 810c. After aligning die segments for stage 1, backgage finger 88 may be automatically positioned to the next stage, i.e., stage 2. More particularly, backgage finger 88 may be positioned at one side of the die corresponding to stage 2. In the illustrated example, backgage finger 88 is positioned at the left edge of die 811. While backgage finger 88 is at that position, first die segment 811a may be placed along die rail 22 and abutted against backgage finger 88 for alignment. Thereafter, die segments 811b and 811c may be placed on and secured to die rail 22.

Figure 5C:
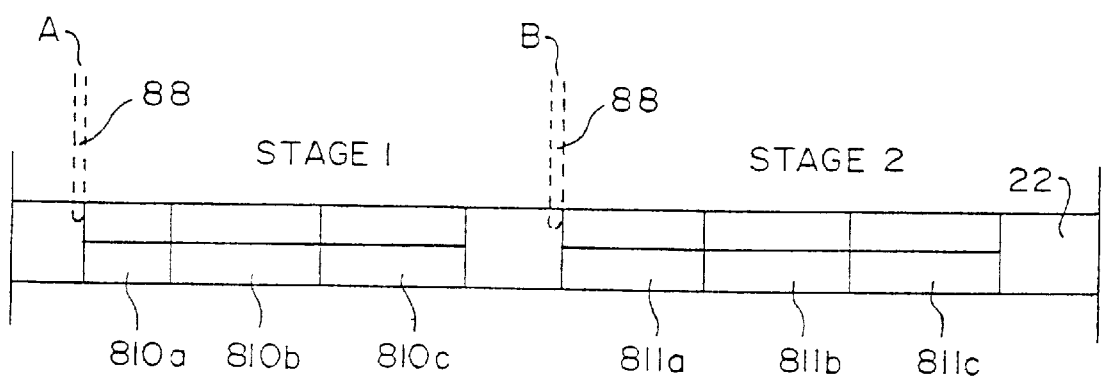
FIG. 5C illustrates a top view of a die rail with a stage setup operation being performed thereon.

FIG. 5C illustrates the main components for controlling the backgage finger 88 to assist in positioning an alignment of dies 810 and 811. The subsystem comprises an input control module 87a which includes a mechanism for instructing backgage servo controller 87b to move backgage finger 88 to one or more particular stage locations.

According to FIG. 5A, alignment control module 87a may be provided in control portion 75 of planning and control system 70, while backgage servo controller 87b may be provided with an interface 77. More specifically, controller 75 may be provided with a backgage task module. The backgage task module may be provided with a backgage finger die-alignment function which may be called by the backgage task module. In calling the die-alignment function, the backgage task module may activate and control a backgage servo controller through the use of a second level backgage device driver 206 (see FIG. 6), which in turn interacts with an appropriate level 1 device driver such as an I/O device driver 220 which interacts with a parallel I/O card connected to the backgage hardware of the bending workstation.

Another manual step that can be performed is positioning and/or adjusting of the punch holders 20. In addition, standard steps may be performed to align tool punch segments so that they are properly seated within each punch holder 20 and correspond to the associated die segments. This may comprise operating the press so that the die segments and corresponding tool punch segments art compressed against each other with a set amount of force. In addition, other standard adjustments and procedures, known to those skilled in the art, may be performed during setup. For example, loader/unloader 30 may need to be adjusted so that suction cups 31 are properly positioned with respect to the workpiece 16.

Figure 1:
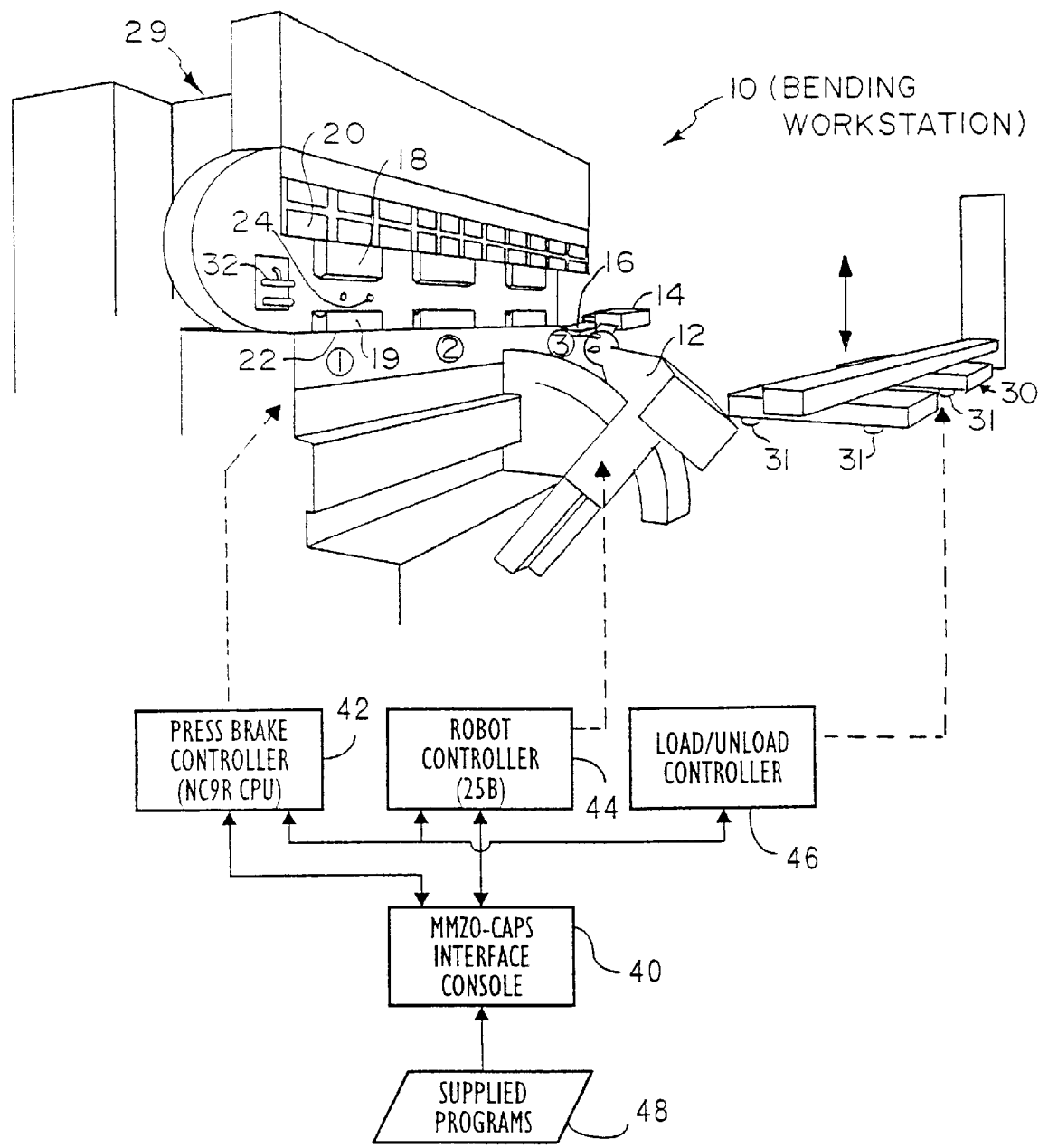
FIG. 1 illustrates a prior art bending workstation.
Figure 2:
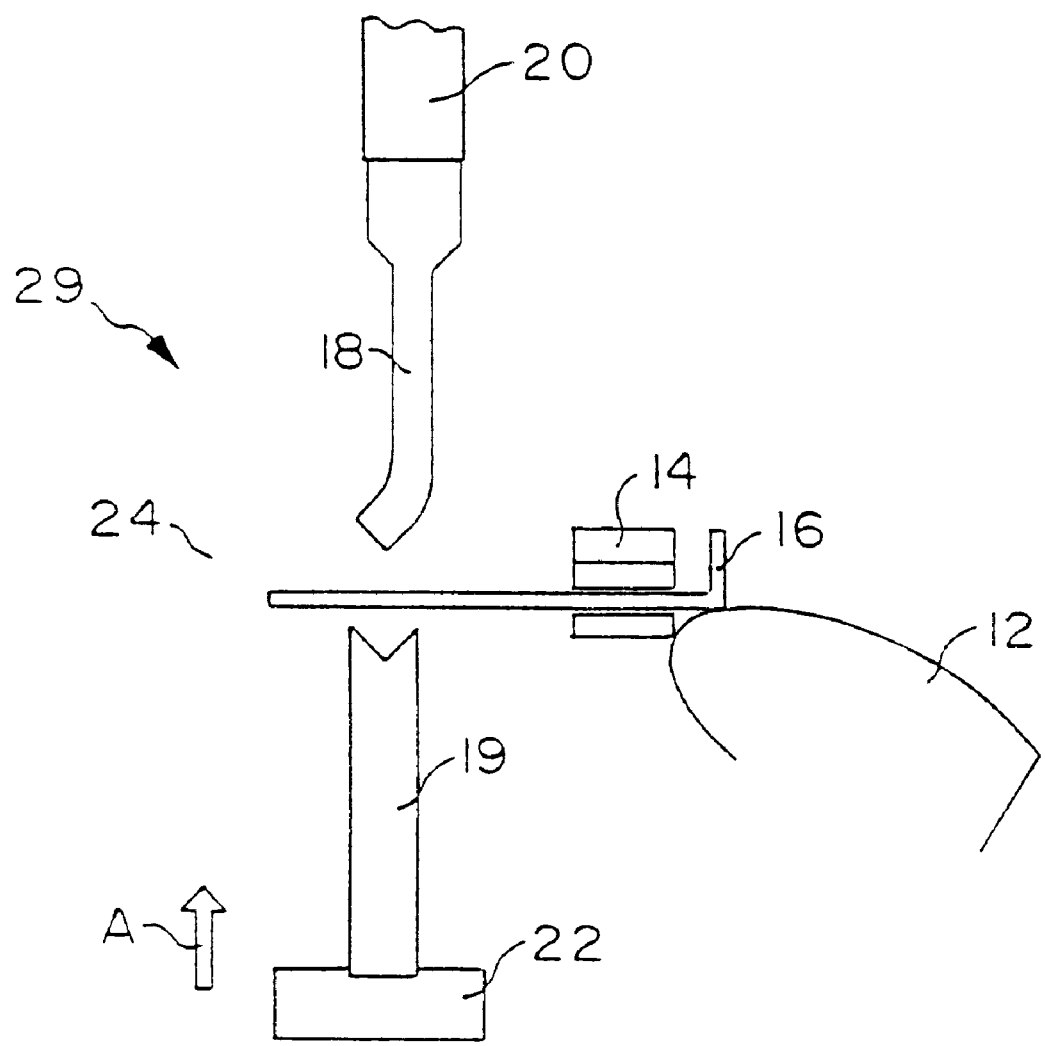
FIG. 2 illustrates part of a side view of a prior art bend press.
Figure 3:
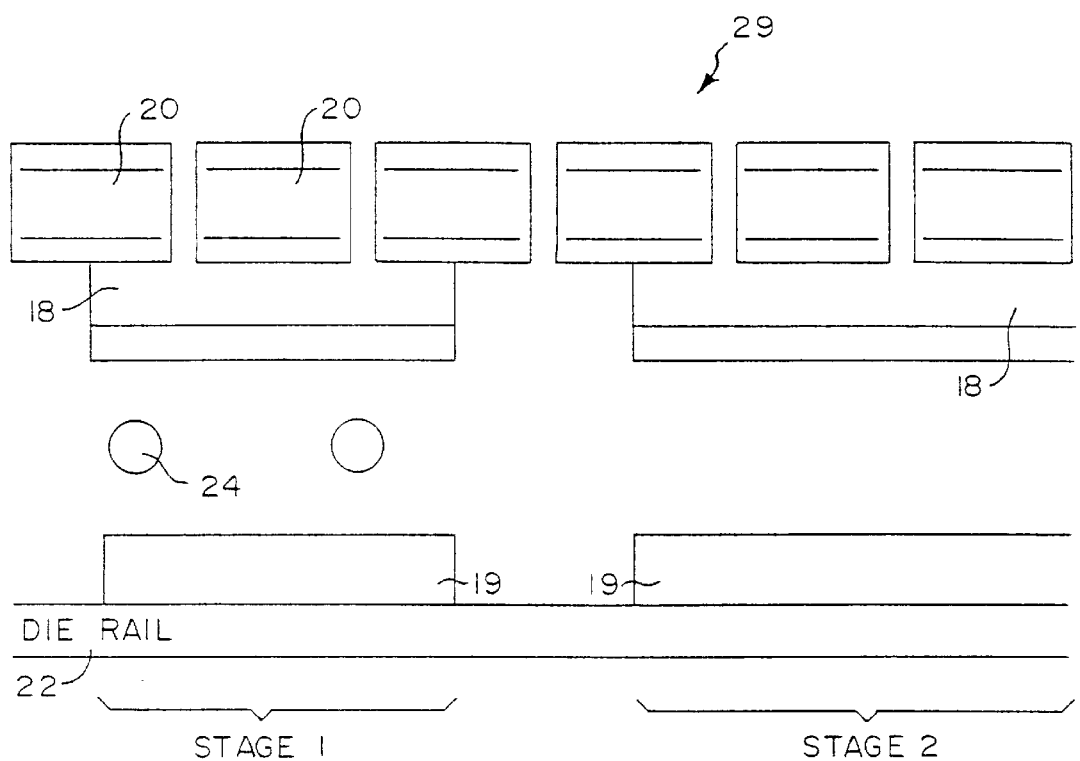
FIG. 3 illustrates a partial front view of a prior art bend press.
Figure 4:
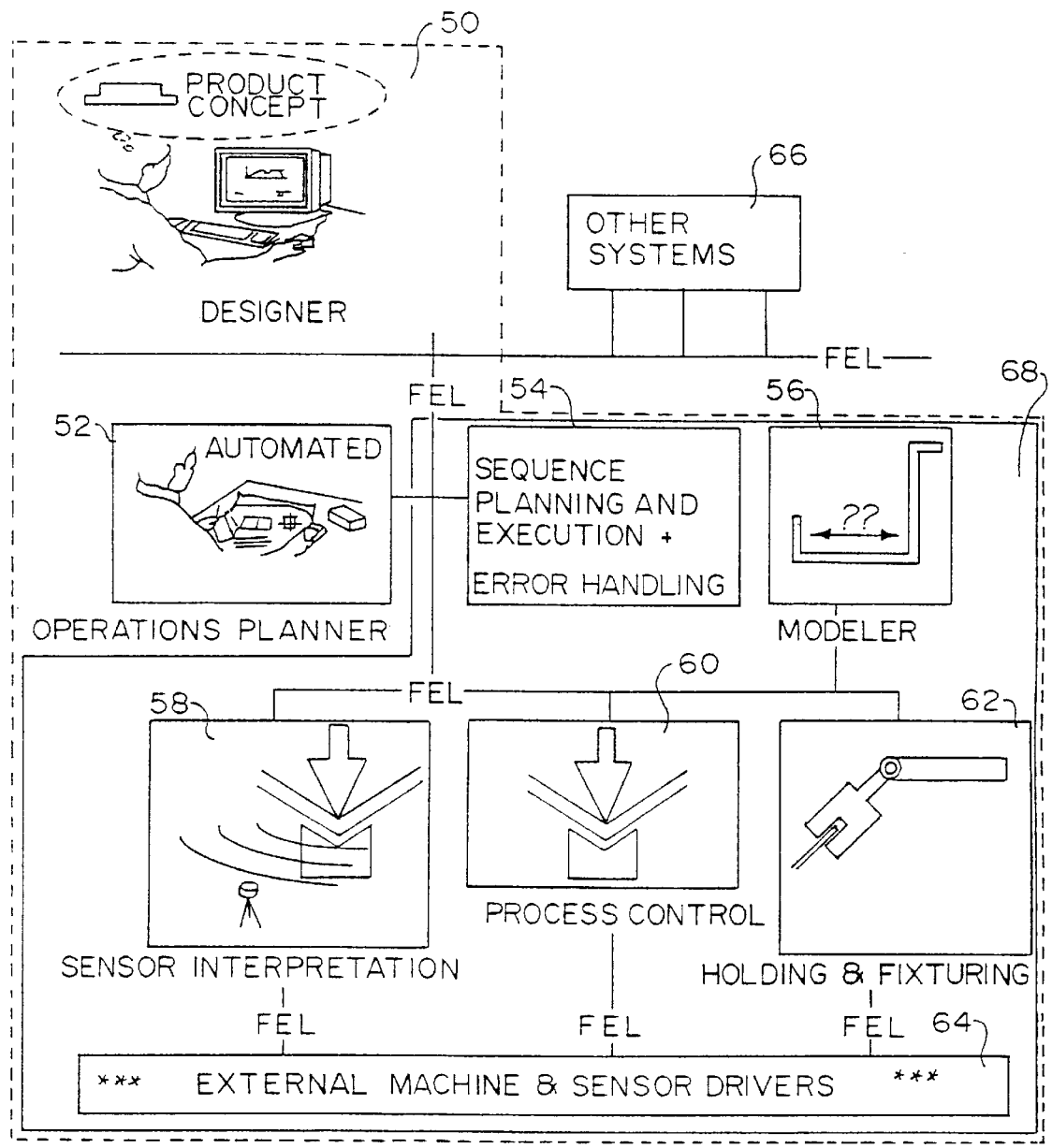
FIG. 4 illustrates a prior art bend planning and control system.

Workstation 10 may be configured to be controlled automatically by the planning system, without any need for human intervention In the event that certain control modules are still maintained as separate, e.g., separate robot control module 44 as shown in FIG. 1, along with separate press brake controller 42 and load/unload controller 46, the planning system may be configured to download appropriate components of the plan to the appropriate control modules.

(c) Sequencing and Control

In the illustrated embodiment, sequencer 76 is implemented within a real-time UNIX-compatible shell such as an Ironics IV-3230 computer with a CHIMERA II operating system. Additional information regarding possible implementations of a real-time scheduler such as sequencer 76 is provided in the CHIMERA manual by Stewart, Schmitz and Khosla, entitled "CHIMERA II Real-Time Programming Environment, Version 1.02" (Oct. 29, 1990), the content of which is incorporated by reference herein in its entirety. Sequencer 76 schedules the general execution of the generated plan by control system 75, which utilizes interface architecture 77 to communicate with various hardware elements and sensors within the system, depicted as hardware and sensors 78 in FIG. 5.

Figure 6:
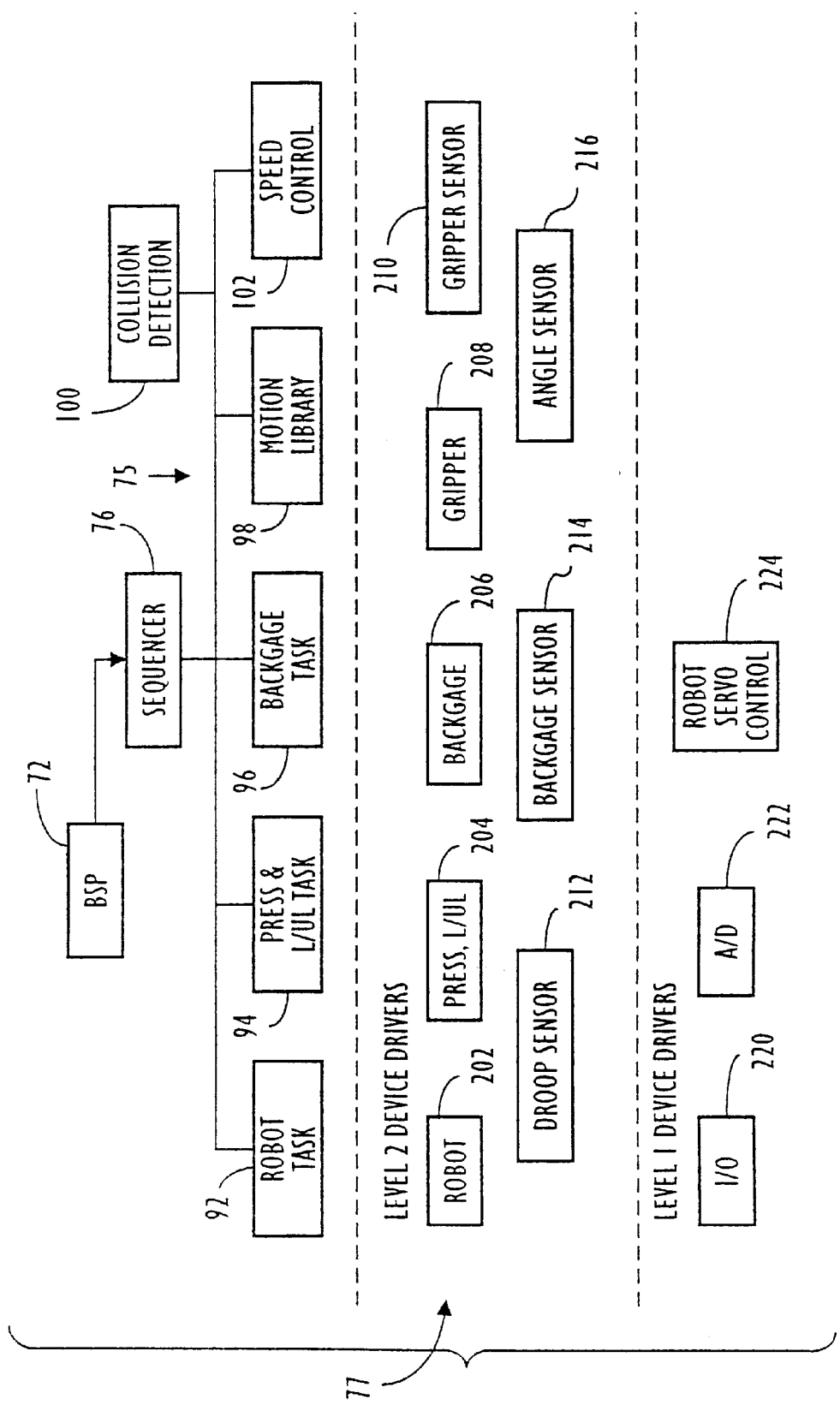
FIG. 6 illustrates a bend planning and control system with a detailed diagram of control system 75 as illustrated in FIG. 5A.

FIG. 6 depicts in greater detail, sequencer 76, control system 75, and interface architecture 77. As illustrated in FIG. 6, sequencer 76 is connected to bend sequencer planner 72 and is further connected to a plurality of modules which comprise control system 75. The modules of control system 75 include a robot task 92, a press and L/UL task 94, a backgage task 96, a motion library 98, a speed control module 102 and a collision detection module 100. Interface architecture 77 comprises a set of level 2 device drivers and another set of level 1 device drivers. The level 2 device drivers (DD's) may include robot DD 202, press and L/UL DD 204, backgage DD 206, gripper DD 208, gripper sensor DD 210, droop sensor DD 212, backgage sensor DD 214, and angle sensor DD 216. The level 1 device drivers may include respective device drivers 220, 222 and 224 for one or more parallel I/O VME cards, one or more A/D VME converter cards, and a robot servo control card.

Accordingly, as illustrated by interface architecture 77, a two-level device driver format is recommended for interfacing the various tasks and control modules of control system 75 to the various hardware elements of the bending workstation. The first level device drivers comprise a UNIX-like interface, with commands supported including open ( ), close( ), read( ), write( ), ioctl( ), and mnap( ) commands. The first level device drivers standardize the interface to the I/O ports to which the hardware devices are attached, such as parallel I/O ports, analog/digital converters and a robot servo control mechanism. The second level device drivers form an interface between the various modules of the control system 75 and the first level device driver. Although there is no standard interface routines provided for the second level device drivers, the second level device drivers may be implemented with the use of a standard form as disclosed in the above-noted CHIMERA manual. With the use of a two-level device driver format, a software interface system may be provided which is reliable, portable, and has code which is easily readable. Specific details regarding the device drivers, and examples implementations thereof, are provided in the above-noted CRA manual, which has been incorporated by reference herein.

As to the VME cards which are the actual I/O ports An connecting the computer to the hardware elements, such cards may include, as noted above, one or more parallel I/O cards, such cards preferably having optically isolated connections between the cooouter and the various hardware elements connected thereto. In addition, the VME cards may include one or more Geonics motion two axis servo control cards II MCCII and one or more A/D converters having sufficient a number of channels and bit resolution, e.g., an A/D converter with 16 channels and 12 bit resolution, such as the IKV-1645 Ironics (Pentland-Burr-Brown MPV 950S). The parallel I/O cards may include an 80-channel (with 64 usable channels) Xycom XVME-240 card and/or 32-channel digital output boards such as the Xycom XVME-220 and/or XVME-212 boards. One or more A/D converters can be provided for inputting information such as reading various data produced by the sensors included in the workstation, such as a gripper sensor, droop sensor, backgage sensor, and/or angle sensor.

Each of the robot task 92, press and L/UL task 94, and backgage task 96, control the appropriate device drivers for controlling the corresponding hardware elements of the bending workstation. Several functions which must be performed during execution of various motion-related functions may be provided in motion library 98. Such functions may include kinematics, trajectory calculations and filtering. Any control functions relating to speed control, i.e., controlling the speed with which various physical elements (such as the robot) of the bending workstation are moved, may be implemented within speed control module 102. Collision detection module 100 is provided in order to perform collision detection which is needed in certain motion control proccsses during execution of the bend process.

Motion library 98 may further include dynamic motion control and sensor-based motion control modules which directly communicate with the second-level device drivers for dynamically controlling the movement of various components of the bending workstation and for changing such control in accordance with sensor-based signals produced by the various sensors provided in this system.

It is noted that in the parallel I/O cards, it is preferred that the computer be optically isolated from the actual hardware connections to prevent damage that may be caused by surges present at the hardware components. Other reasons for optically isolating the parallel I/O cards is to protect the computer and the cards and to prevent the occurrence of ground loops. However, it is not necessary that the A/D converters be optically isolated from the sensors.

2. Bend Sequence Planner

Bend sequence planner 72 of the embodiment shown in FIG. 5A performs three main functions. It generates a bend sequence, including accompanying operations associated with each bend, queries experts as to the consequences of the bend sequence as it is generated, and as to further plan details (subplans) needed to accomplish the generated bend sequence, and compiles all gathered/generated information in order to form an overall plan. The plan specifies the steps needed to execute the bend sequence by a control system which controls operations of the sheet metal bending workstation. Each of the experts of the illustrated planning system 71 performs three main functions when requested by planner 72. They each determine an incremental cost for performing an individual step within the bend sequence, develop proposed/intermediate plan information, and communicate the incremental cost and plan information to bend sequence planner 72. The proposed/intermediate plan information includes two types of information: definite information and indefinite information. For example, at a certain point in time during planning, holding expert 82 will know which regions of the workpiece may be grasped by the robot grasper to perform a given bend within a bend sequence (the grasp regions being definite), but will not yet know the exact grasp location (the precise grasp location being indefinite). A temporary (indefinite) grasp location will be assigned by the holding expert 82, which can be verified at a later time. As noted above, sequence planner will query each expert as to the consequences of a bend sequence as it is generated.

The consequences of the bend sequence are represented in terms of cost. The costs of the bend sequence as it is generated may be determined as a function of one or more of: the amount of time that it takes to perform a particular operation within the bend sequence, the extent to which an operation within the bend sequence will affect the accuracy of the operation and the quality of the resulting workpiece, whether or not there are any safety concerns associated with performing a particular operation at a particular point in a bend sequence, and whether there are any heuristics which, if taken into account, would suggest performing one operation instead of another at a particular point in the bend sequence.

Figure 7:
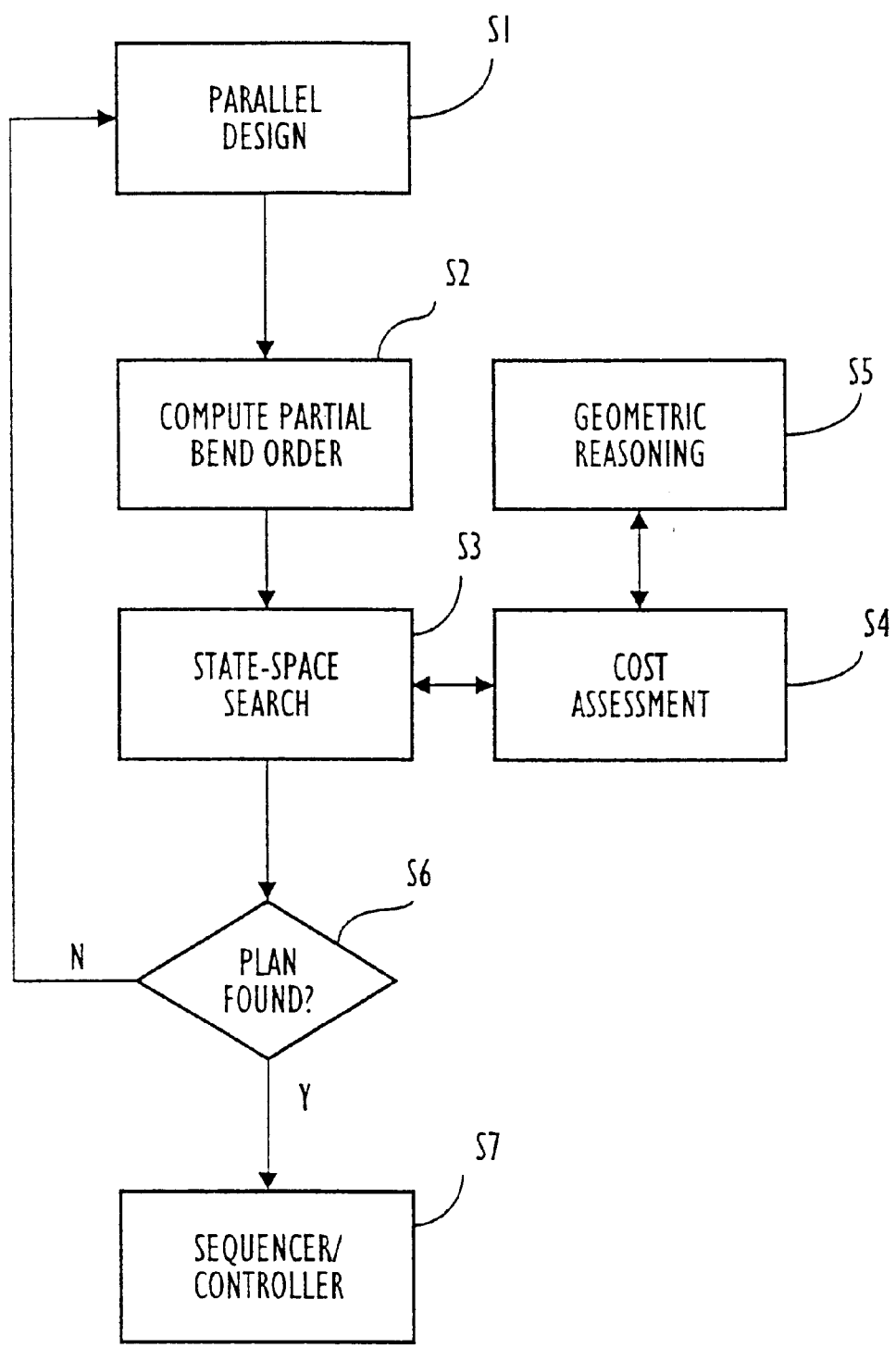
FIG. 7 illustrates a high level flow chart of an overall planning process to be performed by the illustrated planning system.

Bend sequence planner 72 may query experts for information such as what tool profile should be utilized to perform certain bends of the bend sequence, what stage segments will be needed to form a given stage which will be needed to perform a bend, and where can/should the robot gripper grasp the workpiece in performing one or more bends of the bend sequence. In addition, planner 72 may query the experts as to when a repositioning of the workpiece should be performed in the bend sequence, and how should the robot and the workpiece be moved in order to execute various operations throughout the sequence, such as a band, repositioning, workstation load, and/or a workstation unload. FIG. 7 represents, in a high level flow chart, the major steps performed by an example embodiment of bend sequence planner 72. In a first step S1, parallel design processing is performed by CD system 74. The parallel design processing may comprise, among other functions, labeling various geometries corresponding to respective portions of the workpiece, the resulting labels being used later (in step S3) by the bend sequence planner to determine whether heuristics should be considered in generating the bend sequence plan. Subsequently, in step S2, a heuristics framework is produced to guide the bend sequence planner in choosing the bends that will form the bend sequence. In producing the heuristics framework for the bend sequence in step S2, a partial order of bending steps is computed that complies with certain specified heuristics. Subsequently, in step S3 a state-space search algorithm is performed which will be influenced by the heuristics framework. The state-space search algorithm performs an analysis of the implications of performing various bends in a prescribed order, by assigning costs to each bend in step S4. In order to help with the assignment of costs, in step S5, geometric reasoning is utilized, e.g., to determine the physical implications a particular bend will have by modeling the machine and the resulting workpiece as they relate to each other during the execution of each bend.

The heuristics are taken into account by either reducing the assigned costs for a particular bend (if it is preferred due to heuristics) or by increasing the assigned costs (if the bend is not preferred due to heuristics). A particular sequence of bends is thus developed in step S3, which can be executed to produce the desired finished workpiece. Once the state-space search algorithm is performed in step S3, a determination is made in step S6 as to whether or not a complete plan, including a complete bend sequence, has been generated. If a plan cannot be formed for the design that has been specified, the process returns to step S1, where the workpiece may be redesigned to form a part design for which an operational plan can be created.

If a determination is made in step S6 that a complete plan was produced, the process will proceed to step S7, and the complete plan will be forwarded, using FEL, to the sequencer, or the plan may be stored in a file for later retrieval and execution by the sequencer. The state-space search algorithm will preferably comprise an A* algorithm, such as disclosed, e.g., by Nils J. Nilsson in "Problem-Solving Methods. in Artificial Intelligence" McGraw-Hill Book Company, 1971, pages 43–67, the content of which is expressly incorporated herein by reference in its entirety.

It is noted that the cost assignment step S4 may consider variables such as robot motion, gripping positions, the need for regripping, the need to change the gripper, tooling positions, and the need to change the tools. High costs are assigned for variables that will be time consuming, sacrifice quality, and/or expose the system to high risk.

The above-described operations planning method can be termed generative planning (since it automatically generates a bending plan), with weak heuristics and state-space searching. In performing the method, a human inputs the design. A heuristics framework is defined using heuristics which are called "weak heuristics" because they comprise only a limited set of rules. Possible bends are considered, and costs are assigned to each considered bend. The costs assigned to the bends are influenced by the heuristics framework by augmenting or discounting the cost of a particular bend. A sequence of bends of the least total cost is chosen utilizing a state-space searching algorithm.

Generative planning with weak heuristics as disclosed herein should be contrasted with other approaches to operations planning. One such approach includes variant planning with case-based reasoning. In variant planning, a human inputs a design of a new part, and the design is coded according to an index. The index is used to look up an old design which best resembles the current part to be designed and the problems to be solved. A human operator edits the old plan to solve the new problems, e.g., by editing an RML program. One of the problems noted with variant planning is that a similar design may require different or divergent solutions, which will not be discovered by comparison to old plans.

Another approach to operations planning is generative planning with strong heuristics. With generative planning with strong heuristics, the human inputs the design and several labeled features of the new part. Heuristics are then used to determine the total ordering of bends and machine operations, thus being called "strong heuristics." A generative planning system with strong heuristics lacks the flexibility and intelligence of a generative planning system with weak heuristics, and will likely be unable to handle unorthodox problems. Such a system has no understanding as to what heuristics work better in a particular situation, and which heuristics should be discarded. Moreover, such a system will be incapable of developing a plan in many cases.

(a.1) Heuristics

Figure 25:
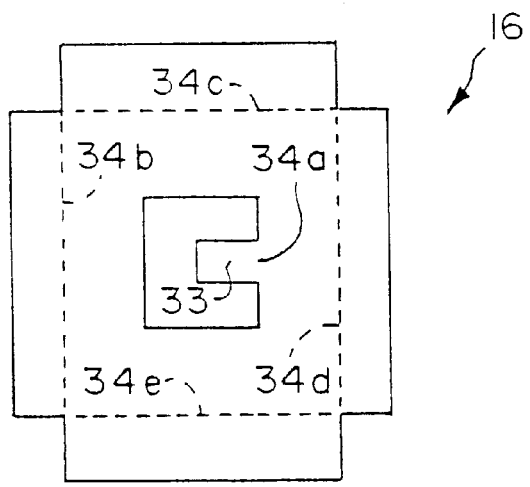
FIG. 25A is an example workpiece having an inner tab.
FIG. 25B is an example workpiece with outer and inner bend lines.
FIG. 25C is an example workpiece with short and long bend lines.
FIG. 25D is an example portion of a bent workpiece, with abutting inside and outside corner edges.
FIG. 25E represents an example cutaway portion of a workpiece with co-linear bends.
Figure 25:
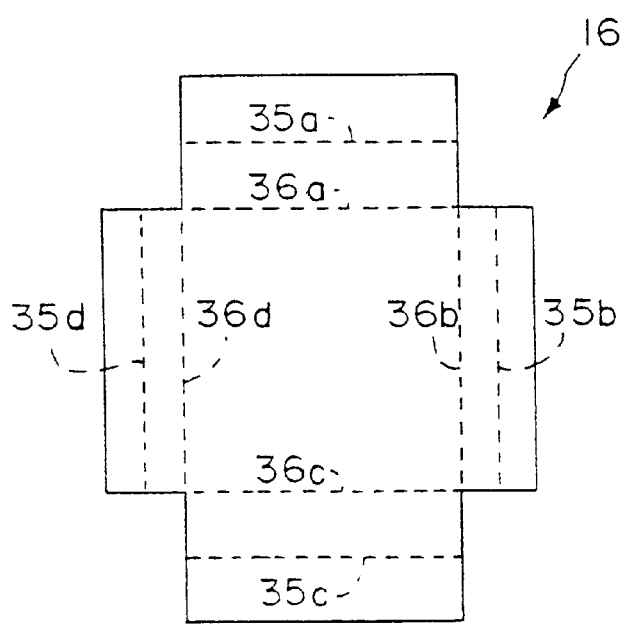

Sheet metal bending heuristics can be taken into account by the bend sequence planner of the present invention. Several exemplary bend heuristics will be described as follows. One heuristic is to bend internal tabs early. FIG. 25A illustrates a workpiece 16 having an internal tab 33 which is to be bent along bend line 34a. In accordance with this heuristic, although there are other bends to be performed along bend lines 34b, 34c, and 34d, it is preferred that the internal tab 33 be bent along bend line 34a first.

In accordance with another heuristic, it is desired that the bends along the outermost bend lines be performed before the bends along the inner bend lines. For example, referring to FIG. 25B, a workpiece 16 is shown which includes outer bend lines 35a, 35b, 35c, and 35d, along with inner bend lines 36a, 36b, 36c, and 36d. In this illustrated example, in accordance with the heuristic, it is desired that the outer bends corresponding to outer bend lines 35a–35d be performed before the bends corresponding to inner bend lines 36a–36d.

Figure 25C:
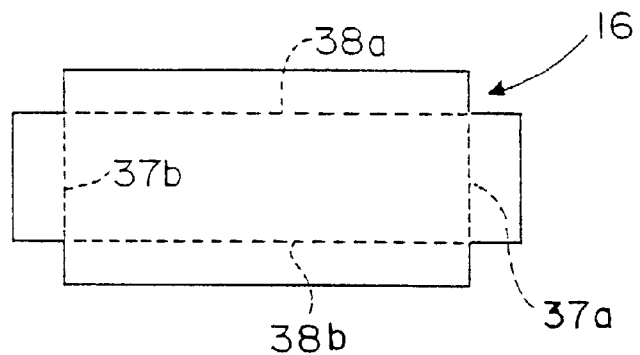

In accordance with a third heuristic, it is preferred that shorter bends be performed before longer bends. FIG. 25C illustrates a workpiece having shorter bends along bend lines 37a and 37b, and longer bends along bend lines 38a and 38b. Accordingly, it is preferred that the bends along bend lines 37a and 37b be performed before the bends along bend lines 38a and 38b.

Figure 25D:
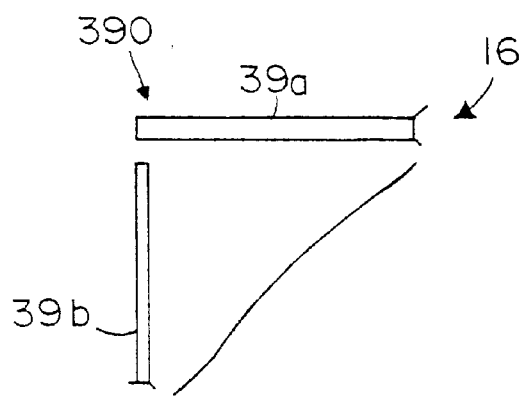

In accordance with a fourth heuristic, it is preferred that bends which form an outside face, of a corner of a 3D workpiece, be performed before the abutting inside corner face. FIG. 25D illustrates a workpiece 16 having an outside face 39a and an inside face 39b which each abut each other at a corner 390. If the bend corresponding to the inside: face was done first, then, when performing the bend corresponding to the outside face 39a, the press would not be able to cause the flange to be bent beyond its intended 90° angle. Accordingly, when the outside face springs back, it will not be flush with the end portion of inside face 39b.

Figure 25E:
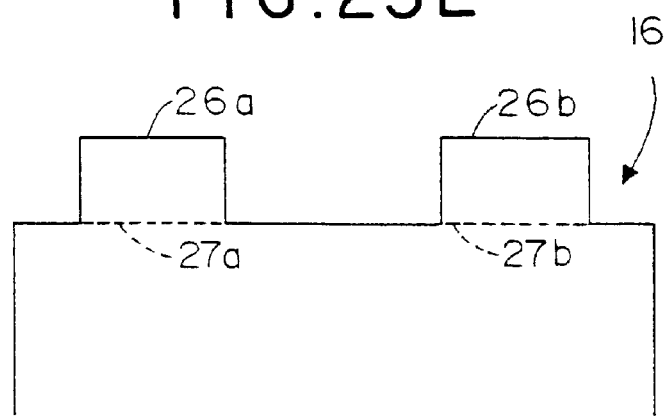

In accordance with an additional heuristic, co-linear bends are performed simultaneously. As shown in FIG. 25E, a workpiece 16 is shown to include two tabs 26a and 26b, which are each to be bent along bend lines 27a, 27b, respectively. Since the bend lines 27a and 27b are co-linear, in accordance with the heuristic, it is preferred that the bends along those bend lines will be performed simultaneously.

The above-described heuristics are only examples of the types of heuristics which may be taken into account by the bend sequence planner of the present invention. A larger or smaller set of heuristics, including all or a portion of the above-listed heuristics, may be utilized by the bend sequence planner.

In order to recognize when certain heuristics may apply to a given workpiece in developing the plan, a list of key features may be created which describe various geometric features of the workpiece which can then be utilized by the bend sequence planner in applying the heuristic rules. A list of key features may be described with respect to the example workpiece 16 illustrated in FIG. 8. Several features may be deduced from workpiece 16, while it is still in its 2D state. An example of such features may include the flange number, the width of the flange, and the height of that flange. Referring, e.g., to flange 7, the flange number of the flange would be 7, a value w would be assigned to the width of that flange, and a value h would be assigned as the height of that flange. In addition, values may be defined which specify an angle-class, i.e., a class of flanges which all have the same bend angle.

Additional features which may be labeled to avoid extra searching in the search space include an indication that the part that is symmetric around one or more axes.

Figure 8:
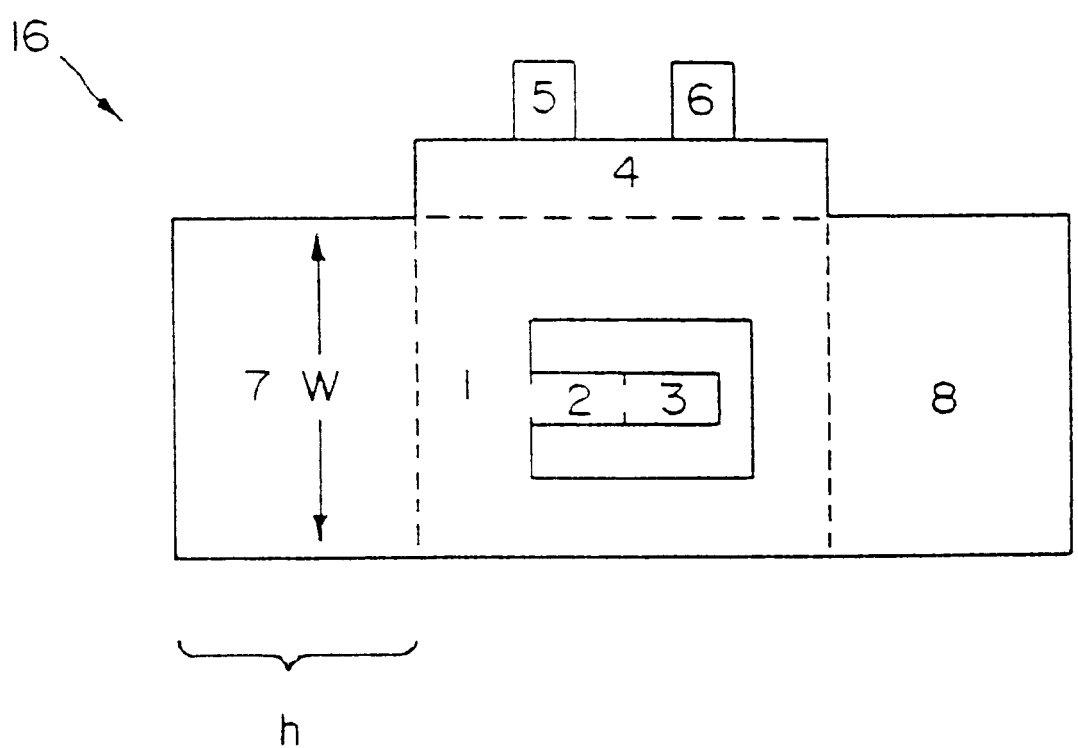
FIG. 8 illustrates a flat workpiece provided for purposes of describing labeled geometric bend-related features.
Figure 9:
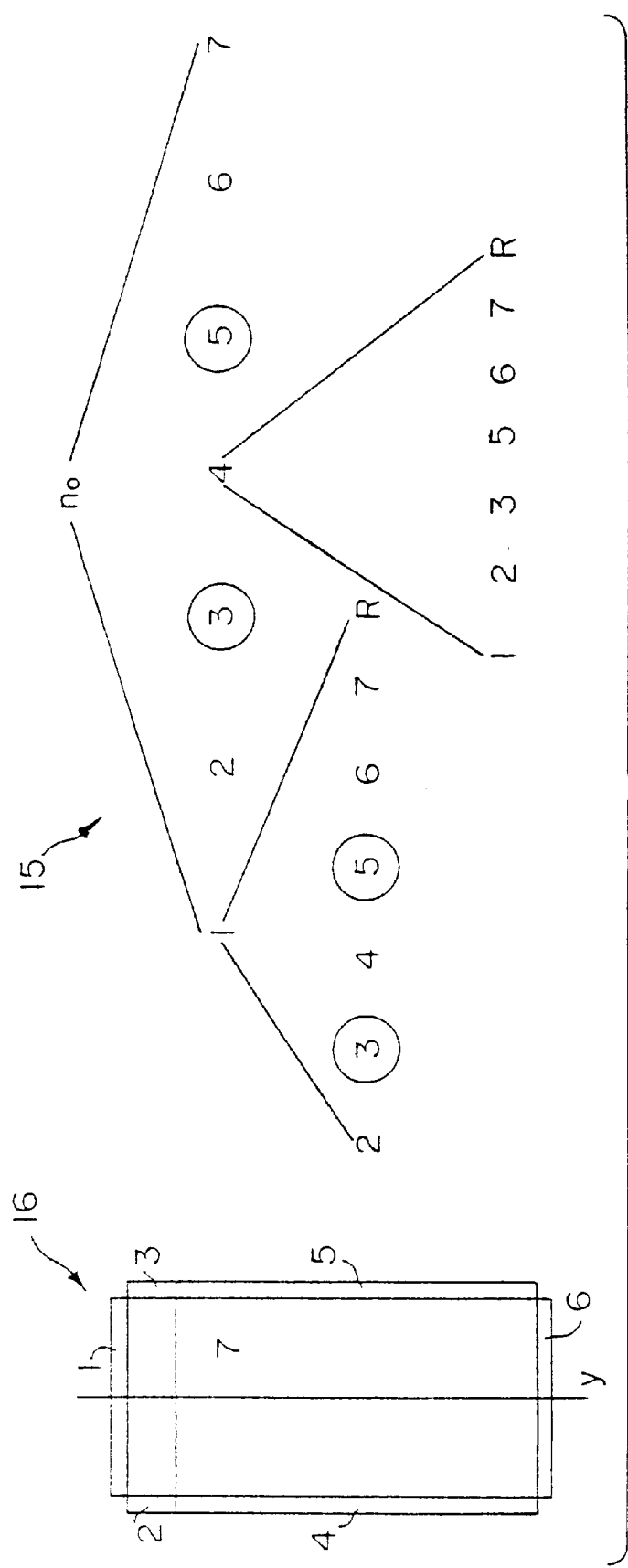
FIG. 9 illustrates a flat workpiece and a corresponding search tree.

FIG. 8 illustrates a workpiece 16 and a search tree 15 corresponding thereto. Workpiece 16 has an axis of symmetry Y which is divided down the middle, running longitudinally through workpiece 16. Accordingly, at the first level of the search, the nodes corresponding to bends 3 and 5 have been eliminated (as indicated by the circles surrounding these bends) because they are symmetrical with nodes 2 and 4. There is no need to also evaluate and search through bends 3 and 5 at the first level, since the same effective results would be obtained if the search started with the bend corresponding to those nodes as opposed to either of bends 2 and 4. If the first bend chosen is bend 1, at the next level of the search, bends 2 and 4 are still symmetrical with bends 3 and 5. Thus, the nodes corresponding to bends 3 and 5 are again eliminated due to the fact that they are symmetrical with bends 2 and 4. However, if the node corresponding to bend 4 is the first chosen node in the sequence, this eliminates the symmetry of workpiece 16. Thus, at the next level of the search stemming from the node of bend 4, there are no nodes eliminated due to symmetry.

(a.2) Constraints

Depending upon the geometric features associated with a part to be formed, there may be bend-related operations which cannot be performed at certain points in the operations sequence being planned. These bend-related operations can be constrained to (or excluded from) certain locations in the bend sequence by using a mechanism referred to as a "constraint". A feature extraction module (not shown) may be provided to automatically label geometric features from geometric models produced by the design system (e.g., using data structures similar to those indicated above), and the geometric feature labels can be used to form legal phrases (called constraints) in an interface communication language, such as FEL.

Figure 26A:
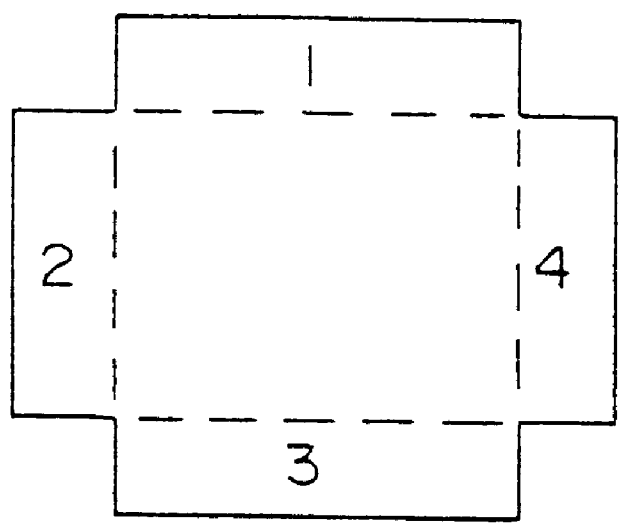
FIGS. 26A, 26B, 27A–27C show example workpieces used to explain constraint expressions.
Figure 26:
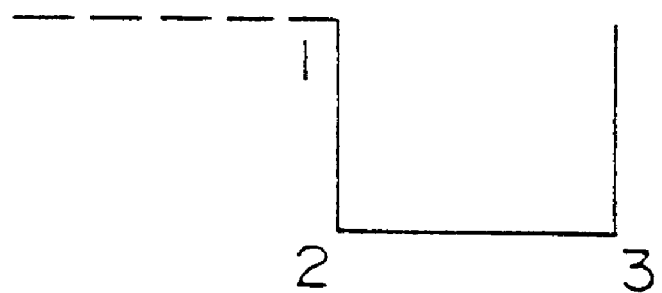

Constraints may be defined by using a data structure that allows a particular arrangement of bend operations to be specified, in varying degrees of flexibility. For example, for a four-sided part 16 as illustrated in FIG. 26A, the following constraint statement can be used to specify the order in which bends 1, 2, 3, and 4 are performed:

(constraints (( 1 2 3 4 )))

This statement signifies that the first bend must be performed a before the second, which must be performed before the third, which must be performed before the fourth. Further, since there are no operators included in the statement, there may not be any other bend operations performed before, between, or after any of bends 1–4.

If the bend 2 must be performed before bend 3, but there are no other constraints on the arrangement of the bend operations in the bend sequence, the following constraint statement may be used:

(constraint (( * 2 * 3 * )))

The operator "*" acts as a "wild card", and allows either no bend operations or any number of bend operations to be performed at its location in the bend sequence, and the type of bend operations which may be performed at its location can be among any of the remaining bend operations not specified in the constraint statement.

Another wild card operator, "?", can also be used, and it signifies that exactly one bend operation, among those not specified in the constraint statement, must be performed at its location in the bend sequence. Thus, if precisely one bend operation must be performed before bend 2 in the part shown in FIG. 26A, but there is no limitation on the number or type of bend operations following bend 2 (except that they may not include bend 2), the following constraint statement can be used:

(constraint (( ? 2 * ))).

The constraint statements may also include grouping operators, which require that certain bend operations be grouped together with no limitation on the order of the bend operations within the group. For example, the following constraint statement requires that bends 2 and 3 be before bend 4 in the bend sequence, and that bends 2 and 3 be grouped together with no bend operations therebetween:

(constraints (( * { 2 3} * 4 *))).

More than one constraint expression can be included within a constraint statement. For example, the following constraint statement includes the above grouping constraint expression, as well as an additional constraint expression which further specifies that bend 1 must be before bend 4 without any additional limitations as to the inclusion and arrangement of the other operations with respect to bends 1 and 4:

(constraints (( * { 2 3 } * 4 * )( * 1 * 4 * ))).

There can be any number of bend operations within a group, and groups can be nested in order to specify that there is no requirement that a plurality of groups be in a specific order. For example, the following expression specifies that bends 1 and 2 must be next to each other in the bend sequence, and bends 3 and 4 must be next to each other in the bend sequence. However, there are no other constraints as to the inclusion and arrangement of other bend operations due to this constraint expression.

( * {{ 1 2 } * { 3 4 }} * ).

Some additional example constraint expressions may include ( * 7 ), which means that bend operation 7 must be performed as the last bend operation in the sequence, and ( * 7 ? ), which means that bend operation 7 must be performed as the second to last bend operation in the sequence.

The types of operators that can be used to define constraints may be expanded to include boolean operators such as NOT, OR, and AND. For eample, a constraint which uses a NOT operator could be ( * NOT 7), which would mean that the seventh bend operation could not be the last operation of the sequence.

There is virtually no limit to the types of constraints that can be specified, and any entity in the planning system, including the various experts as well as a human operator of the bend sequence planner, can define constraints. A constraint manager may be provided, e.g., within the bend sequence planner, in order to help maintain the consistency of constraints and resolve conflicts that arise between constraints.

Figure 27A:
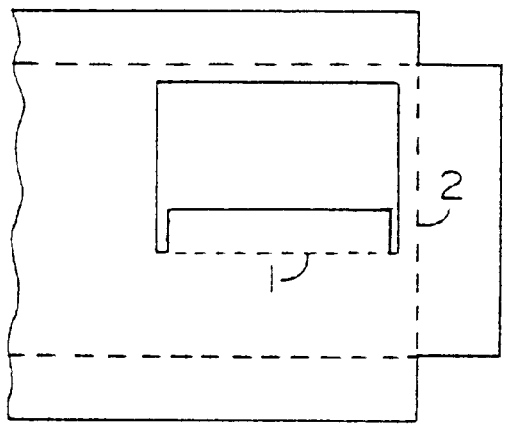
Figure 27C:
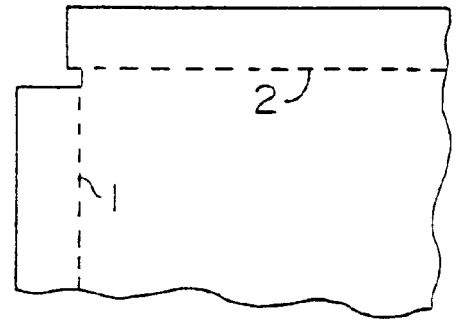

By way of example, the types of constraints may include constraints for (1) channels (e.g., as shown in FIG. 26B), (2) angle bends, where the bend line for the flange to be bent intersects and is close to a non-end point portion of a bend line of another bend (and both of the bends are to be performed in the same direction, e.g., they are both positive bends) (e.g., as shown in FIG. 27A), and (3) flanges which when bent form a corner with an outside flange and an inside abutting flange (e.g., as shown in FIG. 27C).

The constraint expression for the channel illustrated in FIG. 26B usually must be ( * 2 * 1 * 3 * ), even though a common heuristic prefers that bends an outer bend lines be performed before those of inner bend lines, which might suggest a constraint of ( * 3 * 2 * 1 * ). This conflict in constraint expressions, it it existed, would have to be resolved in favor of the channel constraint ( * 2 * 1 * 3 * ).

The constraint expression for the pair bends shown in FIG. 27A may be as follows:

( * 2 * 1 * ).

If the order of bends were different, i.e., if bend 1 was performed before bend 2, the flange of bend 2 would not be bendable beyond 90 and thus could not be properly performed (since when bending malleable materials with elastic tendencies such as sheet metal, the part must be bent slightly beyond the goal angle of the bend).

The constraint expression for the pair of bends shown in FIG. 27C may be as follows:

( * 2 * 1 * ).

Figure 27B:
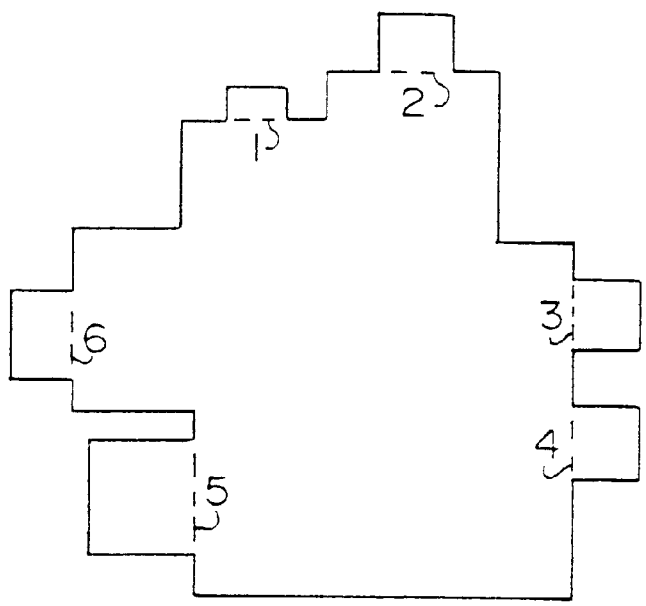

The importance of complying with this constraint is explained above with respect to FIG. 25D.

Where appropriate, a human operator of the bend sequence planner (or another expert/subplanner of the system) say define a constraint expression which groups all bends on each side of a part together, so that less time will be spent by switching between sides of the part when performing a search for a solution bend sequence. FIG. 27B shows a part with several bends on each side of the part, where it may be appropriate to group the bends for each side, e.g., by using the following constraint expression:

( * {{ 1 2 } { 3 4 } { 5 6 }} * ).

Since constraints may conflict, a mechanism should be provided for resolving conflicts. As noted above, a constraint manager may be provided within the bend sequence planner for this purpose. A possible prioritization scheme could simply discard or ignore constraint expressions that have a higher assigned priority. The priority assigned to constraint expressions could depend upon what type of constraint it is. For example, human input constraints could be assigned the highest priority, with machine constraints, part constraints, and optimization constraints being assigned respective lower priorities. Accordingly, machine constraints would have the second to highest priority, part constraints would have the third highest priority, and optimization constraints would have the fourth highest (i.e., the lowest) priority.

A human input constraint is a constraint input by a human operator controlling the bend sequence planner through a human interface. A machine constraint is a constraint dictated by limitations of the machines and tooling (e.g., a channel constraint). A part constraint is a constraint dictated by the features of the part (e.g., a constraint dictated by the presence of inside and outside abutting corners).

Optimization constraints are constraints that are created in order to speed up the search for a bend sequence (e.g., a constraint to group bends together that are on a particular side of the part).

In order to determine if there is a conflict between constrait expressions, an algorithm may be provided which first checks for the presence of common operations within a given pair of constraint expressions. If there is a common operation among the constraint expressions, they may then be merged together in order to determine if they conflict. For example, if (*1*2*) was merged with (*2*3*), the resulting merged constraint expression would be (*1*2*3*). If (*1*2*) was merged with a conflicting expression such as (*2*1*), a null would be the result, thereby indicating that the constraint expressions conflict with each other.

(a.3) Co-linear (and Compatibles) Bends

If two bends have bend lines that are co-linear, e.g., bends 5 and 6 in FIG. 8, and they are compatible (i.e., they have the same bend angles, the same bend radius, and other features which allow the bends to be performed simultaneously), it is preferred to have the bends performed simultaneously. For this purpose, heuristics may be provided in order to influence the search performed by the bend sequence planner so that simultaneous bending of co-linear bends is preferred and thus more likely to become part of the bend sequence formed by the search In addition, or alternatively, constraints may be specified using constraint expressions to require that certain compatible co-linear bends be performed simultaneously if possible (i.e., if the constaint expression does not conflict with a constraint expression of higher priority).

(b). The Bend Sequence Planner's State-Space Search Algorithm

In a state-space search algorithm, a solution is obtained by applying operators to state-descriptions until an expression describing a goal state is obtained. In performing a state-space search method, a start node is associated with an initial state-description, and successors of the start node are calculated using operators that are applicable to the state-description associated with the node. By calculating all of the successors of a node, the node is thereby expanded.

Pointers are set up from each successor node back to its parent node. The pointers may later be used to indicate a solution path back to the start node, when a goal node is finally found.

The successor nodes are checked to see if they are goal nodes by checking the associated state-descriptions corresponding to the successor nodes to see if they describe the goal state. If a goal node has not yet been found, the process of expanding the nodes, and setting up corresponding pointers, continues. When a goal node is found, the pointers are traced back to the start node to produce a solution path. The state-description operators associated with the arcs of the path are then assembled into a solution sequence.

The above-described steps form a state-space search algorithm. Variations of the above-described algorithm may be defined by the order in which the nodes a to be expanded. If the nodes are expanded in an order in which they are generated, the search method is called a breadth-first method. If the most recently generated nodes are expanded first, the method is called a depth-first method. Breadth-first and depth-first methods are blind-search algorithms, since the order in which the nodes are expanded is unaffected by the location of the goal node.

Heuristic information, about the overall nature of the graph and the general direction of the goal, can be utilized to modify the search process. Such information can be used to help direct the search toward the goal, in an attempt to expand the most promising nodes first. One type of heuristic search method is described, e.g., by Nils J. Nilsson in "Problem-Solving Methods in Artificial Intelligence," noted previously.

Blind-search algorithms, such as breadth-first or depth-first, are exhaustive in their approach to find a solution path to a goal node. In application, it is often impractical and time-consuming to use such methods, because the search will expand an excessive number of nodes before a solution path is found. Such an exhaustive expansion of nodes consumes more computer memory in order to store the information associated with each node, and more time, e.g., to calculate node expansions and points. Accordingly, efficient alternatives to blind-search methods are preferred. Heuristics may be applied to help focus the search, based upon special information that is available about the problem being represented by the graph. One way to focus the search is to reduce the number of successors of each expanded node. Another way to focus the search is to modify the order in which the nodes are expanded so that the search can expand outwardly to nodes that appear to be most promising. Search algorithms which modify the ordering of node-expansion are called ordered search algorithms. Ordered search algorithms use an evaluation function to rank the nodes that are candidates for expansion to determine the node which is most likely to be on the best path to the goal node. In operation of the ordered search algorithm an f value is determined at each node $n_j$ available for expansion, where f is an estimate of the cost of a minimal cost path from the start node to the goal node constrained to go through node $n_j$. Each succeeding node having the smallest f value is then selected in sequence for expansion.

Figure 20A:
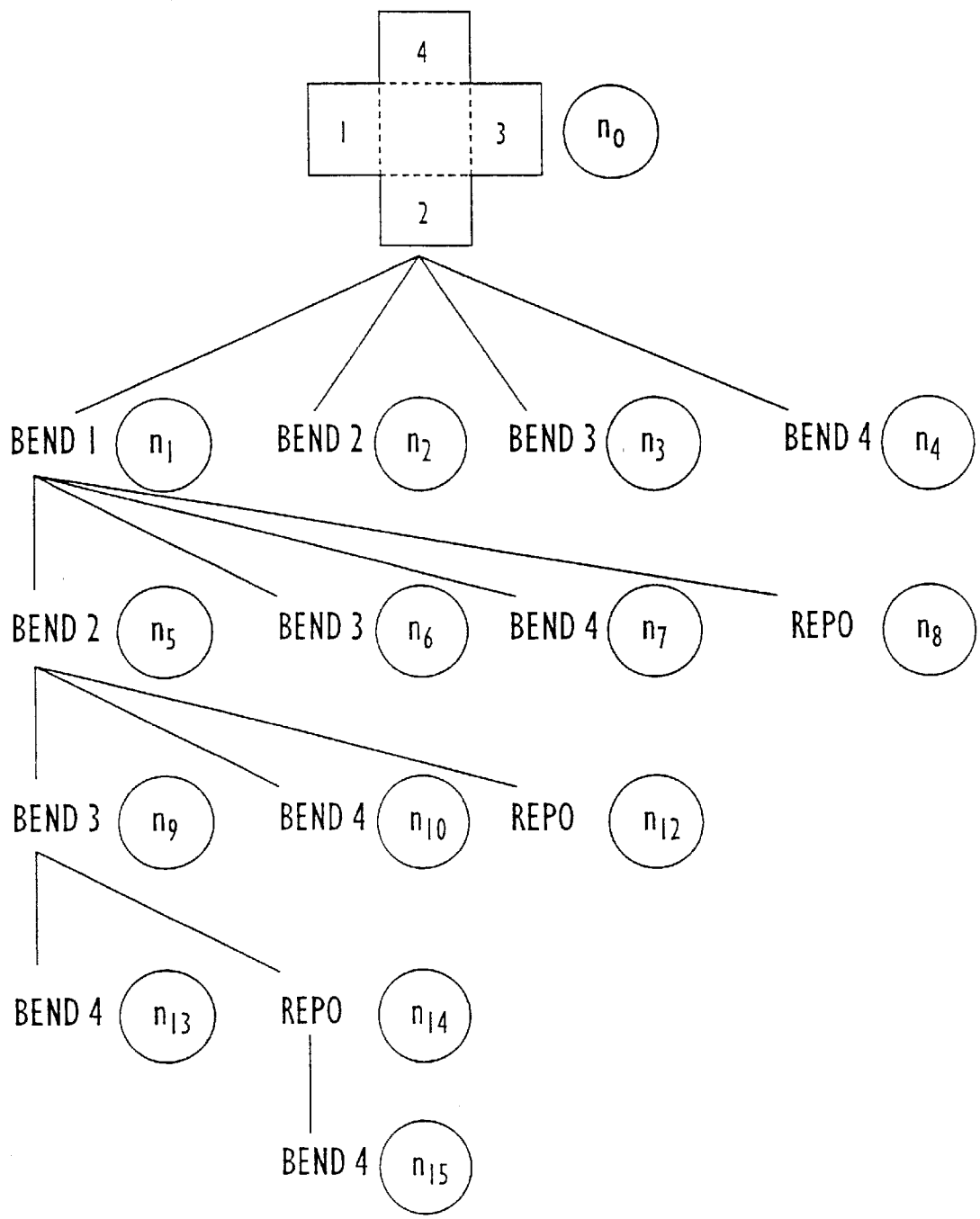
FIG. 20A presents an example of a workpiece and a search tree generated in accordance with the workpiece.

FIG. 20A illustrates a tree produced by an ordered-search algorithm applied to a blank workpiece that has four sections, which are to be bent upward to form four sides of a box, each side being represented in FIG. 20A by a corresponding number 1, 2, 3, and 4. Each numbered side of the box corresponds to a particular bend, including bend 1, bend 2, bend 3, and bend. 4.

The blank workpiece (stock part) corresponds to start node $n_0$ which may also be called the root node associated with the initial state-description of the workpiece. The successors of the start node $n_0$ may be calculated by expanding the start node (the root node) to form successor nodes $n_1$, $n_2$, $n_3$, and $n_4$. At this level of the search, nodes $n_1$–$n_4$ correspond respectively to bend 1, bend 2, bend 3, and bend 4.

Node 1 is expanded to include successor nodes $n_5$, $n_6$, and $n_7$ which correspond respectively to bend2, bend3 and bend4, and an additional successor node $n_8$ which corresponds to a repositioning (i.e., a repo) of the robot gripper's hold on the workpiece. Node 5 is expanded to include successor nodes $n_9$ and $n_{10}$ which correspond respectively to bend3 and bend4, and an additional successor node $n_{12}$, which corresponds to a repo. Node $n_8$ is expanded to have successor nodes $n_{13}$ and $n_{14}$, which correspond respectively to bend4 and a repo. Node $n_{14}$ is expanded to have a successor node $n_{14}$ which is the goal node, because it results in the final bend for the workpiece.

Bend sequence planner 72 preferably is configured to perform a best-first state-space search in order to develop a complete bend sequence to be performed by the bending workstation. An ordered search algorithm utilizes an evaluation function to rank nodes that are candidates for expansion to determine the node which is most likely to be on the best path to the goal node, i.e., the node which is the best. The first node corresponds to the flat part, e.g., as illustrated in FIG. 20A. At each level of the search, the best node which is on an OPEN list will be expanded, and the expanded node will be taken off OPEN. Depending on whether or not there are constraints concerning the ordering of certain operations, all or a portion of the expanded nodes will be placed on OPEN. The expanded nodes which are placed on OPEN will correspond to the remaining bend operations, minus those eliminated due to constraints.

In accordance with a particular embodiment of the present invention, there will be twin nodes corresponding to each bend, including a first twin node corresponding to operation of the bend while holding the workpiece from one side of the workpiece, and a second twin node corresponding to performing the same bend, but while holding the workpiece from the other side of the workpiece. The expanded nodes which are placed an OPEN may also include one node that represents a repositioning of the robot gripper's grasp on the workpiece (i.e., a "repo"). In accordance with a further feature of the present invention, certain levels of the search may be constrained so that they do not include a node for a repo. This is because it would not make sense to perform a repo at one level of the search and again perform a repo at the very next level. Accordingly, if a repo is performed at an immediate parent node, then bend sequence planner 72 will constrain the placement of a repo node on OPEN.

Figure 20B:
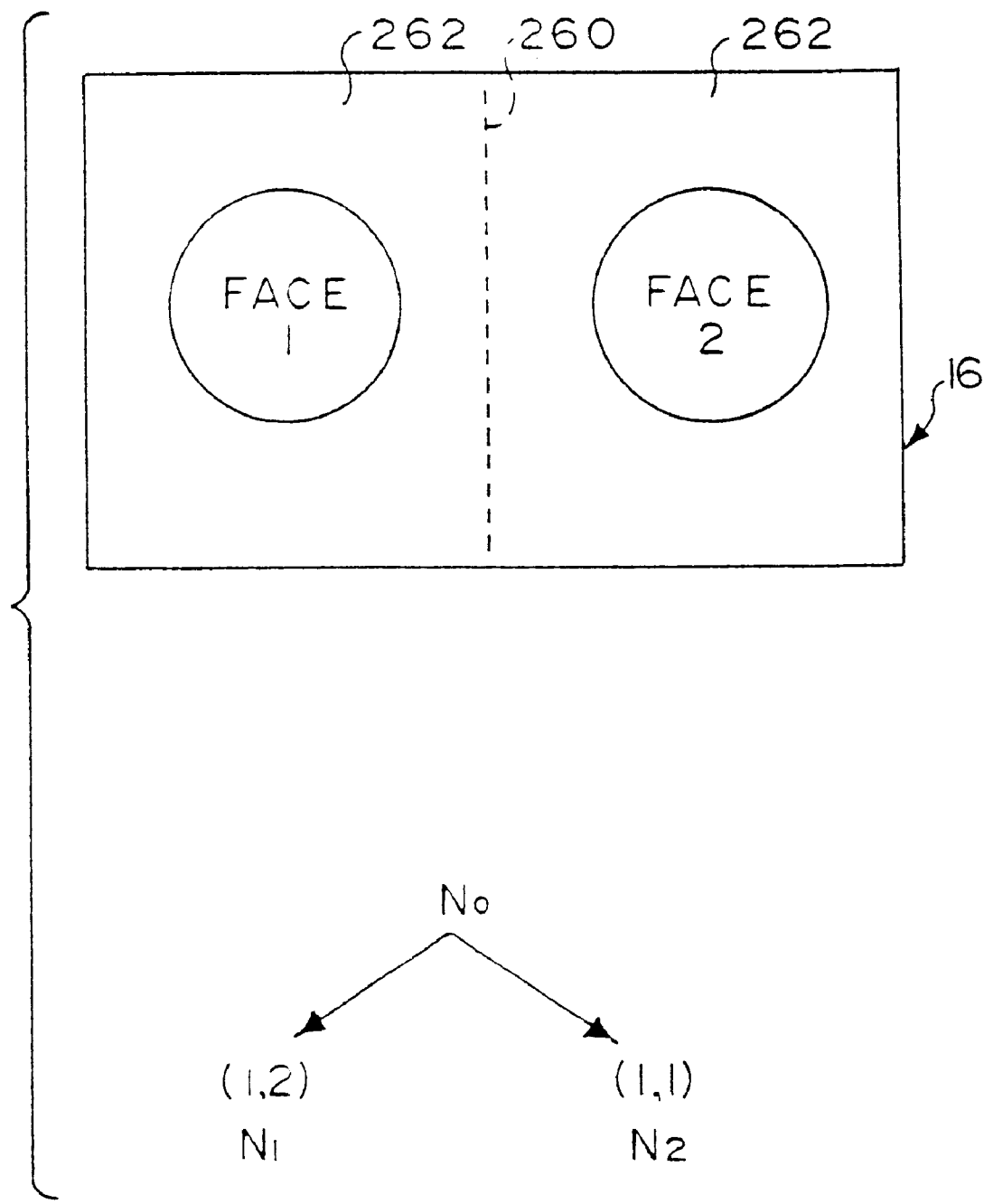
FIG. 20B illustrates an example workpiece and search tree with bend twin nodes.
Figure 20C:
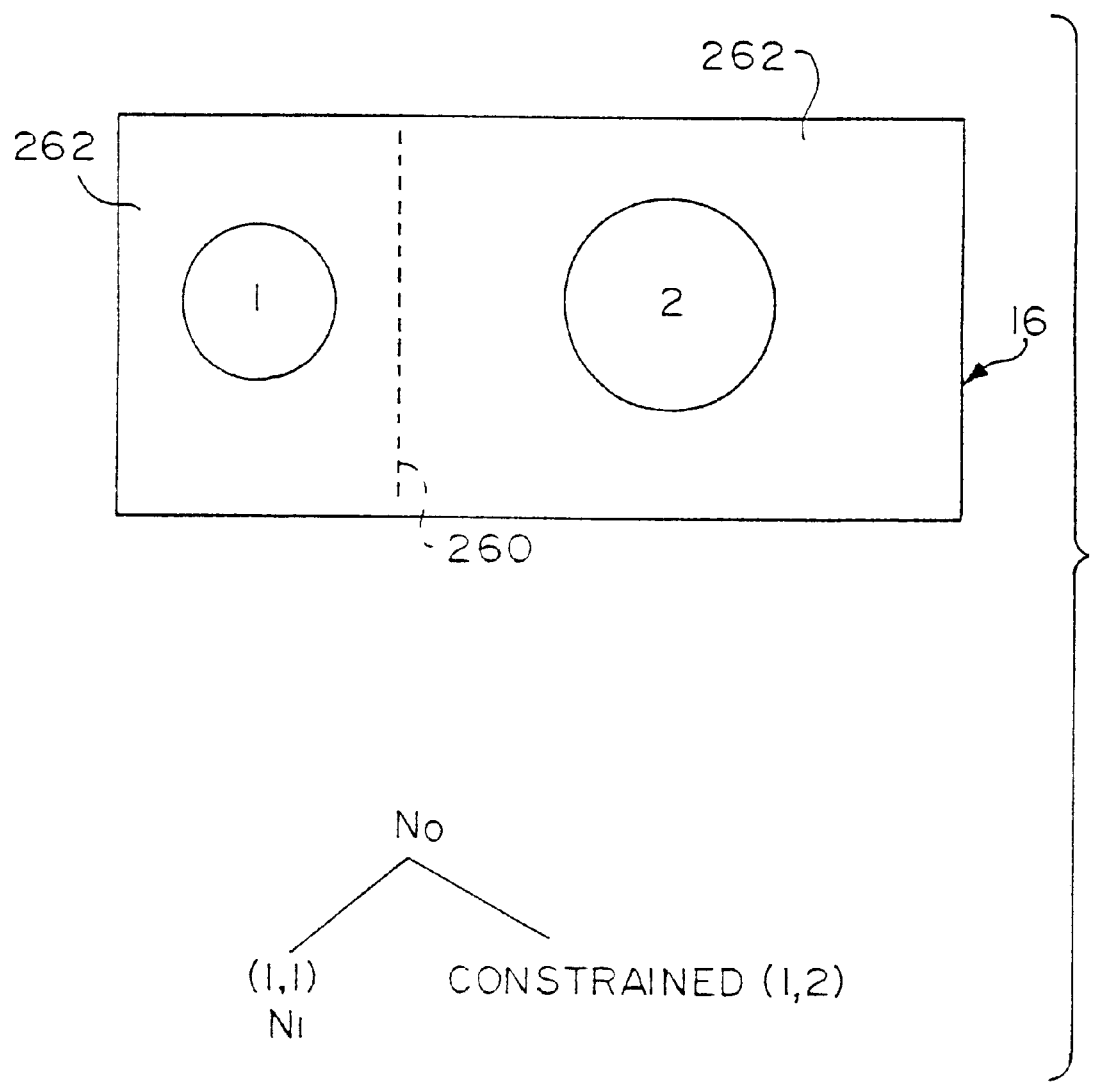
FIG. 20C illustrates an example workpiece and search tree with a constrained bend twin node.

FIGS. 20A and 20B each illustrate a simple example workpiece 16 having two faces 262, and one bend line 260. In addition, each of FIGS. 20A and 20B includes an accompanying diagram of a node expansion from the root node $n_0$ to the first level of a search tree which includes two expanded nodes. FIG. 20B shows two expanded nodes, while FIG. 20C shows one expanded node and indicates that the other node has been constrained. Referring to FIG. 20B, since only one bend is to be performed on workpiece 16, only two nodes are shown. The bend may be performed in accordance with node $n_1$, whereby bend 1 is performed with face 2 being inserted into the die space of the bending workstation, or bend 1 may be performed in accordance with $n_2$, whereby bend 1 is performed with face 1 being inserted into the die space. Referring to FIG. 20C, once workpiece 16 is bent along bend line 260, it is apparent that face 1 will result in a flange having a height which is too small to allow grasping of workpiece 16 at that side of the workpiece when performing the bend. Accordingly, in order to perform bend 1 along bend line 260, workpiece 16 must be grasped by a robot gripper from the side of workpiece 16 corresponding to face 2. In other words, bend 1 must be performed with face 1 being inserted into the die space. Thus, the search tree illustrated in FIG. 20C only includes one node $n_1$, and shows that while the parent node $n_0$ might normally be expanded to include a second node, the second node has been constrained.

A node may be constrained by eliminating it from consideration as a possible operation within the bend sequence. Such elimination of a node may be accomplished by preventing an expansion from including the node, or by simply failing to place the node on the OPEN list.

Figure 20D:
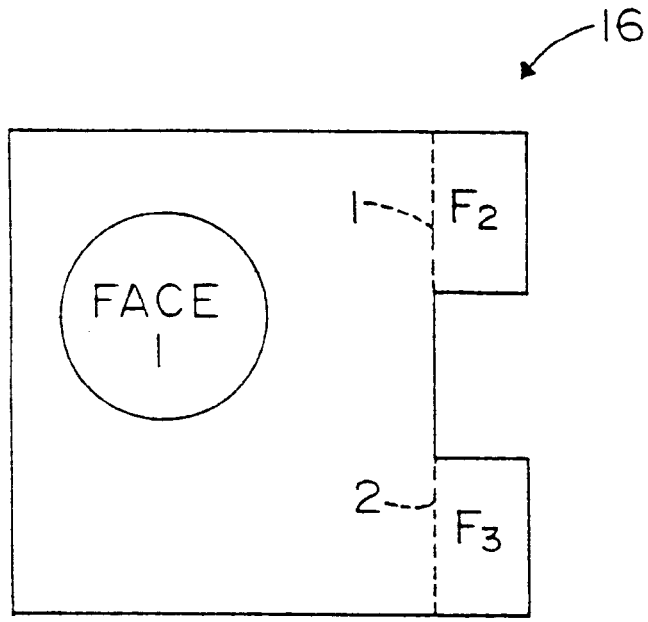
FIGS. 20 and 20E illustrate example workpieces with co-linear bends.
Figure 20E:
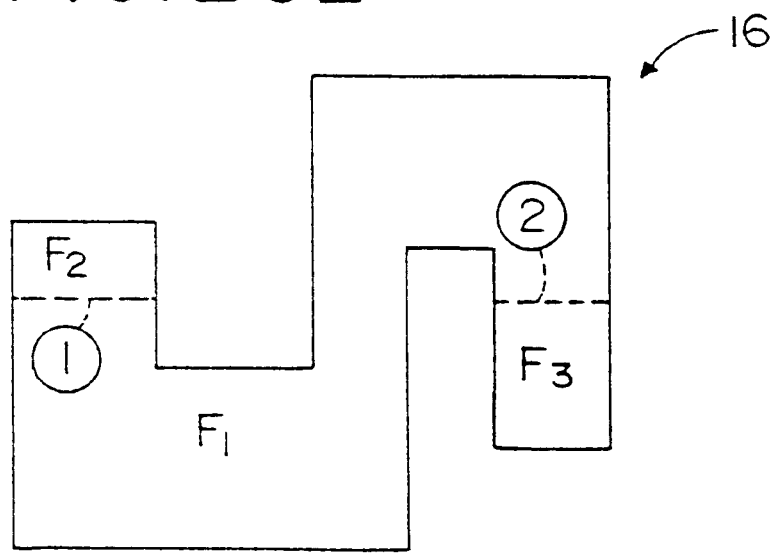

FIG. 20D illustrates an example workpiece 16 having two co-linear bands, with bend lines 1 and 2. The nodes that may be generated from this workpiece include the following: (1,2), (1,1), (2,2), (2,1), ((12),1), and ((12),2). By convention, the holding faces are defined on each side of the first bend line of the co-linear bend. FIG. 20E illustrates another example workpiece 16. The holding sides for this co-linear bend (bending at lines 1 and 2 simultaneously) are defined in the following twin nodes: ((1 2) 1), ((1 2) 2). Note that the bend twin holding face is face 1, even though face 1 also extends to the other side of the bend line (i.e., even though it extends to a position which would be behind the die space during a bend). This is because of the convention noted above, which is used to choose the bend twin holding face.

Figure 21:
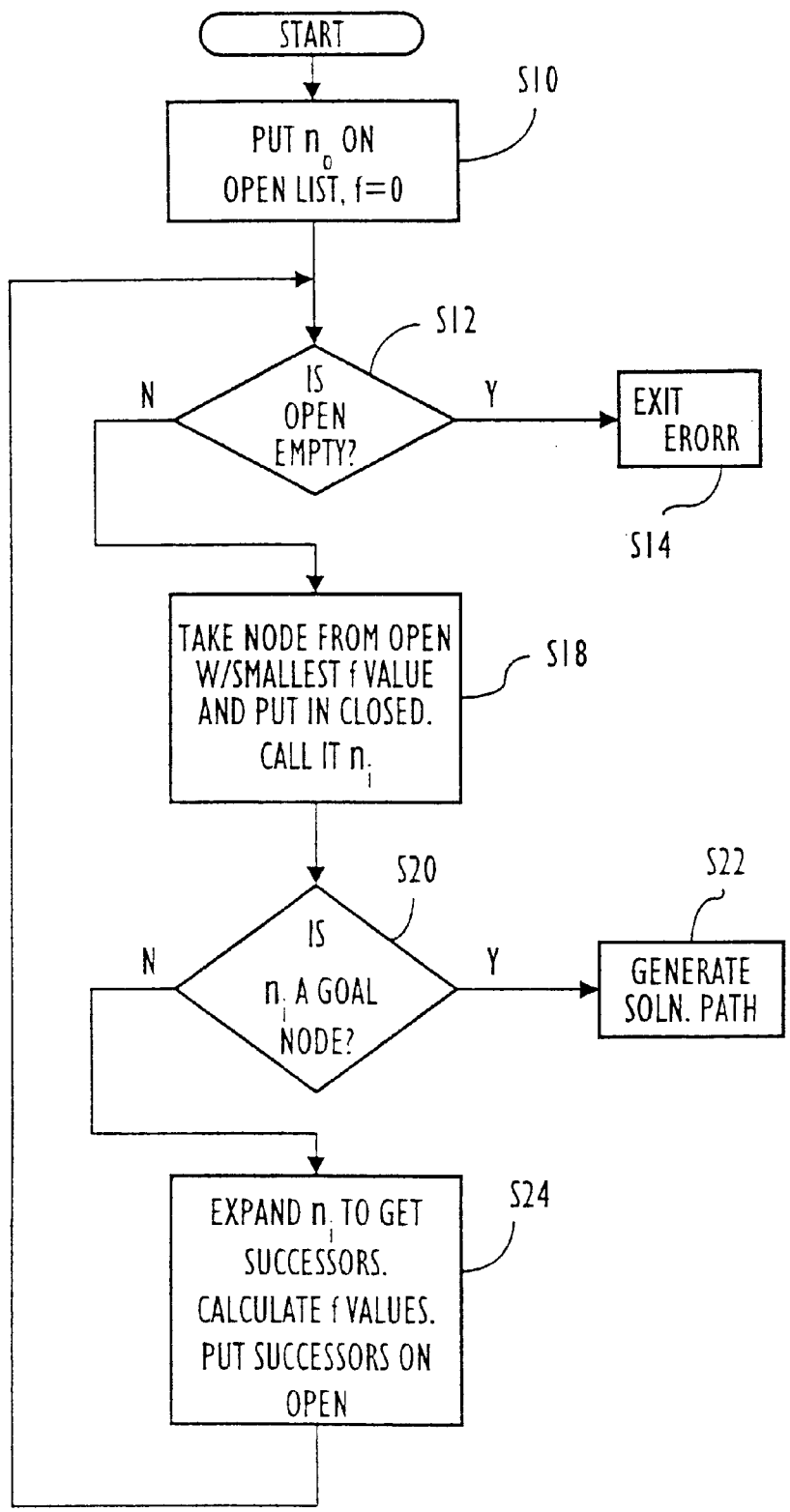
FIG. 21 illustrates a general example flow chart of A* applied to sheet metal bending.

FIG. 21 illustrates, in a simplified flow chart, an example embodiment of a state-search algorithm, comprising an ordered search algorithm, based on the algorithm disclosed by Nils J. Nilsson in "Problem-Solving Methods in Artificial Intelligence", which may be utilized by the bend sequence planner of the present invention in order to form a bend sequence to be utilized by a bending workstation. After the algorithm is started, at step S10, a start node $n_0$ is placed on a list called OPEN, and a function value f is set equal to 0. Thereafter, in step S12, a determination is made as to whether there is anything in the OPEN list. If the OPEN list is empty, the process is forwarded to step S14, and an error indication is given. If the OPEN list is not empty, as determined at step S12, the process will proceed to step S18.

At step S18, the nodes placed within the OPEN list are, checked, and the node having the smallest f value is removed from OPEN and placed on a CLOSED list. This node is called $n_f$. Thereafter, in step S20, a determination is made as to whether the node $n_f$ is a goal node. If it is a goal node, the process is forwarded to step S22, where a solution path is generated by tracing back from node $n_f$, through its pointer and the pointers of the previous nodes, to the start node $n_0$. However, if node $n_f$ is not the goal node, as determined at step S20, the process will be forwarded to step S24. In step S24, node $n_f$ is expanded to generate all of its successor nodes, called $n_j$. If there are no successors nodes $n_j$, the process will return to step S12. For each successor node $n_j$ that is generated, a computation will be made for a corresponding f value $f(n_j)=k'(n_j)+h(n_j)$, where k' is equal to the sum of the k costs of performing each node from the starting node to the current node, and h is equal to the projected cost from the current node to the goal node. Also, in step S24, each of the computed f values will be associated with their corresponding successor nodes $n_j$ that are not already on either the OPEN or CLOSED lists. Such successor nodes $n_j$ are then placed on the OPEN list, and pointers are directed from those successor nodes $n_j$ back to $n_f$. For each successor node $n_j$ that was already on an OPEN or CLOSED list, an f value is associated with that successor node $n_j$ that is equal to the smaller of the f value just computed for that node and the f value already associated with that node. The successor nodes $n_j$ on the CLOSED list who have their associated f values made smaller are placed on the OPEN list, and the pointers for those successor nodes $n_j$ are redirected to $n_f$. After execution of step S24, the process will return to step S12.

(c) Illustrated Example Bend Sequence Planner

Figure 22A:
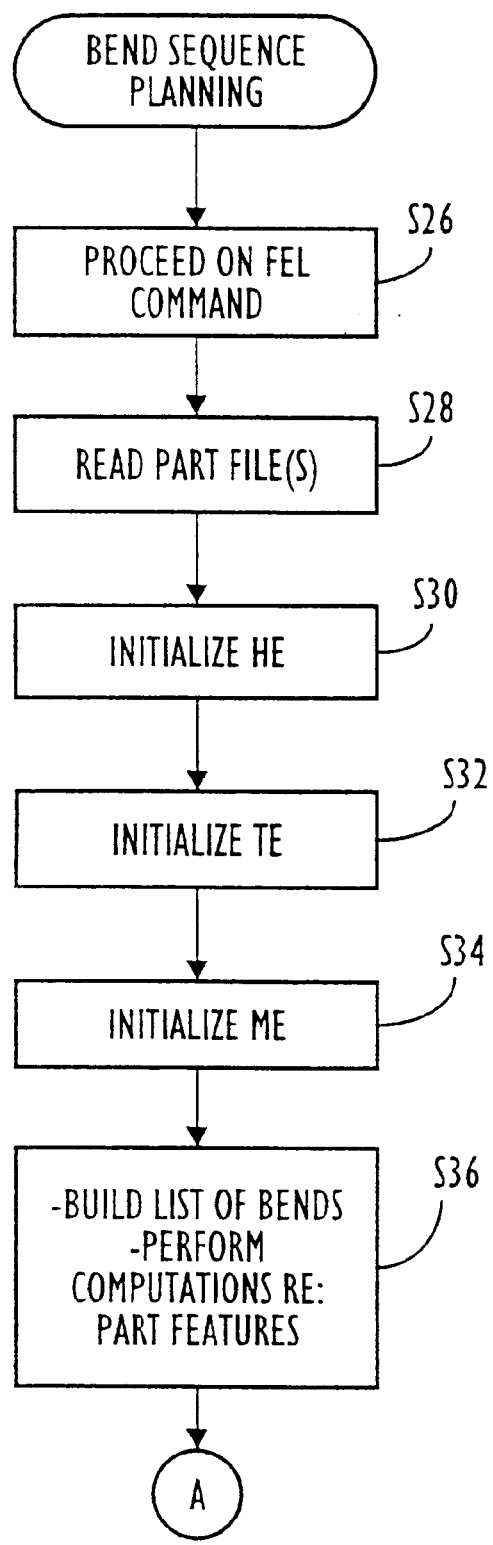
FIGS. 22A–22D illustrate the main flow of an embodiment of the bend sequence planner illustrated herein.
Figure 22B:
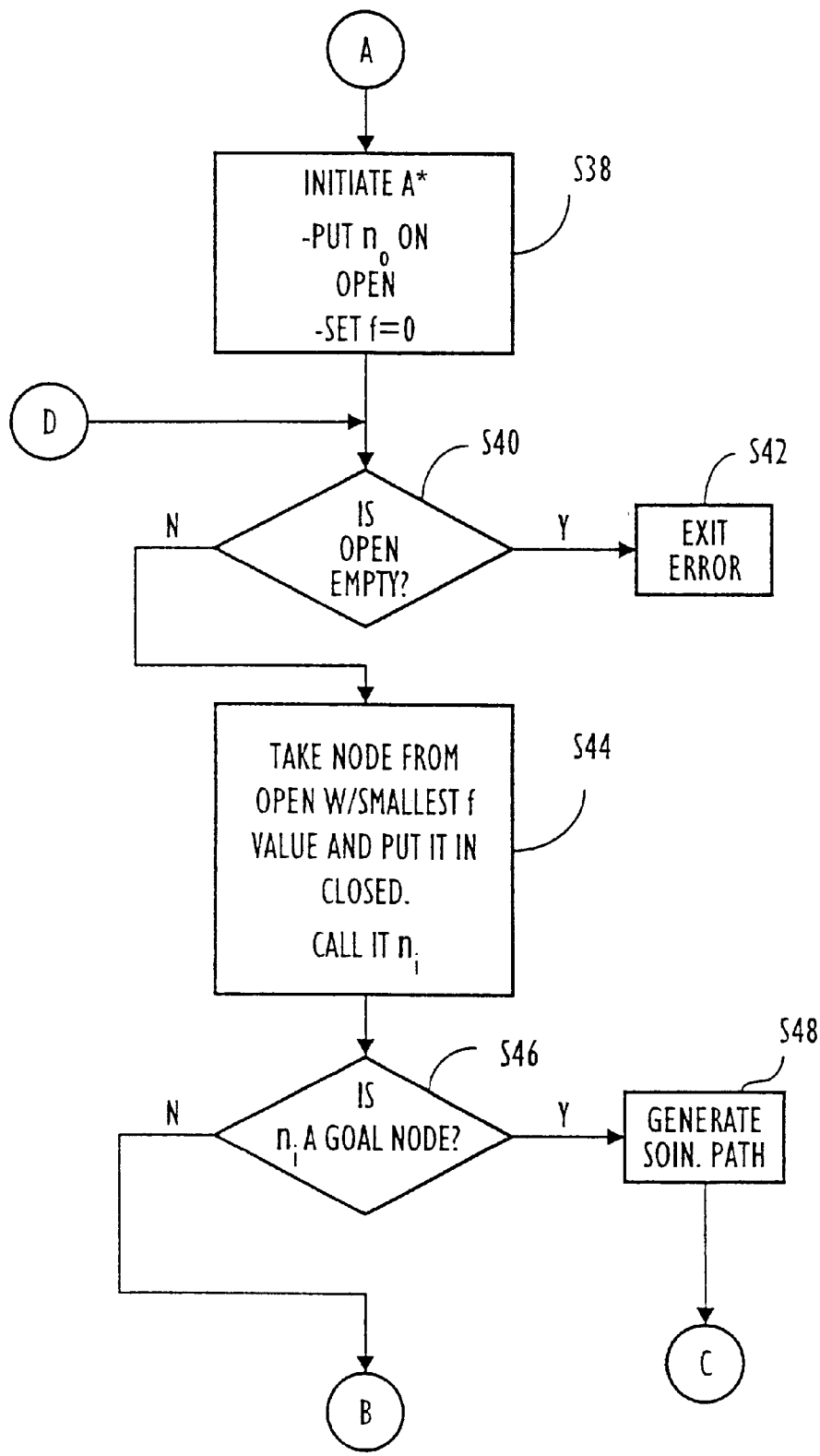
Figure 22C:
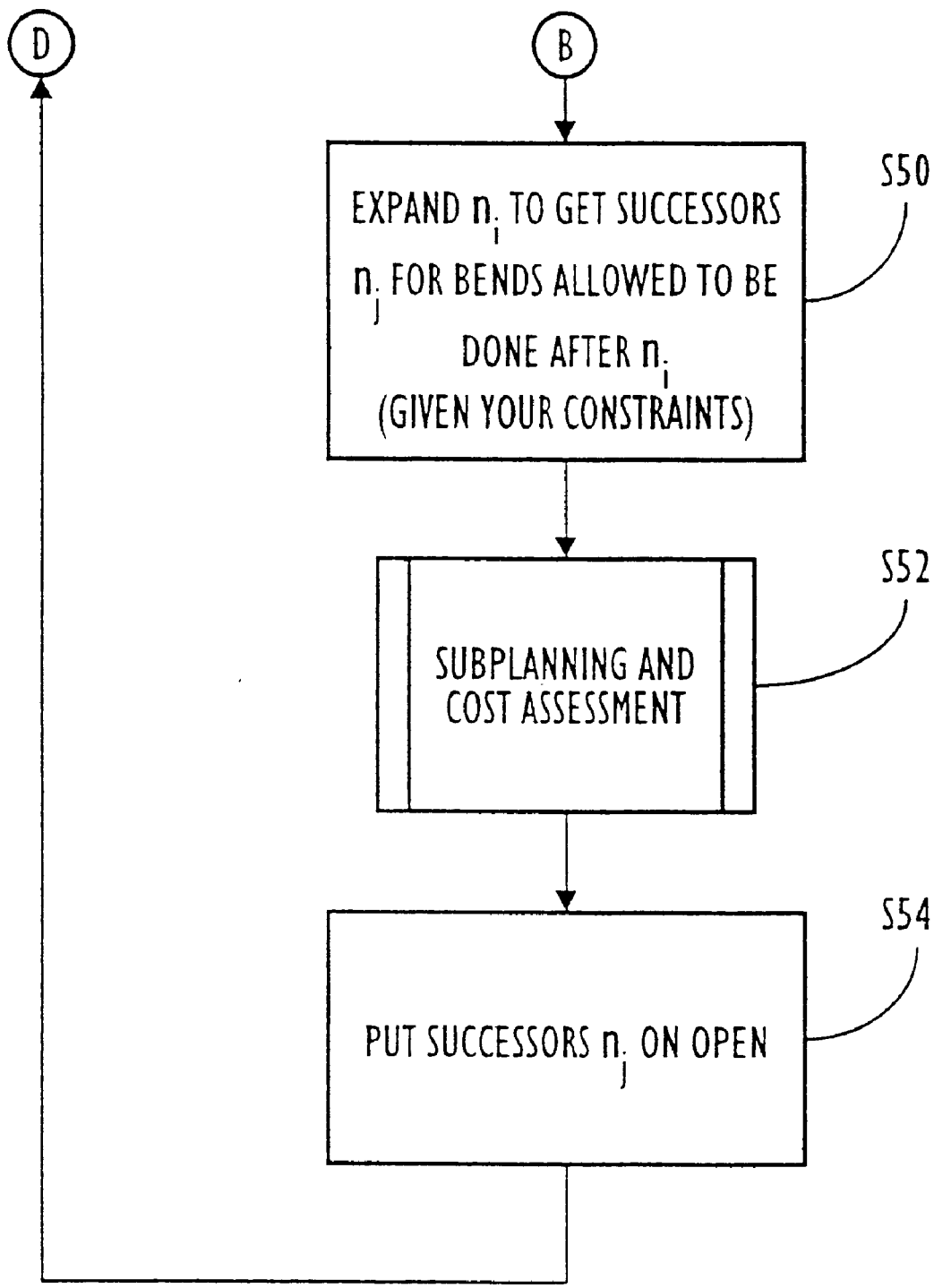

FIGS. 22A–22C illustrate a particular example embodiment of a bend sequence planning process to be performed by bend sequence planner 72 illustrated in FIG. 5A. The bend sequence planning process is started upon receipt of a command to commence operation, e.g., as indicated in step S26, by proceeding on receipt of an FEL command to start planning. Once the process starts, and proceeds in step S28, one or more files corresponding to the parts to be produced are read by the bend sequence planner. Such files may be in the form of a shape file including information such as geometric and topological information (a 3D data description of the part and a parallel 2D data description of the part corresponding to the 3D data description), labeled geometric features which are pertinent to determinations to be made by bend sequence planner, and a bend graph correlating bends to be performed with geometric and topological information.

Once the part file has been read in stop S28, the process proceeds to steps S30, S32, and S34, during which each expert is initialized. More particularly, the holding expert, the tooling expert and the motion expert are each initialized. Once the various experts have been initialized, in step S36, a list of bends is built, and calculations are performed regarding the various features of the parts. For example, a computation may be performed, regarding what the lengths of bends are and which bends are co-linear. Thereafter, in step S38, an A* algorithm is initiated, including steps such as putting a root node $n_0$ on an OPEN list, and setting an f value equal to 0. A determination is then made at step S40 as to whether the OPEN list is empty. If the list is empty, the process will proceed to step S42, and exit with an error indication. Otherwise, if the OPEN list is not empty, the process will proceed to step S44, in which the node on the OPEN list with the smallest f value will be taken and placed an a CLOSED list. The chosen node will be called $n_f$ for purposes of explaining the steps of the flow charts of FIG. 22A–FIG. 22D.

In step S46, a determination is made as to whether node $n_f$ is a goal node. If node $n_f$ is a goal node, the process proceeds to step S48, where a solution path is generated. Otherwise, if $n_f$ is not a goal node, the process proceeds to step S50 which is shown at the top of FIG. 22C.

Figure 22D:
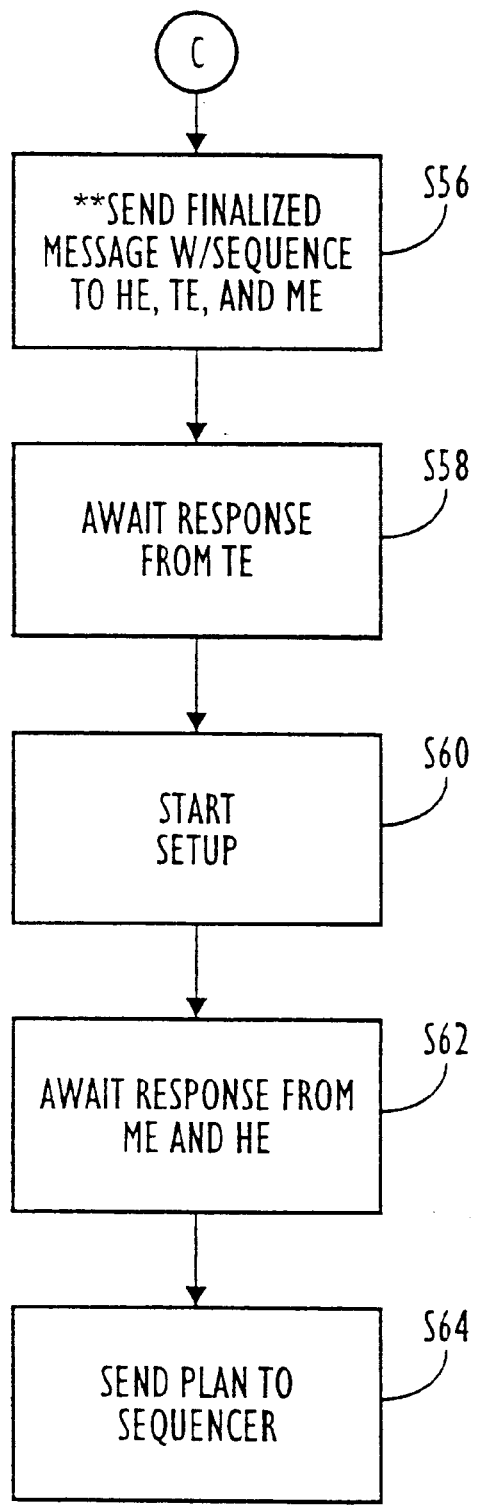

After generating a solution path in step S48, the process will proceed to step S56 which is shown at the top of FIG. 22D. In step S56, a finalize message is sent along with the bend sequence to each of the experts, and each of the experts is queried for final detailed information which is needed to complete the bend sequence plan. Thereafter, in step S58, the bend sequence planner will await a response from the tooling expert. Once all the final information has been received from the tooling expert, in step S60, the setup of the bending workstation will be started. In the meantime, while the setup of the workstation is being performed, in step S62, the process will await a response from the motion expert and the holding expert. Once the complete motion expert and holding expert plans have been received, at step S64, the final plan will be forwarded to the sequencer of the system.

Assuming that $n_f$ is not determined in step S46 to be the goal node, the process will continue at step S50 at the top of FIG. 22C. At this step, node $n_f$ will be expanded to obtain its successor nodes $n_j$. The successor nodes will include bend twin nodes for each bend, i.e., two nodes corresponding to each bend, and an additional node for a repo, minus any nodes which are constrained from being successor nodes at the present level of the search.

Once the successor nodes have been generated in stop S50, a subplanning and cost assignment process is performed in step S52. Thereafter, in step S54, successors $n_j$ are each placed on the OPEN list, with the subplan information and cost information corresponding to each node being associated with each node in the OPEN list (e.g., by using pointers). The process will then return to step S40 where a determination will be made as to whether the OPEN list is empty. If the OPEN list is empty, the process will exit with an error indication at step S42; otherwise the process will proceed to again execute steps S44, S46, S48, S50, S52 and S54.

FIGS. 23A–23D illustrate the subplanning and cost assignment process which corresponds to step S52 in the bending sequence planning process illustrated in FIGS. 22A–22D. The subplanning and cost assignment process determines or formulates a subplan and incremental costs which correspond to each of the expanded/successor nodes $n_j$ which have not been eliminated as a viable node at the present level of the search due to constraints. For each such expanded/successor node, the process illustrated in FIGS. 23A–23D will be performed. In a first step S66, a test will be performed for the permutability of node $n_j$ regarding the subplan and costs of the holding expert. More particularly, a test will be performed to determine whether the subplan and costs which will be determined by the holding expert will be the same as that already determined for another "equivalent" node. If such is the case, the subplan and costs will be identical to that "equivalent" node, and it is unnecessary to again query the holding expert for such information which would result in an unneeded use of time. If it is determined at step S68 that an equivalent node was found, then the process proceeds to step S70, where the subplan and costs are copied and associated with that successor node $n_j$. However, if an equivalent node is not found in step S68, the process proceeds to step S72, where the bend sequence planner will query the holding expert for a proposed subplan, the incremental k cost, and the incremental h cost. In performing step S72, as soon as a cost of infinity has been evaluated by the holding expert, the present successor node $n_j$ will be aborted. Thus, the successor node $n_j$ will be discarded at the present level of the search, and the subplanning and cost assignment process will again start with the next available successor node $n_j$.

Once the subplan and costs have been obtained either by step S70 or step S72, the process will proceed to step S76 (at the top of FIG. 23B), where another test for permutability will be performed regarding the tooling expert subplan and costs. If an equivalent node is found, as determined at step S78, the bend sequence planner will copy the subplan and costs corresponding to the equivalent node and associate the same with the present successor node $n_j$. In the alternative, if an equivalent node is not found, the process will proceed to step S82 where the tooling expert will be queried for a proposed subplan, a k cost and an h cost. If a cost of infinity is evaluated, the present successor node will be aborted at step S84. Once the proposed subplan and costs have been determined, the process will proceed to step S86, where the bend sequence planner will await the results from the holding expert and the tooling expert. The process will wait for the results of the holding expert and tooling expert queries, since such information is needed by the motion expert to do its subplanning and cost assignment computations.

In step S88, a test will be performed for the per mutability regarding the motion expert subplan and costs. That is, a test will be performed to determine if the subplan and costs that would be assigned by the motion expert are identical to those which have already been assigned to another node, the other node thereby being deemed an equivalent node to the present successor node $n_j$ being evaluated. If, at step S90, it is determined that an equivalent node has been found, the process will proceed to step S92, where the subplan and costs of the equivalent node will be, copied and thereby associated with the present successor node $n_j$. However, if an equivalent node is not found, the process will proceed to step S94, where the motion expert will be queried for a proposed subplan, a k cost and an h cost. If any of the costs are infinity, the present successor node will be aborted, proceeding to a next successor node and again commencing subplanning and cost assignment for the next successor node. Assuming that the proposed subplan and costs have been obtained, the process will proceed to step S98, where the results will be awaited from the motion expert. Additional processing may be performed to obtain a subplan and costs regarding different aspects of the system which will be related to performance of the overall bend sequence proposed by the bend sequence planner. In this regard, additional experts may be provided as indicated by the reference numeral S100. For example, FIG. 5A shows a sensing expert. The subplanning and cost assignment process could be appropriately modified to include steps such as testing for per mutability, querying the additional expert (e.g., sensing expert) for a proposed subplan and costs, and, at an appropriate location within the process, awaiting the results from the additional expert.

Figure 23A:
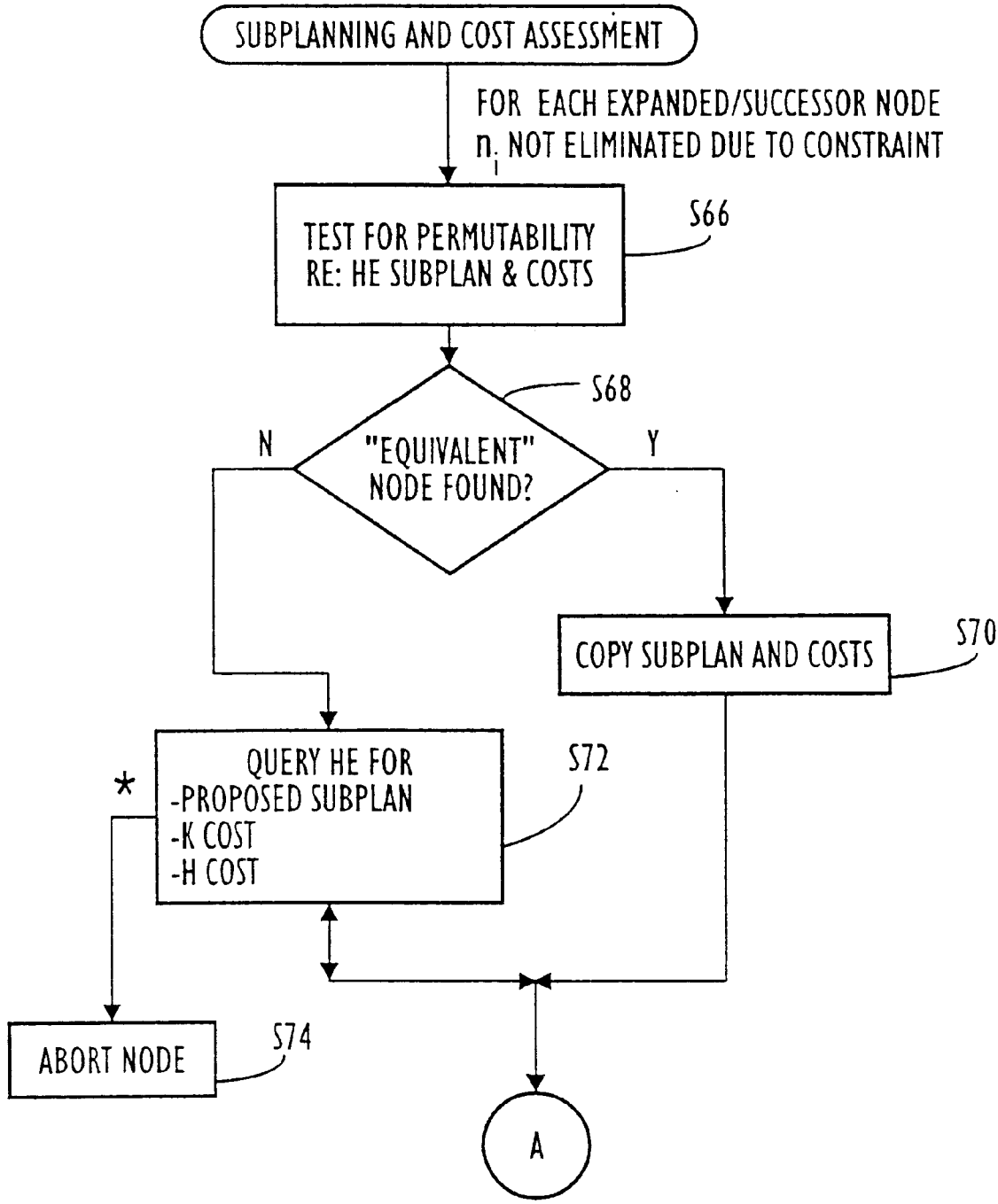
FIGS. 23A–23D illustrate a process for performing subplanning and cost assignment.
Figure 23B:
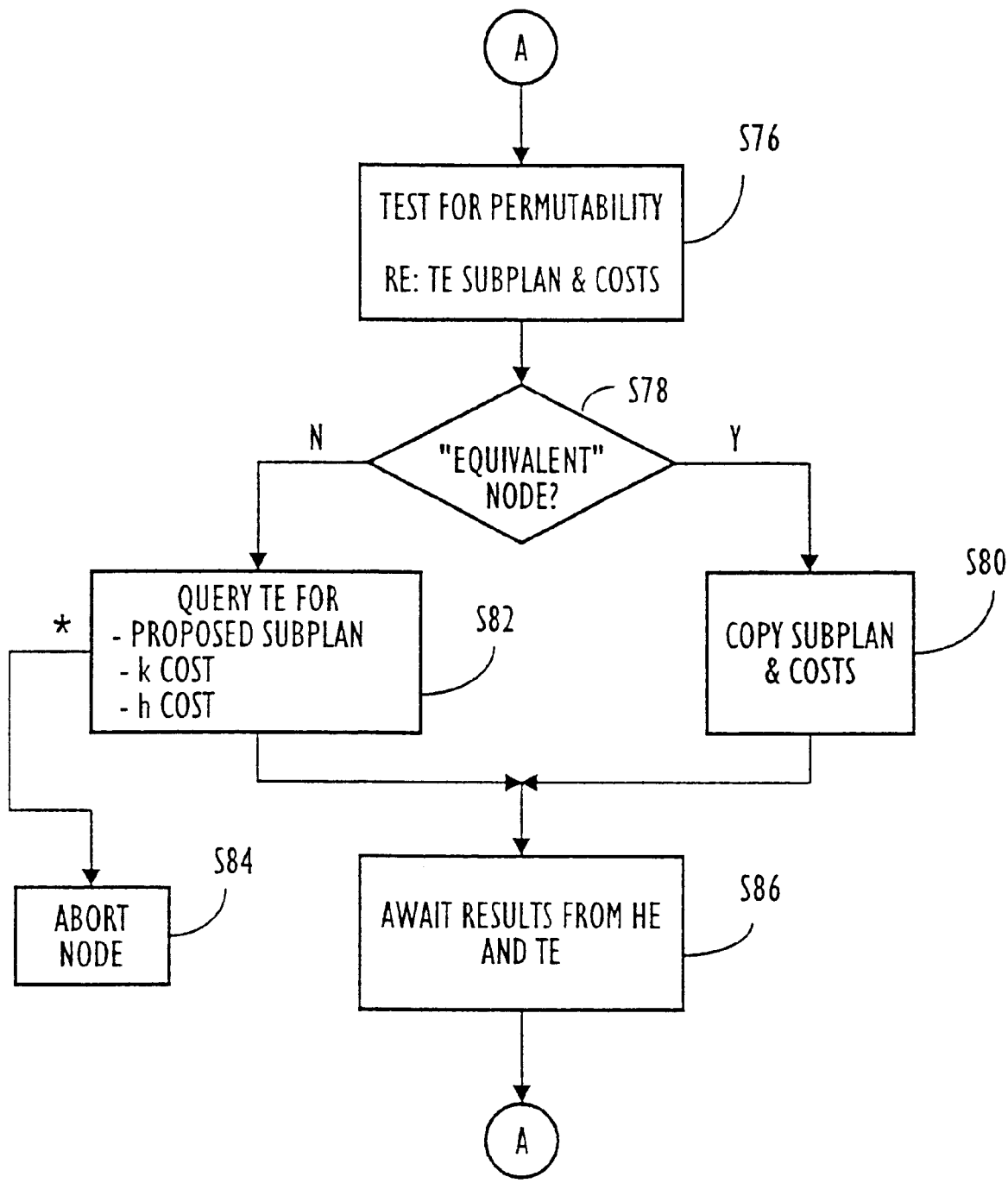
Figure 23C:
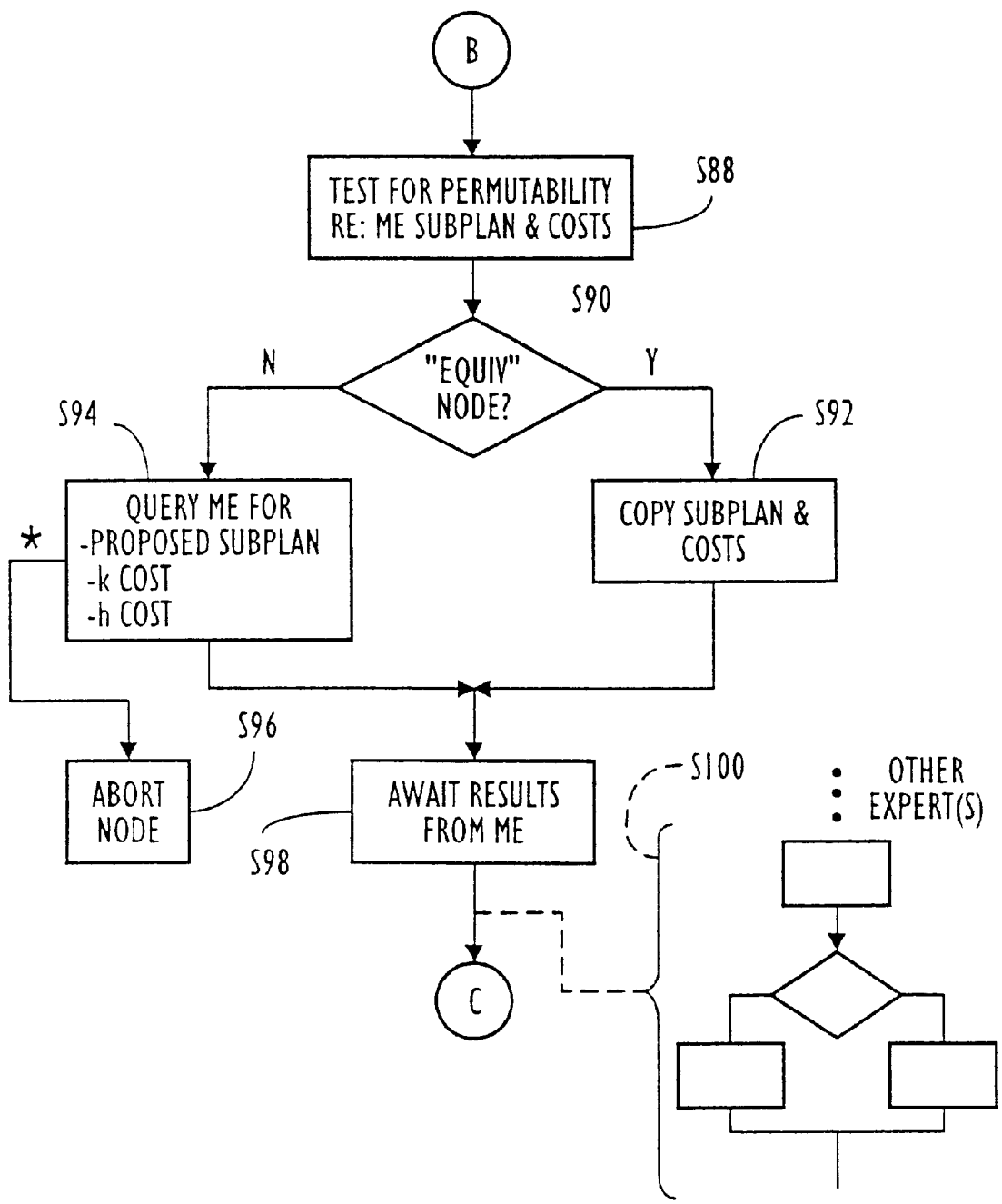
Figure 23D:
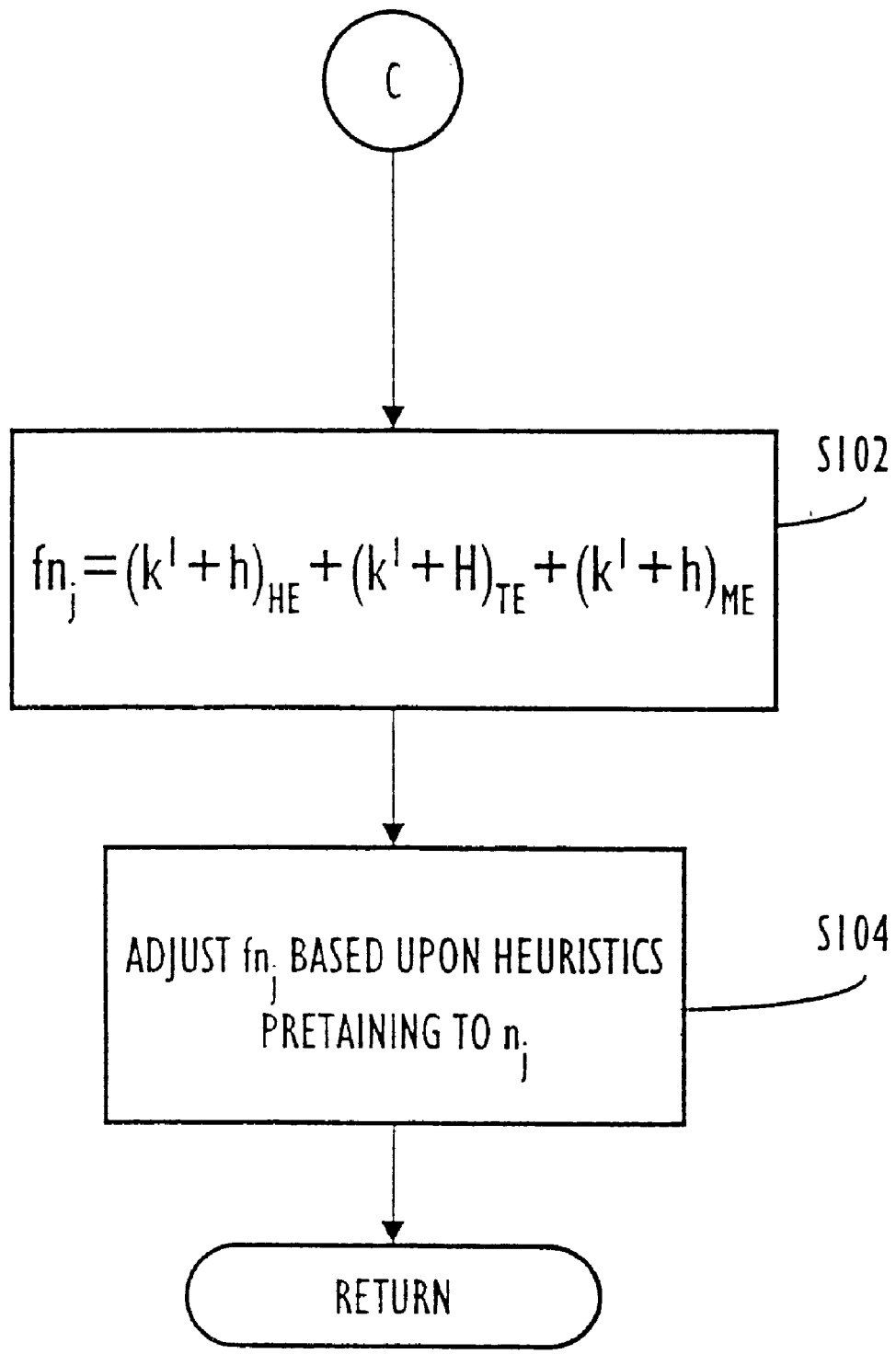

Once the results from the motion experts have been obtained, as determined at step S98, the process will proceed to step S102 which is shown at the top of FIG. 23D. In step S102 the f value for node $n_j$ will be calculated in accordance with the formula $f_{nj}=(k'+h)_{HE}+(k'+)_{TE}+(k'+h)_{HE}$. Then, in step S104, the f value will be adjusted based upon any heuristics which pertain to the successor node $n_j$. In this regard, if it is a desired node, i.e., it has beneficial or desired heuristics which say that this node is preferable over other nodes, a value will be added to the f value. However, if the node is undesired, a value will be subtracted from the f value.

Figure 24:
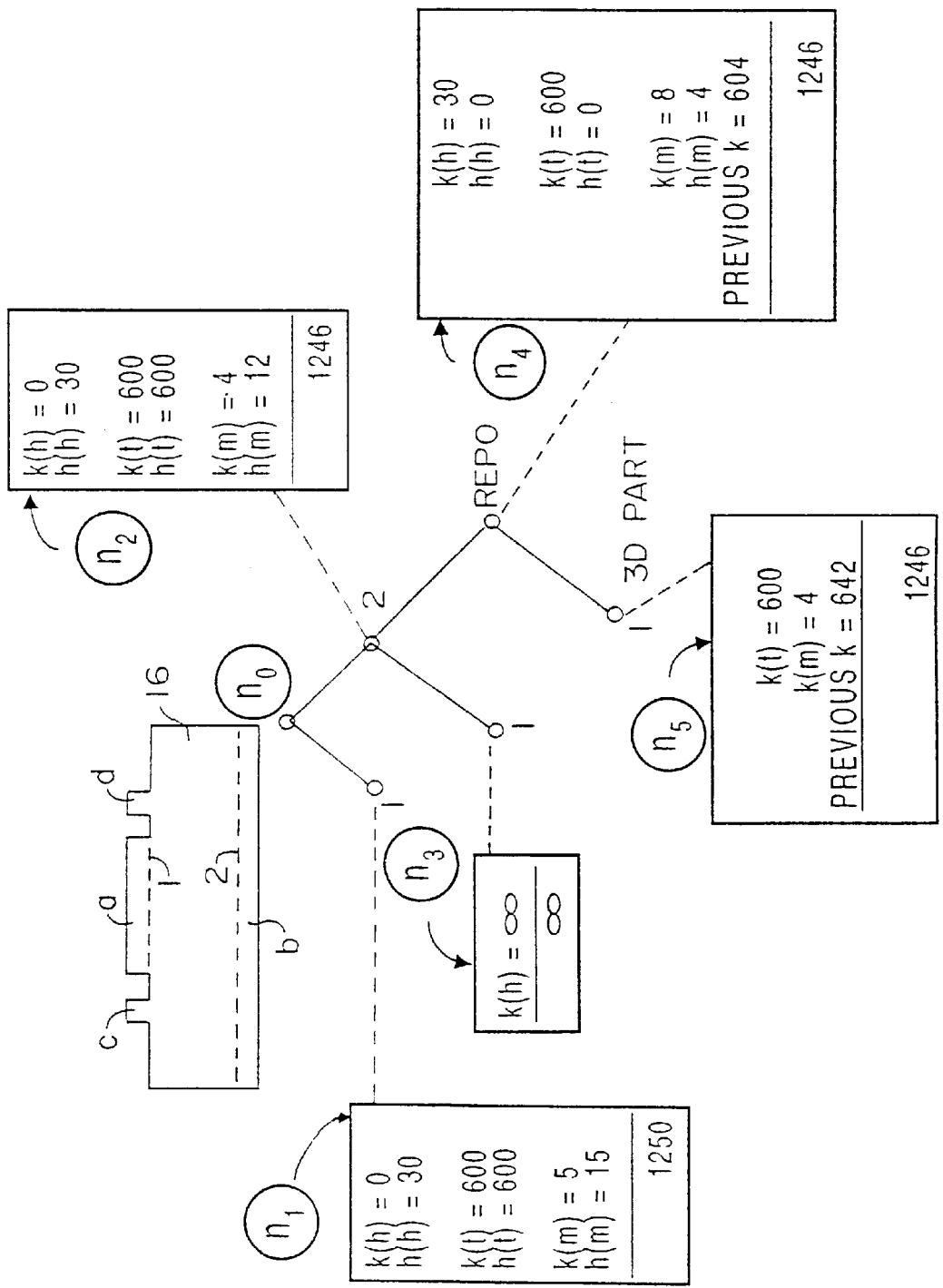
FIG. 24 illustrates an example workpiece and search tree, with calculated costs illustrated.

FIG. 24 illustrates an example flat workpiece 16, and several nodes expanded during the performance of a state-space search by the bend sequence planner illustrated herein. Various costs are shown which are assigned to the nodes throughout the search process. As shown, flat workpiece 16 has two portions a, b which are to be bent to form flanges. First flange a is placed in between two tabs c, d. First flange a is to be bent along bend line 1, and second flange b is to be bent along bend line 2. The first node $n_0$, i.e., the root node, of the search tree corresponds to flat workpiece 16. Successor nodes of node $n_0$ include nodes $n_1$ and $n_2$, which correspond, respectively, to bend lines 1 and 2. In the illustrated example, it is assumed that a bend along bend line 1 would be performed with flange a inserted into the die space of the bend press, and that a bend along bend line 2 would be performed with flange b inserted into the die space. Thus, there are no bend twins illustrated in the tree of FIG. 24. There is only one node per bend line.

In the event that the bend sequence planner is designed to assign bend twin nodes for each bend, the alternate node would likely be constrained in the present example. For example, it would likely not be possible to perform a band along bend line 1 by inserting flange b into the bend press, since flange a is very short, and thus cannot be grasped by a robot gripper during execution of the bend.

At the first level of the search, two successor nodes $n_1$ and $n_2$ are generated as successor nodes. In forming these two nodes, the bend sequence planner may ask each of the holding expert, tooling expert, and motion expert for the incremental cost (i.e., h and k costs) corresponding to that node. For example, the costs that are assigned to node $n_1$ are illustrated in the box corresponding thereto as shown in FIG. 24. A holding expert assigned a k cost (i.e., the cost that it takes to love from the parent node $n_0$ to the present node) of 0. This signifies that a grip location can easily be found on workpiece 16, and that there is need to reposition the grip of the robot on the workpiece before performing bend 1 as a first bend in the bend sequence. The holding expert further assigned an h cost of 30. The number 30 represents an approximate amount of time (30 seconds) which it will take to reposition the gripper's grasp on the workpiece 16 (i.e., to perform a repo). This value represents that the holding expert has predicted that one repo will be needed in order to complete the bend sequence associated with workpiece 16. The h cost is a predicted cost to complete the bend sequence from the present node to the final goal node.

The costs assigned by the tooling expert include a k cost of 600 and an h cost of 600. The k cost is the incremental amount of time (due to tooling) associated with performing the bend of that node. In this case, in order to perform the bend of bend line 1, a first stage must be placed on the die rail of the bending workstation. An approximated time for installing the first stage is 600. Accordingly, the incremental k cost (for tooling) from $n_0$ to $n_1$ is 600 seconds. The predicted additional cost from node $n_1$ to the goal node (i.e., the h cost for tooling) is calculated to be the time needed to install one additional stage, and thus is 600 seconds.

The costs assigned by the motion expert include an incremental k cost of 5 (an estimated 5 seconds), equal to an approximated robot travel time in moving from $n_0$ to node $n_1$. The costs assigned by the motion expert further include a predicted future h cost of 15 seconds, which is equal to a running average of all k costs evaluated so far (since $n_0$) multiplied by a station of the number of remaining bends and twice the number of predicted repos: $h = k_{AVE}$ [number of remaining bends+(number predicted repos) (2)]. The number of predicted repos is multiplied by 2, since two movements are required per repositioning. One movement is required to take the robot from a present stage to the repo gripper, and a second movement is required to reposition the robot gripper's hold on the part. The k value for the next node is calculated based upon the amount of time that it takes to move from the repo gripper to the appropriate stage for the next bend.

The alternate node at the first level of the search is node $n_2$. This node corresponds to bend line 2. The incremental costs include k and h costs assigned by the holding expert, k and h costs assigned by the tooling expert, and k and h costs assigned by the motion expert. The k and h costs assigned by the holding expert are 0 and 30 respectively. The holding expert assigns a k cost of 0, because no repositioning is necessary to go from node no to node $n_2$. However, a holding h cost of 30 is assigned because one repo is predicted to be necessary in order to complete all of the bends of the bend sequence, i.e., to get to the goal node. This becomes apparent when viewing workpiece 16. Depending on which bend is done first, since the bends are on opposite sides of the workpiece 16, it will be necessary to reposition the robot's grasp on workpiece to be at the other side of workpiece 16 in order to perform the other bend. Further, since the workpiece is somewhat narrow, it would not be possible to locate the robot gripper at either the left or right sides of workpiece 16 so that the workpiece can be grasped at the same location for both bends. If the robot gripper was positioned at one of the sides of workpiece 16, robot gripper would likely collide with the tooling (the punch tool) of the bend press when the die is raised to perform the bend.

The k cost assigned by the tooling expert again is 600, since the bend, being the first bend introduced in the search, will require at least one stage. 600 seconds is an approximated time for installing a stage, and thus is assigned as the incremental k cost to go from node $n_0$ to node $n_2$. The h cost assigned by the tooling expert is 600, since a predicted additional stage will be necessary to go from node $n_2$ to the goal node. The motion expert assigns a k cost of 4, and an estimated h (future) motion cost of 12. The k cost assigned by the motion expert for node $n_2$ is less than the k cost assigned for node $n_1$. This is because bend line 2 is longer than bend line 1, and thus requires a larger stage. In a typical bending workstation, such as the Amada BM100 workstation illustration in FIG. 1, it is preferred that longer stages be placed in the center of the die rail, and that shorter stages be placed off to the sides. Thus, to go from an initial position before any bends are performed (at node $n_0$) to a canter stage would require less movement by the robot than moving to a stage set off to the side of the die rail. Accordingly, the calculated robot travel time, without regard to the collisions, from the loader/unloader (L/UL) to the center stage in performing bend 2 is estimated to be 4 seconds, and less that it would take to get a stage positioned at the left side of the die rail which is where the smaller stage would be placed along the die rail. Since the h cost is calculated as a function of the present running average of the k cost calculated so far, the h cost is also a lower value of 12 seconds.

At the first level of the search, the respective total incremental costs performing bends 1 and 2, respectively, are 1250 and 1246. Accordingly, node $n_1$ has a total incremental cost of 1250, and node $n_2$ has a total incremental cost of 1246, the total cost being assigned by each of the experts queried by the bend sequence planner.

It is noted that the only two nodes at the first level of the search included a node for performing bend 1, and a node for performing bend 2 (nodes $n_1$ and $n_2$). The first level did not include a node for performing a repo. This is because the search is constrained so that the first bend to be performed at the first level after the root node does not include a repo. It would be unnecessary for a repo to be performed as a first step in the bend sequence, since the robot gripper can be placed anywhere at the start to correspond to any particular bend. However, at the next level of the search, a repo is included as a possible node, in addition to the one or more bends which comprise the rest of the bends leading to the goal node. Accordingly, the next level of the search includes nodes $n_3$ which corresponds to bend 1, and $n_4$ which corresponds to a repo before performing the next bend in the bend sequence. At node $n_3$, upon being queried by the bend sequence planner, the holding expert assigns a cost of infinity, since there are no available grasp regions that were used in performing bend 2 that can also be used to perform bend 1. If there was a grasp region that was used in order to perform bend 2 that could also be used to perform bend 1, then the robot gripper could be placed within that intersecting region, and the repositioning of the gripper would not be necessary when going from the completed bend 2 to bend 1 (i.e., from node $n_2$ to node $n_3$). However, in this case, the holding expert has determined that there is no such intersection of grasp regions, and thus the incremental k cost for holding is infinity. The predicted h cost is not even relevant, nor are any of the other costs which might be assigned by the other experts such as the tooling expert and y the motion expert, since bend 1 cannot be performed at the present point in the bend sequence, without first performing a repo. Thus, node $n_3$ is no longer considered, and the bend sequence planner proceeds to the repo node $n_4$, and queries the respective experts for their assigned costs associated with that node.

After repo node $n_4$, the holding expert assigns a k cost of 30, which signifies that approximately 30 seconds will be needed to perform a repo at the present point in the bend sequence. A predicted h cost of 0 is assigned by the holding expert, since it is predicted that no additional repos will be needed between the present node $n_4$ to the goal node. After the holding expert assigns its cost, the tooling expert, upon being queried by the bend sequence planner, assigns a k cost of 600, which equals the approximate time (600 seconds) to install an additional stage which will be needed in order to perform bend 1 (along bend line 1), since the stage which was utilized to perform bend 2 (which has a length equal to the length of bend line 2) cannot be used to perform bend 1 since such a stage cannot fit between tab portions c and d of workpiece 16. No additional predicted stages or tooling change is expected by the tooling expert; and accordingly, the tooling expert assigns an h cost of 0 to be associated with node $n_4$. It is noted that the tooling expert may initially determine a total initial h cost based upon the total amount of predicted stages that will be needed to perform the complete bend sequence, either at an initial point in the search before performing the search. In the present example, a total initial h cost is calculated to be 1200, since two predicted stages have been predicted to be necessary to perform bends 1 and 2 an workpiece 16. Throughout the search, the k cost is either 0 (with no extxa stages needed) or 600 (if an additional stage is needed for,the bend corresponding to the present node). The h cost for a given node is equal to the total initial h cost minus all of the preceding and current k costs leading up to and including the given node. Accordingly, for node $n_4$, since the preceding k cost leading to $n_4$ was 600, and the present k cost for $n_4$ is 600, the h cost is 1200−600−600=0.

The cost assigned by the motion expert to correspond to node $n_4$ include a k cost of 8 and an h cost of 4. The k cost is estimated to be twice the average preceding k cost, since two motions are needed in order to perform a repo. One movement is needed to take the workpiece from a stage at which the workpiece was left from a previous bend to the repo gripper, and the second movement is to move the robot gripper to the repositioned location while the repo gripper is grasping workpiece 16. The predicted h cost assigned by the motion expert for a repo node is the predicted additional costs needed to perform all future movements in the bend sequence. In this case, h is estimated to be the h value calculated for a previous node $n_2$ minus the present k cost, and thus is estimated to be 4 seconds for node $n_4$. The total incremental costs are then added to the total of all previous k costs preceding that node (in this case repo node $n_4$). Thus, all the incremental associated with node $n_4$ are added to a total previous k costs of 604 which were previously calculated in association with node $n_2$, to obtain a total cost value of 1246.

The bend sequence planner will, in performing its state-space search, thus choose $n_4$ as the best node and will proceed with expanding that node to form its successor nodes. The successor nodes of repo node $n_4$ include node $n_5$. In this case, node $n_5$ is the goal node, since it results in the workpiece 16 having all of its bends completed to form a 3D part. The costs determined by the relative experts include a presumed holding k cost of 0, a calculated tooling k cost of 600, and a calculated motion k cost of 4. Since the present node $n_5$ is known to be the goal node, no h costs are calculated. The previous total k costs 642 seconds. Accordingly, 642 is added to the k cost for tooling of 600 and the k cost for motion of 4 to be equal a total f value of 1246. Such an f value is the cheapest f value among the nodes still left an OPEN. Accordingly, this node will be checked to see if it is a goal node, and if it is a goal node, the solution path will be generated to include (in order) bend 2 which corresponds to node $n_2$, a repo which corresponds to node $n_4$, and bend 1 which corresponds to node $n_5$.

(d) Permutability Determination

Figure 28:
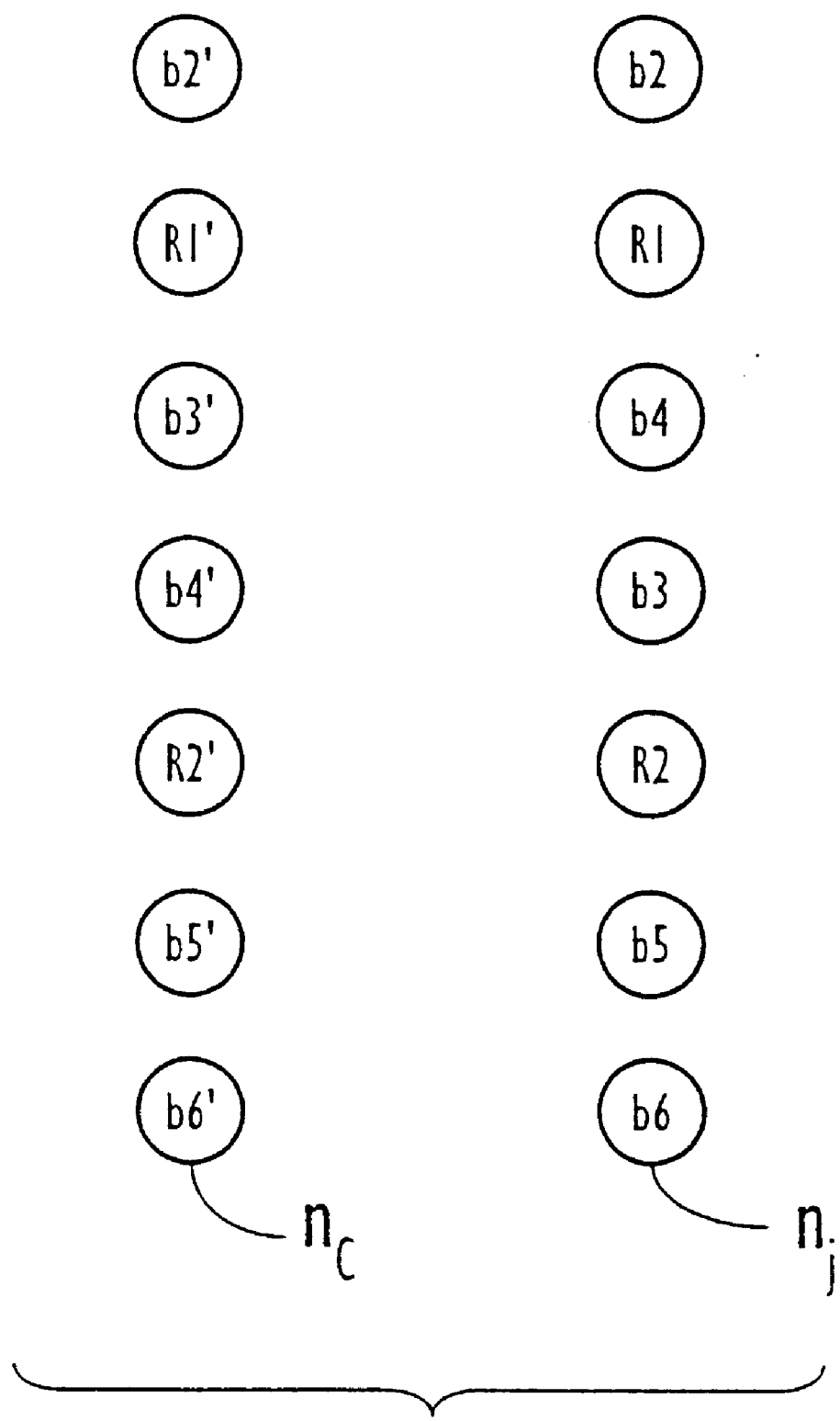
FIG. 28 comprises a graph comparing the histories of nodes b6' and b6.

As described above, in connection with FIGS. 23A–23D, before asking an expert for the costs associated with a particular node, a test is performed for the permutability of that node regarding the subplan and costs for each expert. For example, in step S66 shown at the top of FIG. 23A, a test is performed for the permutability of a particular successor node $n_j$ to determine if it is merely a permutation of another node, and thus have an equivalent set of subplan and costs. If this is the case, it would be wasteful to again ask the holding expert for a proposed subplan and associated k and h costs, since these parameters are already known, and can be obtained by merely referring to the other equivalent nodes. FIG. 28 illustrates a graph of compared histories of nodes b6' and b6, which have been generated by the bend sequence planner in performing its state-space search. Assuming that the subplanning and cost assignment process of the bend sequence planning algorithm was being performed on a particular node b6, at each of steps S66 (FIG. 23A), S76 (FIG. 23B), and S88 (FIG. 23C), a test will be performed for the permutability of that node with any other nodes in the search tree regarding the holding expert's subplan and costs, he tooling expert's subplan and costs and the motion expert's subplan and costs, respectively. In testing whether or not a node is a mere permutation of another node within the search tree, a node such as node b6 illustrated in FIG. 28 will be compared to another node in the search tree, such as node b6', also illustrated in FIG. 28. In making the comparison, the history of node b6, which includes nodes b2, r1, b4, b3, r2, and b5, is compared to the history of b6[1], which includes b2', r1', b3', b4', r2' and b5'.

Depending on the particular implementation of the bend sequence planner and the particular calculations made by each of the experts, the method to be used to determine whether one node is a permutation of another will vary. However, an analysis can be performed of the various permutations of nodes, and the various subplans and costs that can be associated with each node at various levels of the search, in order to determine under what conditions a node is a mere permutation of another node in the search. Based upon the results of the analysis, an appropriate method may be formed for determining whether a node is a permutation of another node, in terms of the subplan and costs assigned for the node. Thus, while the above-described examples have been given for determining the permutability of a node regarding the subplan and costs assigned by the holding expert and the motion expert, respectively, alternative methods may be used depending upon particular variations and implementations of the bend sequence planner and the experts of a system. A similar method can be provided for determining whether or not a node is permutable with another node in terms of the subplan and costs assigned by a motion expert. Thus, a specific embodiment for making that determination is not described in detail herein.

3. Expert Modules, Subplanning, and Dialogue Between Modules

Figure 29:
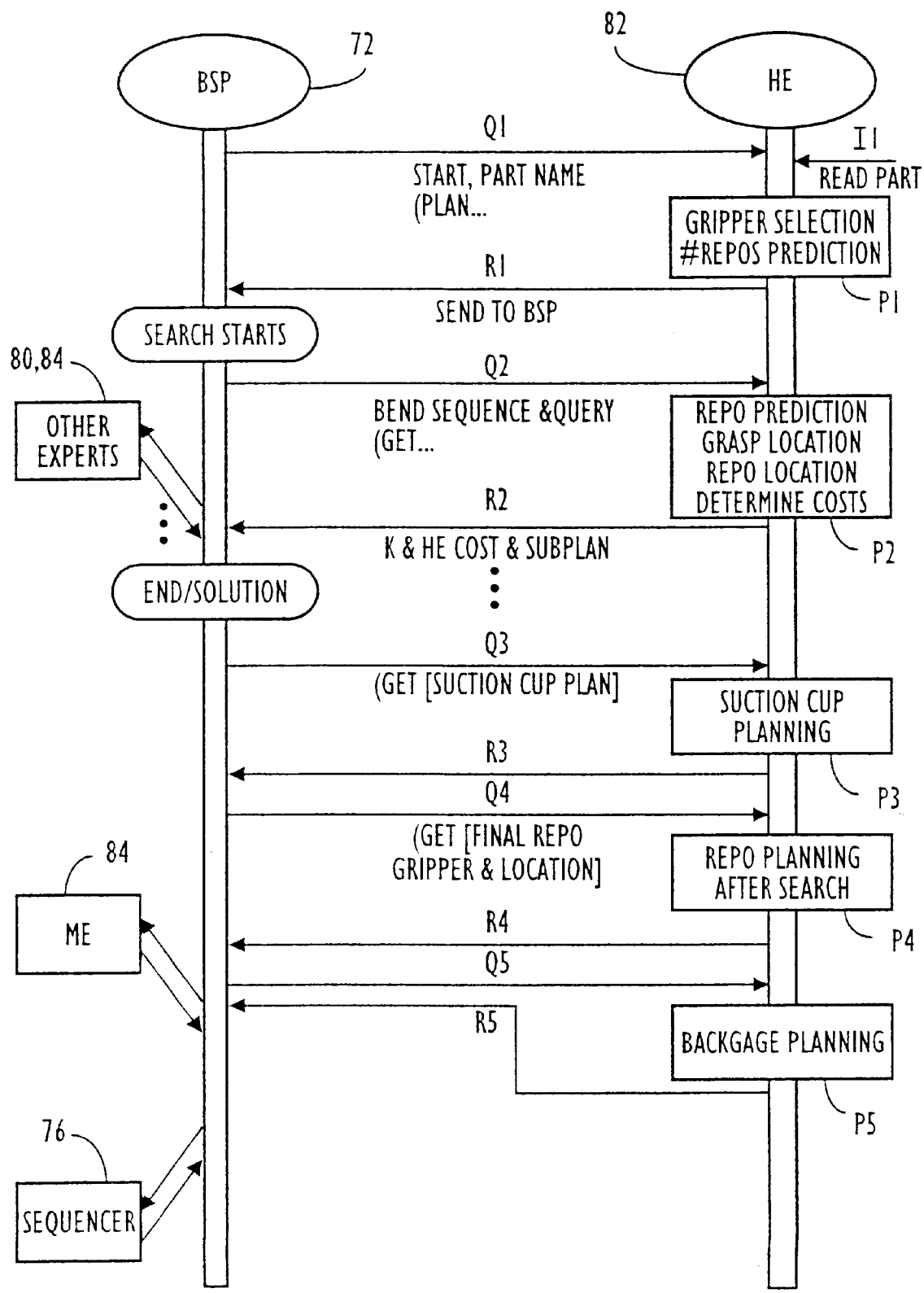
FIG. 29 comprises a chart of a dialogue between the bend sequence planner and the holding expert.
Figure 30:
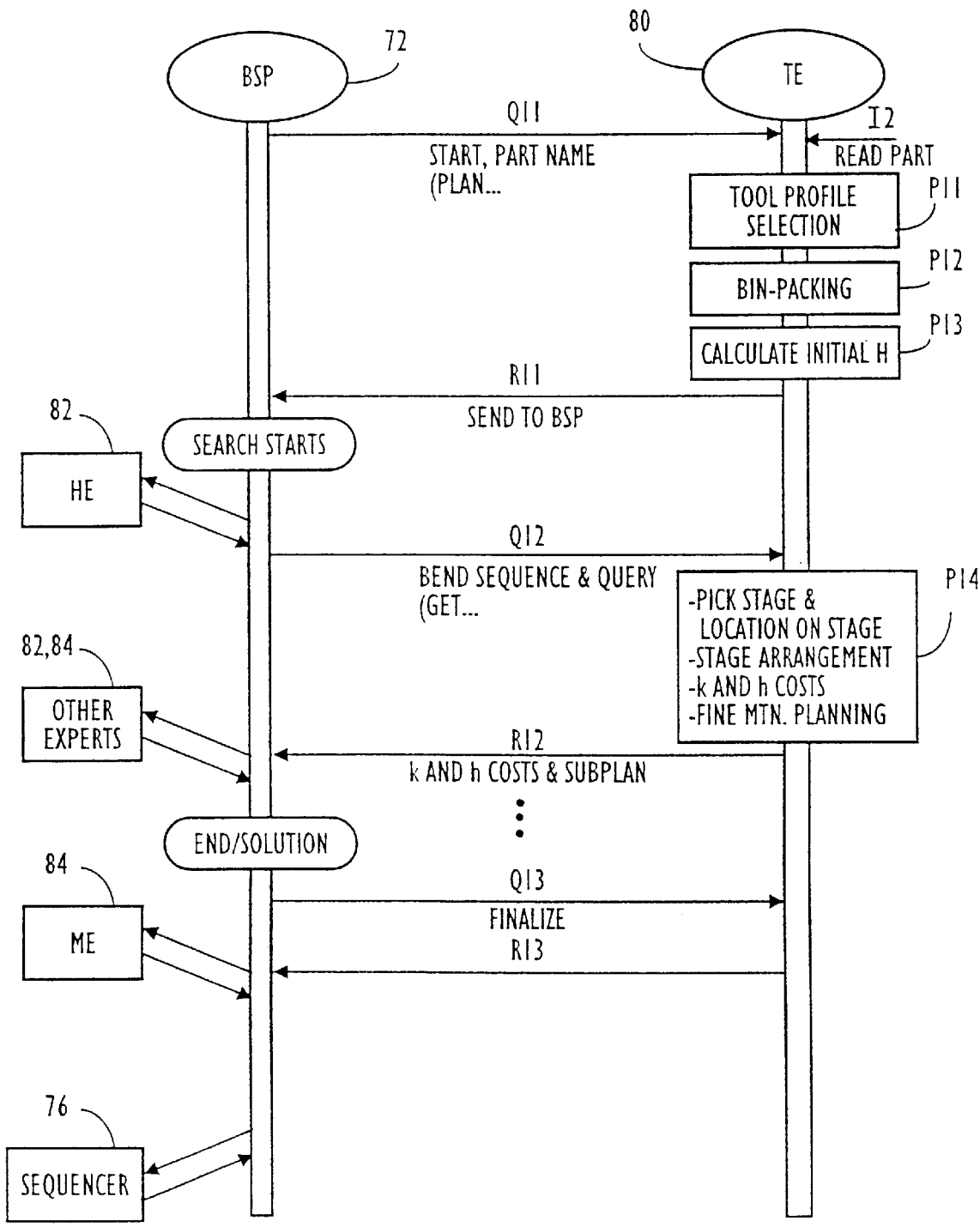
FIG. 30 illustrates a chart of a dialogue between the bend sequence planner and the tooling expert.
Figure 31:
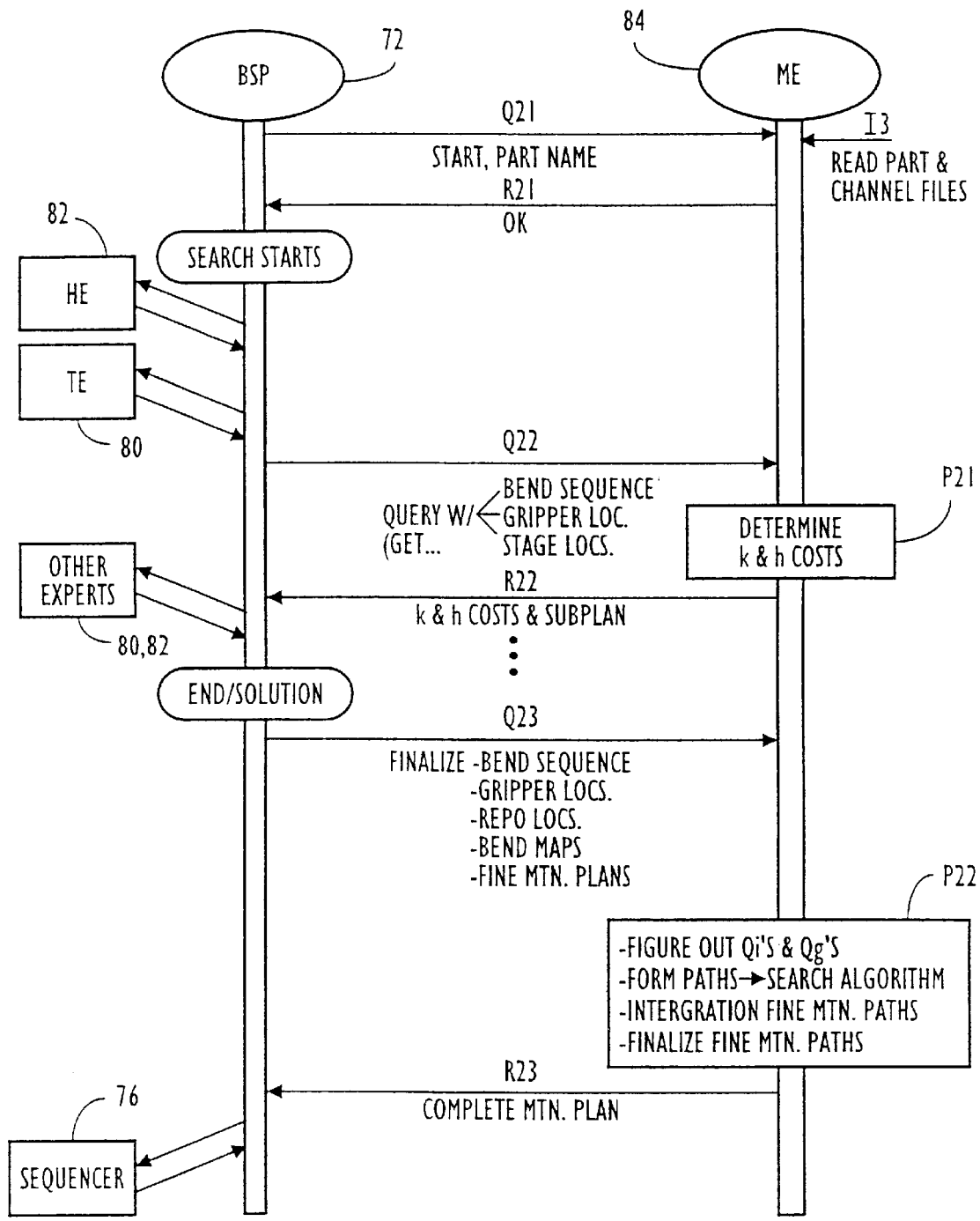
FIG. 31 illustrates a chart of a dialogue between the bend sequence planner and the motion expert.

FIGS. 29–31 respectively include charts which depict the dialogue between the bend sequence planner and the holding expert, tooling expert, and motion expert of the illustrated embodiment planning system 71 as shown in FIG. 5A. Referring to FIG. 29, which illustrates the dialogue between bend sequence planner 72 and holding expert 82, several query arrows Q1, Q2, Q3, Q4 and Q5 are illustrated to represent a query message being forwarded from the bend sequence planner 72 to holding expert 82. In addition, several response arrows R1, R2, R3, R4, and R5 are illustrated to represent response messages from holding expert 82 to bend sequence planner 72. While the queries and responses are indicated in FIG. 29 with consecutive numbers from 1 to 5, this is not meant to indicate that there could not be additional queries and responses, in between, before, or after the queries and responses illustrated in FIG. 29. Rather, these numerals are merely provided to facilitate the description of the dialogue between the modules as shown in FIG. 29.

At some point before commencing its search (e.g., at step S30 as illustrated in FIG. 22A), bend sequence planner 72 forwards an initial query Q1 to holding expert 82, which includes, among other things, a start command, and a file name for the part to be produced. This query Q1 would be forwarded utilizing a VERB "plan . . . " (which is utilized to initialize a module for planning a part). Upon receipt of query Q1, the holding expert then performs an input operation indicated by I1, which includes reading an appropriate file which includes geometric, topological, feature information, and other information regarding the parts to be produced. After the part is read, initial planning steps will be performed, as indicated in block P1. More particularly, holding expert 82 will perform gripper selection, which includes picking a robot gripper, and which includes picking a temporary repo gripper. In addition, holding expert 82 will predict the minimum number of repos that will be needed to complete the overall bend sequence. After performance of the initial planning steps in P1, holding expert 82 then sends the resulting information back to bend sequence planner 72 via a response R1. The response includes a savelist which includes a list of names of attributes to be saved by bend sequence planner 72. The savelist further includes, along with each attribute name, the parameters and values accompanying each attribute to be saved by bend sequence planner 72. The attributes to be saved by bend sequence planner 72 at this point include the selected robot gripper, the temporarily selected repo gripper, and the values indicative of the minimum predicted number of repos which will be necessary to complete all of the bends of the bend sequence.

After response R1 (e.g., in step S38 of the bend sequence planning process illustrated in FIG. 22B), the search is started. After commencing the search, a query Q2 is sent to holding expert 82 (e.g., at step S72 of the bend sequence planning process illustrated in FIG. 23A). The query Q2 includes bend sequence information, and a request for a proposed subplan, a k cost and an h cost associated with that particular node. In this regard, a "get" FEL command may be utilized to perform this query. After receipt of query Q2, holding expert 82 will then perform planning steps indicated in block P2, which include predicting the number of repos which will be needed after performance of the presently proposed bend-related operation, deters ing the grasp location (i.e., the location at which the robot should grasp a workpiece in order to perform the presently proposed bend), and potential repo locations (for the repo gripper's grasp on the workpiece), and will also determine k and h costs associated with the particular proposed bend-related operation (which would include either a bend or a repo). Once all the planning is performed in block P2, holding expert 82 will then respond with a response R2 to bend sequence planner 72, the response including the k and h costs, a subplan, and various attributes which will be saved by bend sequence planner 72 as specified in a savelist forwarded by holding expert to bend sequence planner 72. If the presently proposed node is not a repo node, k will either be equal to 0 or infinity, 0 indicating that no repo is necessary at the present node, and minfinity indicating that there are no available places for the robot to grasp the workpiece without first performing a repo. The h value will be equal to 30 (an estimated amount of time it takes to perform a repo) times the predicted number of repos from the present node to the goal nodes. If the present node is a repo node, k will be equal to 30, if the repo is possible, or infinity if a repo cannot be performed at the present level of the search for the present node. The h cost will be 30 times the predicted number of repos which will need to be performed after performance of the present node bend-related operation.

After performance of processing in relation to query Q2 and response R2, bend sequence planner 72 will then query various other experts including tooling expert so and motion expert 84, in order to obtain their respective subplans and costs, and repeatedly will query each of the experts in association with each node generated during the search in order to form a complete bend sequence plan which includes nodes from the start node to the goal node. Once the search has ended and a solution has been obtained, bend sequence planner 72 will forward another query Q3 to holding expert 82 which includes a request for the suction cup plan, again utilizing the "get" verb of FEL. In response to query Q3, holding expert 82 will perform suction cup planning as indicated by block P3. Suction cup planning will include a determination of what locations along the workpiece loader/unloader may place its suction Cups during loading and unloading of the workstation. Once the suction cup planning has been completed, holding expert 82 will respond with response R3 to bend sequence planner 72. Bend sequence planner 72 will subsequently again query, by query Q4, holding expert 82, for the final repo gripper that will be used and the location of the repo gripper on the workpiece for various stages of the bend sequence. The "get" verb of FEL may be used for this query. After receipt of query Q4, holding expert 82 will perform the planning indicated in block P4, which includes repo planning to be performed after the search. In performing the repo planning after the search, holding expert 82 chooses a true repo gripper to be utilized in execution of the resulting bend sequence plan, and finalizes the repo position based upon the chosen repo gripper. After completion of the repo plan after the search, holding expert 82 will forward a response R4 to bend sequence planner 72. Thereafter, in query Q5, bend sequence planner 72 will further query holding expert 82 for a backgage plan. Accordingly, holding expert 82 will perform backgage planning as indicated by block P5, and will respond to bend sequence planner 72 with the appropriate backgage plan in response R5.

Once all the planning has been performed by holding expert 82, including the final planning after the search, bend sequence planner 72 will have queried the motion expert 84 for its final plan information, and will await, before execution of the plan, the results of the final motion plan from motion expert 84. After receipt of the final motion plan from motion expert 84, bend sequence planner 82 will then proceed to forward the final plan to sequencer 76.

In the illustrated dialogue between bend sequence planner 72 and tooling expert 80 in FIG. 30, several queries are illustrated from bend sequencer planner 72, indicated by query lines Q11, Q12, and Q13, and several responses are illustrated by response line R11, R12, and R13. As indicated by the first query line Q11, at some point in time before commencing its search (e.g., at step S32 in the bend sequence planning process illustrated in FIG. 22A), bend sequence planner 72 will command tooling expert 80 to start its processing, and will forward the name of the part to be produced with the use of a "plan" verb in FEL. Upon receipt of query Q1, as indicated by input line 12, tooling expert 80 will then read an appropriate part file. Subsequently, tooling expert 80 will perform various planning steps as indicated by blocks P11, P12 and P13. These planning steps include selection of a tool profile, bin-packing, and performing a calculation of an initial h value (which corresponds to the total number of predicted stages that will be needed to perform all of the bends of the bend sequence). The bin-packing algorithm comprises the selection of tool segments that will together add up to the appropriate stage length for each stage to be utilized by the bending workstation in performing the bends of the bend sequence. Once all of the appropriate plan information is gathered in planning blocks P11, P12, and P13, tooling expert 80 will respond as indicated by response line R11, to bend sequence planner 72, and will indicate to bend sequence planner 72, via a savelist, various attributes to be saved. Subsequently (e.g., at step S38 in FIG. 22B), the bend sequence planner 72 will commence it search. Once the search is commenced, and after the information has been gathered from holding expert 82, bend sequence planner 72 forwards a query Q12 to tooling expert 80, which includes the bend sequence at that point of the search and a query for the subplan and associated k and h costs. The verb "get" in FEL is utilized for this query. Tooling expert 80 then performs planning steps, as indicated by planning block P14, which include picking of a stage length to correspond to a bend and a location along that stage where the bend should be proved, arranging the stages, calculating the k and h costs, and performing fine motion planning. Then, tooling expert 80 responds to bend sequence planner 72 via response R12, and forwards the k and h costs and the associated subplan information to bend sequence planner 72. A savelist is also included in response R12 which indicates information and attributes that should be saved by the planner. Subsequent queries and responses may be exchanged throughout the search, with tooling expert 80 and with other experts 82 and 84 before the search is finished. Once the search ends and a solution has been found (e.g., in step S56 in FIG. 22D of the bend sequence planning process), a query Q13 instructing the tooling expert to finalize will be forwarded to tooling expert 80. Tooling expert 80 will then perform its appropriate final processing, and return, via response R13, any final information to bend sequence planner 72. Subsequently, bend sequence planner 72 requests final information and final processing to be performed by motion expert 84 and will await the results thereof. Once the final motion planning results have been obtained by motion expert 84, bend sequence planner 72 will compile all information to form a final plan, and will forward the same to sequencer 76.

As illustrated in FIG. 31, bend sequence planner 72 communicates with motion expert 84 before, during and after performing a search, in the form of queries and responses which may include the queries indicated by query lines Q21, Q22 and Q23, and respective response finef R21, R22 aid R23. Initially (e.g., as indicated at step S34 in FIG. 22A), a first query Q21 may be forwarded to motion expert 84 which includes a start command, and the name of the part to be produced. Upon receipt of query Q21, motion expert 84 will then input the appropriate part file and a channel file which represents all of the free space channels through which the part and the robot may be manipulated in performance of the various bends and operations of the bend sequence. This input is indicated by 13. Thereafter, motion expert 84 will send a response R21 to bend sequence planner 72, indicating, essentially, that the information was read in and acknowledging that it is ready for the next query by bend sequence planner 72. Sometime thereafter (e.g., at step S38 in FIG. 22B), the state-space search of the bend sequence planner 72 will commence. Then, bend sequence planner 72 will query holding expert 82 for various information while performing the first level of the search, then query tooling expert 80, and thereafter send a query Q22 to motion expert 84. Query Q22 includes information about the bend sequence, the gripper location and the bend locations on the stages (in the form of a bend map). This query may be sent to motion expert 84 by using a "get" verb in FEL. Upon receipt of query Q22, motion expert 84 will perform processing in processing block P21, and thus will develop a subplan and determine the k and h costs for performing the bend proposed by bend sequence planner 72 at that particular point in the bend sequence. The resulting k and h costs and subplan are returned to bend sequence, planner in response R22. Afterward, additional processing by other experts 80, 82, and by motion expert 84 may be performed in order to complete the search.

Once the search has ended and the solution has been obtained, bend sequence planner 72 will send an additional query Q23, which includes a finalize command. With query Q23, bend sequence planner 72 will forward information to motion expert 84 so that motion expert 84 may perform all final planning operations. Such forwarded information would include the bend sequence, the gripper locations for each bend in the sequence, the repo locations for each repo to be performed, the bend maps corresponding to the bends of the bend sequence, and all fine motion plans which have been developed by tooling expert 80, in order to bring the workpiece into and out of the die space when performing each bend in the bend sequence. otion expert 84 utilizes that information to perform the processing indicated in processing block P22. More particularly, motion expert 84 will figure out the various starting and finishing points in order to develop a gross motion plan. A search algorithm is then performed in order to form paths between the gross motion starting and finishing locations. Then, the resulting gross motion paths are linked with the fine motion paths so that a complete motion scheme is formed, commencing with acquiring the workpiece from the loader/unloader during loading of the workstation, bringing the workpiece to each of its bends, and finally bringing the finished workpiece to the loader/unloader to be unloaded from the workstation.

The complete motion plan is then returned to bend sequence planner 72 in a response R23. Once the complete motion plan has been received by bend sequence planner 72, bend sequence planner 72 may compile the complete plan, and forward the same to sequencer 76 for execution.

Figure 32:
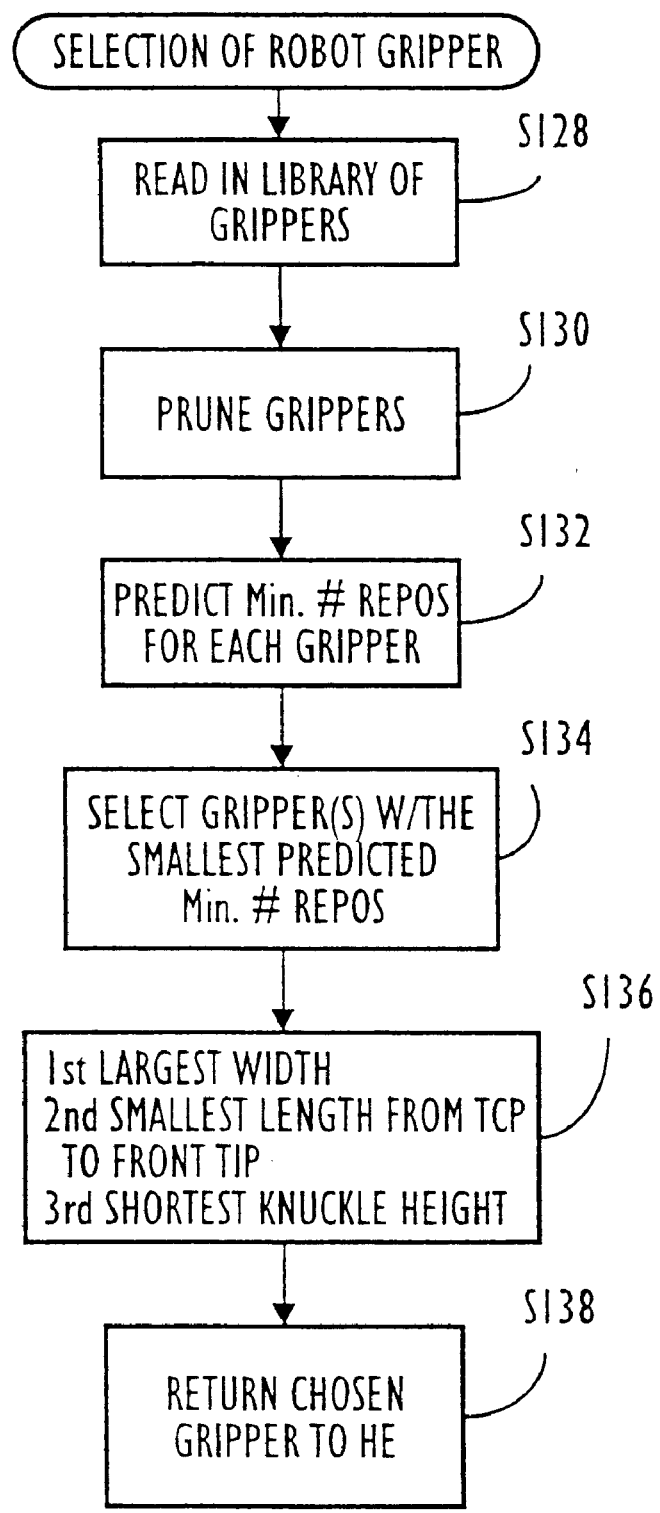
FIG. 32 illustrates a process of the selection of a robot gripper.

FIG. 32 illustrates a flow chart of an example process for performing robot gripper selection. This process is performed, e.g., in planning block P1 in FIG. 29. In a first step S128, a library of grippers is read in. Then, in step S130, the process prunes obviously bad grippers, e.g., if they have certain dimensions which are inappropriate for the type of work being performed by the bending workstation. In step S132, a minimum number of repos for each gripper is predicted. Thereafter, in step S134, the one or more grippers having the smallest predicted number of repos is selected. Then, in step S136, among the selected grippers, all of the grippers having the largest width are selected. Among the remaining grippers, those with the smallest length from the tool center point to the front tip of the gripper, are selected. Among those selected grippers, the grippers with the shortest knuckle height are selected. If there is only one gripper having the largest width among the selected grippers, then that gripper will be selected and no further determination is needed as to the length of the gripper or as to the knuckle height of the gripper. Similarly, if several grippers have the largest width among the select grippers, but only one gripper has the smallest length, then that gripper will be selected and no further determination will be needed as to the knuckle height of the gripper. If there are several grippers left that have an equal shortest knuckle height, as determined in step S136, then any one of those grippers may be chosen. Thereafter, in step S138, the chosen gripper is returned to the holding expert.

Figure 33A:
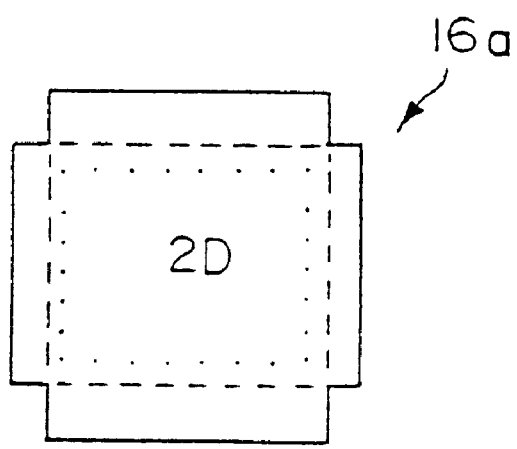
FIG. 33A illustrates a flat 2D workpiece with discretized x points illustrated thereon.
Figure 34A:
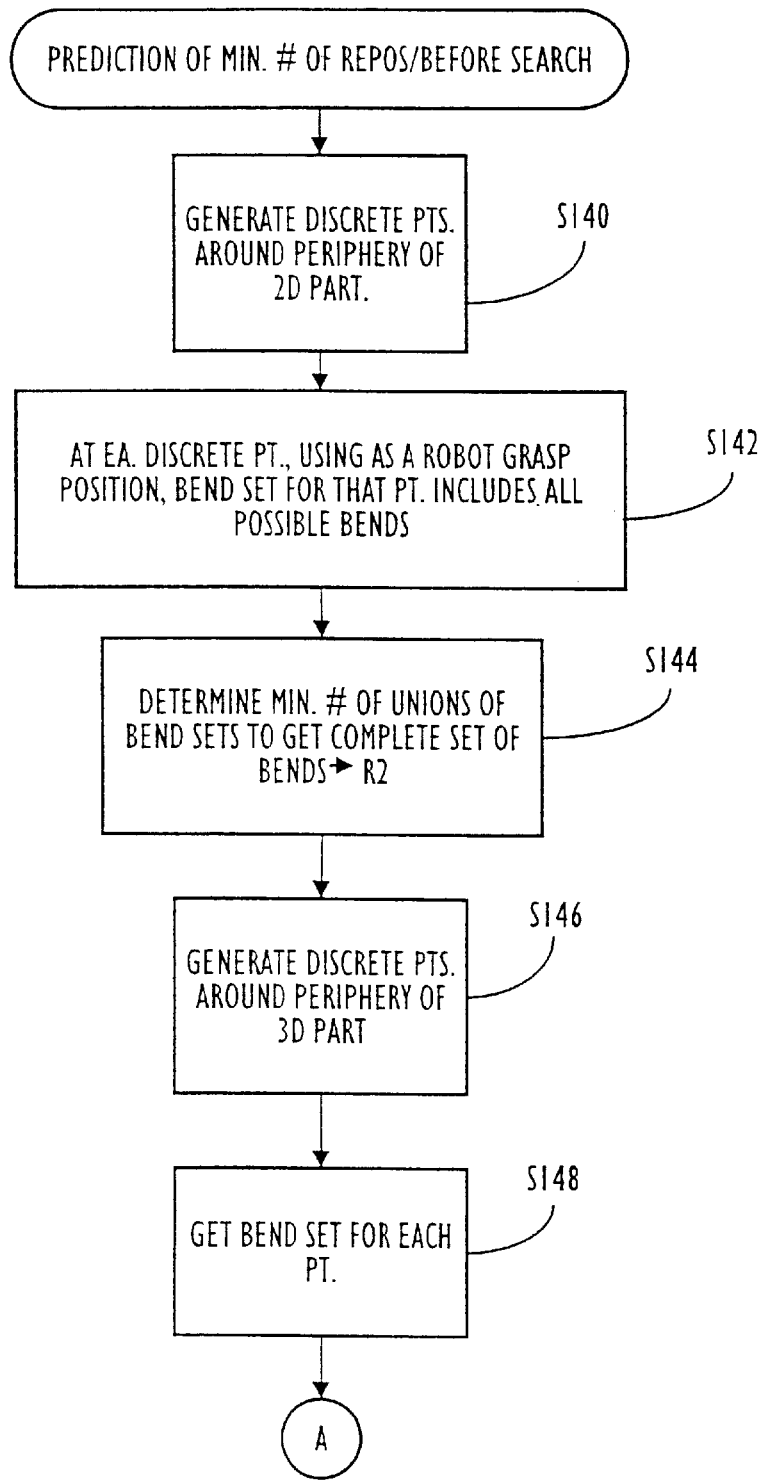
FIGS. 34A–34B illustrate a process for predicting a minimum number of repos to be performed before the search.

As illustrated in FIG. 32, a prediction must be made as to the minimum number of repos needed for each gripper in step S132. Such a prediction of the minimum number of repos, before the search, can be performed by utilizing the exemplary process illustrated in FIG. 34A. The goal of the process depicted in FIG. 34A is to, for a given robot gripper and a given part, predict the minimum number of repos that will be needed in order to form the complete 3D part. Among the information utilized. In order to perform the prediction, information is needed regarding both the 2D part, and 3D part (the completely formed bent part). In a first step, discrete points are generated around a periphery of a part of a 2D representation of the part. Such discrete points, located a set distance from the edge of the part, are illustrated in FIG. 33A. The granularity shown in FIG. 33A is merely for the purpose of explanation of the algorithm, and does not necessarily reflect a preferred granularity. The granularity of the discrete points may be varied in order to obtain an optimum accuracy, while not sacrificing the speed of the search process.

Assuming a grasp position at a first one of the discrete points, a bend set including all of the possible bends for that robot grasp position will be identified in step S142, assuming that the part is still flat, (in 2D) and that the part is at the L/UL. This is repeated for each discrete point around the periphery of the 2D part 16a (e.g., as shown in FIG. 33A), and all bend sets for each corresponding robot grasp point are identified.

Figure 33B:
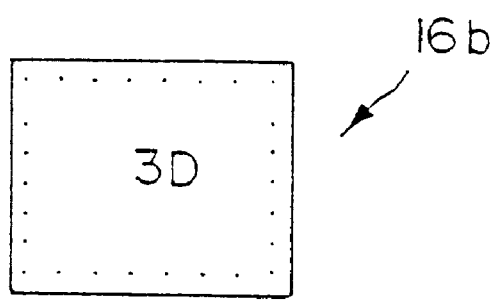
FIG. 33B illustrates a bent 3D workpiece with discretized x points placed thereon.
Figure 34B:
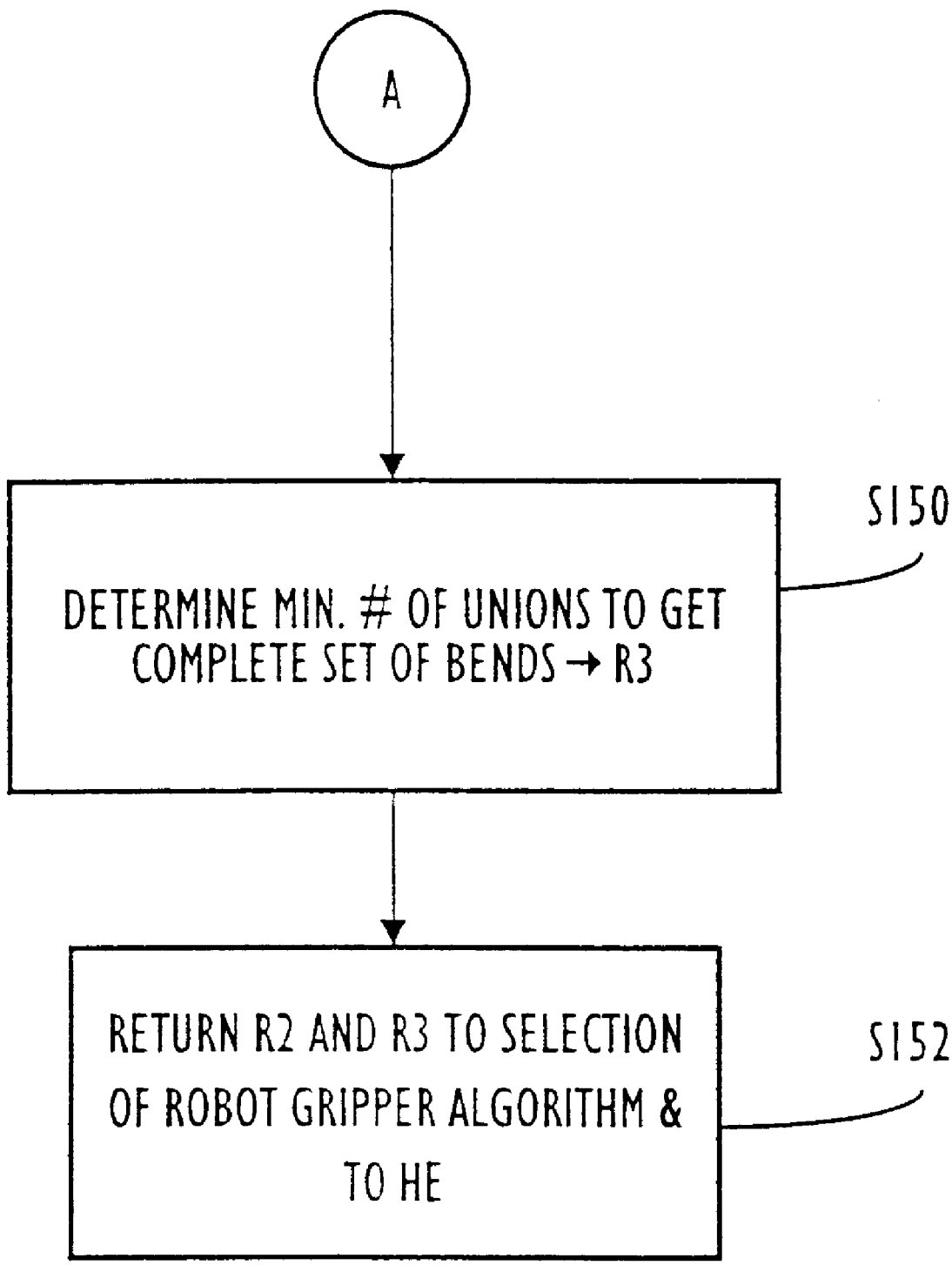

Thereafter, in step S144, a determination is made as to the minimum number of unions of the bend sets determined in step S142 that will form a complete set of bends (i.e., all of the bends of the bend sequence). This minimum number of unions will be identified as a 2D minimum number of repos R2. Thereafter, in step S146, the discrete points are generated around the periphery of a 3D part 16b (e.g., as shown in FIG. 33B). It is noted that the granularity shown in FIG. 33B is only shown by way of example, and does not necessarily represent the preferred granularity for performing the present algorithm. The appropriate granularity for the generation of points around the outer periphery of the part may be modified in accordance with the desired accuracy and speed of the algorithm. For each paint generated around the periphery of 3D part 16b, the corresponding bend set (i.e., all of the possible bends that may be performed then the robot is grasping the part at that location) is identified, thereby identifying all of the bend sets for all of the discrete points around a periphery of 3D part 16b. Then, proceeding to step S150 (in FIG. 34B), the minimum number of unions required to get a complete set of bends (i.e., all of the bends of the bend sequence) is determined, and is called R3 which represents the minimum number of 3D repos. In performing step S148, all of the possible sets of bends in grasping at the respective discretized X positions on 3D part 16b are formed assuming a particular gripper, and further assuming that the 3D part is located at the repo station. At step S152, the values R2 and R3 are returned to the algorithm for selecting the robot gripper (e.g., as disclosed in FIG. 32) and to the holding expert. The value R3 represents an upper bound number of predicted repos, since it is more difficult to hold the workpiece when it is completely bent, i.e., a 3D part, than it is to hold the workpiece in performing bends when it is a flat part. The value R2 represents a lower bound number of predicted repos. The selection of robot gripper algorithm and the holding expert may each utilize either the lower value R2, the upper value R3, or a combination of the two in performing their calculations and determinations. For example, for purposes of choosing a robot gripper (in step S134 shown in FIG. 32), the lower number R2 may be first considered. If there are more than one grippers with an equal smallest predicted number of repos R2, but with different values R3, then the grippers with the smallest value R3 may be selected. These selected grippers, if more than one, would then be further evaluated inaccordance with step S136, as shown in the flow chart of FIG. 32.

Figure 35A:
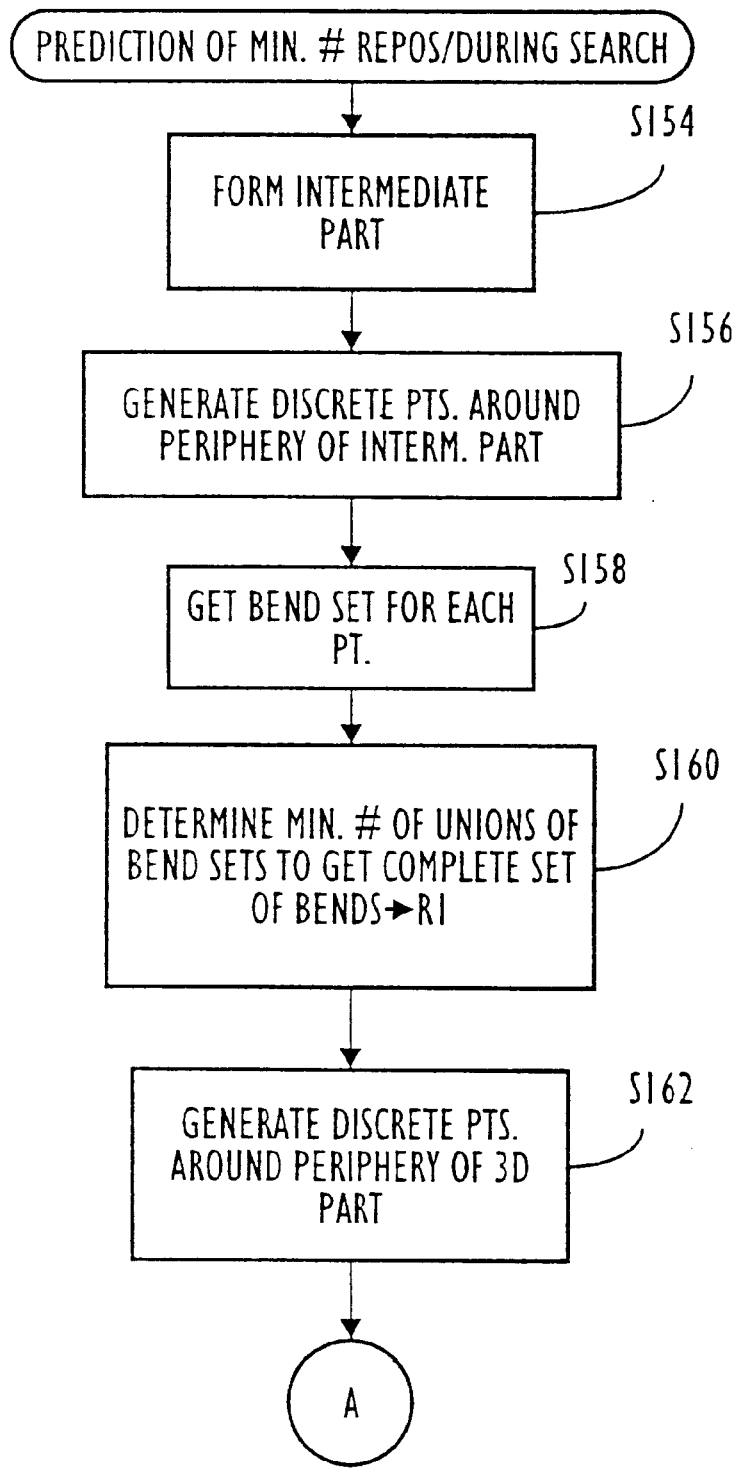
FIGS. 35A–35B illustrate a process for predicting a minimum number of repos to be performed during the search.
Figure 35B:
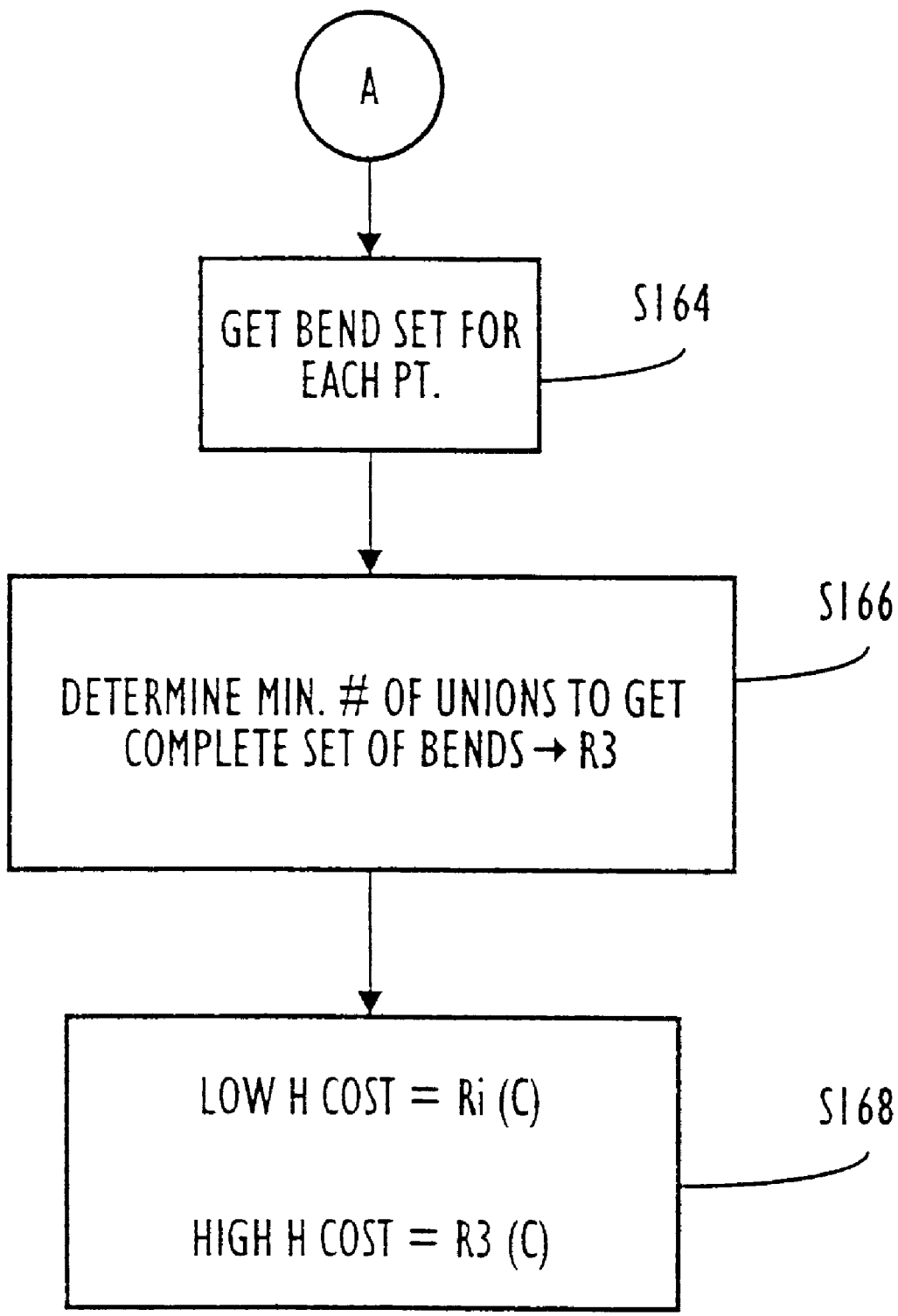

FIG. 35A illustrates a process for predicting the minimum number of repos which can be used during the search. The algorithm for predicting the number of repos used before the search did not include an evaluation of intermediate parts, in order to save time. In order to have better accuracy throughout the search, the algorithm depicted in FIG. 35A also considers a formed intermediate part, and the variations of the part as it moves throughout the various bends.

In a first step S154, an intermediate part is formed, by calling an appropriate function in a geometric modeling library. The intermediate part includes all of the bends in the bend sequence so far up to the present node of the search. Thereafter, in step S156, discrete points are generated around the periphery of the intermediate part, in a manner similar to that described in the process of FIGS. 34A–34B, and in a manner similar to that illustrated in FIGS. 33A and 33B. Once the discrete points are generated, in step S158, a bend set is determined for each grasp location point. In other words, a determination is made as to all of the possible bends that may be performed while the robot gripper is grasping the part at each discretized point. In step S160, a determination is made as to the minimum number of unions of the bend sets generated in step S158 needed to form a complete set of bends (i.e., all of the bends of the bend sequence). This number is called R1. Once the value R1 is determined, then, in step S162, discrete points are generated around the periphery of the 3D part. A bend set (i.e., the possible bends that may be performed for each gripper position along the discretized points) is then identified in step S164. The minimum number of unions of the bend sets is then determined which would be necessary to form a complete set of bends (i.e., all of the bends of the bend sequence). That minimum number of unions is referred to as. R3. Then, in step S168, a law h cost Ri(c) and a high h cost. R3(c) are assigned and returned to the planner. The cost values Ri(c) and R3(c) are estimates of the amount of time it takes to perform a repo times the minimum number of repos (Ri and R3, respectively). Instead of sending the low h cost and high h cost as noted in step S168 to the holding expert, the process for predicting the minimum number of repos during the search may send the values Ri and R3 themselves.

Figure 36A:
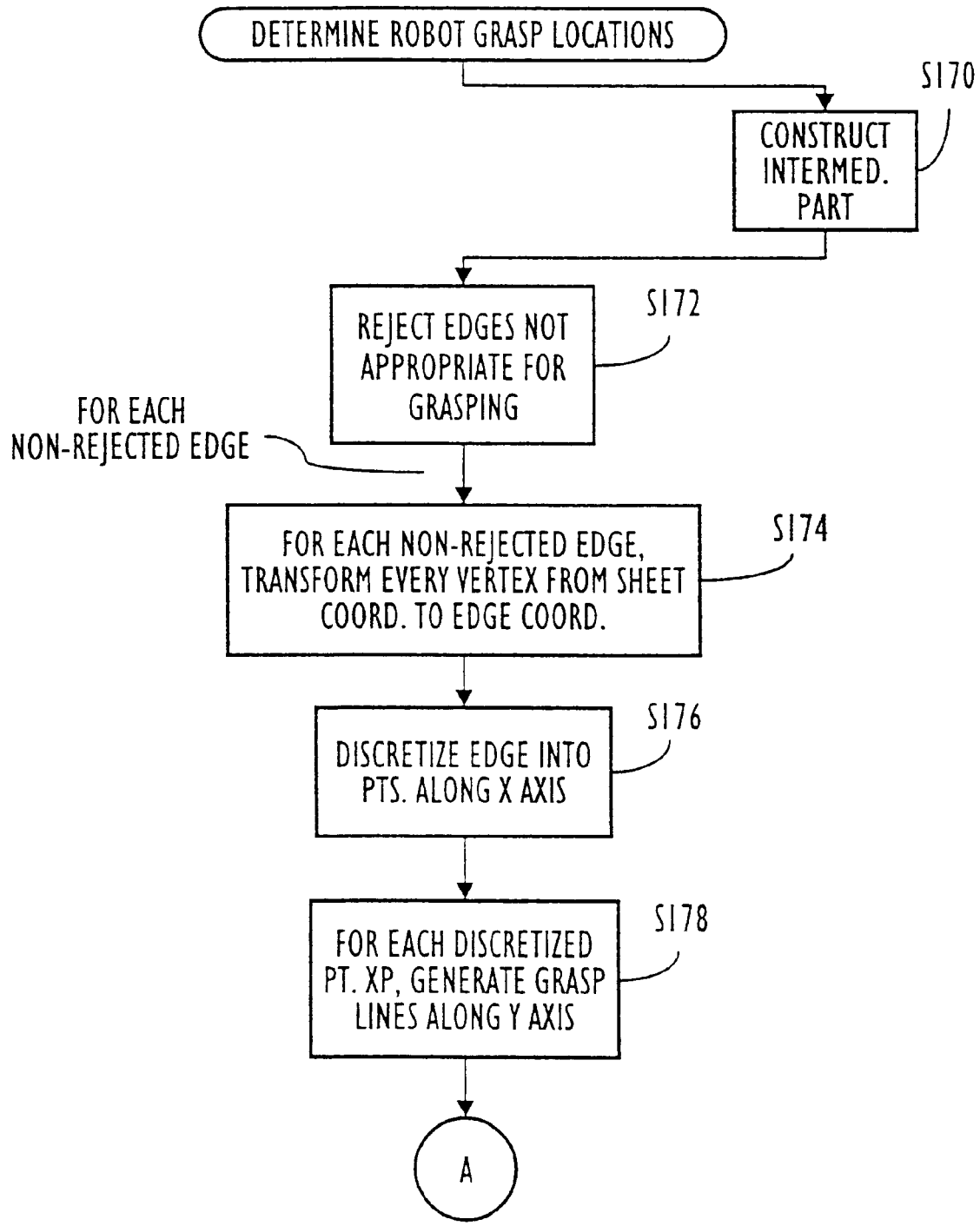
FIGS. 36A–36B illustrate a process for determining the robot's grasp locations on the workpiece.

FIG. 36A illustrates an example process for detererring the robot grasp locations, as performed in planning block P2 in the chart depicted in FIG. 29 by holding expert 82. In a first step, S170, an intermediate part (having the bends corresponding to the present node of the state-space search of the bend sequence planner) is constructed. Thereafter, in step S172, all edges which are not appropriate for grasping are rejected. For example, an edge may be rejected if it is not a face which is parallel to the robot's XY plane. In addition, an edge may be rejected if it is inaccessible by the robot gripper when the part is loaded in the die space. In addition, the edge may be rejected if the edge is too close to the die, so that the robot would collide with the tooling before and/or during the bend operation. The edge may also be rejected if grasping the workpiece on such an edge would cause the robot to be outside of its work space.

Figure 37:
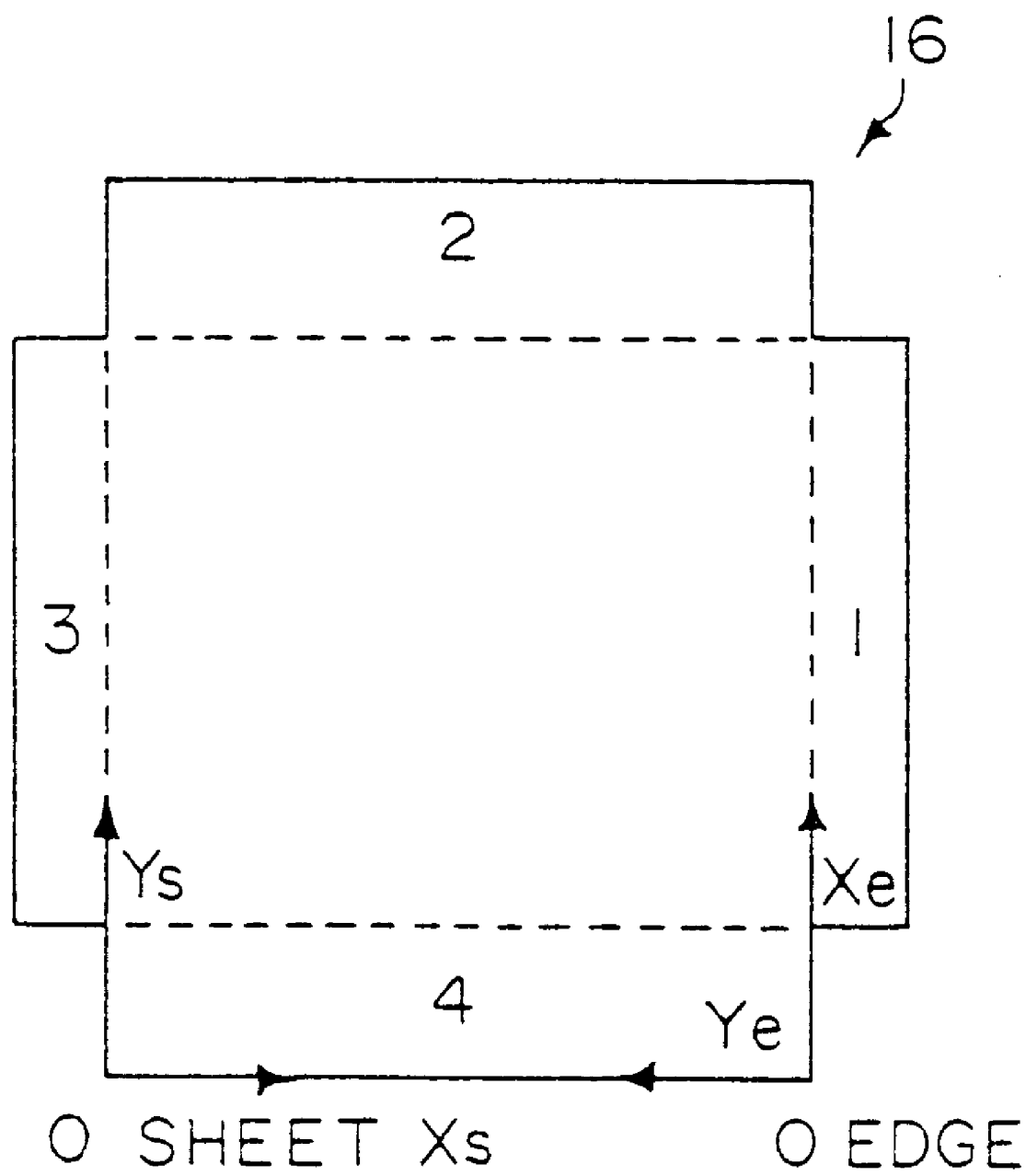
FIG. 37 illustrates a 2D workpiece having both sheet and edge coordinate systems.

For each non-rejected edge, the steps following step S172 are performed (shown in FIG. 36A). In step S174, for each non-rejected edge, every vertex is transformed from sheet coordinates to edge coordinates. In this regard, by way of example, an illustration is provided in FIG. 37 in order to define an example set of sheet coordinates $X_s$ and $Y_s$ on a workpiece 16 having bend lines 1, 2, 3, and 4, which may be transformed to edge coordinates $X_e$ and $Y_e$ which correspond to the edge of workpiece 16 which is next to bend line 1.

In terms of edge coordinates, each edge is discretized ties into points along the X axis in step S176. Thereafter, in step S178, for each discretized ties point, $X_p$, grasp lines are generated which extend along the Y axis. In order to generate the grasp lines along the Y axis, several process steps are performed. For example, referring to FIG. 38, for a discretized point $x_p$, a (broken) grasp line 306 is formed along the Y axis. For the discretized ties point $x_p$, an initial Y value Ys is proposed which is set at a distance from the edge (e.g., 3 mm). It is assumed that the gripper is oriented to be normal to the X axis in edge coordinates. A determination is then made as to whether or not the point Ys is cut of the robot's work space, while the workpiece is at the loader, the repo station, or at one of the stages. If this is the case, a new point along a line corresponding to the discretized ties point Xp and normal to the edge is found that is within the work space. For the first valid Yp, a determination is made as to whether Yp is beyond the gripper's maximum reach. If so, the value Yp is rejected. In addition, a determination is made as to whether or not the gripper can make good pad contact with the part if the gripper is at the position Yp. If no good pad contact can be made, the position Yp is rejected. New values for Yp are proposed, until line 306 reaches a first maximum location at which the robot can grasp the part, that first maximum position being Yf. This distance is defined by the fact that pads cannot have good contact any more due to holes or due to a boundary in the part. For example, a maximum position Yf is found right before a first hole 307 in the workpiece 16 shown in FIG. 38. The next viable or potential Yp is then found along the line running perpendicular to the edge and is defined as a new initial or starting position Ys'. Y values Yp are then proposed and tested until an additional final position Yf' is found due to limits because the pads cannot have good contact or due to the fact that the part has a boundary at that location. Thus, as shown in the workpiece in FIG. 38, Yf' is determined to be just before second hole 308. This process is repeated until the end of the line 306 reaches the gripper's maximum reach or the boundary on the opposite side on workpiece 16. Thus, an additional line segment extending from Ys" to Yf" is generated.

Once the grasp lines have been generated for each discretized point Xp, later in step S180, a common grasp area is defined for the present bend in the search, and is defined to be the intersection of the current grasp lines with the grasp lines determined for previous bends since the last chosen repo in the search. A k cost of 0 is assigned if the intersection is not equal to 0, and a k cost of infinity is assigned if the intersection is 0. This signifies that the present bend cannot be performed since the grasp areas needed to perform the bend are not common with the previous bend. Thereafter, in step S182, a temporary grasp location is selected within a defined common area.

Whenever it is determined that there is no intersection of grasp regions, and thus a repo is necessary, final grasp locations are selected for the bends preceding the repo, since it is known that the grasp location will not change any further for that set of bends. A final grasp location is selected such that a large repo are is generated.

Figure 36B:
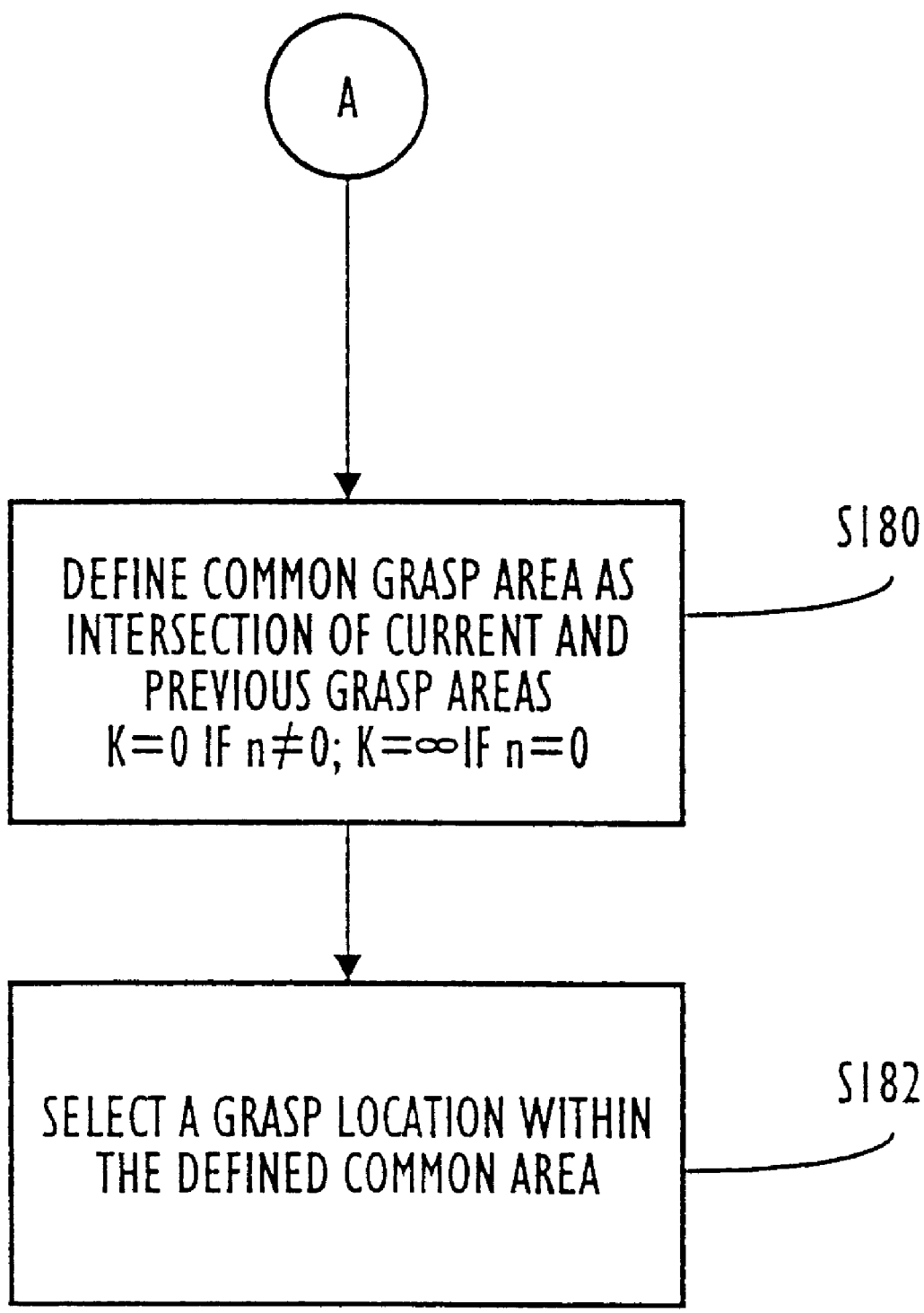
Figure 39:
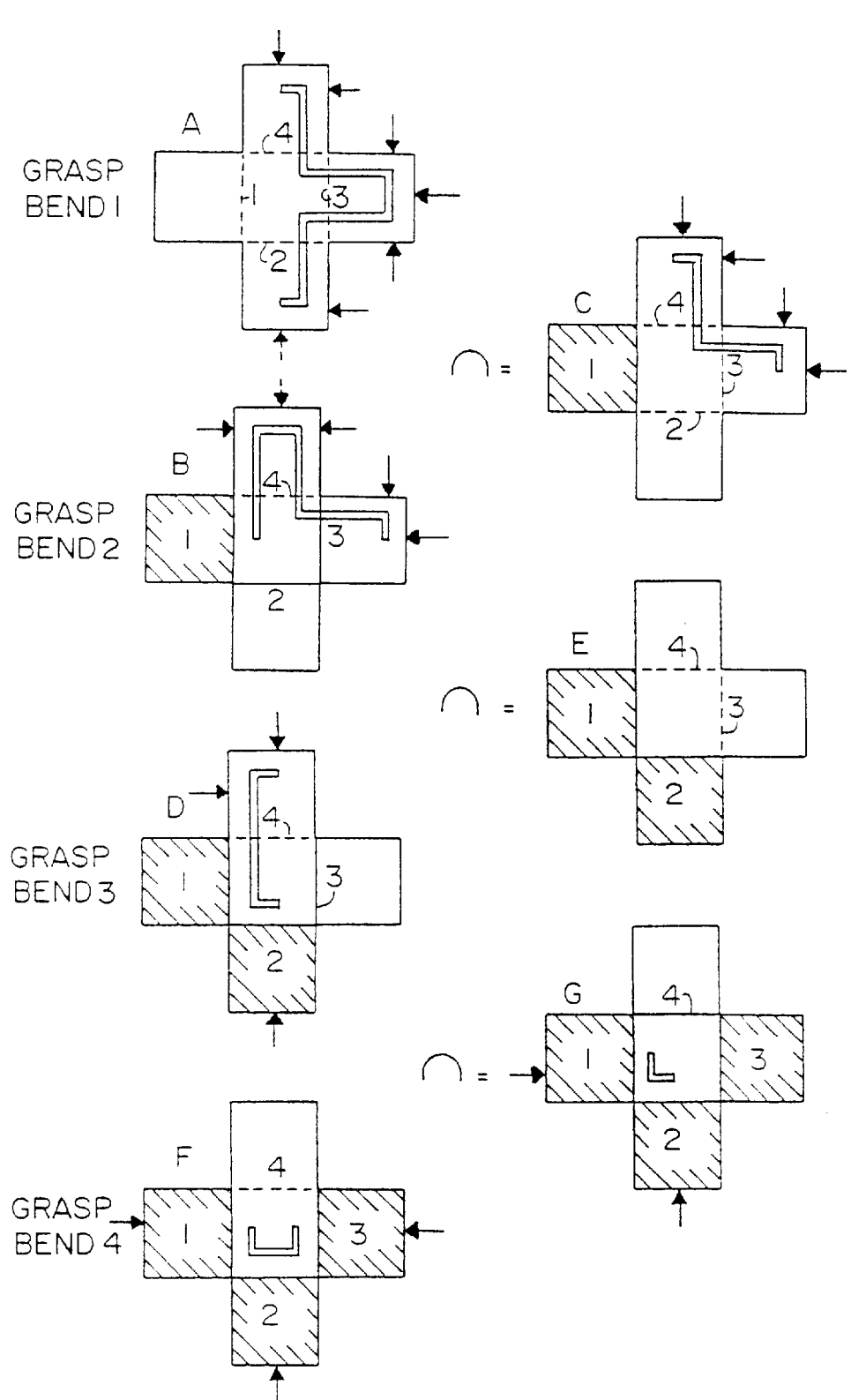
FIG. 39 is a diagram representing the intersections grasp regions to determine of a final grasp region before a repo is performed.

FIG. 39 illustrates the evolution of the common grasp area as determined throughout a search, as calculated by a determined robotic grasp locations process, e.g., as illustrated in FIGS. 36A–36B. The grasp area for bend 1 is first determined as illustrated in view A. Then, with bend 1 having been already performed, and the corresponding flange being bent (indicated by the cross-hatched lines in view B), the potential grasp regions which can be utilized to perform bend 2 are determined as illustrated in view B. The intersection of the regions in views A and B is then determined as illustrated in view C. Then, bend 2 is performed (indicated by cross-hatched lines in view D), and the total available grasp regions which may be utilized to perform bend 3 are determined as shown in view D. To go from bend 2 to bend 3, an intersection is made of the regions in views C and D. as shown in view E. This signifies that there is no different intersecting region and that a repo must be done before bend 3 can be performed (as indicated by the cross-hatched lines in view F). The repo is then performed, and bend 3 is performed. Before performing bend 4, the potential robot grasp regions for that bend are determined as illustrated in view F. In order to determine the exact grasp position to perform bend 4, an intersection is made of the regions in views D and F, as indicated in view G. This is the region for the robot grasp location that can be utilized in order to perform both bends 3 and 4.

Each bend, which has already been performed, is indicated by cross-hatched lines being placed on the flange that is bent. The grasp regions are indicated by a solid black line.

Figure 40:
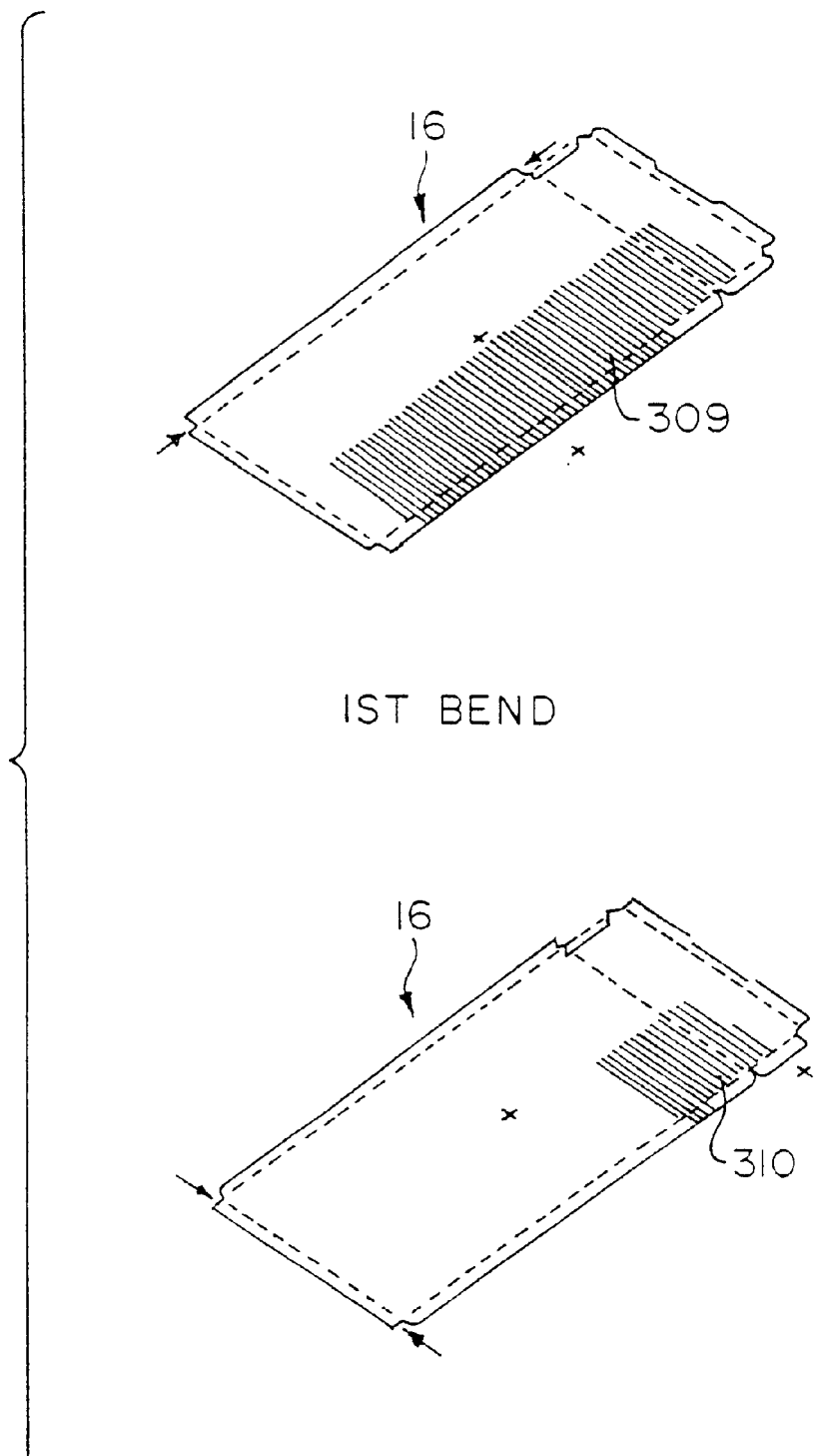
FIG. 40 comprises examples of grasp regions in different levels of the search.

FIG. 40 illustrates first and second views of a workpiece 16, the views showing the grasp line regions determined before performing a first bend, and before performing a second bend, respectively. As can be seen in FIG. 40, the grasp line region 309 comprises a certain large area of the workpiece 16. The lower view illustrates the intersection of the grasp line region (i.e., the grasp area) shown in the top view which can be utilized to perform the first bend and a grasp line region (not shown) which may be utilized to perform the second bend. Thus, grasp line region 310 is a small subset of the grasp line region 309, and may be utilized as a grasp location to perform both the first bend and the second bend.

Figure 38:
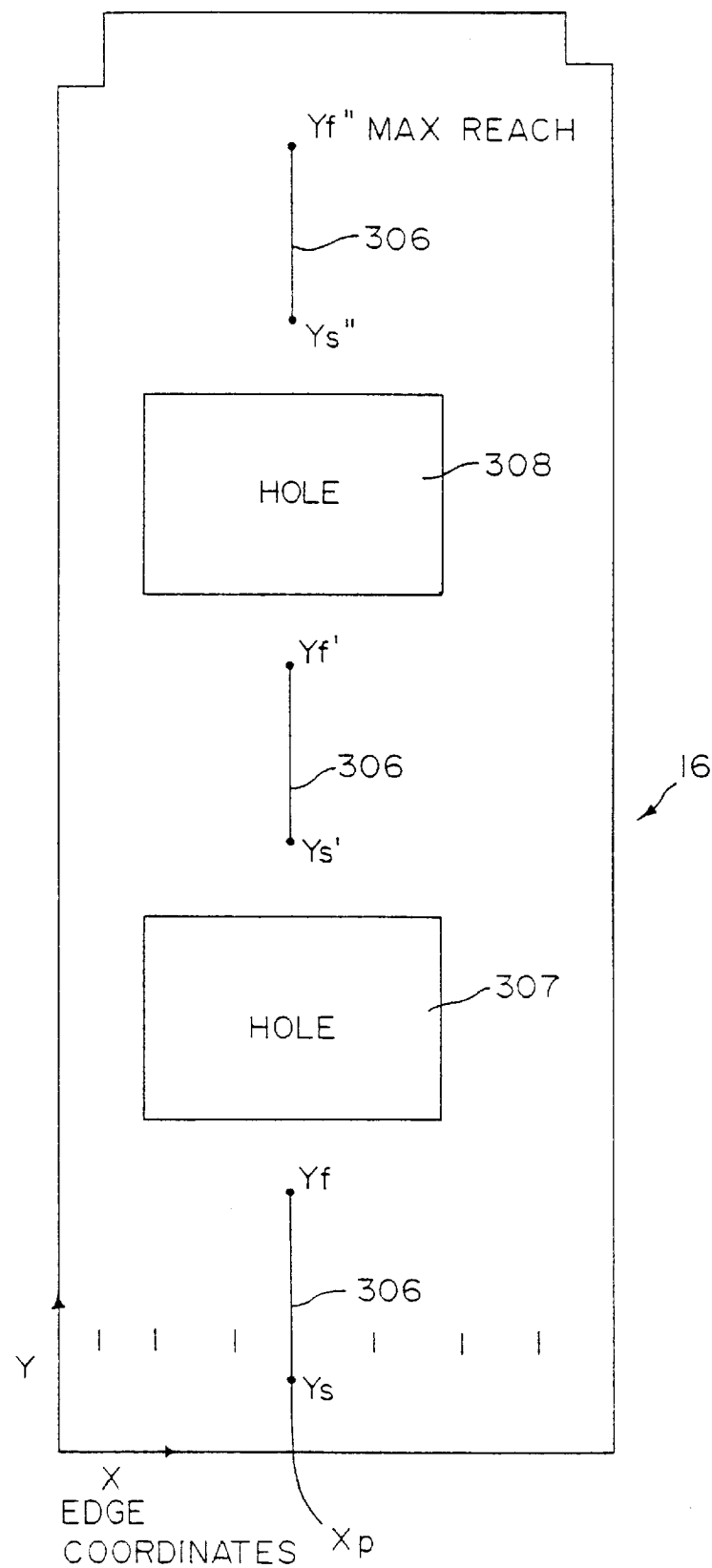
FIG. 38 illustrates a 2D workpiece and the illustrated generation of available Y grasp locations.
Figure 41:
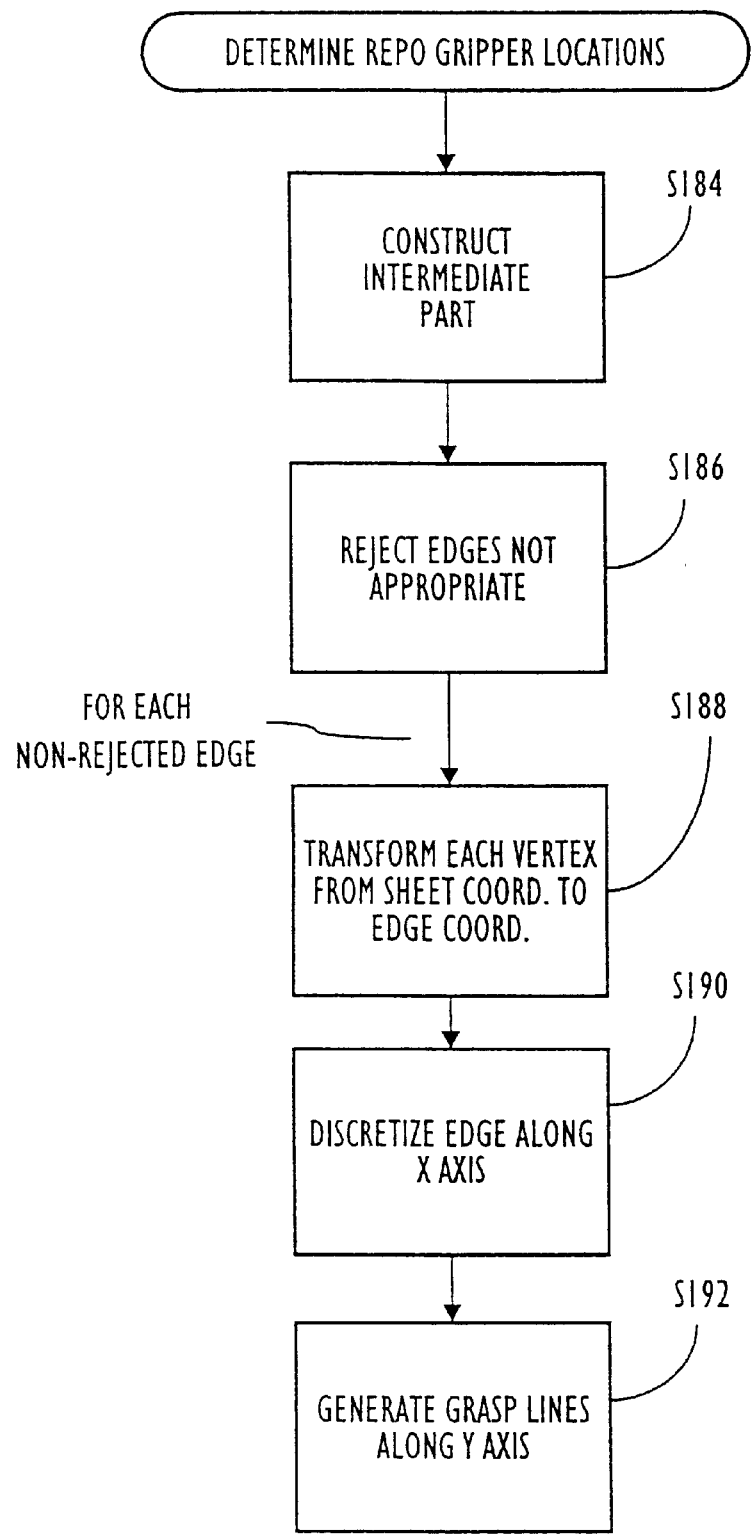
FIG. 41 illustrates a process for determining the repo gripper location.

FIG. 41A illustrates an example embodiment of a process for determining the repo gripper locations which will be performed during repo planning after the search as indicated by planning block P4 in FIG. 29. In a first step S184, an intermediate part is constructed. The edges which are not appropriate are then rejected in step 8186. For example, the process may reject an edge if it does not correspond to a face which is parallel to the robot's X-Y plane. For each non-rejected edge, the steps following step S186 are performed. In step S188, the intermediate part is transformed from sheet coordinates to edge coordinates. Thereafter, in step S190, the edge of concern is discretized along the X axis (in a manner similar to that illustrated in FIGS. 33A and 33B) with an appropriate granularity. Then, in step S192, grasp lines are generated along the Y axis, by generating points along the Y axis from a first point Ys (e.g., 3 mm) to the gripper's maximum reach along the line which is placed on the discrete X point. For every point along that line, if the repo gripper interferes with a previous robot gripper location, that Y location is rejected. In addition, for each Y position, if the repo gripper interferes with any portion of the part, that Y position is rejected. In addition, if there is no good pad contact between the repo gripper and the part, that Y position is rejected. A line is thus drawn as shown in FIG. 38 from an initial position Ys to a final position Yf which is a first maximum position that the repo gripper may grasp the part until it hits a boundary portion (e.g., a hole in the part) Additional sets of initial and final positions Ys and Yf are formed until the repo gripper reaches its maximum reach (e.g., at Yf" as shown in FIG. 38), in a manner similar to that performed in the process for deterring the robot's grasp locations as disclosed in conjunction with FIGS. 36A and 36B.

A final repo location is assigned. (in consideration of previous and current robot gripper location) when the search reaches the goal or another repo becomes necessary.

Figure 42:
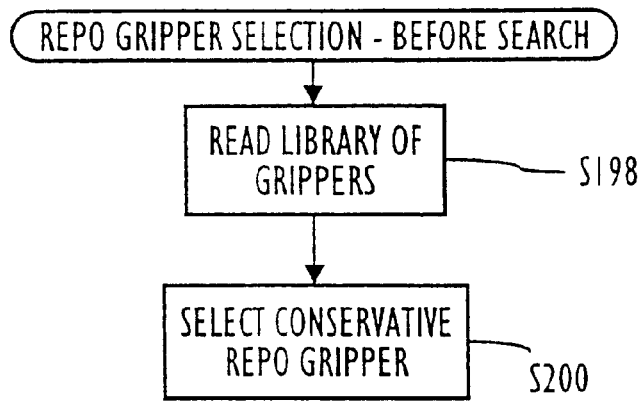
FIG. 42 illustrates a process for selecting a repo gripper before performance of a state-space search.
Figure 43A:
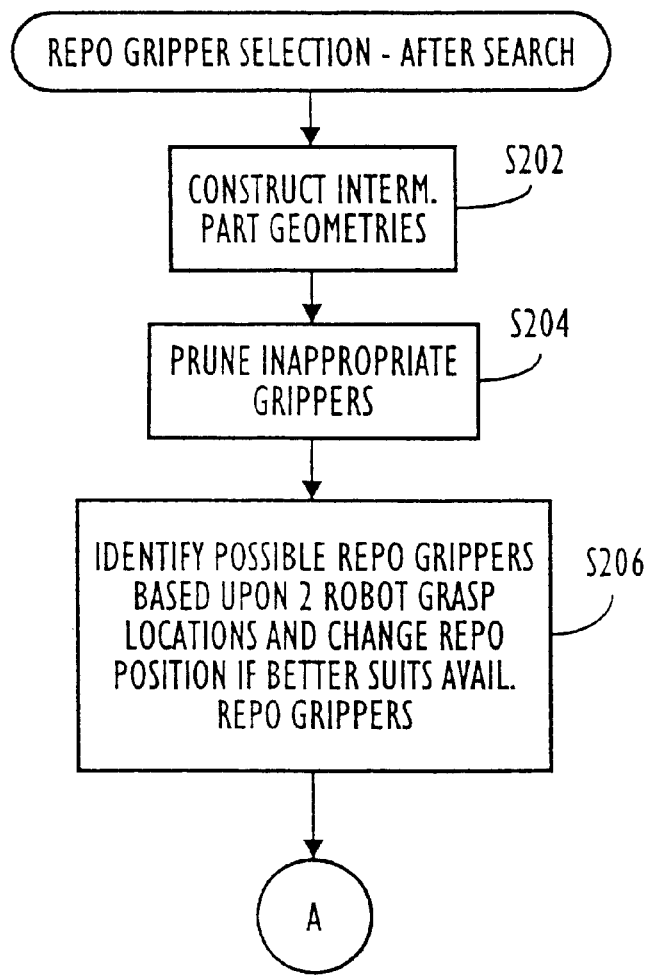
FIGS. 43A–43B illustrate a process for selecting a repo gripper to be performed after a state-space search.
Figure 43B:
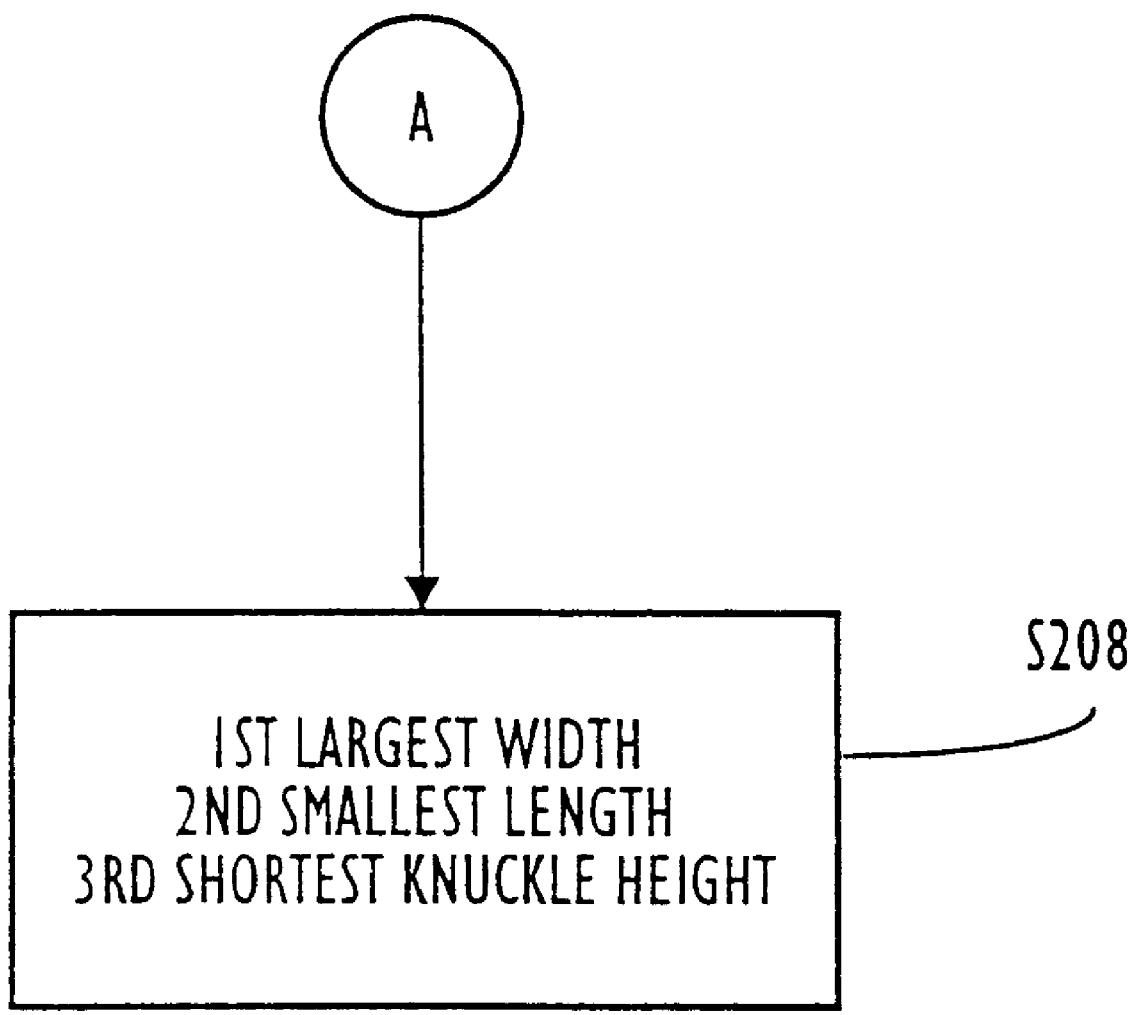

FIG. 42 illustrates an example embodiment of the process for performing repo gripper selection before the search. This may not be actually implemented. In a first step S198, a library of grippers is read, and in a second step S200, a conservative repo gripper is selected. A conservative repo gripper is defined as a gripper which is narrow and short, and is capable of holding the part (in either 3D or 2D shapes). The selected repo gripper is a temporary solution, since a final repo gripper selection will be performed after the search is completed. The repo gripper selection after the search is illustrated in FIGS. 43A–43B. In a first stop S202, all the intermediate part geometries for the various bends throughout the bend sequence are constructed. In other words, in accordance with the order of bends determined from the search, the appropriate intermediate part geometries corresponding to each bend within the bend sequence are constructed. Then, in step S204, grippers are pruned, which are deemed inappropriate due to obvious reasons (e.g., they cannot grasp a part because of insufficient dimensions). Then, in step S206 available repo grippers are identified based upon two robot grasp locations which include an initial robot grasp location before the repo and a repositioned robot grasp location. Each of these positions has been already determined in the search process. If the previously determined temporary repo position, determined during the search, could be improved upon in view of the repo grippers that are identified as available, then the position is adjusted. In step S208, if there are more than one available repo grippers (after pruning), then the repos with the largest width are selected. If there are more than one repo grippers with the largest width, then the ones with the smallest length are chosen. If there is more than one repo gripper with the smallest length, then the one with the shortest knuckle height is chosen. If there are several repo grippers with the same smallest knuckle height, then any one of those is chosen. Currently, a repr gripper is selected such that it allows a larger robot gripper to be selected and it guarantees a successful generation of repo gripper locations. The width of a repo gripper is determined by the dimension of possible area of 3D part for grasping. The knuckle height of a repo gripper is determined to be taller than the minimum flange height of 3D part.

Figure 44:
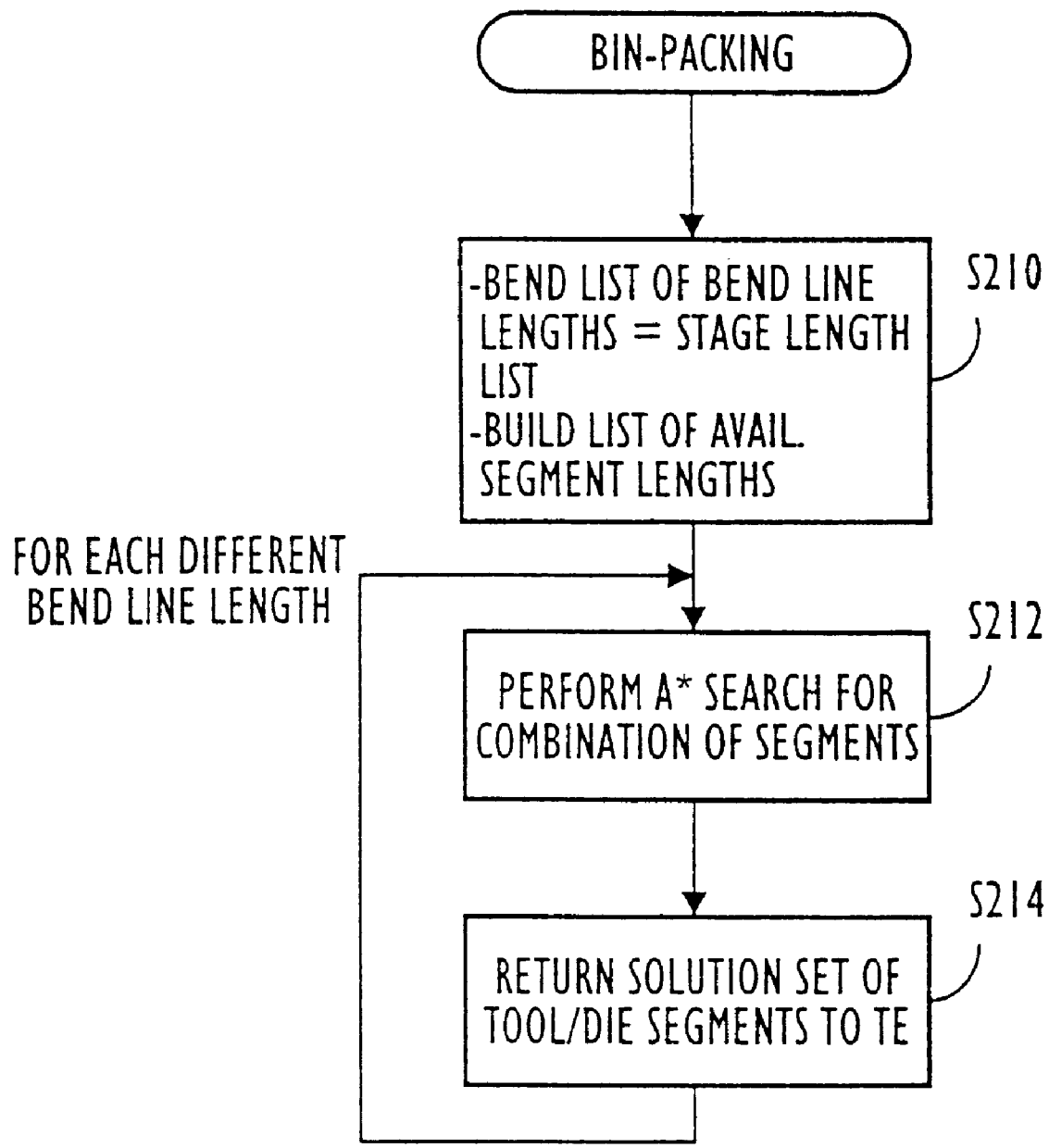
FIG. 44 illustrates a bin-packing process to be performed before a search.

As shown in FIG. 30, in a planning block P12, a bin-packing algorithm is performed before the search is started. During the execution of the bin-packing algorithm, a plan is produced that specifies how the segments should be put together to form each stage in a list of stages to be chosen from. FIG. 44 illustrates an example bin-packing algorithm. In a first step S210, the process builds a list of bend line lengths, and forms a stage length list having stage lengths equal to the lengths of the bend lines to be formed on the workpiece. In addition, the process builds or reads a list of available segment lengths which may be chosen from in order to form the stages in the stage length list. Then, for each different bend line length (i.e., for each stage length) each of steps S212 and S214 is performed. In step S212, an A* search is performed in order to determine a combination of segments which could be used to form the particular stage. Then, in step S214, the process returns a solution set of tool/die segments to the tooling experts.

In performing the A* search, the initial node $n_0$ is expanded to include a plurality of nodes at the first level of the search, each of the expanded/successor nodes at the first level corresponding to one of the available segment lengths (i.e., lengths of a tool punch an& corresponding die segments). For example, if the available tool segment lengths are 10 mm, 15 mm, 22 mm, 40 mm, 80 mm and 160 mm, the nodes at the first level would correspond to each of those segment lengths. The k cost assigned for each successor node is the length of the segment corresponding to the present node and the h cost is set equal to the length of a remaining portion of the stage which is yet to be formed by the segments (i.e., how far the search process is from the goal).

Figure 45:
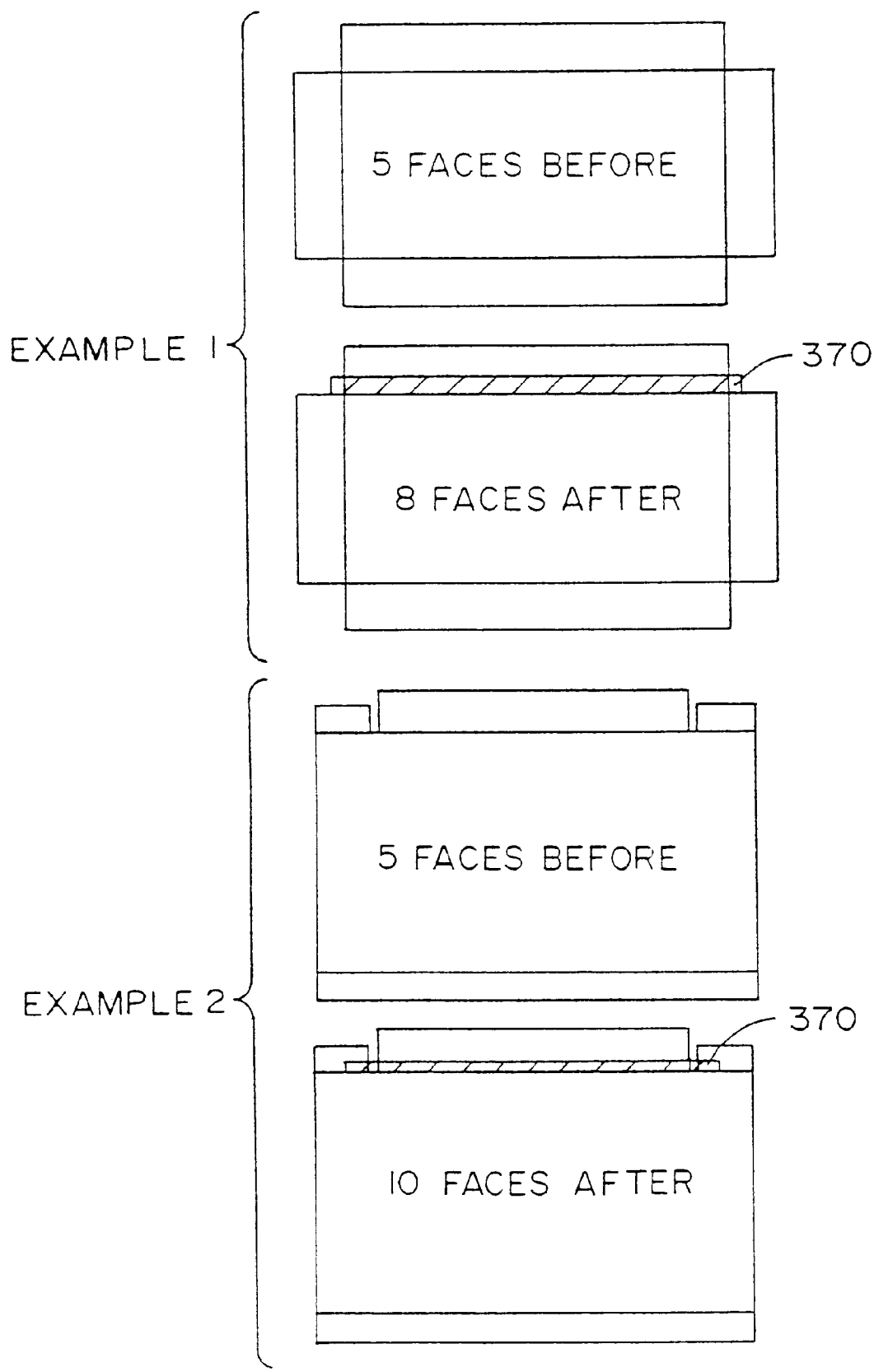
FIG. 45 illustrates a graphic representation of the steps utilized to determine an initial tooling h-cost (based upon the total predicted stages which will be needed to perform the complete bend sequence)
Figure 46:
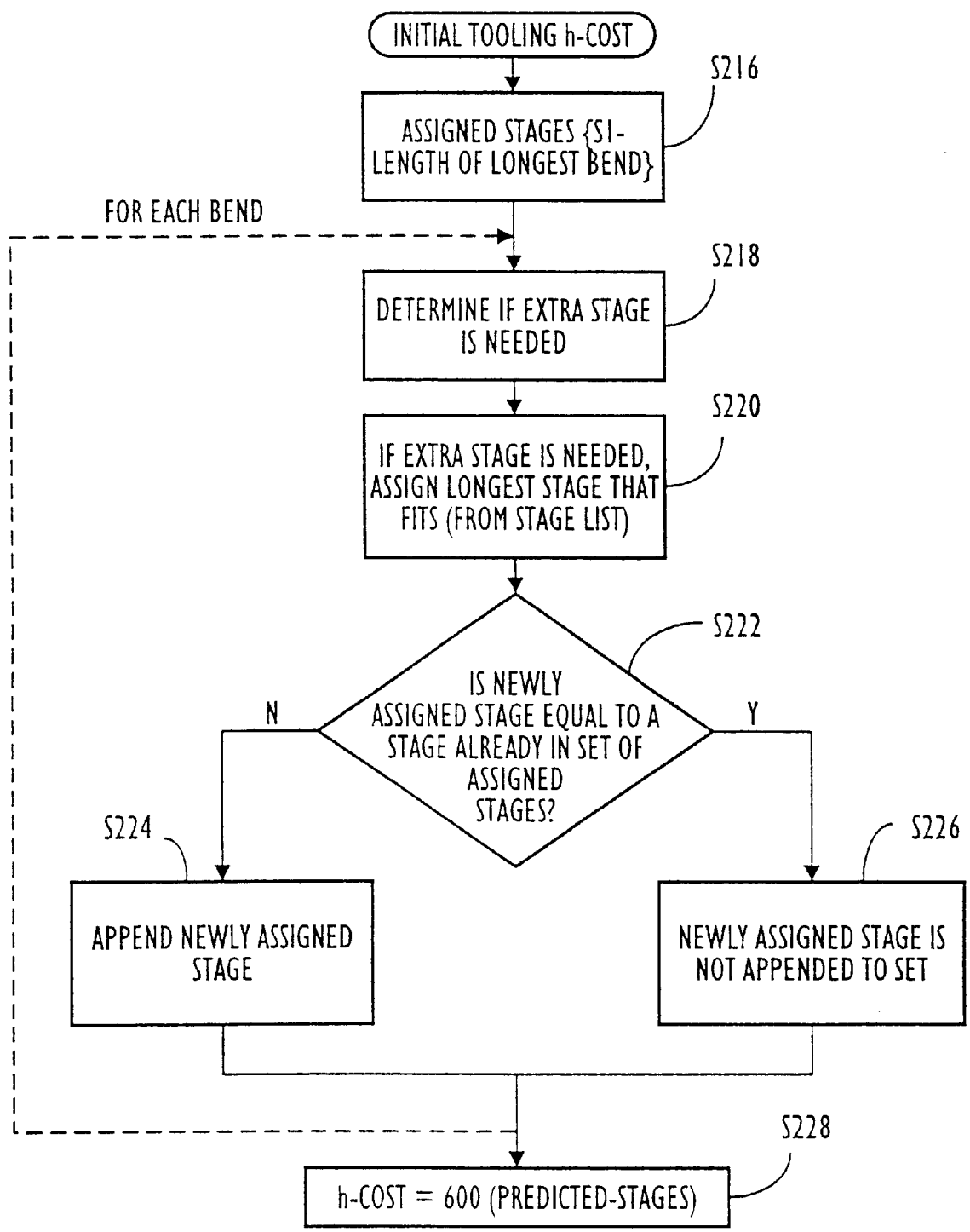
FIG. 46 illustrates the steps of a process for determining the initial tooling h-costs.

FIGS. 45–46 illustrate how the h cost that is assigned by the tooling expert throughout execution of the search, and forwarded to the bend sequence planner 72 (in response R32, as shown in FIG. 30), is calculated. The tooling h cost is determined as a function of the total number of predicted stages that will be needed to perform all of the bends in the bend sequence.

More specifically, $h_{TE}$ for $n_j$, h initial is an initial h cost equal to the total number of predicted stages needed to perform all bends of the bend sequence multiplied by an approximate amount of time (e.g., 600 seconds) needed to install each stage, and $k'_{TE}$ for $n_j$ is the summed tooling k costs from node $n_0$ to node $n_j$. In order to determine initial h cost ($h_{initial}$) (the total predicted number of stages) a process is performed before the search (in planning block P13 in FIG. 30), as shown in FIGS. 45 and 46. A first example workpiece is illustrated in the top portion of FIG. 45, and a second example workpiece is illustrated in the bottom portion of FIG. 45. In the first example workpiece, a total of four bends are to be performed, and the workpiece is to have a total of five faces after the bends are performed. In the second example workpiece, a total of four bends are to be performed, and the workpiece will have a total of five faces after the bends are performed. In order to assist in the prediction of the total amount of stages which will be needed to perform the bends, a bend "test strip" 370 is laid across each bend line of the 2D representation of the workpiece. In each of the examples shown in FIG. 45, such a bend "test strip" 370 is laid across the bend line which is darkened.

FIG. 46 illustrates an example flow chart of the steps that may be performed in order to determine the initial tooling h-cost ($h_{initial}$), which is the total number of predicted stages needed to perform all of the bends on the workpiece. In a first step S216, a first stage length which is equal to the length of the longest bend line is placed with the set of assigned stages. Thereafter, a test is performed for each bend line, by performing step S218 and the steps following step S218 for each bend. In step S218, a determination is made as to whether or not an extra stage is needed. This is done by placing a narrow "test strip" across the bend line in the manner illustrated by the examples shown in FIG. 45. If a difference value, equal to the total number of faces after placing the test strip over the bend line minus the total number of faces before the test strip, is less than or equal to 3, then no extra stage is needed. Otherwise, an extra stage is needed. In a next step S220, if an extra stage is needed (i.e., predicted), the longest stage (from the stage list) that can be used to perform the bend being tested is assigned, i.e., placed in the set of assigned stages. Then, a determination is made in step S222 as to whether the newly assigned stage is equal to a stage already in the set of assigned stages. If the newly assigned stage is already in the set of newly assigned stages, the newly assigned stage is not appended to the set, as indicated in step S226. However, if it is not already in the set of assigned stages, the newly assigned stage will be appended to the assigned stage set inks step S224. Thereafter, the process returns from either of steps S224 and S226 to step S218, if there are additional bend lines which need to be evaluated. Once all the bend lines have been evaluated by the process, the process proceeds to step S228, where the initial tooling h__cost is set to the product of 600 and the predicted number of stages (which is the total number of stages which have been placed in the set of assigned ages).

Applying the process steps as shown in FIG. 46 to Example 1 of FIG. 45, the faces after placement of the test strip along the bend line are equal to 8, and the number of faces before the placement of the test strip along the bend line is equal to 5. Thus, 8–5=3, and no extra stage is predicted. In Example 2 shown in FIG. 45, the number of faces after the test strip is placed over the bend line is 10. 10–5=5, which is greater than 3. Accordingly, an extra stage is predicted for Example 2.

Figure 47A:
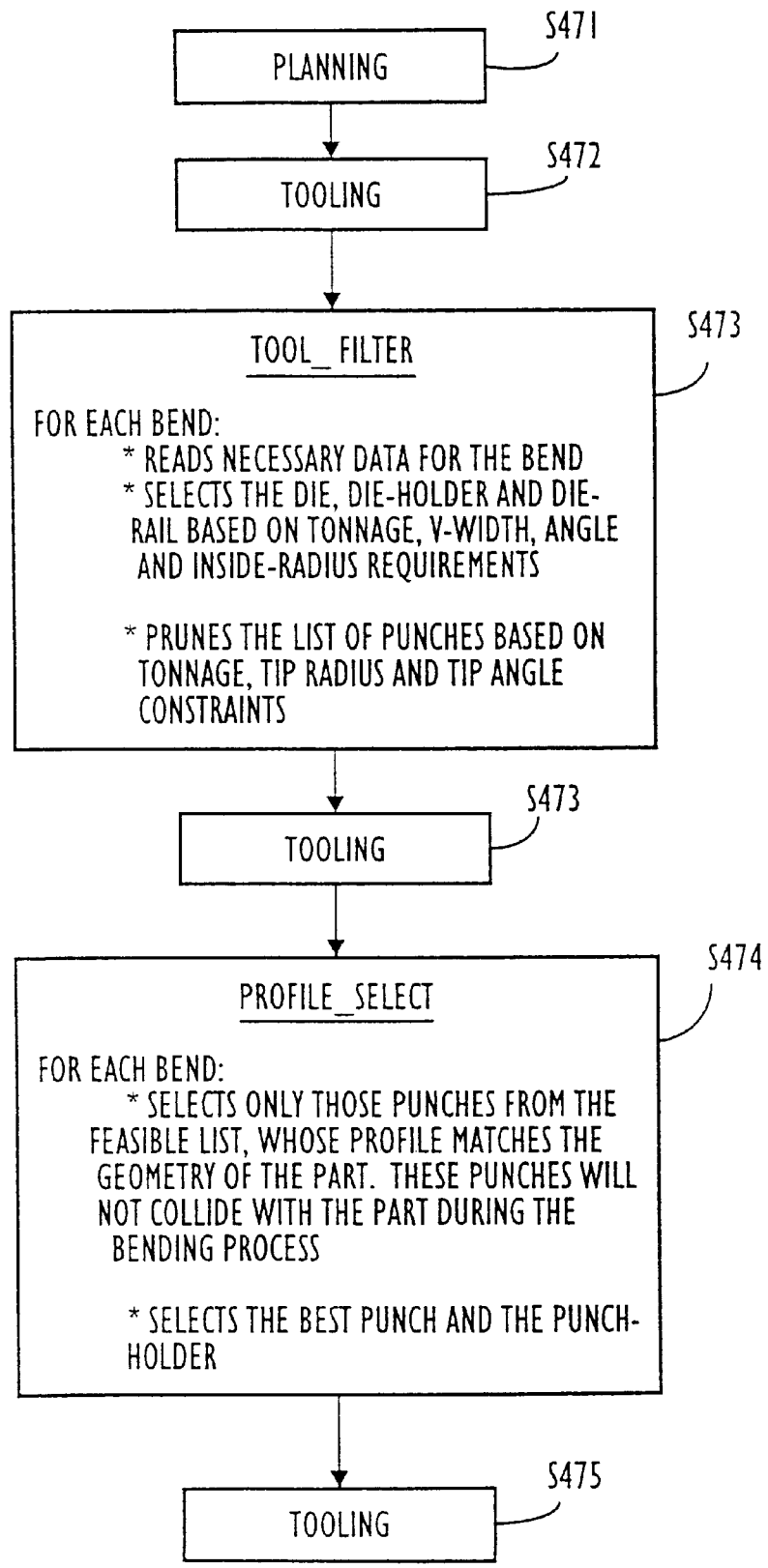
FIG. 47A illustrates a process of selecting tooling to be used.

FIG. 47A illustrates a tool selection process overview which forms part of the tool profile selection planning block P11 in FIG. 30. The process begins at the bend sequence planner in step S471, and proceeds to the tooling expert (tooling module) which operates in step S472. In response to receipt of a "PLAN" command in FEL from the bend sequence planner, the tooling expert forwards the part's geometric model, bend-graph data, and a tool library to a tool filter module. In step S473, the tool filter module determines a selected die, die-holder, die-rail and a list of feasible punches. In determining such information, the tool filter module performs several steps for each bend to be performed on the workpiece as indicated by the bend-graph data. The tool filter module reads necessary data for the bend, and selects the die, die-holder, and die-rail based upon tonnage, V-width, angle and inside-radius requirements. The tool filter module., then prunes the list of punches (to form a list of feasible punches) based upon tonnage, tip radius and tip angle constraints.

The process then returns to the tooling module in step S473, which then forwards the part's geometric model, bend-graph data and a list of feasible punches to a profile select module. Then, in step S474, the profile select module selects the punch and punch holder to be utilized by the bending apparatus. In performing the profile selection, for each bend, the profile select module selects only those punches from the feasible list whose profile matches the geometry of the part. Punches with matching profiles will not collide with the part during the bending process. The profile select module then selects the best punch and punch-holder accordingly. The appropriate selected punch and punch holder are then returned to the tooling module which continues its functions at step S475.

A more detailed explanation of the algorithm performed by the tool filter module will now be provided. In a first step, the tool filter module reads the following data: the desired inside radius (IR) of each bend; the part material thickness (T), the part material tensile strength; the minimum adjacent flange length (the minimum/preferred minimum length (height) of the shorter flange which runs along the bend line of the particular bend of concern); the bend length and bend angle; and a tool library (the tool library includes inverted profiles of the punches which can be used).

In a second step, for each bend, the tool filter module performs the following steps:

(a) A list of FEASIBLE__DIES is set to empty.

(b) The list of available dies in the library is scanned, and for each die:

if its v-width can produce the desired IR within some tolerance, and if its v-angle closely matches the bend angle, and if the tonnage-per-meter required for this v-width and T (computed using a bend force chart and tonnage equations), is within the tonnage capacity of this die, then, add this die to FEASIBLE__DIES.

It is noted that the tonnage-meter requirement for the v-width and T may be computed using a force chart and tonnage azations provided by Amada in their press brake tooling catalogues. In addition, or in the alternative, the tonnage-per-meter value may be calculated using the bend chart and tonnage equations provided in the text entitled "Now Know-how on Sheet-Metal Fabrication Bending Technique," written by the Amada Sheet Metal Working Research Association, Machinists Publishing company, Ltd., First Edition (May 15, 1981), the content of which has been incorporated by reference herein in its entirety.

(c) The die is selected from FEASIBLE DIES, which most closely satisfies the IR, bend angle, the minimum flange, and total tonnage requirements. If the minimum flange length constraint is still not satisfied, then a warning is issued. The appropriate die-holder and die-rail for the selected die are then selected for the selected die.

(d) The list of available punches in the library is then scanned, and for each punch:

if the tip angle is less than but close to the selected die's v-angle, and if the tip radius is less than and close to the IR, and if the tonnage-per-meter required for this bend is within the tonnage capacity of this punch, then this punch is added to the list of FEASIBLE_ PUNCHES, for this bend.

A more detailed explanation of the steps performed by the profile select module will now be provided.

In an initial step performed by the profile select module, for each bend, the final (finished) 3D model of the part is aligned in relation to the appropriate tooling in a position in which it would be in the bending press after completion of the bend being evaluated. Then, for each bend:

(a) The list of FEASIBLE_PUNCHES is scanned for this bend, and for each punch, if the 3D geometric model of the punch does not intersect the 3D geometric model of the part at the end of this bend, then this punch is a FEASIBLE_ PUNCEH for this bend. The 3D part model is a sufficient condition, but may be over constraining and may be modified at a future date. For example, intermediate part models, representative of the actbal shape of the part at each bend in the sequence could be used as the profile selection is performed throughout the search process being performed by the bend sequence planner.

(b) The punch is selected among the FEASIBLE_ PUNCHES, which most closely satisfies the IR, bend angle, and tonnage requirements. The standard "robot-tooling" punch will be selected if feasible. It is noted that the selected punch may have to be used with its profile inverted (i.e., inverted in the Y direction/rotated around the Z axis by 180°), in order to satisfy the intersection test in step (a) above of the profile selection module.

It is noted that one or both of the tool filter module and profile selection module calculations may be performed either before, during or after the search is performed by the bend sequence planner.

Figure 47B:
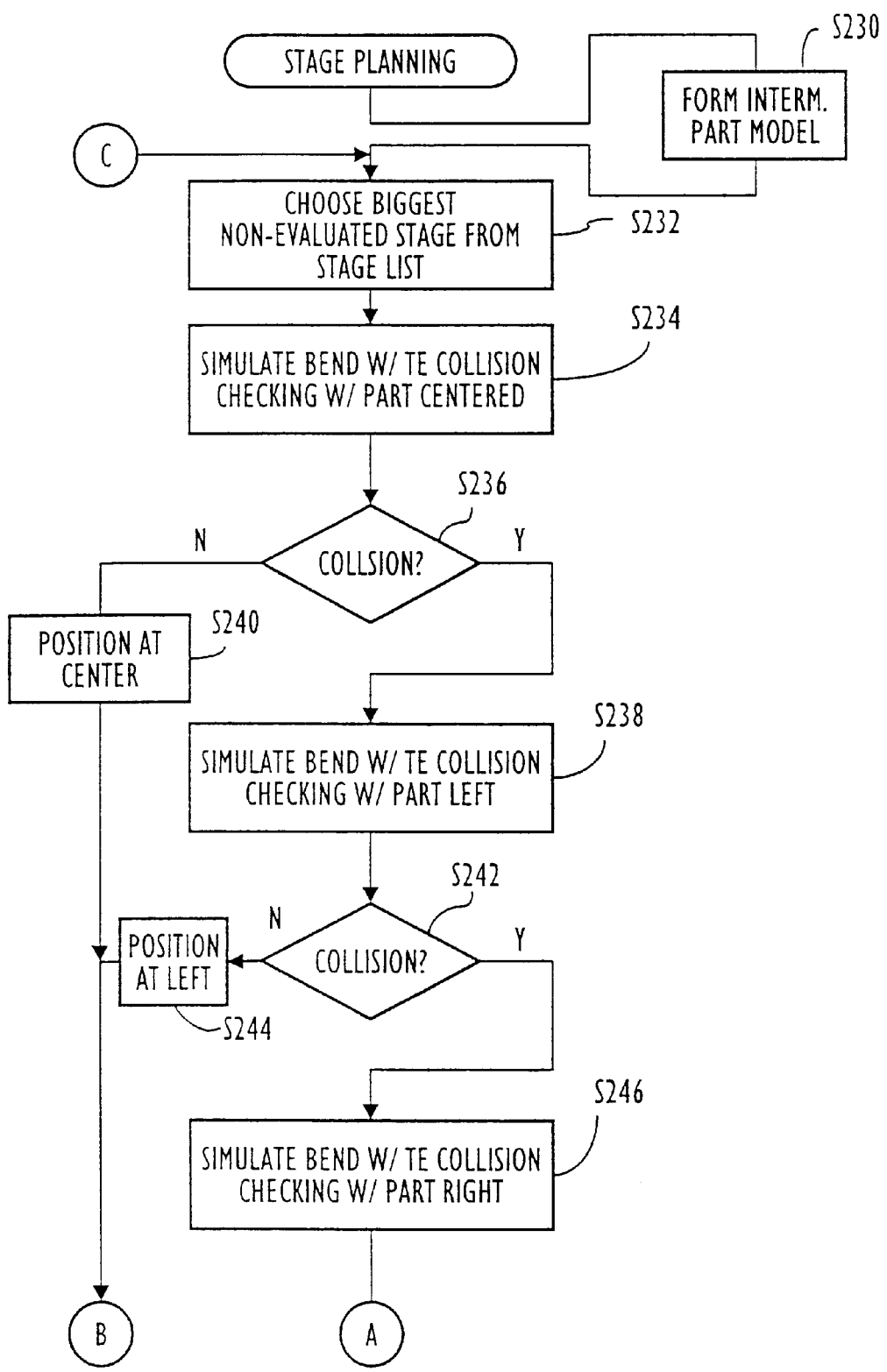
FIGS. 47B–47C illustrate a process for performing stage planning.
Figure 47C:
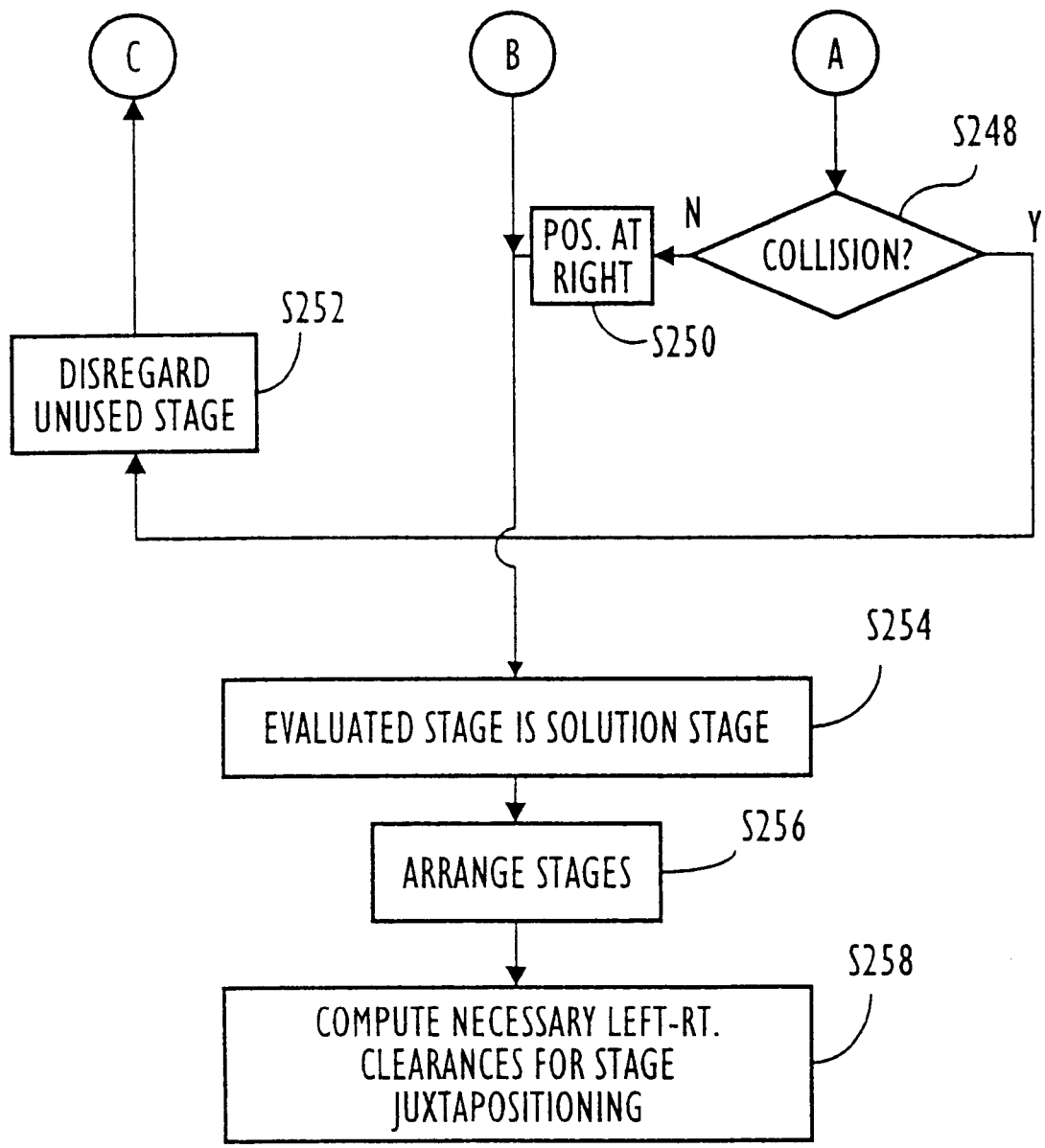

FIGS. 47B–47C illustrate a stage planning process which picks a stage and a location along the stage at which the workpiece will be loaded when performing a particular bend in the bend sequence, such planning being indicated in block P14 of the dialogue diagram shown in FIG. 30. In a first step S230, an intermediate part model of the part is formed (with the part having the bends up to the present bend in the bend sequence).

In step S232, the biggest: non-evaluated stage is chosen frot the stage list (of available stages). Then, in step S234, the present bend in the search is simulated with tooling expert (TE) collision checking, with the part being loaded at as onto the tooling stage at a center position with respect to the stage. Then, in step S236, a determination is made as to whether or not there was a collision during simulation of the bend. If there was a collision, the process proceeds to step S238, where the bend being evaluated in the search is simulated with TE collision checking while the part is loaded at the left side of the tooling stage, with the left and of the bend line being placed just to the left of the left side of the tooling stage. If a collision is then determined in step S242, the process proceeds to step S246.

If, however, a collision is not determied to have occurred in step S236, the position at which the workpiece will be loaded onto the stage is set to the center position in step S240, and the process proceeds (via connector B) to step S254 which is shown in FIG. 47C.

If a collision is not determined in step S242, after simulating the bend with the part positioned on the left side of the stage, the process proceeds from step S242 to step S244, where the position for loading the workpiece on the stage is set to the left position. Then the process proceeds directly to step S254 (via connector B).

Figure 48C:
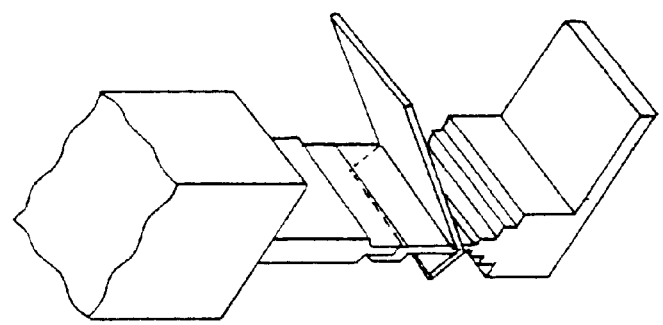
FIGS. 48A–48C are graphic representations of a modeled bend press and workpiece which will be utilized during stage planning.
Figure 48B:
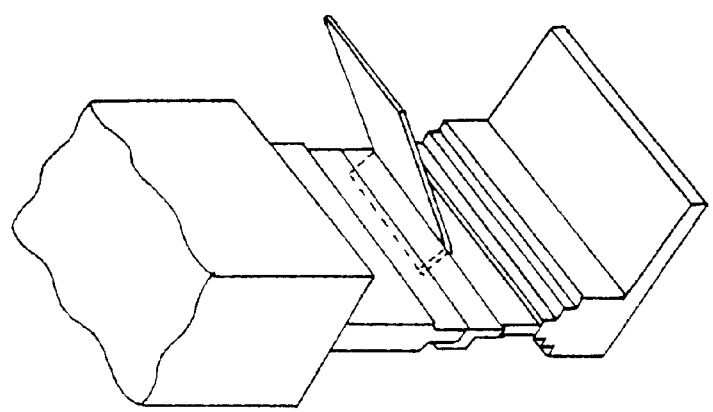

In step S246, the bend is simulated with TE collision checking with the part positioned at the right side of the tooling stage (e.g., as shown in FIG. 48B), with the part being placed on a tooling stage so that the right end of the bend line is placed just to the right of the tooling stage while the bend is performed. If a collision is determined to have occurred during this simulation, the process proceeds to step S252. If no collision occurred during this simulation as determined in step S248, the process proceeds from step S248 to step S250, wherein the loading position is set to the right position, before the process proceeds to step S254. If a collision did occur as determined at step S248, the process proceeds to step S252, wherein the chosen stage (chosen in step S242) is disregarded, and the process proceeds (via connector C) to step S232 at the top of FIG. 47B. It is noted that the next non-evaluated biggest stage from the stage list will be chosen in step S232 at this point. However, the stage planning process may be designed so that it will go from a "failed" biggest stage straight to a stage having a length approximately equal to the bend line of the particular bend being evaluated.

In step S254, the evaluated stage is deemed a solution stage. Thereafter, in step S258, the stages are arranged along the die rail, and in step S256, the necessary left-right clearances for stage juxtapositioning are computed.

The above-referenced tooling expert (TE) collision checking process, referred to in each of steps S234, S238 and S246, may be performed as follows:

The tooling expert collision checking comprises mainly an intersection determination. The intermediate part corresponding to the particular bend being evaluated in the search is formed, and is further converted to a B-rep (boundary representation) which is compatible with the NOODLES geometric modeler. Then, an intersection is performed utilizing the appropriate NOODLES function. First, the number of faces of the part, as it changes shape throughout performance of the bend, are monitored. For each of a plurality of discretized shapes of the part throughout performance of the bend, each of those shapes are intersected with the appropriate tools of the bending workstation during the performance of the bend. The resulting number of faces of the part, for each shape, is then countee. If the resulting number of faces, intersected with the tools, is greater than the expected number for that shape, then there has been a collision.

The above-described steps define a preferred algorithm for performing a tooling expert collision checking process. In the alternative, the intermediate part before and after the band may be modeled by a bounding box, and the basic solid intersection function provided by NOODLES may be utilized to determine if the tools intersect with the bonding box representation of the workpiece for the particular bend being evaluated during the search.

A description will now be given of a process for determining the necessary left-right clearances for juxtapositioning the stages along the die rail, as computed in step S256 of the process illustrated in FIGS. 47A–47B. The lateral limits of the part at the particular bend being evaluated are calculated based upon the amount by which the workpiece extends beyond a side edge of the solution tooling stage, and a largest lateral limit for each side of the stage is determined. The stages arranged adjacent to the present solution stage are then appropriately spaced to have a gap between the adjacent side edges which is greater than or equal to the larger of the determined largest lateral limits of the adjacent side edges.

In arranging the stages, in step S258 of the stage planning process shown in FIGS. 47B–47C, the present solution stage (corresponding to the presently evaluated bend) is placed in the middle of the die rail if it is the longest solution stage that has been evaluated so far in the search. On the other hand, if it is the shortest stage that has been decided upon at the present point in the search, then it is placed at the first or left position along the die rail. All middle gradations, from the second largest down, are respectively positioned from the third position to the last position along the die rail, the third position being positioned just to the right of the middle position, and the last position being the position furthest to the right.

Additional considerations must be taken into account by the bend sequence planner to arrange the layout of the stages hen co-linear bends are to b e performed simultaneously in performance of the operation sequence. There are issues which must be taken into account, such as the clearance of the part with respect to the stages when the co-linear bend is being performed, and the sizes, arrangement, and number of stages that are needed in order to accommodate the co-linear bend while at the same time best using the resources at hand. One particularly important resource that must be conserved is the use of space along the die rail in order to set up the stages. The number, sizes, and spacings of the stages may be limited because of limitations in die rail space.

When planning the staging for performance of a particular co-linear bend, a decision should be made as to whether the co-linear bend can be done with only one stage, or whether two spaced stages are needed in order to allow clearance therebetween. Accordingly, the tool expert should consider whether the co-linear bends are interrupted (as is the case in FIG. 20E) or non-interrupted (meaning that one stage can be used for both bends, as is the case in FIG. 20D).

A search algorithm could be used, such as A*, in order to come up with an appropriate stage layout that can accommodate co-linear bends, while minimizing the fiber of stages and the spacing between stages that are needed. A significant cost to be taken into account by such a search algorithm is the total length of the die rail, the amount of space along the die rail a certain in staging solution will occupy, and amount of space along the die rail remaining at the present level of the bend sequence (being generated by the bend sequence planner).

Figure 48A:
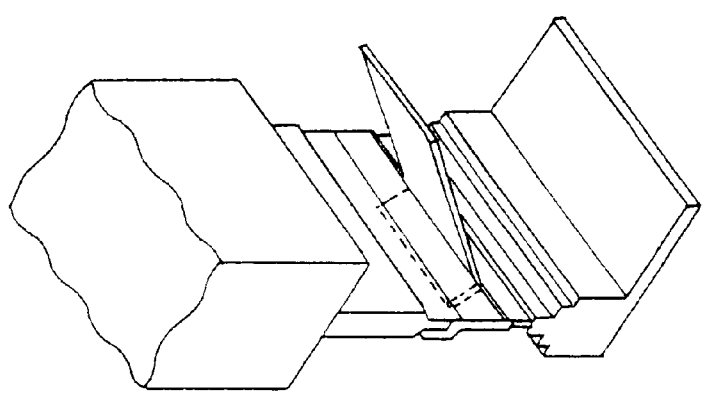

FIGS. 48A–48C illustrate respective intermediate representations of a workpiece, being modeled in relation to the tooling during performance of a bend. In FIG. 48B, the workpiece is at a right position along the stage. In each of FIGS. 48A and 48B, the bend line is shorter than the length of the tooling stage. In FIG. 48C, the workpiece centered along the tooling stage, where the bend line is slightly longer than the length of the tooling stage.

In each of the graphic representations shown in FIGS. 48A–48C, the various components of the bend press are modeled, including the tool punch and the die, along with an intermediate representation of the workpiece.

Figure 49:
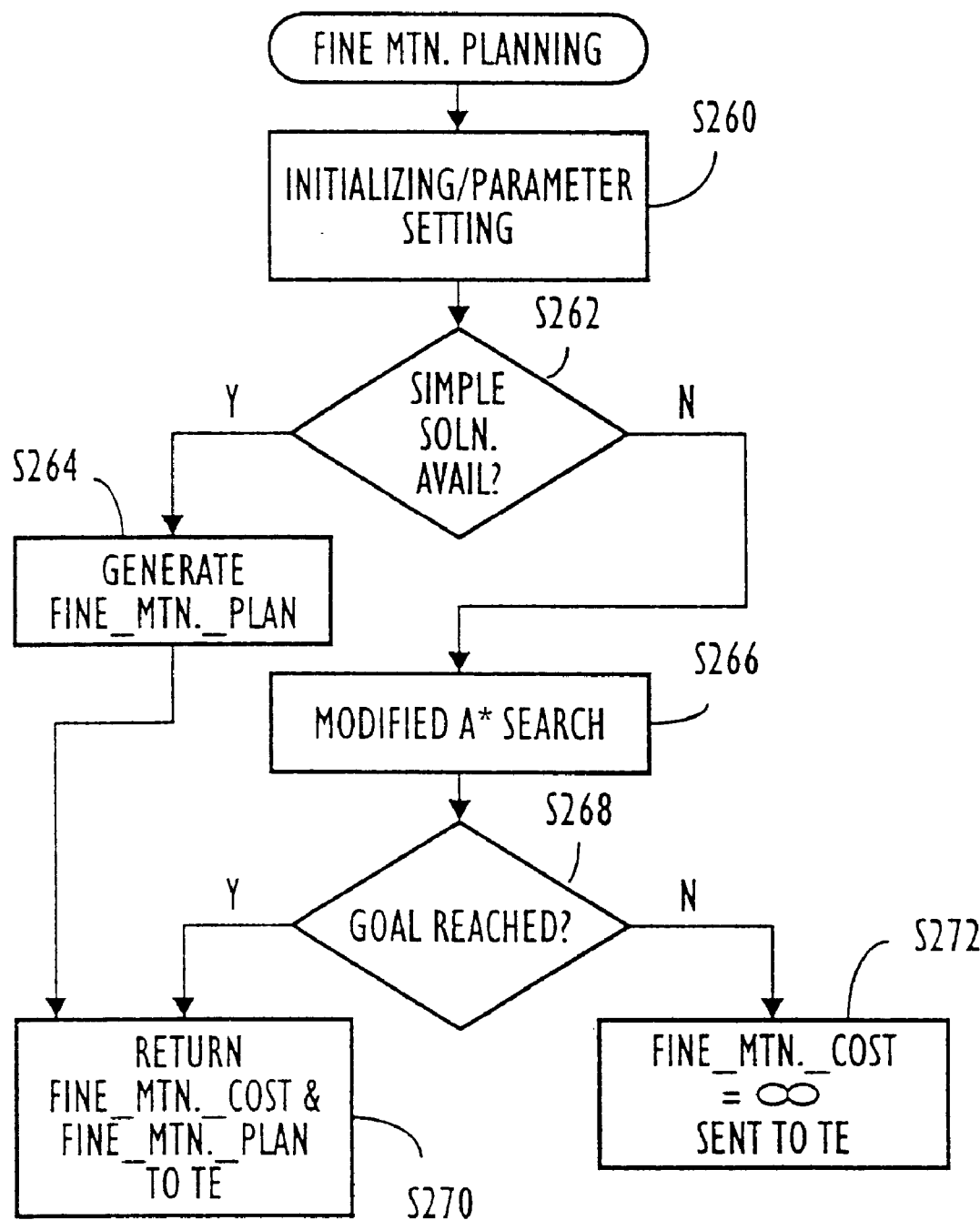
FIG. 49 illustrates a process of fine motion planning.

FIG. 49 illustrates a fine motion planning process, which may be performed in planning block P14 of the dialogue chart shown in FIG. 30. In a first step S260 of the process illustrated in FIG. 49, parameters are set and initialization steps are performed. In this regard, the 3D models of the tooling and the part are read, and various initialization functions are performed. The goal parameters are set up based upon the tool and part geometry, and the desired clearance. In addition, the portion of the part inside the bend line is rapidly analyzed, and a bounding box that surrounds the part is computed.

In step S262, a determination is made as to whether or not a simple solution path is readily available, by testing it the top of the part can clear the bottom edge of the tooling punch, and if certain features of the part satisfy constraints imposed by the tool geometry and the die opening. If such a simple solution path is readily available, the process proceeds to step S264, where a fine motion plan is quickly generated. The process is then forwarded to step S270 where it returns to the tooling expert with the fine motion plan and the fine motion cost, which is equal to the amount of time that it takes to unload the part from the bend press.

If a simple solution is not available as determined at step S262, the process proceeds to step S266, in which a modified A* search is performed. In performing the search, a plurality of feasible virtual configuration space nodes are generated and placed on the OPEN list with their respective costs. The first level of the search includes several generated intelligent direction feasible VC (virtual configuration)—space nodes that were appended to the OPEN list. When a node from the OPEN list is expanded, it is expanded to include several neighborhood nodes representative of locations in the general neighborhood of the parent node. Each expanded node is tested for feasibility by utilizing a geometric intersection test. If the test is positive (i.e., there is no collision by the use of a negative intersection function), the expanded node is appended to the OPEN list along with its cost. The cost is an h cost which is set equal to the Euclidean distance from the expanded node to the goal. The nodes on the OPEN list are continually expanded to lower levels in the search tree until the goal is reached or until the OPEN list becomes empty.

At step S268, a determination is made as to whether or not the goal was reached. If the goal was reached, the fine motion planning process returns to the tooling expert with the fine motion costs and the fine motion plan in step S270. If the goal was not reached, the process proceeds to step S272, when the fine motion cost is set to infinity, and is sent to the tooling expert.

Figure 50:
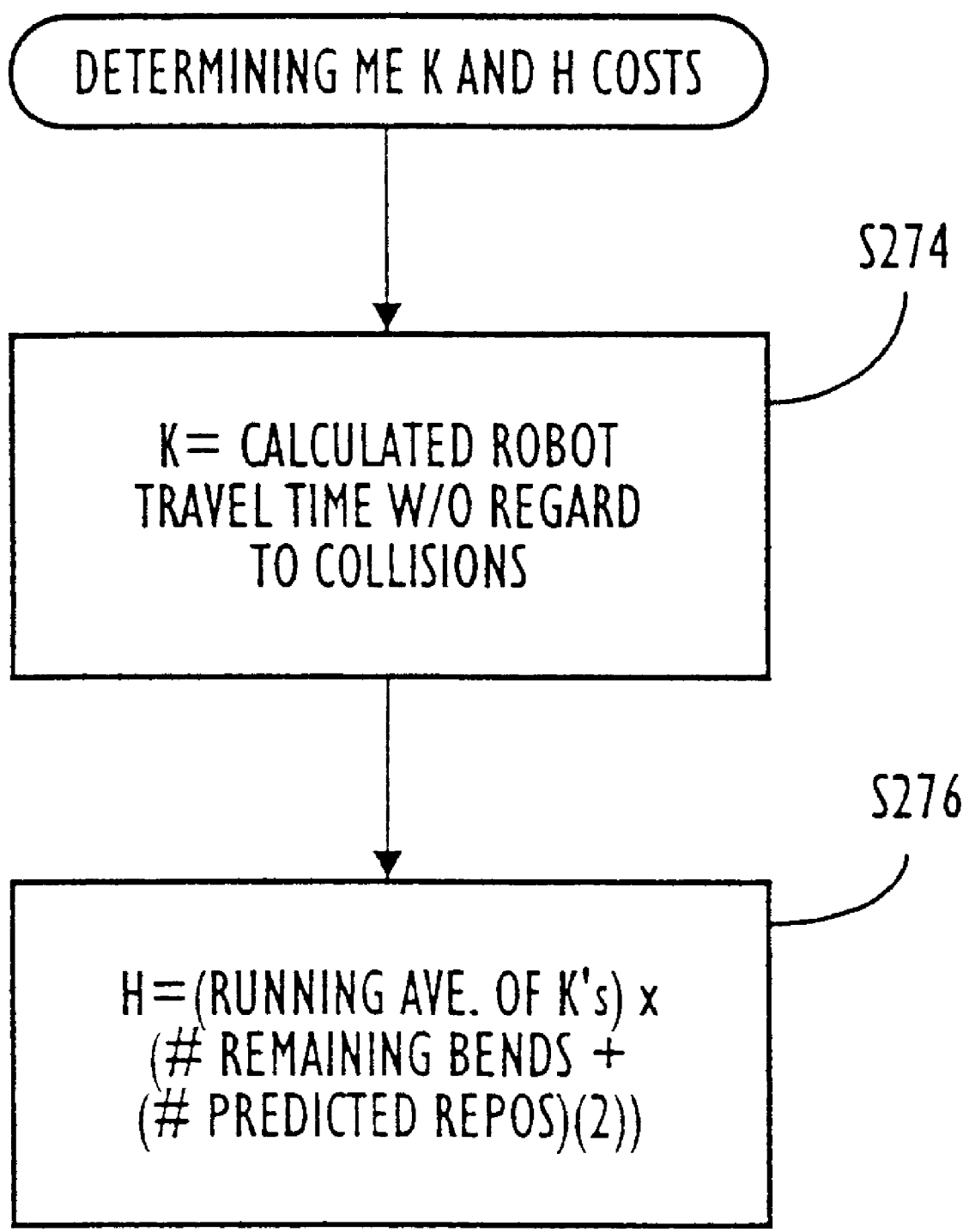
FIG. 50 illustrates process steps performed by the motion expert to calculate k and h costs.

FIG. 50 illustrates an example process for determining the motion expert k and h costs, as indicated in planning box P21 of the dialogue chart shown in FIG. 31. In a first step S274, the k cost is calculated to be equal to a calculated robot travel time to take the part from a position at a stage of an immediate preceding bend to the stage location corresponding to the presently evaluated bend in the search, without regard to collisions. Then, in step S276, the h cost is calculated to be equal to the product of the ring average of the k cost values for the previous bends and the presently evaluated bend, and the sum of the number of remaining bends and twice the number of remaining predicted repos that will have to be performed before all of the bends in the bend sequence are completed.

Figure 51:
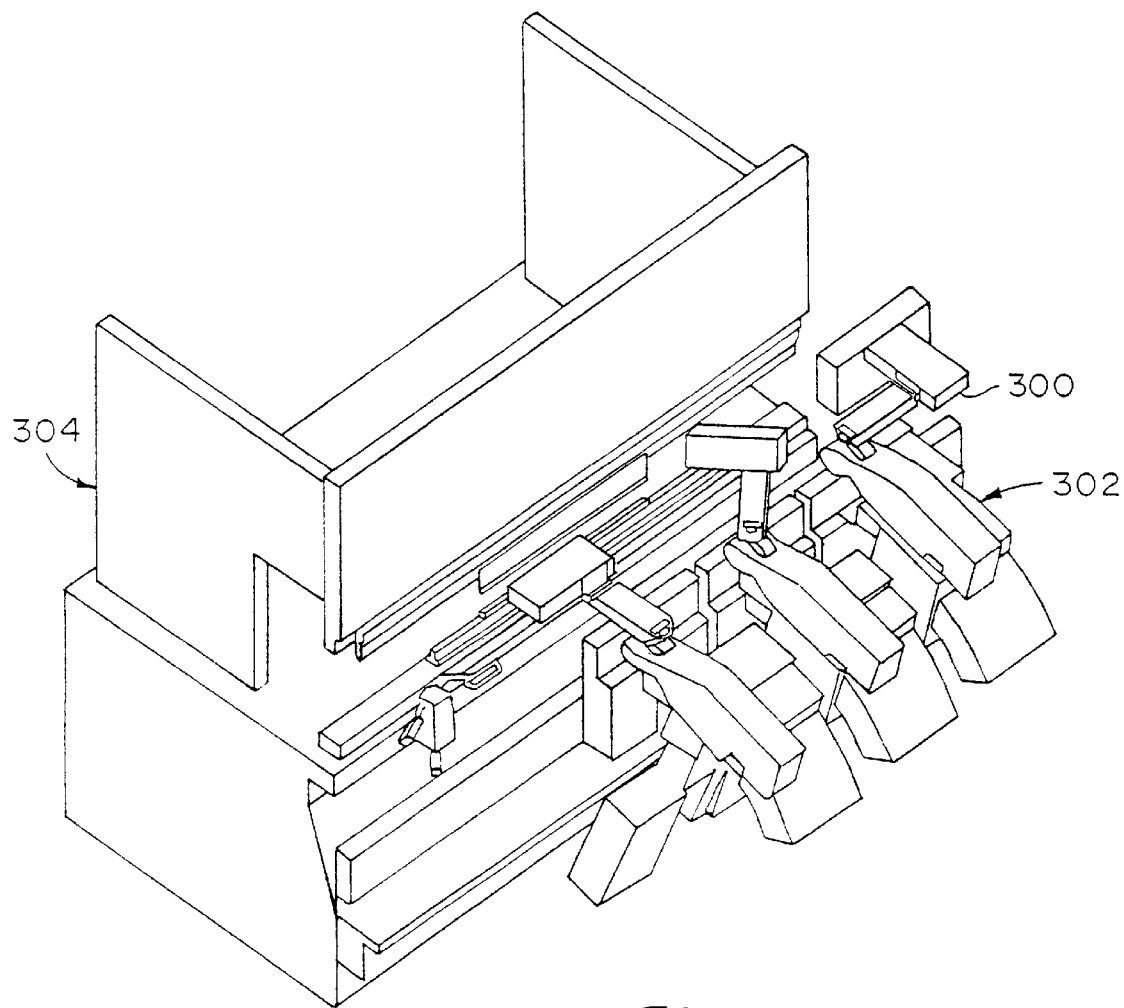
FIG. 51 is a graphic representation of models of a bend press, a robot, and a workpiece, the models being used for determining a gross motion plan.

In forming the gross motion scheme and the gross motion paths after the search is performed, as indicated in planning block P22 of the dialogue chart shown in FIG. 31, a state-space search algorithm, particularly an A* algorithm, may be performed to form each of the steps along the path from one point to another in order to bring the workpiece throughout its various stages in the bend sequence. When generating a path from an initial start position to a goal position, for a particular operation of the bend sequence, before deciding that the path will be the final path to be used, collision checking may be performed. In order to perform this collision checking, the workpiece, the robot, and the bend press may each be modeled, and intersection tests may be performed using the appropriate NOODLES functions. FIG. 51 illustrates a geometric model of a press brake 304, a workpiece bounding box 300, and a robot 302. Tn performing collision checking in connection with the gross motion planning, the workpiece is modeled by a bounding box 300. In FIG. 51, the position of the robot 302 and the modeled part 300 is shown in three positions extending between a stage used for the final bend of the bend sequence to a position at the far right of the diagram which corresponds to a position ready for unloading by the loader/unloader.

4. Geometric Modeling

Each module of planning system 71 utilizes geometric modeling functions in order to analyze the physical relationships between various components of the bending workstation and the workpiece as it is being moved and developed. Such geometric modeling functions may include representing stock, intermediate, and final parts, checking for interferences during motion planning and assisting in selecting robot grip positions. In addition, needed geometry information may be provided to assist the sub-planners in determining punch geometry selection, tool placement, loader/unloader suction cup 31 placement, and interpretation of sensing signals. Simplified geometric representations may be provided for fast computations (e.g., bounding boxes, convex hulls, and 2D cross-sections), which may be needed to perform geometric-based reasoning methods (e.g., octtree representations, and configuration spaces). A geometric database of physical components may be provided which includes both symbolic descriptions (e.g., labeled features) along with actual geometry data of physical components. Other geometric modeling functions may be provided, although they are not specifically enumerated herein.

In a particular embodiment of the present invention, NOODLES is utilized to perform many of the noted modeling functions. Several reasons may be given for using NOODLES to implement the geometric modeling functions. NOODLES includes a large package of geometric routines and is accessible to C/C+/C++ source code. In addition, NOODLES is capable of handling non-manifold geometry (e.g., 0D, 1D, 2D, 3D, etc.) with the same routines, and has a hierarchal structure which can be used to build geometry libraries and to store various types of information regarding features of parts.

A modeling mechanism (not shown) may be provided for modeling both upper and lower surfaces (i.e., the thickness) of each sheet metal workpiece throughout one or more of the design, planning, and execution phases of the bending process. It may be useful to have such a complete thickness representation in the workpiece for certain aspects of the system. For example, holding expert 82 may benefit from the added knowledge of knowing both the upper and lower surfaces of the workpiece, and motion expert 84 may be able to better plan for and control fine motion of the work piece when it is close to the die and punch tool before and after a bending operation.

Figure 10:
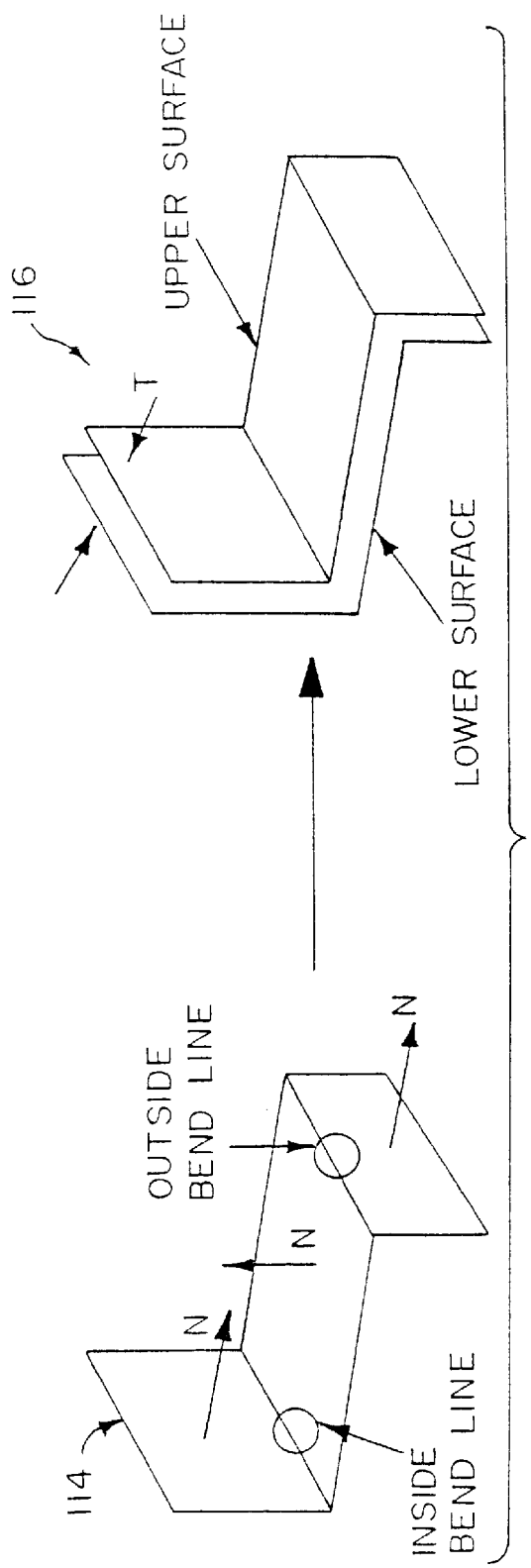
FIG. 10 illustrates a thickness transformation of a single workpiece.

Referring to FIG. 10, an upper/lower surface modeling mechanism (not shown) performs a thickness transformation between a flat representation 114 and a representation with thickness 116, shown at the right of FIG. 10. Essentially, the representation with thickness 116 comprises two flat representations juxtaposed one on the other.

Figure 11:
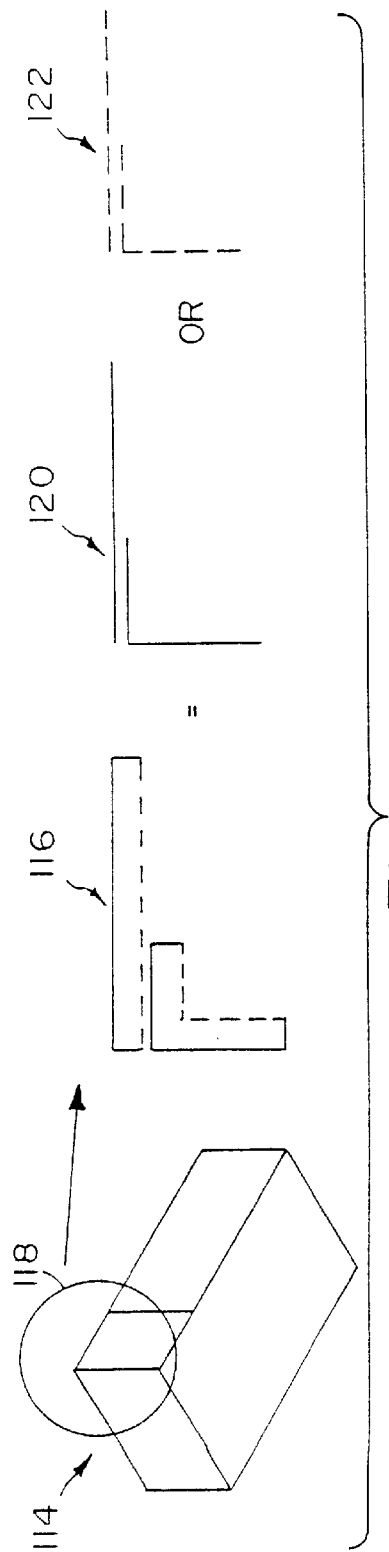
FIG. 11 illustrates a thickness transformation of an assembly of workpieces.

FIG. 11 illustrates an overlapped flange 118 modeled as a flat representation 114 at the left of FIG. 11, and transformed to a representation with thickness (i.e., a solid model). Solid model 116 is shown to be equal to an upper surface representation 120 together with a lower surface representation 122. Upper surface representation 120 is shown in solid lines, and lower surface representation 122 is shown in dotted lines.

Figure 12:
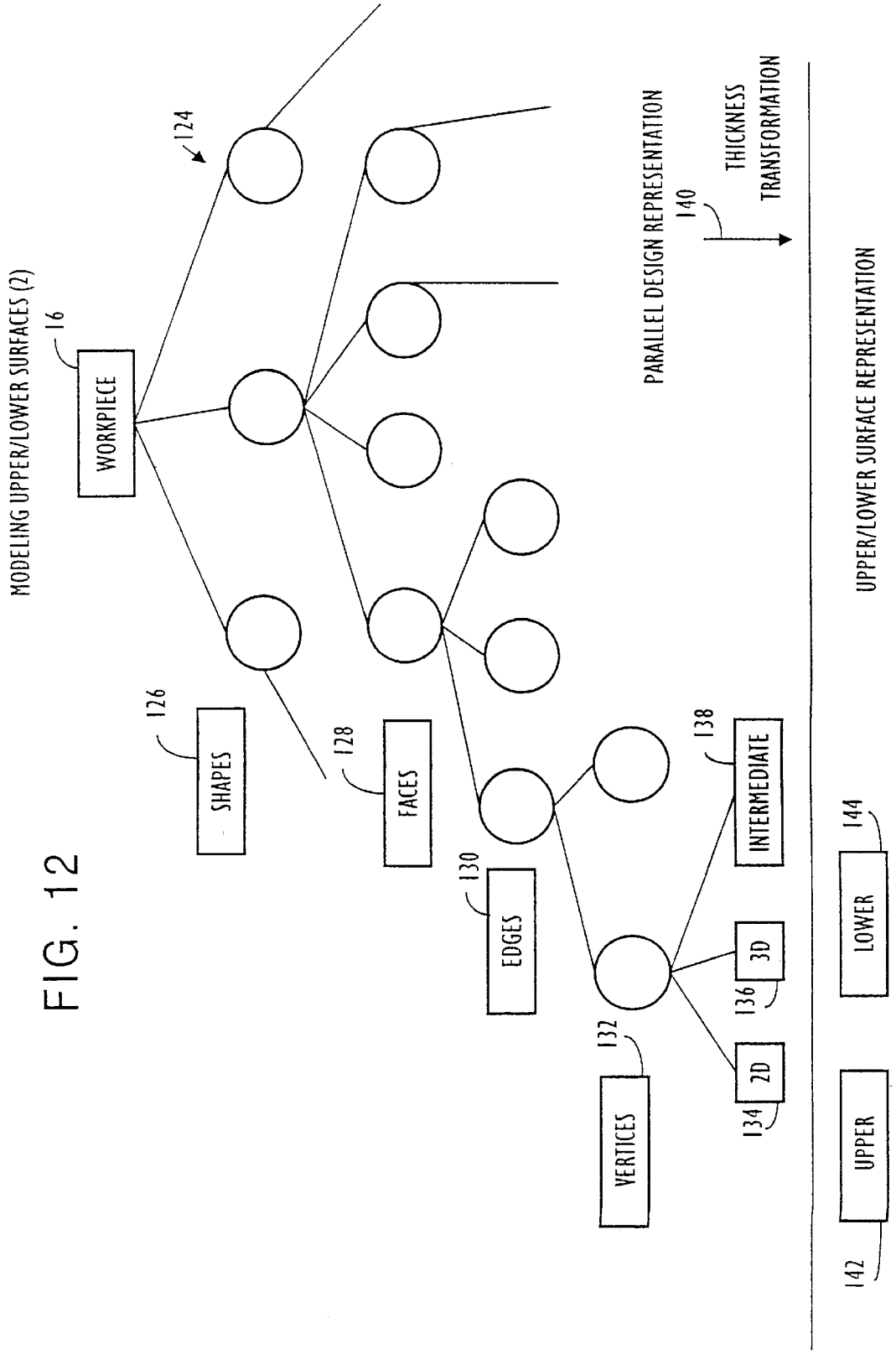
FIG. 12 illustrates a geometric modeling file structure with and without a thickness transformation.

FIG. 12 represents an exemplary tree structure which may be utilized to model the design representation of a sheet metal workpiece 16. At a first level, a plurality of shapes 126 are indicated corresponding to workpiece 16. For each shape 126, several faces 128 are defined, and for each face, several edges 130 are defined. For each edge, a plurality of vertices 132 are indicated. For each vertex, a 2D, (i.e., stock part) representation 134 may be maintained, along with a 3D (i.e., final part) representation 136 and an intermediate representation 138.

A thickness transformation may be performed, as represented by arrow 140, resulting in upper and lower surface representations 142, 144, which each have a tree structure similar to that illustrated above the line in FIG. 12.

FIGS. 17A–17B and 18A–18B illustrate several different types of geometric libraries which may be provided in order to aid in the performance of geometric modeling of the system.

For further information regarding the NOODLES modeling system and geometric modeling in general, reference is made to the Reference Manual for the Noodles Library, by E. Levant Gsoz,, EDRC, Carnegie Mellon University, Pittsburgh, Pa., and a book by Michael E. Mortenson, entitled *Geometric Modeling*. The contents of each of these documents are expressly incorporated herein by reference herein in their entireties.

5. The Query-Based Module Communicating Language (FEL)

In order to formalize the interface between each of the modules of the planning system, a query-based language called FEL may be used. FEL was originally developed by David Bourne in 1988, and has since been further refined. For more detailed information regarding FEL generally, reference should be made to the several user guides provided by the Robotics Institute at Carnegie Mellon University including: "Feature Exchange Language Programmer's Guide." David Alan Bourne, Duane T. Williams (Jan. 14, 1994); "Using the Feature Exchange Language in the next Generation Controller," David Alan Bourne, Duane T. Williams, CMU-RI-TR-90-19; and "The Operational Feature Exchange Language," David Alan Bourne, Jeff Baird, Paul Erion, and Duane T. Williams, CMU-RI-TR-90-06. The contents of each of these PEL documents are hereby expressly incorporated by reference) herein in their entireties.

Figure 19:
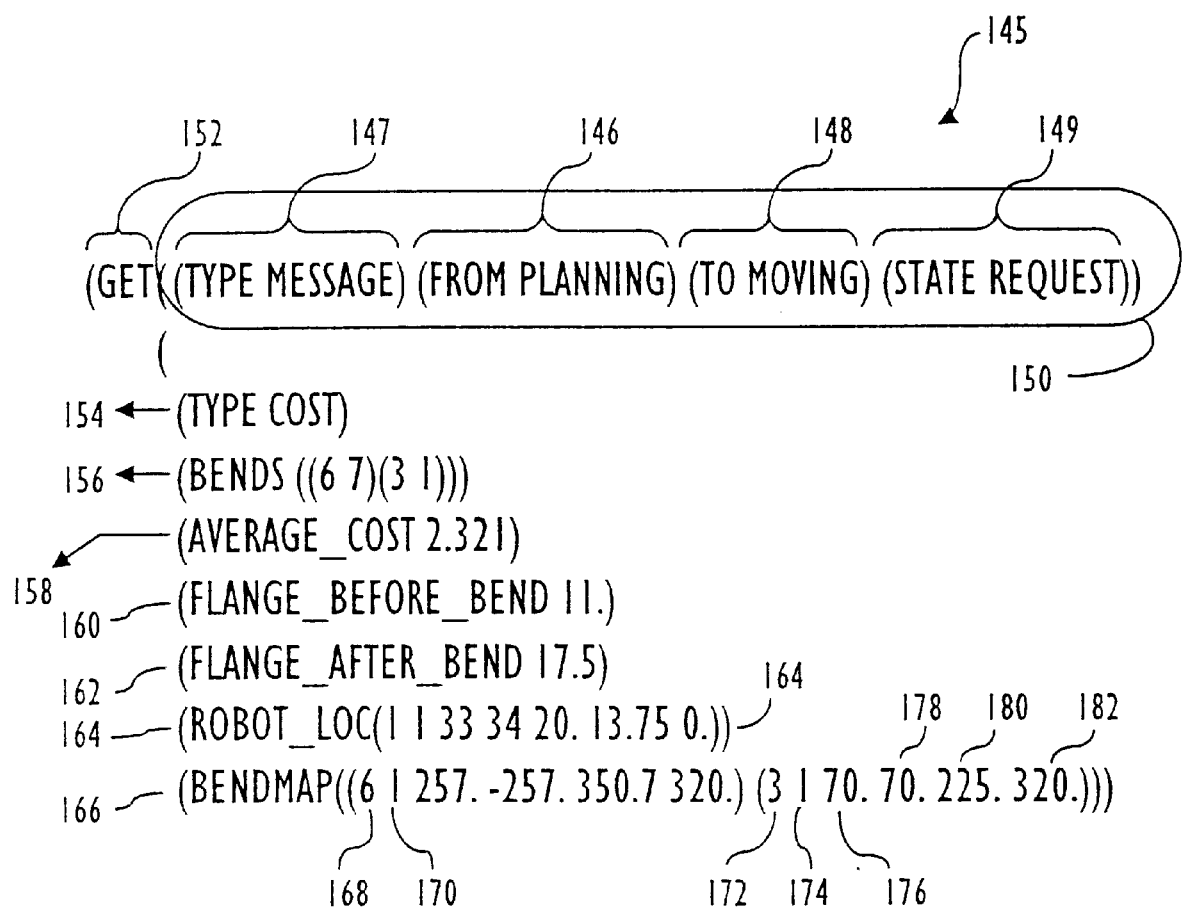
FIG. 19 illustrates an FEL planning message to be sent from a bend sequence planner to a motion expert.

FIG. 19 illustrates an exemplary PM planning message 145 which is being sent from bend sequence planner 72, as indicated by expression 146, to motion expert 84, as indicated by expression 148. FEL planning message 145 comprises a query command sent from bend sequence planner 72 to motion expert 84, which provides preliminary information to motion expert 84 so that it may satisfy the query. An initial parameter setting portion 150 of message 145 is provided immediately after a main verb/command "get" 152, and includes expressions "type message" 147, "from planning" 146, "to moving" 148, and "state request" 149. The expression "type cost" is provided immediately after setting portion 150, and signifies that a request is being made for the motion expert to tell the planner how much a particular operation will cost. The next expression "bends . . ." 156 queries how expensive it will be to perform bend number 3, after having done bend number 6. The numbers 7 and 1 represent a face of the workpiece that will be inserted into the die space of the bending workstation for bends 6 and 3, respectively.

A next expression "averagecost 2.321" 158 informs the motion expert that this is the average cost (k-cost) for motion per bend for the bends that have previously been done based upon cost values previously assigned by the motion expert. In this case, the average cost is 2.321 seconds per bend previously performed. A next expression "flange_before_ bend" 160 indicates the height (in millimeters) of the tallest flange of concern (indicated in FIG. 18A as 11 millimeters) to be used by the motion expert to make clearance determinations. Expression "flange_after_bend" 162 similarly indicates the height (in millimeters) of the tallest flange of concern which will exist after the bend is performed (indicated in FIG. 18 as 17.5 millimeters). A next expression "robot_loc" 164 informs the motion expert where the part is by specifying the location of the robot (as it was left upon completion of the previous bend). A last expression in the planning message 145, "bendmap" 166, indicates the respective tool stages for the previous bend and presently proposed bend and where the workpiece should be with respect to the stage for each bend. The first value 168 represents that the location information is given for bend number 6, and a second value 170 indicates the stage at which bend number 6 was performed, which in this case is stage number 1. Several coordinates are listed to the right of the first and second values 168, 170. The first coordinate value "257." represents the position of the left edge of the part with respect to the left edge of the stage, and the second coordinate value "−257" represents the position of the left edge of the part with respect to the stage. The value "350.7" represents the position of the right edge of the part with respect to the stage. The final value "320." represents the position of the stage along the die rail with respect to the left edge of the die rail.

Generally speaking, the planning message 145 forwards all the information which the motion expert will need in order for it to generate a subplan for moving the workpiece from an initial position (where it is left after performance of a preceding bend) to a position ready for a proposed next bend.

A significant feature of the query-based interface structure between the planner and its various sub-planners (experts) is that when the planner forwards a query to an expert, it informs the expert of all background information that the expert will need to respond to the query. Thus, the experts need not save information, but can simply respond to the bend sequence planner and return all related information for the bend sequence planner to save.

(a) Configuration of FEL-Based Process Planner

In configuring the process planner 71 illustrated in FIG. 5, each module including bend sequence planner 72, and experts 80, 82, and 84, is sent a command to read its startup configuration file. An example of such a command could be as follows:

(read ((type file (name "config.s 2.fel"))) ((type message) (from planning) (to tooling) (name "config")))

After each module has read is st p configuration file, the system will be set so that bend sequence planner 72 can use any specified number of experts, e.g., using a command such as the following:

(set ((type experts) (experts (tooling grasping moving))))

After the experts to be used by bend sequence planner 72 are specified, the part design may then be read from CAD system 74 into each module as needed, and bend sequence planner 72 may start the planning process.

(b) FEL Commands

The following table lists several commands that may be specified by bend sequence planner 72 in participating in a dialogue with the other modules of the system, including the experts.

| FEL MODULE DIALOG COMMANDS | |
|---|---|
| SEARCH COMMANDS | |
| Finalize | collect final plan info from each module |
| Get | get cast information (and other data) for a bend |
| Plan | initialize a module for planning a part |
| USER COMMANDS | |
| Quit | cleanup and exit a module |
| Read | read files for planning |
| Set | set various module options |
| Show | show various module data to user |

The following table lists several commands that may be specified by bend sequence planner 72 for execution by sequencer 77.

| FEL SEQUENCER COMMANDS | |
|---|---|
| Print Messages | print messages for BM100 operator for setup |
| Programs | download programs to NC9R press controller and backgage controller |
| Startup | initialize state of press and robot |
| Get | acquire part from various steps of the process |
| Put | load part into various steps of the process |
| Move | move the robot through a series of paints |
| Bend | initiate bend sequence (backgage and bending) |

The "read" command may be used to instruct a module to read certain files needed for planning, the files being representative of the design to be produced, and to configure itself in accordance with the design. With use of the "set" command, various module functions may be set, e.g., how to display information, how to interface with other modules, and so on. The "show" user command may be utilized to show various module data to the user, e.g., the various nodes of the A* algorithm which represents the various costs or different bends within the proposed bend sequence.

6. Part Design and Modeling

In the illustrated embodiments shown in FIG. 5A, a CAD system 74 performs several functions relating to part design and part modeling for planning system 71. CAD system 74 allows a user to form a design of a given workpiece by working with simplified, primitive components (in either 2D or 3D form) on a graphic interface, each primitive component having certain desired dimensions which may be input by the user, in order to design the workpiece. The user may then utilize a user interface with CAD system 74 to connect the primitive components and, in addition, to remove portions, such as holes, slots, etc., from the connected primitive components. CAD system 74 may then perform feature labeling functions including labeling several geometric features of the workpiece, such features having a particular significance in the context of sheet metal bending. CAD system 74 may also build a bend graph which associates various bend-related information with the geometric design of the workpiece. CAD system 74 thereby forms an output file which includes geometric, topological, and bend-related feature information (including a list of labeled features and a bend graph). All of this information is then placed into an output shape file which will form the basis of communication with other modules of planning system 71. In this regard, a part modeler may be provided to form an interface between the design system's output shape file and the various expert modules 80, 82, and 84 (and 85) along with bend sequence planner 72.

A part modeler may be provided which performs various conversions on the data provided in the output shape file in order to form developed part data structures which can be used for geometric modeling purposes by each of the modules of planning system 71. Part modeler may be implemented in the form of a library which is accessible to each of the modules in planning system 71, which may be utilized to manipulate the information in the developed part data structures and/or undeveloped data structures provided in the output shape file, in order for the various modules to utilize the information provided therein to serve any particular purpose that they may be addressing at a particular point in time.

Figure 13A:
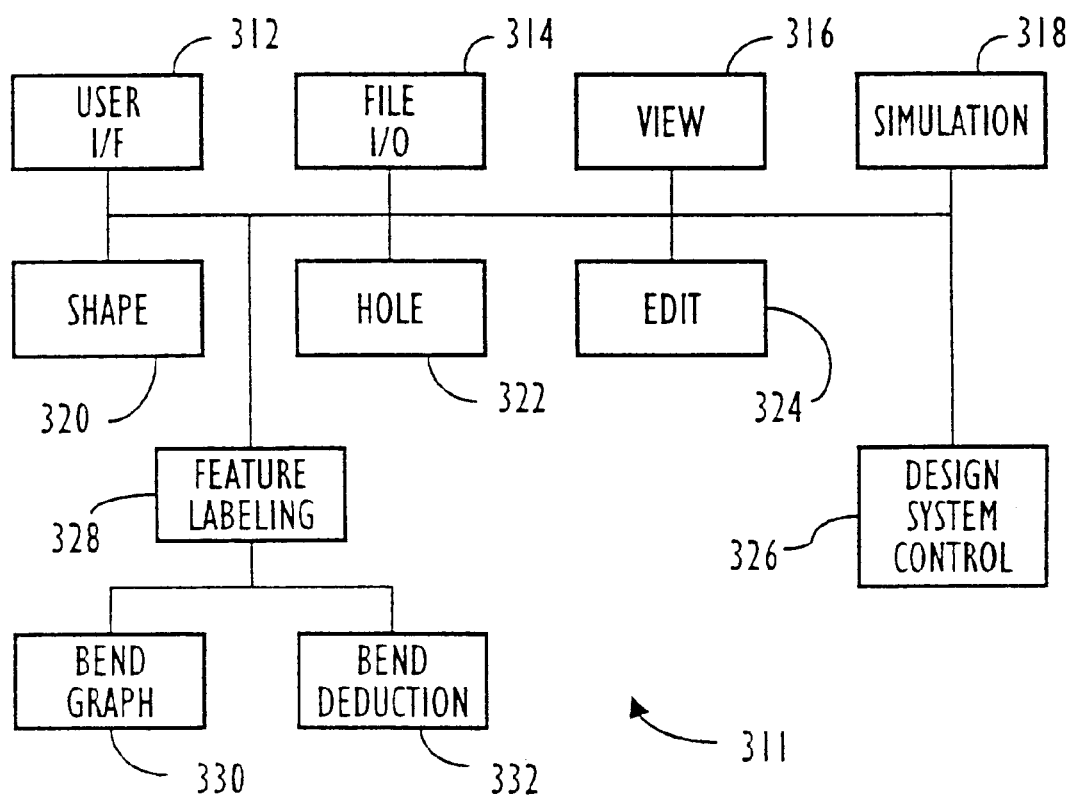
FIG. 13A illustrates a plurality of functions of a design system for intelligent bond planning.

FIG. 13A illustrates a functional block diagram of a design system 311 which may be provided to perform the functions of CAD system 74 of the illustrated embodiment. Design system 311 performs several design-related functions which may be implemented in the form of function modules as illustrated in FIG. 13A. Each function module may be implemented by a particular function provided in a library of functions comprised by the design system. The functions shown FIG. 13A include a user interface 312, file I/O 314, view 316, simulation 318, shape defining 320, hole defining 322, editing 324, and feature labeling 328. Each of these functions may be controlled by a design system control module 326. In order to perform several feature labeling functions, bend graph module 330 and bend deduction module 332 are each connected to feature labeling module 328.

Each of the functions are illustrated in FIG. 13A in the form of function modules. However, it is not necessary that each of these functions be separated into separate modules in the specific manner as illustrated. In the alternative, an overall program or hardware system may be provided which allows each of these functions to be performed without having any specific interface with other functions of the design system. For example, one complete routine may be provided within a processor of a computer to implement each and every one of the functions of the overall design system, without removing several of the general benefits provided by the design system disclosed herein.

The file I/O module 314 performs functions such as reading, writing, printing, and performing data exchanges between modules. The view function module 316 performs functions such as zooming in/out, and panning during display of the part on a graphic interface. The shape module 320 is provided to allow a user to specify particular shapes, including rectangular shapes, angles, a Zee, a box, a hat, and so on, which may be put together to form a particular workpiece design. Role module 322 is provided for the user to specify various type of cavities to be provided in the workpiece, such as cutouts, holes, slots, notches and so on, to further allow the user to design the workpiece in a manner similar to that provided by shape module 320. Edit module 324 is provided to allow the user to perform various editing functions such as a fillit function, a chamfer function, and changing the workpiece material type and/or thickness. Simulation module 318 is provided so that the user can simulate bending and unfolding of various bends on the workpiece, thus to get a visual representation of such bends on the graphic in ace to be utilized by the design system.

Feature labeling module 328 is provided to automatically assign feature labels which pertain to sheet metal bending, and which will thus be useful to the planning system 71 illustrated herein in forming or generating a bend sequence plan with the use of such feature labels. Feature labeling module 328 may generate feature-related information such as corners, setbacks, form features (e.g., dimples, louvers), holes, large radius bend, etc. In addition, feature labeling module 328 may be designed so that it directs a bend graph module 330 to form a bend graph which includes information organized in a certain way to relate the geographic and topological information to the various bends to be performed on the 2D workpiece to form the desired 3D finished workpiece. In addition, feature labeling module 328 may be designed so that it directs the performance of bend deduction calculations by a bend deduction module 332. The resulting bend deduction information may then be placed within a bend graph listing provided by bend graph module 330.

Figure 13B:
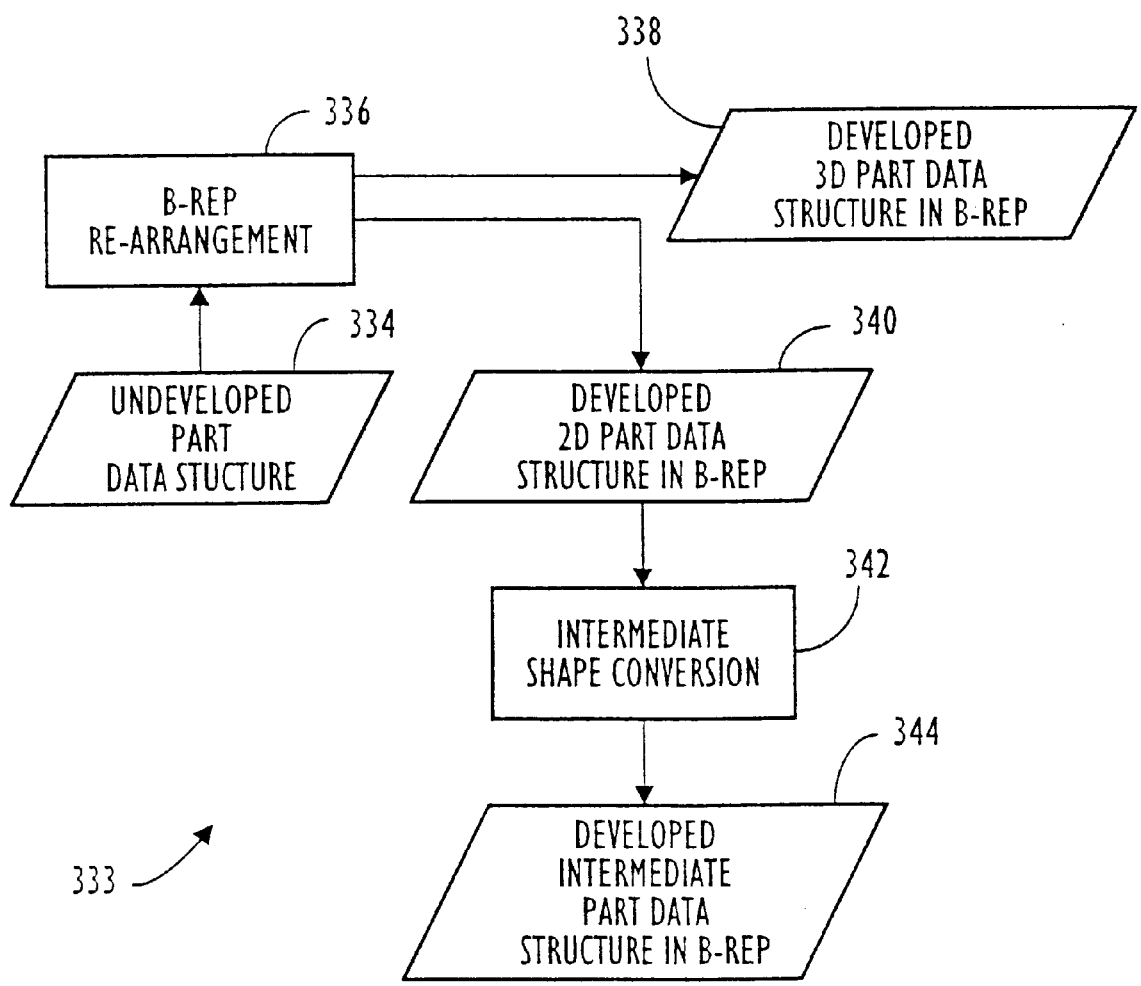
FIG. 13B illustrates a part modeler for modeling parts based upon a design system's output shape file.

Various modules provided in the planning system 71 illustrated herein perform various geometric modeling functions which require that a part (i.e., a workpiece) be modeled. Accordingly, a part modeler should be provided, and may be provided in the form of a library of functions accessible to the various modules in order to interface between the design system's output shape files and the various modules within planning system 71. FIG. 13B illustrates a part modeling system 333 for performing this function. Part modeler 333 includes two main function modules: a B-REP rearrangement module 336 and an intermediate shape conversion module 342. The B-REP rearrangement module 336 converts an undeveloped part data structure 334 to either or both of a developed 3D part data structure (in B-REP) 338 and a developed 2D part data structure (in B-REP) 340. Intermediate shape conversion module 342 converts the developed 2D part data structure (in B-REP 340) to a developed intermediate part data structure (in B-REP) 344.

The undeveloped part data structure 334 (provided by the design system 311 as illustrated in FIG. 13A) defines a geometric/topological data structure that does not take into account bend deduction and that forms part of the output shape file produced by CAD system 74. A developed part data structure, such as developed 3D part data structure 338 and developed 2D part data structure 340, includes a modified representation of the part that takes into account bend deduction. The noted developed part data structures are further converted to be in the form of a boundary representation (B-rep) model.

The data structure which resides in the shape output file produced by the CAD system may be designed to include a shape header which includes part information, followed by a plurality of shapes in a linked list, the linked list ending with a null. In each shape, topological and geometric information may be provided for both a 3D and a 2D representation of the part. The structure of the shape may include a list of information including the shape type, shape identification, a face list, an edge list, a 3D vertices list, and a 2D vertices list. Each face may have its own structure, which may include a list of information including a face, identification, the number of vertices of the face, a vertices list for the vertices of the face, and a,face normal vector. For each edge, a structure may be provided which includes information such as the edge identification, the edge type, the bent line type, and the vertices index number for that particular edge. For each vertex, information may be provided including the vertices identification, vertices coordinate, 2D coordinates, 3D coordinates and intermediate coordinates. Further information regarding the details of data structures and the illustrated CAD system in general are provided in an ME report dated May, 1992 entitled "A Parallel Design System for Sheet Metal Parts" presented by Cheng-Rua Wang at the Mechanical Engineering Department, Carnegie Mellon University, Pittsburgh, Pa., the contents of which are expressly incorporated by reference herein in its entirety.

Figure 13C:
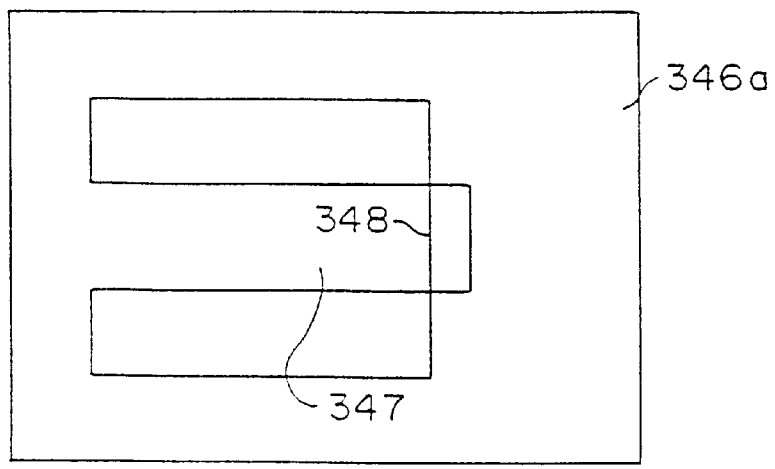
FIG. 13C and FIG. 13D respectively illustrate a 2D1 representation and a 3D representation of a workpiece.
Figure 13D:
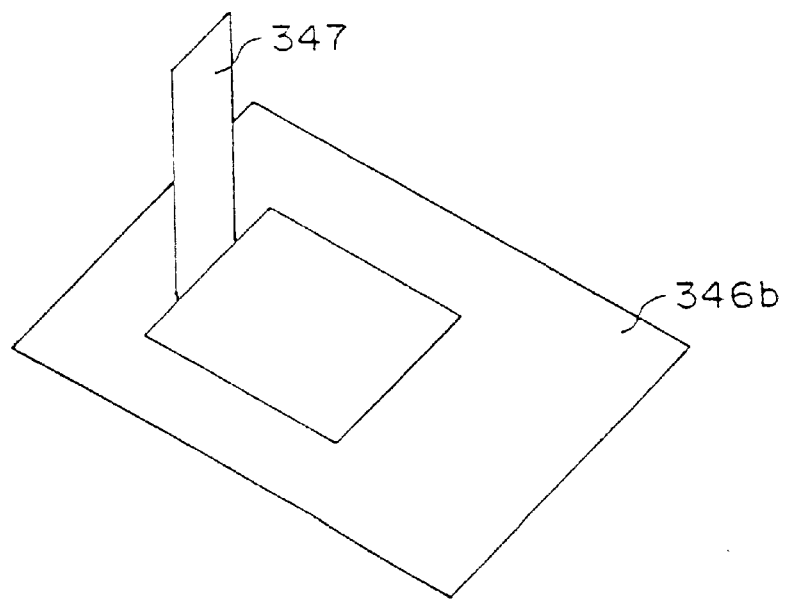

As noted above, the CAD system preferably employs a concurrent "parallel" representation of both the 3D and the 2D versions of the part as it is being designed, and such representations are maintained once the part is finally designed for use by planning system 71. In order to demonstrate one of the benefits associated with having such a concurrent and parallel maintenance of 3D and 2D data representations, FIGS. 13C and 13D are provided. One of the benefits of having a concurrent and parallel design system is that such a system resolves ambiguities which may otherwise occur in the design process. For example, a 2D part 346a is illustrated in FIG. 12C and a 3D part 346b is shown in FIG. 12D. By viewing just the 3D1 representation of 346b of the part, one may not notice that inner tab 347 is too long, and cannot possibly be formed from a single, malleable piece of sheet metal. This is only clearly evident by viewing the 2D representation 346a of the part, which illustrates the overlap of inner tab 347 as it crosses an inner edge portion 348 of the part. Accordingly, as can be seen in FIGS. 13C and 13D, by having both the 2D and the concurrent 3D representations in a graphic form, the designer can easily resolve ambiguities and recognize errors in the design which might otherwise be detected due to ambiguities in just viewing one or the other of the 2D and 3D representations during a design. Another benefit associated with such a concurrent design approach, as noted above, is that it may be easier to make modifications to one representation (e.g., the 2D representation) instead of the other for a particular type of modification, e.g., adding an inner tab to the part.

FIGS. 14A–14E illustrate a design system graphical user interface 348, with its display changing throughout the process of designing a certain desired part. Referring, e.g., to FIG. 14A, graphical user interface 348 includes a key pad 350, a parameters window 352, a primitive shape 3D window 354, a primitive shape 2D window 356, a model 3D window 358 and a modet 2D window 360. FIG. 14A shows the first introduced primitive shape provided on a graphical interface 348 in order to produce the desired workpiece as shown in FIG. 14E. The first primitive shape is a box. The parameters of the box may be specified with the use of key pad 350 and are illustrated in parameters window 352 to have a base which is 100×100 (indicated by parameters P[2] and P[2]), and a height equal to 20 (indicated by parameter [3]). The 3D version of the primitive shape is illustrated in primitive shape 3D window 354, and the 2D shape of the primitive shape is illustrated in primitive shape 2D window 356. Since this is the first primitive shape being provided for the part design, model 3D window 358 is identical to primitive shape 3D window 354, and model 2D window 360 is identical to primitive shape 2D window 356.

FIG. 14B illustrates the next shape to be added which is a rectangle having a length of 100 (indicated by parameter [1]), and a width of 15 (indicated by parameter [2]). The next primitive shape being added to design the part is another rectangle having the same parameters as the rectangle of FIG. 14B. The next primitive shapes are added to the workpiece as shown in FIGS. 14C, 14D and 14E.

It is noted that for each primitive shape which is added to the workpiece, a dotted line is utilized to indicate a bend line. Parameter P[1] corresponds to the X dimension, parameter P[2] corresponds to the Y dimension, and parameter a P[3] corresponds to the Z dimension of the primitive shape being added.

Figure 15A:
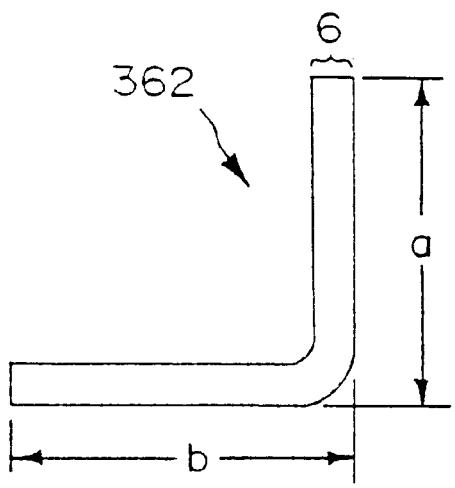
FIG. 15A illustrates a side view of a bent workpiece with thickness.
Figure 15B:
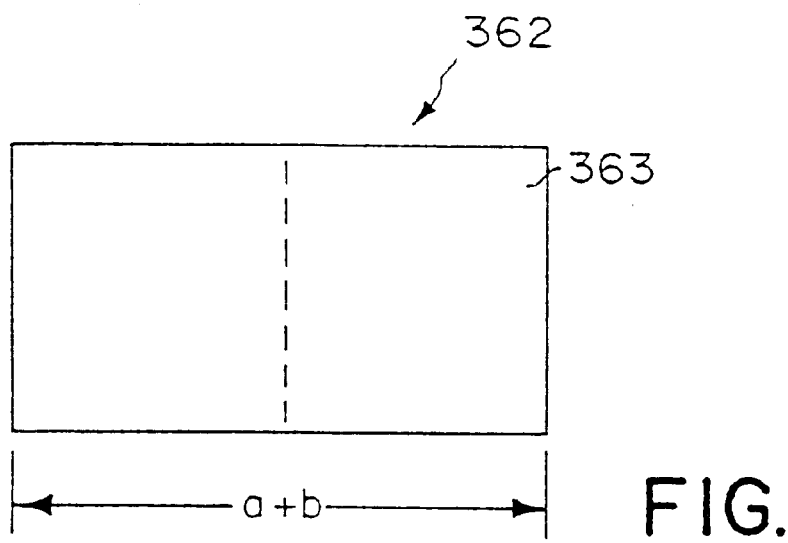
FIG. 15B illustrates a top view of an undeveloped flat 2D workpiece representation.
Figure 15C:
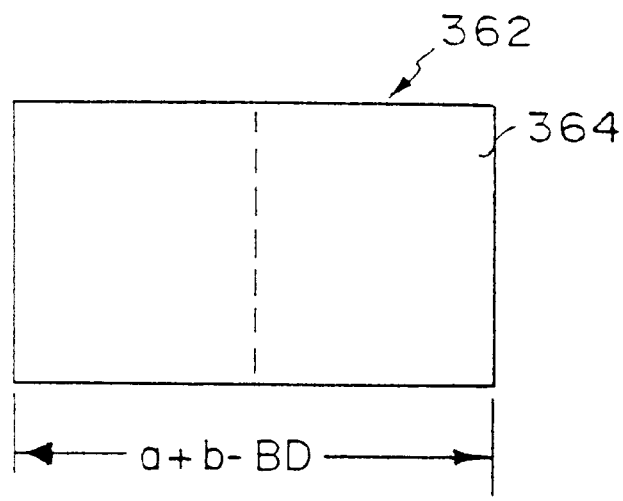
FIG. 15C illustrates a top view of a developed flat 2D workpiece representation.

FIGS. 15A–15C are provided to illustrate bend deduction, and the manner in which it relates to the 3D and 2D dimensions of flanges of a workpiece. Where a workpiece 362 has a thickness t, and the flanges of the workpiece 362 are desired to have lengths a and b, a calculation should be performed so that the flat 2D representation of the part, when bent along the appropriate bend line, will indeed form the flanges having appropriate dimensions a and b, taking into account the thickness t of the material, the material type, and the internal radius of the bend line (to the inside surface of the sheet metal). Starting with an undeveloped representation 363 of workpiece 362, the developed 2D representation 364 workpiece 362 may be calculated by subtracting the appropriate bend deduction (BD) value from the overall dimension a+b. Methods for performing such a calculation are known manner. Accordingly, no specific details are given herein regarding the equation used for determining the bend deduction (BD) value.

Figure 16:
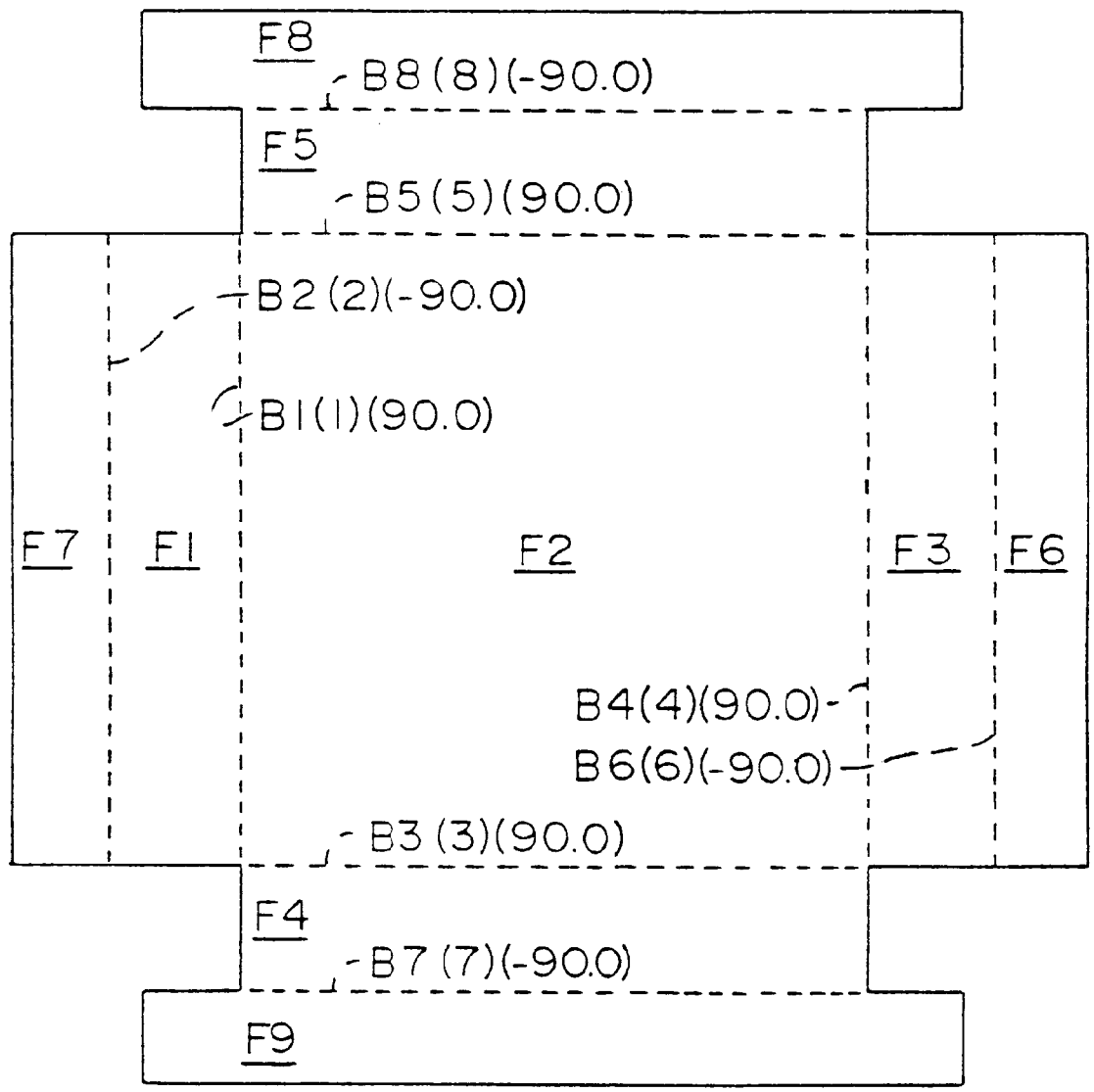
FIG. 16 illustrates a 2D drawing corresponding to a bend graph listing.
Figure 17A:
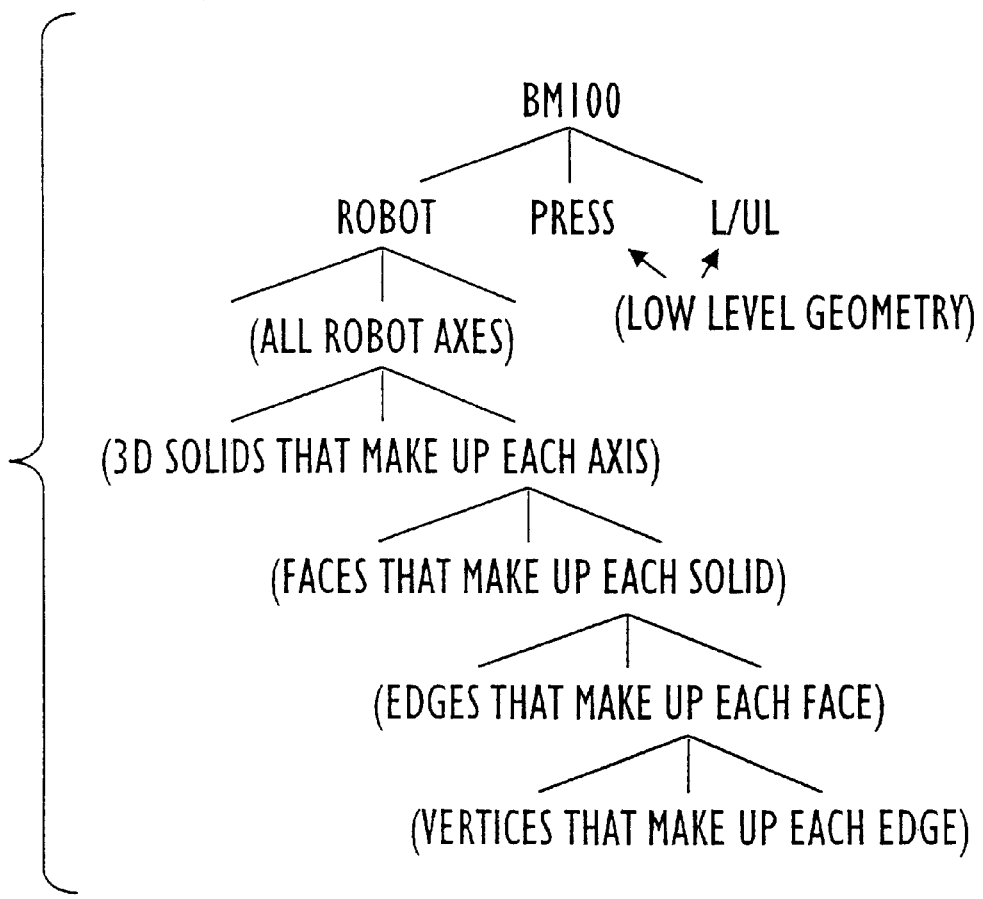
FIG. 17A illustrates a BM100 geometric modeling filing structure.
Figure 17B:
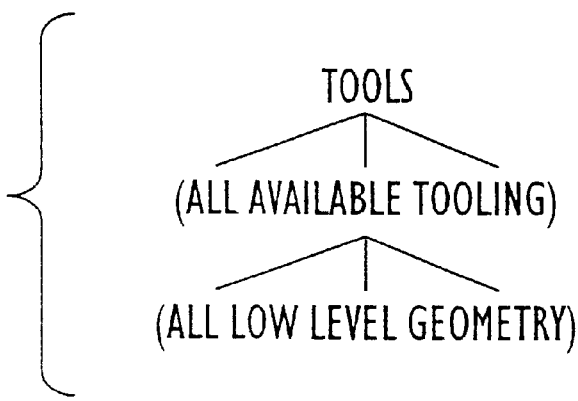
FIG. 17B illustrates a tooling modeling file structure.
Figure 18A:
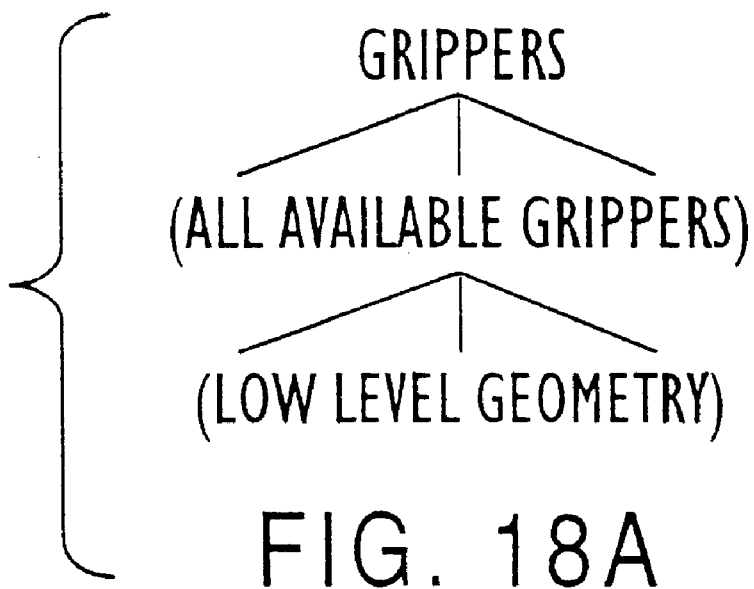
FIG. 18A illustrates a gripper modeling file structure.
Figure 18B:
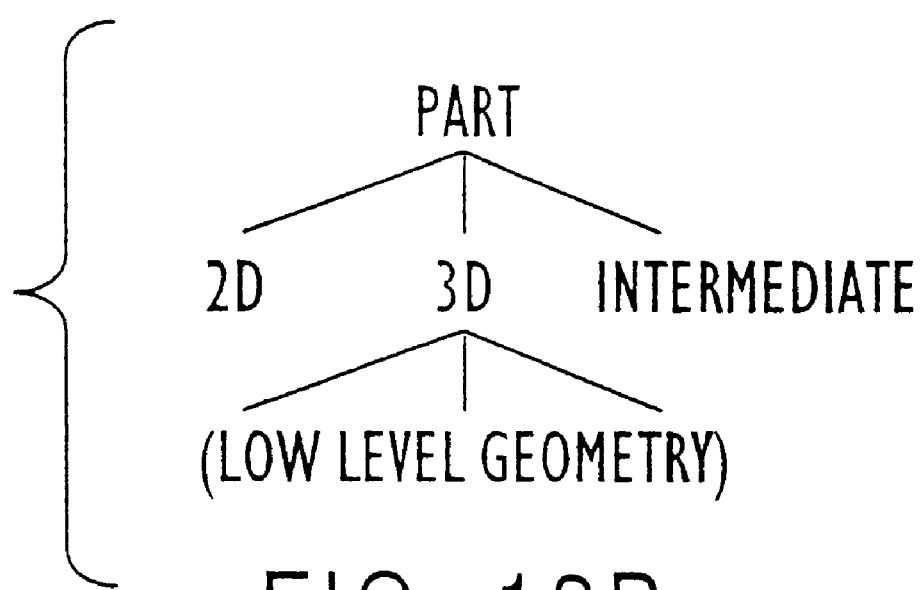
FIG. 18B illustrates a part modeling file structure.

FIG. 16 illustrates a graphic representation of a bend graph, the graphic representation being a 2D representation of the workpiece designed in the steps illustrated in FIGS. 14A–14E. The bend lines of the designed workpiece are labeled as bend lines B1, B2, . . . B8, and each label comprises a bend line index. Each bend line index is then assigned a bend sequence number which comprises an initialization value. The bend sequence number indicates the order in the bend sequence in which the bend line will be bent, and is assigned for each bend line in accordance with the plan (i.e., the bend sequence) produced by the bend sequence planner of the illustrated planning system 71. In addition, to the bend line indices, each bend line is assigned a bend angle. For example, in the bend graph illustrated in FIG. 16, an angle of −90.0° is given for bend B2, and a bend angle of 90.0° is given for B1. The bend graph further comprises an indication of the various faces F1–F9 which are formed on the workpiece once the bends are performed.

Listings are provided in Appendices A and B which respectively include a geometric/topological data structure and a bend graph listing for the part designed in FIGS. 13A–13E. In addition to the above-noted report to the Mechanical Engineering Department of Carnegie Mellon University, further reference may be made to an article by Cheng-Hua Wang and Robert H. Sturges, entitled "Concurrent Product/Process Design with Multiple Representations of Parts," IEEE (1993) 1050– 4729/93, the content of which is expressly incorporated by reference herein in its entirety.

7. Sequencing and Control

Figure 52:
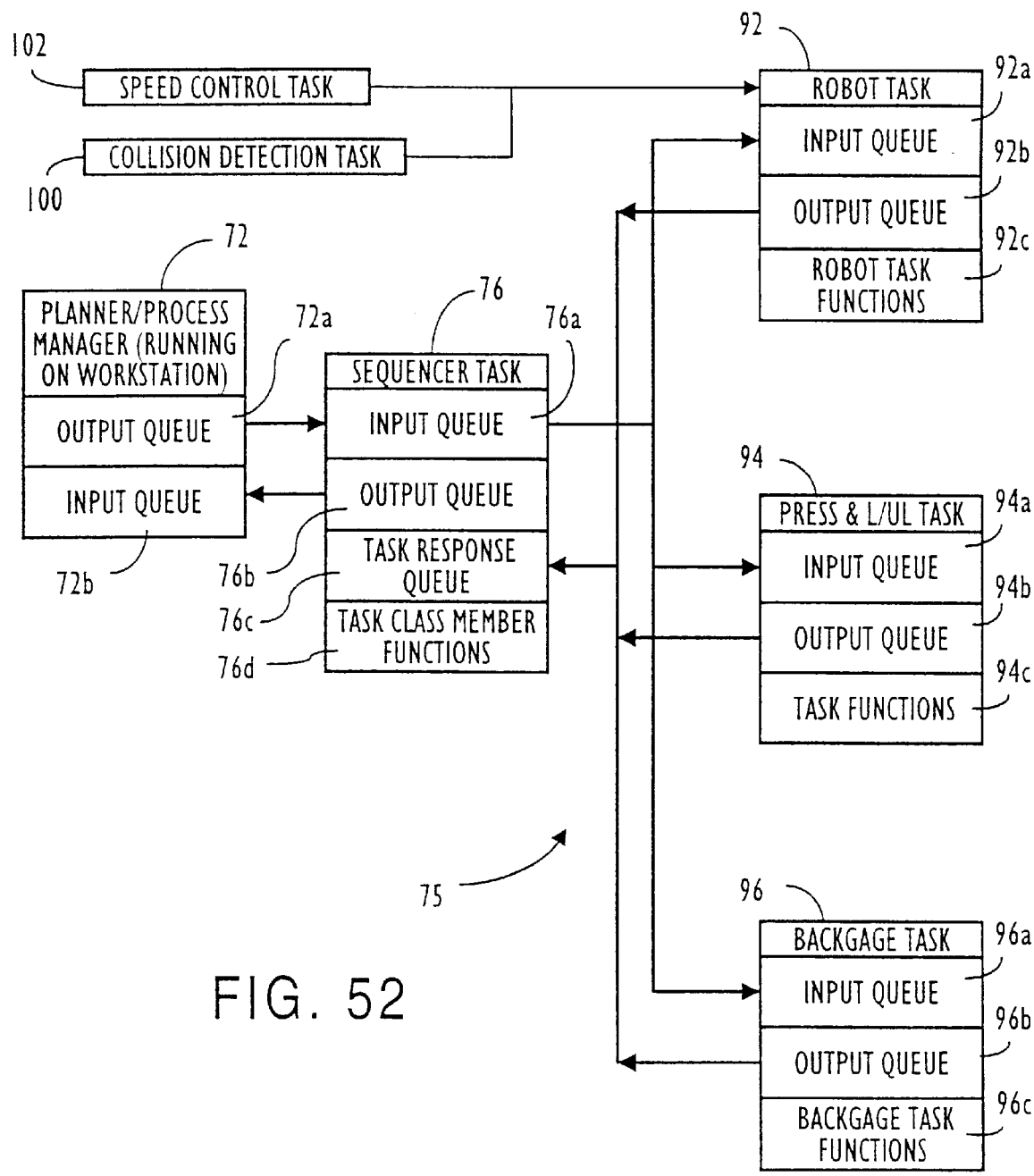
FIG. 52 is a block diagram which illustrates the structure of the controller software of the planning system illustrated hereon.

FIG. 52 comprises a block diagram of the various software modules and their main interfacing components, such modules including planner 72, sequencer task 76, robot task 92, press and L/UL task 94 and backgage tasks 96, speed control task 102, and collision detection task 100. Planner 72 includes interfacing components such as an output queue 72a and input queue 72b. The sequencer task 76 includes an input queue 76a, an output queue 76b, a task response queue 76c and a section corresponding to several task class member functions 76d. Output queue 72a of planner 76 is connected to input queue 76a of sequencer task 76. Output queue 76b of sequencer 76 is is connected to input queue 72b of planner 72.

Robot task 92 includes an input queue 92a, an output queue 92b, and a portion corresponding to robot task functions 92c. Press and L/UL task 94 includes an input queue 94a, an output queue 94b, and a portion corresponding to press task functions and L/UL task functions 94c. Backgage task 96 includes an input queue 96a, an output queue 96b, and a portion corresponding to backgage task functions 96c. Each of input queues 92a, 94a, and 96a is connected to input queue 76a of sequencer task 76. Each of output queues 92b, 94b, and 96b is connected to task response queue 76c of sequencer task 76.

The controller software structure shown in FIG. 52 is representative only of an example of the inner connections between planner 72, sequencer task 76, and control system 75, the structure of each of the tasks, and how they are connected. It is within the scope of the invention disclosed herein to provide variations of a control system which performs the same essential controlling functions, without being implemented in the manner illustrated in FIG. 52.

Figure 53:
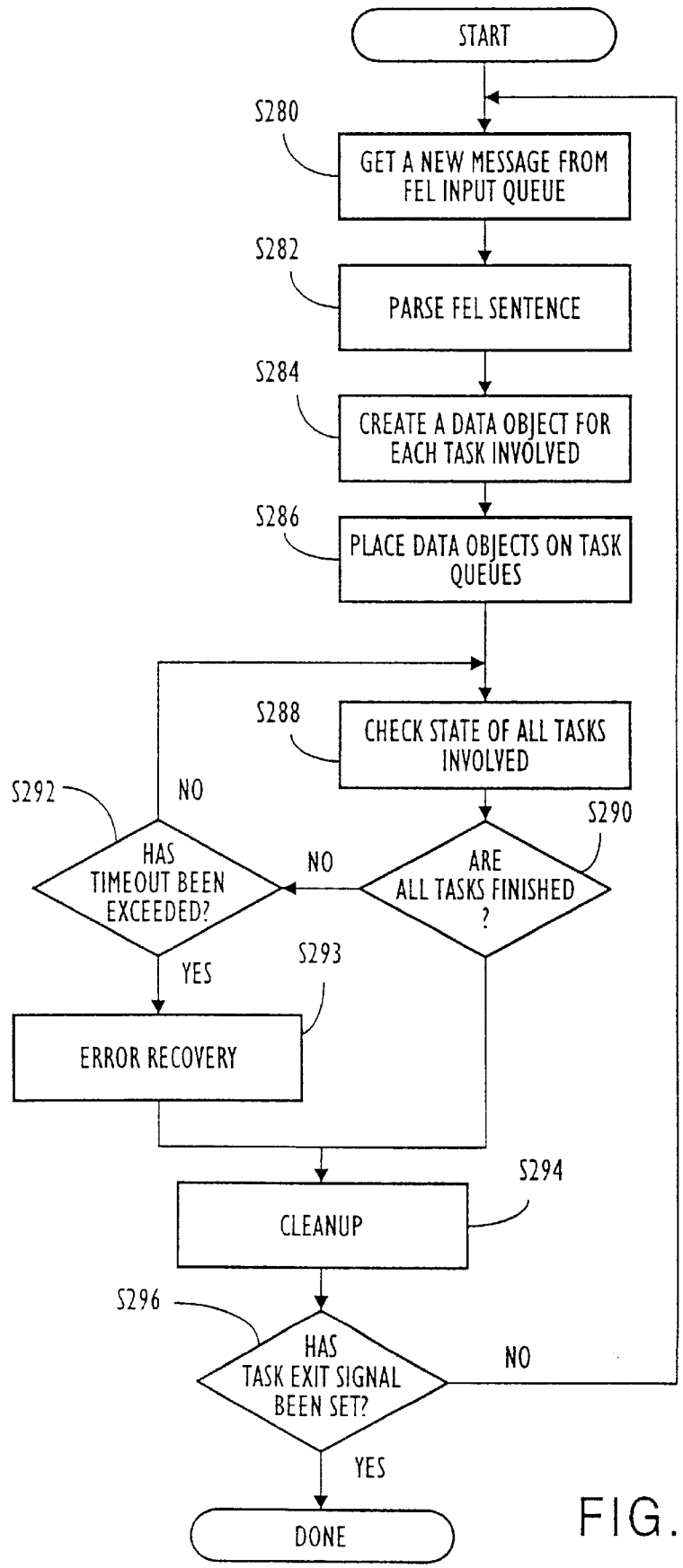
FIG. 53 illustrates the in process steps of the sequencer task provided within the sequencer of the planning system illustrated herein.

FIG. 53 illustrates an example flow of the process performed by sequencer task 76 illustrated in FIG. 52. Once the sequencer is started, in a first step S280, the sequencer will obtain a new message from the FEL listing at input queue 76a. In step S282, the sequencer will parse the FEL sentence, and in step S284, the sequencer will create a data object for each task involved. In step S286, the appropriate data objects will be placed upon their appropriate task queues (e.g., on one or more of the input queues of robot task 92, press and L/UL task 94, and backgage task 96). In step S288, the sequencer checks the state of all tasks involved. Thereafter, in step S290, a determination is made as to whether all the tasks are finished. If not, the sequencer proceeds to step S292. If all the tasks have finished, the is sequencer proceeds from step S290 to step S294 where appropriate cleanup operations are performed (e.g., destroying data objects and resetting flags).

If all the asks have not finished as determined at step S290, in the next step S292, a determination is made as to whether or not a time out has been exceeded. If not, the process returns to step S288. If the time out has been exceeded, the sequencer proceeds to step S293 where appropriate error recovery processing is performed. After the cleanup operations are performed in step S294, a determination is then made in step S296 as to whether the task exit signal has been set. If the task exit signal has been set, the process will then terminate. Otherwise, the process will return to step S280 where a new message will be acquired from the FEL input queue.

Figure 54:
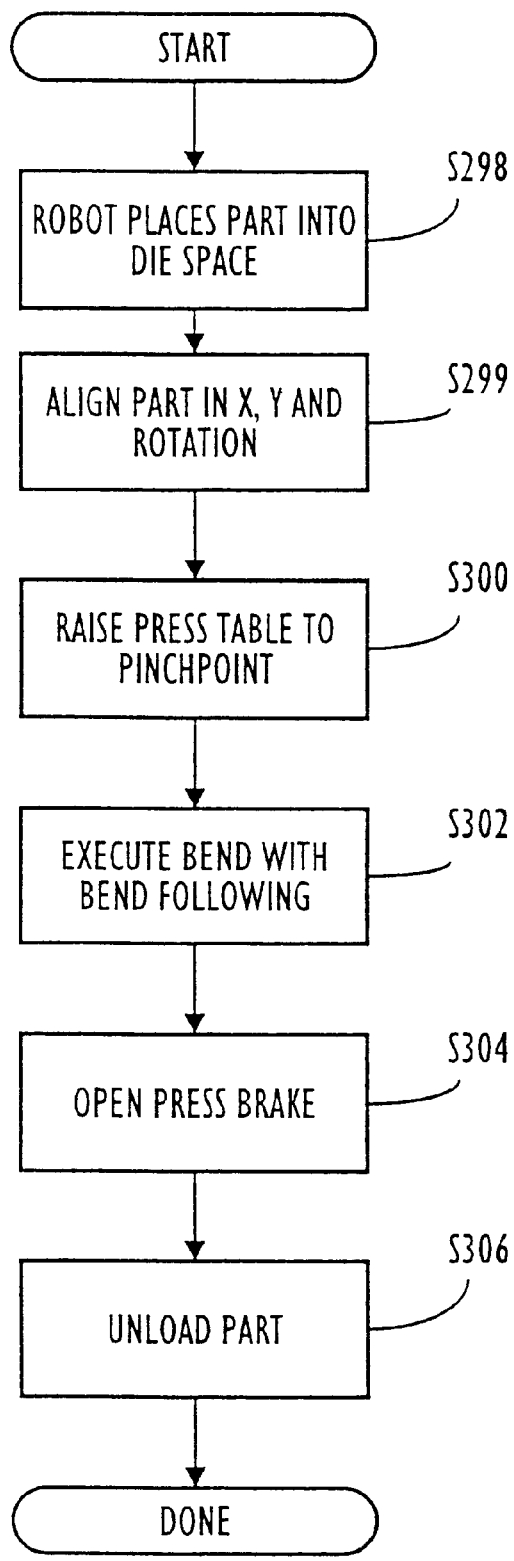
FIG. 54 illustrates the steps performed in executing a bend in accordance with a developed plan.

FIG. 54 is a flow chart of the overall bending process during execution of a single bend. In execution of the bending process, in a first step S298, the robot places the part into the die space. Thereafter, the part is aligned in the X, Y and rotation directions. This alignment is part of the backgaging operation. In step S300, the press table is raised to the pinch point, i.e., the point at which the die contacts the workpiece, which in turn engages with the punch tool so that the workpiece is in a semi-table state pinched between the die and tool punch. In step S302, the bend is executed with bend following (i.e., with the robot gripper maintaining its hold on the workpiece throughout the execution of the bend). Thereafter, in step S304, the press brake will be opened. Then, in step S306, the part is unloaded from the die space. Once the part is unloaded, the bend is completed.

Figure 55:
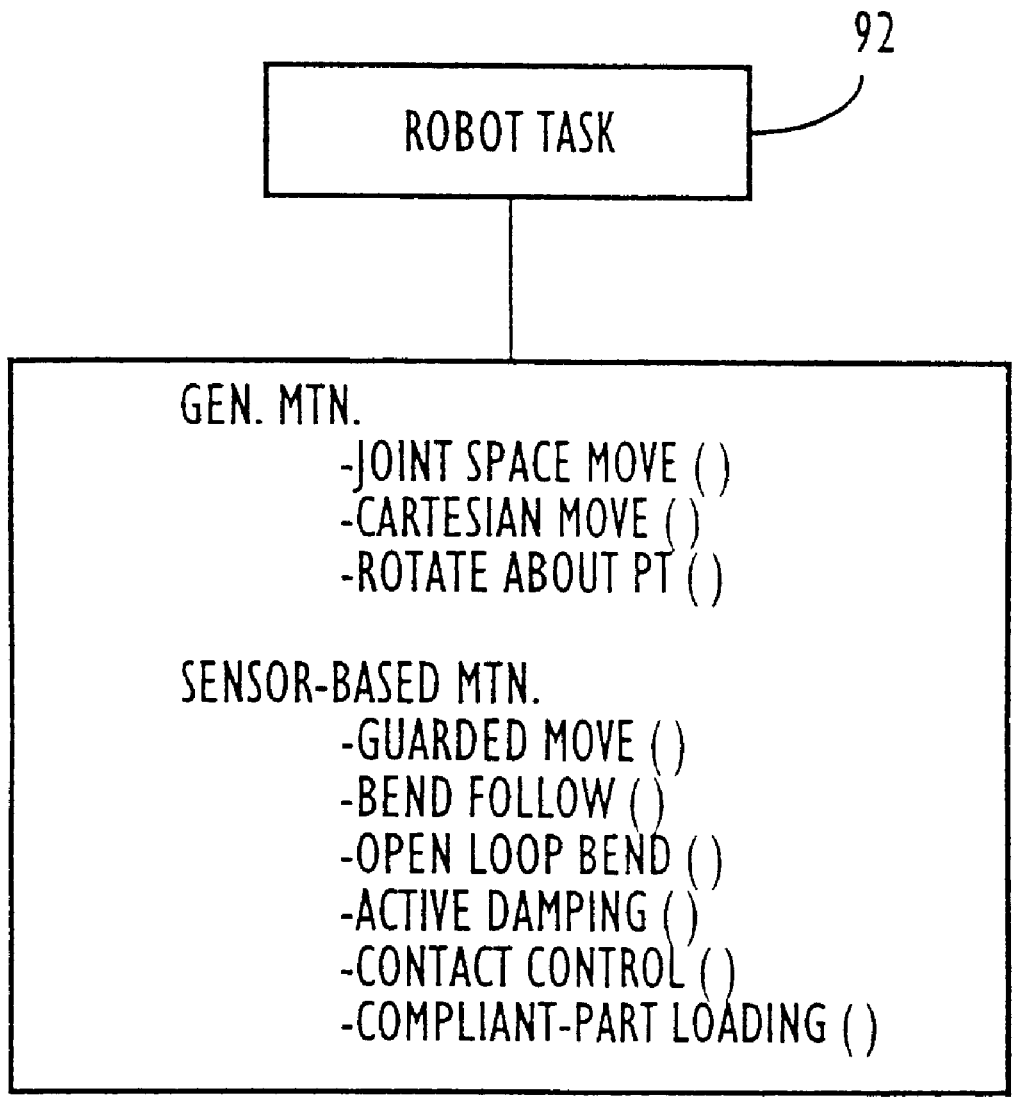
FIG. 55 illustrates a robot task which forms part of the control system.

FIG. 55 illustrates the robot task 92 and the various functions that way be provided therein, including general motion functions and sensor-based motion functions. The general motion functions may include a joint space move a cartesian move, and rotation about a point. The sensor-based motion functions may include a guarded move, bend following, open loop bend, active damping, contact control, and compliant-part loading. Compliant-part loading comprises loading a vibrating compliant-part into the die space of the proper timing so that the part fits in the die space and does not collide with the workstation.

Figure 56:
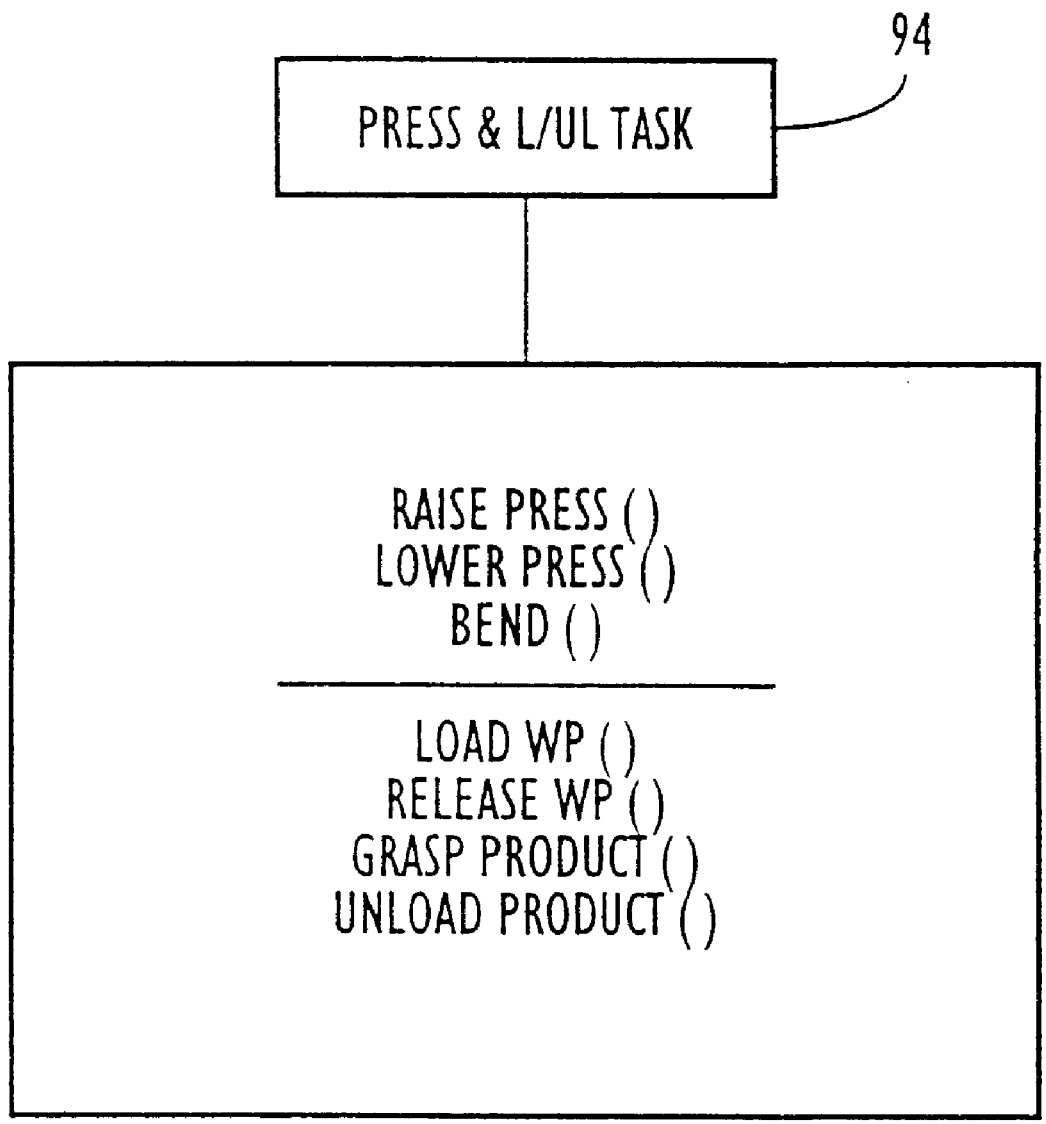
FIG. 56 illustrates a press and loader/unloader (L/UL) task of the control system.

FIG. 56 illustrates the press and L/UL (loader/unloader) task 94, and the various functions that may be provided within the task. The functions that may be provided for controlling the press may include raise press, lower press, and bend. The L/UL functions may include a load workpiece, release workpiece, grasp product, and unload product.

Figure 57:
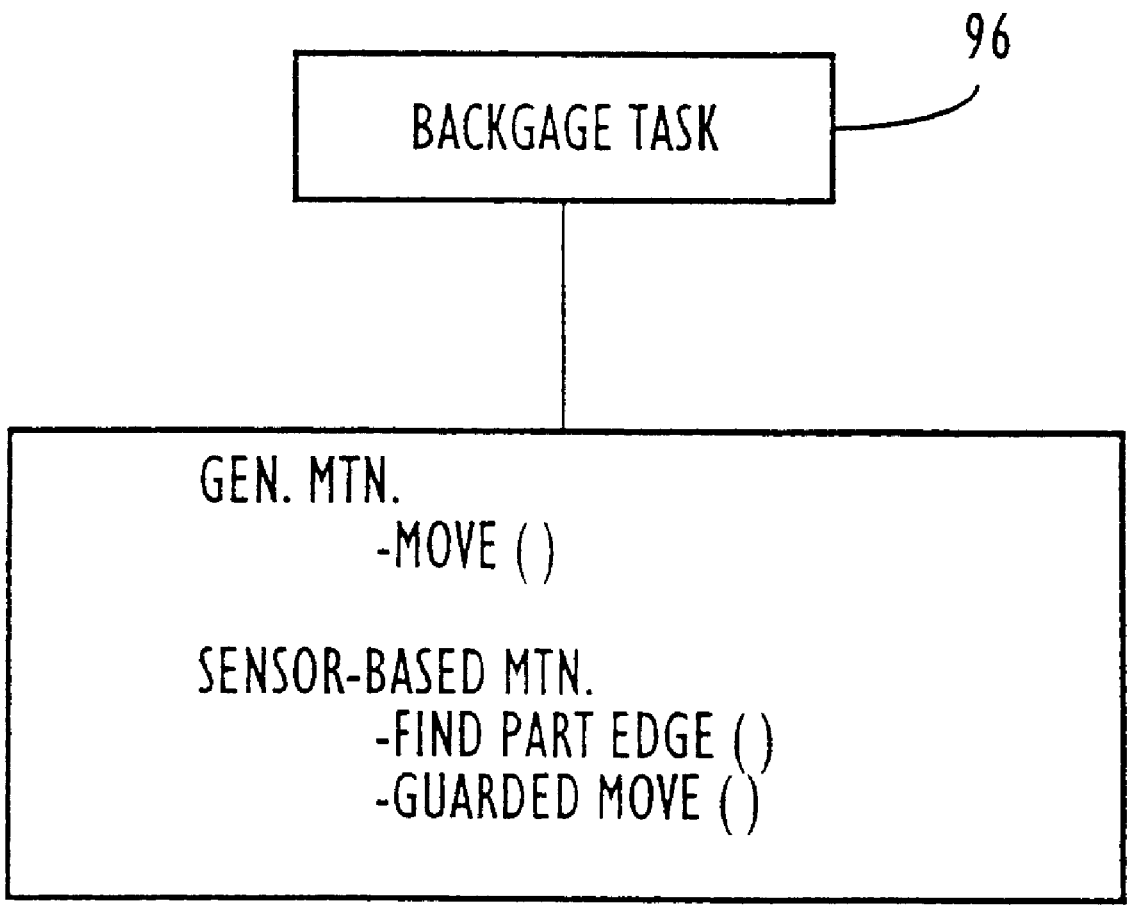
FIG. 57 illustrates a backgage task of the control system.

FIG. 57 illustrates the backgage task 96, and the various functions that may be provided therein. The backgage task may include general motion functions and sensor-based motion functions. One general motion function may include a move function. The sensor-based motion functions may include a find part edge and a guarded move function.

8. Learning for Speed and Quality

The bend system illustrated herein may be provided with one or more mechanisms for learning from the results of the one or more initial runs of a plan, and for modifying the plan accordingly in order to improve the speed of operations and to also improve the quality of the resulting workpiece. In this regard, a sensor-based control mechanism may be provided for performing an operation, including moving a workpiece from one position to another. The bending apparatus may use a sensor output to modify the movement of the workpiece, but measure the amount by which the movement of the workpiece is modifed due to the sensor output. Then, by learning the amount by which the movement of the workpiece was modified, the operation may then be controlled, based upon what was learned, so that the workpiece is moved from one position to another without modifying the movement of the workpiece utilizing a sensor output.

Figure 58:
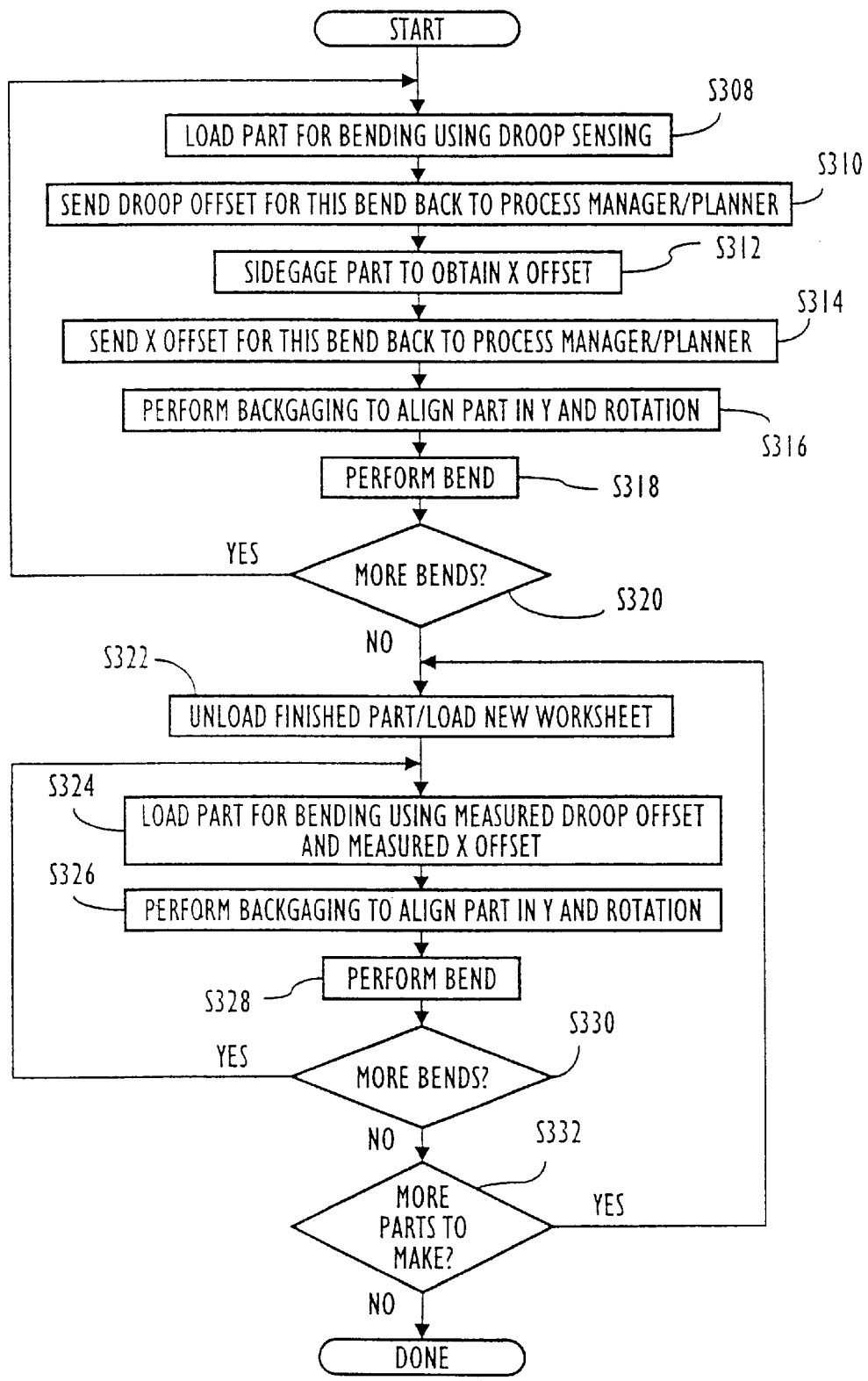
FIG. 58 is a flow chart, demonstrating the main steps performed in a learning process that may be performed by the planning system illustrated herein.

FIG. 58 illustrates an example process for performing learning measurements and for modifying movement control during multiple executions of a generated bend sequence plan, where the movement of the workpiece from one position to another comprises droop compensation and backgaging in the X direction. The sensor output comprises a measured amount of X offset and a measured amount of droop offset of the part.

In a first step of the illustrated process, S308, the part is loaded for bending using droop sensing. The amount of offset of the part, i.e., the amount by which the part is drooping, is sensed and sent back to the planner (e.g., planner 72 illustrated in FIGS. 5A and 6). Then, in step S312, the part is side-gaged (gaged in the X direction) to obtain an X offset value. The X offset value detected for this bend is sent back to the planner (or the process manager). Backgaging is then performed to align the part in the Y direction and also to appropriately rotate the part so that it is in the appropriate yaw position. In step S318, the bend is then performed.

In step S320, a determination is made as to whether or not there are more bends to be performed in the present bend sequence being executed. If so, the process returns to step S308, where steps S308–S318 are again performed to obtain values corresponding to that next bend. If all of the bends have been completed, the process proceeds from step S320 to step S322, at which point the finished part is unloaded, and a new workpiece is loaded with the loader/unloader. Then in step S324, the part is loaded for bending using the measured droop offset and measured X offset values that were previously determined and forwarded to the planner. By using such values, the bending apparatus can position the workpiece without performing sensor-based control (or at least with a simplified sensor-based control method) while positioning the workpiece. This should greatly increase the speed with which the workpiece is introduced into the die space, and reduce. Then, in step S326, backgaging is performed to align the part in the Y and rotation (yaw) directions. The bend is then performed in step S328, and a determination is then made in step S330 as to whether more bends in the bend sequence still have to be performed. If all the bends have been performed, the process proceeds to step S332, at which point a determination is made as to whether more parts are to be made. If more parts are to be made, the process returns to step S322.

Due to the repeatability of a typical bending workstation, such as the Amada BM100 bending workstation, the offset values only need to be determined by performing one or a few execution runs of the system. Once the offset values are determined, the offset values may be used for future batch runs of the system, and should be considered dependable for many runs. Accordingly, the process in FIG. 58 is illustrated as returning from step S332 to step S322 for each new workpiece to be formed, rather than returning all the way back to step S308 for obtaining new offset values.

9. Costing, Scheduling, Part Design and Assembly

The present invention is described as being directed to methods and subsystems provided in an, intelligent design, planning and manufacturing system for producing materials such as bent sheet metal parts. The present invention may be further utilized for performing such functions as costing (i.e., determining how much it will cost to develop certain types of parts with a given sheet metal bending work station), scheduling (e.g., determining how much time it will take to perform to manufacture various parts with a given sheet metal bending work station) and part design and assembly. The planning system 71 of the present invention (e.g., as disclosed in FIG. 5A) is capable of generating a complete sequence of bends and bend-related operations which will be needed to form a given part. The generated sequence of operations may be accompanied by a complete plan which specifies all steps needed to execute the bend sequence in a proper order by the sheet metal bending work station. In generating the bend sequence, the planning system 71, through use of experts/subplanners, will determine the consequences of performing each bend and other accompanying operations within the bend sequence. Accordingly, without actually executing the resulting plan generated by planning system 71, planning system 71 will have information as to what the likely amount of time it will take to perform all of the necessary operations to manufacture the part with the sheet metal bending work station. In addition, the planning system 81 will be able to further confirm whether or not the sheet metal bending work stations and available tooling are capable of forming a particular designed part. By knowing the consequences of performing the various operations in a given plane planning system 71 can determine the resulting costs, and such information may be utilized to evaluate the cost of producing a given set of parts that form a desired assembly.

In addition, planning system 71 will be able to determine factory scheduling with its information regarding the time needed to complete various operations of the plan. In addition, by knowing the limitations of producing a particular part the amount of time it would take to produce the part, and the costs, it will be possible to utilize such information to generate alternative part designs which may result in less cost and less time needed for production of the part.

While planning system 71 has been described specifically as comprising a plurality of experts, with each expert being implement in the form of a module which is separate from bend sequence planning module 72, planning system 71 may be implemented without being separated into modules. For example, planning system 71 may be implemented as one overall operations planning module. In addition, in the implementation shown in FIG. 5A, the language utilized to communicate between the respective modules may be a language other than FEL.

The modular structure shown in FIG. 5A, which utilizes a query-based language, formalizes the interface between the modules, resulting in an open architecture which can easily be expanded upon by adding further modules, and/or by modifying the modules of the planning system. Other modifications within the general spirit of planning system 71 of the invention may be made. In order to enhance the speed of operations performed by planning system 71, such as the embodiment shown in FIG. 5A, each module (i.e., bend sequence planner 72 and subplanners 80, 82, 84 and 85) may be implemented on a different computer/processor.

While the invention has been described with reference to several illustrative embodiments, it is understood that the words which have been used herein are words of description, rather than words of limitation. Changes may be made, within the purview of the appended claims, without departing from the scope and the spirit of the invention in its aspects. Although the invention has been described herein in reference to particular means, materials, and embodiments, it is understood that the invention is not to be limited to the particulars disclosed herein, and that the invention extends to all equivalent structures, methods, and uses such as are within the scope of the appended claims.

What is claimed is:

1. A system for generating a plan which comprises a sequence of operations to be performed by a bending apparatus for bending workpieces comprising sheets of malleable material, said sequence of operations comprising a set of N bends for forming a finished workpiece from a stock sheet of malleable material, said system comprising:

proposing means for proposing, for an Mth operation within the sequence of operations, a plurality of proposed operations including a plurality of proposed bends to be performed by said apparatus; and generating means for generating a plan including a sequence of bends from a first bend through an Nth bend, by choosing each bend in the sequence of operations based upon the proposed bends.

2. A system for generating a plan which comprises a sequence of operations to be performed by a bending apparatus for bending workpieces comprising sheets of malleable material, said sequence of operations comprising a set of N bends for forming a finished workpiece from a stock sheet of malleable material, said system comprising:

proposing means for proposing, for an Mth operation within the sequence of operations, a plurality of proposed operations including a plurality of proposed bends to be performed by said apparatus;

estimating means for estimating a cost to be associated with each proposed bend; and generating means for generating a plan including a sequence of bends from a first through an Nth bend, by choosing each bend in the sequence of operations based upon the proposed bends and the estimated cost associated with each proposed bend.

3. The system according to claim 2, wherein said proposing means comprises means for proposing bends among the set of N bends that are still remaining.

4. The system according to claim 2, wherein said proposing means comprises means for proposing bends among the complete set of N bends that are still remaining less bends blocked due to constraints.

5. The system according to claim 2, further comprising means for representing the Mth operation within the sequence of operations as an Mth level of a search tree.

6. The system according to claim 2, wherein an estimated cost associated with an Nth bend in the sequence of N bends comprises a cost k calculated based upon an estimated amount of time it will take the bending apparatus to complete one or more operations of the bend.

7. The system according to claim 6, wherein the estimated cost associated with an Nth bend in the sequence of N bends comprises a cost h calculated based upon an estimated total amount of time it will take the bending apparatus to complete one or more operations of each of the rest of the bends in the bend sequence that follows the Nth bend.

8. The system according to claim 6, wherein said one or more operations of a given bend comprise moving the workpiece from a tooling stage location of a preceding bend to a tooling stage location of the given bend.

9. The system according to claim 6, wherein said one or more operations of a given bend comprise installing, when setting up the bending apparatus, a tooling stage to perform the given bend.

10. The system according to claim 2, wherein the estimated cost associated with an Nth bend in the sequence of N bends comprises a cost h calculated based upon an estimated total amount of time it will take the bending apparatus to complete one or more operations of each of the rest of the bends in the bend sequence that follows the Nth bend.

11. The system according to claim 10, wherein said one or more operations of a given bend comprise moving the workpiece from a tooling stage location of a preceding bend to a tooling stage location of the given bend.

12. The system according to claim 10, wherein said one or more operations of a given bend comprise installing, when setting up the bending apparatus, a tooling stage to perform the given bend.

13. The system according to claim 2, further comprising prioritizing means for prioritizing proposed bends in accordance with bend heuristics determined based upon the geometry of the workpiece.

14. The system according to claim 13, wherein said generating means generates a plan including a sequence of bends from a first through an Nth bend, by choosing each bend in the sequence of operations based upon the prioritized proposed bends and a proposed subplan that accompanies each proposed bend.

15. The system according to claim 13, wherein said prioritizing means comprises means for discounting an estimated cost of a bend having a high priority and increasing an estimated cost for a bend having a low priority.

16. The system according to claim 2, further comprising determining means for determining the time needed for, and the feasibility of, producing one or more workpieces with the bending apparatus based upon the generated plan.

17. The system according to claim 16, further comprising means for performing calculations of the cost of producing a predetermined number of the workpieces, based upon the time determined by said determining means.

18. The system according to claim 16, further comprising means for redesigning the workpiece based upon the time and feasibility determinations made by said determining means.

19. The system according to claim 16, further comprising means for scheduling manufacturing with the bending apparatus depending upon the determined amount of time for producing a number of workpieces.

20. The system according to claim 2, further comprising subplan means for providing a proposed subplan that accompanies each proposed bend.

21. The system according to claim 20, wherein the generated plan further includes at least part of the proposed subplans that accompany the chosen bends.

22. The system according to claim 21, wherein said proposed subplans comprise set-up and control information for said bending apparatus.

23. The system according to claim 21, wherein said proposed subplans comprise indications of tooling stages to be utilized to perform the bends of the sequence of bends.

24. The system according to claim 21, wherein said proposed subplans comprise locations of tooling stages to be utilized to perform the bends of the sequence of bends.

25. The system according to claim 21, wherein said proposed subplans comprise positions along a tooling stage at which the workpiece will be loaded into the bending apparatus in order to perform the bends of the sequence of bends.

26. The system according to claim 21, wherein said proposed subplans comprise motion plans for maneuvering around tooling stages in performing the bends of the sequence of bends.

27. The system according to claim 20, wherein said proposing means and said generating means collectively comprise a bend sequence planning module, and further wherein said subplan means and said estimating means collectively comprise a plurality of expert modules.

28. The system according to claim 27, wherein said expert modules each comprise means for operating said subplan means and said estimating means when said proposing means proposes a proposed operation for performance as said Mth operation within the sequence of operations.

29. The system according to claim 27, wherein said plurality of expert modules comprise a tooling expert module having means for operating said subplan means to provide a proposed tooling subplan that includes information regarding a position along a tooling stage at which the workpiece will be loaded into the bending apparatus in order to perform a given bend.

30. The system according to claim 27, wherein said plurality of expert modules comprise a tooling expert module having means for operating said estimating means to estimate a cost based upon an amount of time to install, when setting up the bending apparatus, a tooling stage to perform a given bend.

31. The system according to claim 27, wherein said plurality of expert modules comprise a motion expert module having means for operating said estimating means to estimate a cost based upon a calculated travel time for moving the workpiece from a tooling stage location of a given bend to a tooling stage location of a next bend.

32. The system according to claim 27, wherein said bend sequence planning module comprises means for querying each of said expert modules for a subplan and estimated costs, and wherein each of said expert modules comprises means for responding to a query by returning a save list to said bend sequence planning module, said save list comprising a list of attributes, and values respectively corresponding to the attributes, to be saved by said bend sequence planning module.

33. A system for generating a plan which comprises a sequence of operations to be performed by a bending apparatus for bending workpieces comprising sheets of malleable material, the bending apparatus having a gripper for gripping a workpiece while performing a bend, said sequence of operations comprising a set of N bends for forming a finished workpiece from a stock sheet of malleable material, said system comprising:

proposing means for proposing, for an Mth operation within the sequence of operations, a plurality of proposed operations including a plurality of proposed bends to be performed by said apparatus;

subplan means for providing a proposed subplan that accompanies each said proposed bend, said proposed subplan comprising setup and control information for said bending apparatus, said proposed subplan further comprising numbers, each of said numbers representing a predicted number of repositions of the gripper needed to complete a set of bends; and generating means for generating a plan including a sequence of bends from a first bend through an Nth bend, by choosing each bend in the sequence of bends based upon the proposed bends and the proposed subplan that accompanies each proposed bend, said generated plan further comprising at least part of the proposed subplans that accompany the bends chosen by the generating means.

34. A system for generating a plan which comprises a sequence of operations to be performed by a bending apparatus for bending workpieces comprising sheets of malleable material, the bending apparatus having a gripper for gripping a workpiece while performing a bend, said sequence of operations comprising a set of N bends for forming a finished workpiece from a stock sheet of malleable material, said system comprising:

a proposing system for proposing, for an Mth operation within the sequence of operations, a plurality of proposed operations including a plurality of proposed bends to be performed by said apparatus;

a subplan system for providing a proposed subplan that accompanies each proposed bend, said proposed subplan comprising setup and control information for said bending apparatus;

an estimating system for estimating a cost to be associated with each proposed bend; and generating system for generating a plan including a sequence of bends from a first through an Nth bend, by choosing each bend in the sequence of operations based upon the proposed bends, the proposed subplan that accompanies each proposed bend, and the estimated cost associated with each proposed bend.

35. The system according to claim 34, wherein said proposing system comprises a system for proposing bends among the set of N bends that are still remaining.

36. The system according to claim 34, wherein said proposing system comprises a system for proposing bends among the set of N bends that are still remaining less bends blocked due to constraints.

37. The system according to claim 34, said proposing system comprising a system for proposing, for an Mth operation, a repositioning of the gripper's hold on the workpiece.

38. The system according to claim 34, wherein the generated plan further includes at least part of the proposed subplans that accompany the bends chosen by the generating system.

39. The system according to claim 34, further comprising a system for representing the Mth operation within the sequence of operations as an Mth level of a search tree.

40. The system according to claim 34, wherein said proposed subplans comprise locations on the workpiece at which the gripper will grip the workpiece while performing the bends of the sequence of bends.

41. The system according to claim 34, wherein said proposed subplans comprise ranges of locations on the workpiece at which the gripper can grip the workpiece while performing the bends of the sequence of bends.

42. The system according to claim 34, wherein said proposed subplans comprise numbers, each representing a predicted number of repositions of the gripper needed to complete the sequence of bends.

43. The system according to claim 34, wherein said proposed subplans comprise indications that a next bend in the sequence of bends cannot be performed unless the location of the gripper on the workpiece is first repositioned.

44. The system according to claim 34, wherein said proposed subplans comprise locations on the workpiece at which a repositioning gripper will grip the workpiece while performing a repositioning operation between bends of the sequence of bends.

45. The system according to claim 34, wherein said proposed subplans comprise indications of tooling stages to be utilized to perform the bends of the sequence of bends.

46. The system according to claim 34, wherein said proposed subplans comprise locations of tooling stages to be utilized to perform the bends of the sequence of bends.

47. The system according to claim 34, wherein said proposed subplans comprise positions along a tooling stage at which the workpiece will be loaded into the bending apparatus in order to perform the bends of the sequence of bends.

48. The system according to claim 34, wherein said proposed subplans comprise motion plans for maneuvering around tooling stages in performing the bends of the sequence of bends.

49. The system according to claim 34, wherein said proposing system and said generating system collectively comprise a bend sequence planning module, and wherein said subplan system and said estimating system collectively comprise a plurality of expert modules.

50. The system according to claim 49, wherein said expert modules each comprise a system for operating said subplan system and said estimating system when said proposing system proposes a proposed operation as said Mth operation within the sequence of operations.

51. The system according to claim 49, wherein said plurality of expert modules comprise a holding expert module having a system for operating said subplan system to provide a proposed holding subplan that includes information regarding a location on the workpiece at which the gripper can grip the workpiece while performing the bends of the bend sequence.

52. The system according to claim 49, wherein said plurality of expert modules comprise a holding expert module having a system for operating said estimating system to estimate a holding cost calculated based upon whether a hold of a gripper on the workpiece is to be repositioned before performing a given bend.

53. The system according to claim 49, wherein said plurality of expert modules comprise a tooling expert module having a system for operating said subplan system to provide a proposed tooling subplan that includes information regarding a position along a tooling stage at which the workpiece will be loaded into the bending apparatus in order to perform a given bend.

54. The system according to claim 49, wherein said plurality of expert modules comprise a tooling expert module having a system for operating said estimating system to estimate a cost based upon an amount of time to install, when setting up the bending apparatus, an additional tooling stage to perform a given bend.

55. The system according to claim 49, wherein said plurality of expert modules comprise a motion expert module having a system for operating said estimating system to estimate a cost based upon a calculated travel time for moving the workpiece from a tooling stage location of a bend to a tooling stage location of a next bend.

56. The system according to claim 49, wherein said bend sequence planning module comprises a system for querying each of said expert modules for a subplan and estimated costs, and wherein each of said expert modules comprises a system for responding to a query by returning a save list to said bend sequence planning module, said save list comprising a list of names of attributes, and values respectively corresponding to the attributes, to be saved by said bend sequence planning module.

57. The system according to claim 34, further comprising a prioritizing system for prioritizing proposed bends in accordance with bend heuristics determined based upon the geometry of the workpiece.

58. The system according to claim 57, wherein said generating system generates a plan including a sequence of bends from a first through an Nth bend, by choosing each bend in the sequence of operations based upon the prioritized proposed bends and the proposed subplan that accompanies each proposed bend.

59. The system according to claim 57, wherein said prioritizing system comprises a system for discounting an estimated cost of a bend having a high priority and increasing an estimated cost for a bend having a low priority.

60. The system according to claim 34, further comprising a determining system for determining the time needed for, and the feasibility of, producing one or more workpieces with the bending apparatus based upon the generated plan.

61. The system according to claim 60, further comprising a system for performing a calculation of the cost of producing a plurality of the workpieces, based upon the time determined by said determining system.

62. The system according to claim 60, further comprising a system for redesigning the workpiece based upon the time and feasibility determinations made by said determining system.

63. The system according to claim 60, further comprising a system for scheduling operations with the bending apparatus depending upon the determined amount of time for producing said one or more workpieces.

64. A system for generating a plan and for controlling a bending apparatus, the plan comprising a sequence of operations to be performed by the bending apparatus, the bending apparatus being adapted to bend workpieces comprising sheets of malleable material, the sequence of operations comprising a sequence of bends, from a first bend through an Nth bend, for forming a finished workpiece from a stock sheet of malleable material, said system comprising:

a setup planning system for generating said sequence of bends and a setup subplan, said setup subplan comprising setup and control information for said bending apparatus, said setup and control information including information regarding a manner in which the bending apparatus is to be setup before commencing the first bend in said sequence of bends;

a forwarding system for forwarding said setup subplan, to a signaling system for signaling commencement of setup operations to be performed in accordance with said setup subplan; and a finalizing system for generating detailed subplan information to complete said plan after said setup subplan has been generated, at least part of said detailed subplan information being generated after the commencement of setup operations has been signaled by said signaling system, wherein said setup subplan comprises positions of tooling stages along a die rail of said bending apparatus.

65. A system for generating a plan and for controlling a bending apparatus, the plan comprising a sequence of operations to be performed by the bending apparatus, the bending apparatus being adapted to bend workpieces comprising sheets of malleable material, the sequence of operations comprising a sequence of bends, from a first bend through an Nth bend, for forming a finished workpiece from a stock sheet of malleable material, said system comprising:

a setup planning system for generating said sequence of bends and a setup subplan, said setup subplan comprising setup and control information for said bending apparatus, said setup and control information including information regarding a manner in which the bending apparatus is to be setup before commencing the first bend in said sequence of bends;

a forwarding system for forwarding said setup subplan, to a signaling system for signaling commencement of setup operations to be performed in accordance with said setup subplan; and a finalizing system for generating detailed subplan information to complete said plan after said setup subplan has been generated, at least part of said detailed subplan information being generated after the commencement of setup operations has been signaled by said signaling system, wherein said setup subplan comprises information regarding a type of gripper to use for manipulating the workpiece through the bend sequence.

66. A system for generating a plan and for controlling a bending apparatus, the plan comprising a sequence of operations to be performed by the bending apparatus, the bending apparatus being adapted to bend workpieces comprising sheets of malleable material, the sequence of operations comprising a sequence of bends, from a first bend through an Nth bend, for forming a finished workpiece from a stock sheet of malleable material, said system comprising:

a setup planning system for generating said sequence of bends and a setup subplan, said setup subplan comprising setup and control information for said bending apparatus, said setup and control information including information regarding a manner in which the bending apparatus is to be setup before commencing the first bend in said sequence of bends;

a forwarding system for forwarding said setup subplan, to a signaling system for signaling commencement of setup operations to be performed in accordance with said setup subplan; and a finalizing system for generating detailed subplan information to complete said plan after said setup subplan has been generated, at least part of said detailed subplan information being generated after the commencement of setup operations has been signaled by said signaling system, wherein said setup subplan comprises information regarding a type of repo gripper to use for holding the workpiece while a gripper changes a grip on the workpiece between bends of the bend sequence.

67. A system for performing setup operations on a bending apparatus so that the bending apparatus can be utilized to perform bending operations on workpieces comprising sheets of malleable material, the bending apparatus comprising a die rail, a tool punch holding mechanism, and one or more tooling stages, each tooling stage comprising a die mounted on said die rail and a tool punch held by said punch holding mechanism, said system comprising:

a system for receiving information regarding a location of each of said one or more tooling stages along said die rail; and a control system for controlling a position of a guide member along at least one of said die rail and said tool punch holding mechanism based upon the received information so that at least one of said die and said tool punch can be aligned with reference to said guide member so that the resulting tooling stage will be at a desired location along said die rail.

68. The system according to claim 67, wherein said guide member comprises a backgage finger of a mechanism for performing backgaging when loading a workpiece into the bending apparatus.

69. A system for executing a plan for controlling a bending apparatus for bending workpieces comprising sheets of malleable material, the plan comprising a sequence of operations to be performed by the bending apparatus, said system comprising:

a sensor-based control system for performing an operation, including movement of a workpiece from one position to another position, said bending apparatus utilizing a sensor output to modify movement of the workpiece;

a measuring system for measuring an amount by which movement of the workpiece was modified due to the sensor output; and a learned control system for performing said operation, including moving the workpiece from one position to another position, without modifying movement of the workpiece utilizing a sensor output, said learned control system controlling performance of said operation based upon the amount measured by said measuring system.

70. A system for generating a plan which comprises a sequence of operations to be performed by a bending apparatus for bending workpieces comprising sheets of malleable material, said sequence of operations comprising a set of N bends for forming a finished workpiece from a stock sheet of malleable material, said system comprising:

proposing means for proposing, for an Mth operation within the sequence of operations, a plurality of proposed operations including a plurality of proposed bends to be performed by said bending apparatus;

prioritizing means for prioritizing proposed bends in accordance with bend heuristics determined based upon the geometry of the workpiece; and generating means for generating a plan including a sequence of bends from a first bend through an Nth bend, by choosing each bend in the sequence of operations based upon the proposed bends.

71. The system according to claim 70, wherein said generating means generates a plan including a sequence of bends from a first through an Nth bend, by choosing each bend in the sequence of operations based upon the prioritized proposed bends.

72. A system for generating a plan which comprises a sequence of operations to be performed by a bending apparatus for bending workpieces comprising sheets of malleable material, the bending apparatus having a gripper for gripping a workpiece while performing a bend, said sequence of operations comprising a set of N bends for forming a finished workpiece from a stock sheet of malleable material, said system comprising:

a proposing system for proposing, for an Mth operation within the sequence of operations, a plurality of proposed operations including a plurality of proposed bends to be performed by said apparatus;

a subplan system for providing a proposed subplan that accompanies each proposed bend;

a generating system for generating a plan including a sequence of bends from a first bend through an Nth bend, by choosing each bend in the sequence of operations based upon the proposed bends and the proposed subplan that accompanies each proposed bend; and an estimating system for estimating a cost to be associated with each proposed bend, wherein said generating system generates a plan including a sequence of bends from a first through an Nth bend, by choosing each bend in the sequence of operations based upon the proposed bends, the proposed subplan that accompanies each proposed bend, and the estimated cost associated with each proposed bend, wherein the estimated cost associated with an Nth bend in the sequence of N bends comprises a cost k calculated based upon an estimated amount of time it will take the bending apparatus to complete one or more operations of the bend.

73. A system for generating a plan which comprises a sequence of operations to be performed by a bending apparatus for bending workpieces comprising sheets of malleable material, the bending apparatus having a gripper for gripping a workpiece while performing a bend, said sequence of operations comprising a set of N bends for forming a finished workpiece from a stock sheet of malleable material, said system comprising:

a proposing system for proposing, for an Mth operation within the sequence of operations, a plurality of proposed operations including a plurality of proposed bends to be performed by said apparatus;

a subplan system for providing a proposed subplan that accompanies each proposed bend;

a generating system for generating a plan including a sequence of bends from a first bend through an Nth bend, by choosing each bend in the sequence of operations based upon the proposed bends and the proposed subplan that accompanies each proposed bend; and a estimating system for estimating a cost to be associated with each proposed bend, wherein said generating system generates a plan including a sequence of bends from a first through an Nth bend, by choosing each bend in the sequence of operations based upon the proposed bends, the proposed subplan that accompanies each proposed bend, and the estimated cost associated with each proposed bend, wherein the estimated cost associated with an Nth bend in the sequence of N bends comprises a cost h calculated based upon an estimated total amount of time it will take the bending apparatus to complete one or more operations of each of the rest of the bends in the bend sequence that follow the Nth bend.

74. The system according to claim 72, wherein the estimated cost associated with an Nth bend in the sequence of N bends further comprises a cost h calculated based upon an estimated total amount of time it will take the bending apparatus to complete one or more operations of each of the rest of the bends in the bend sequence that follow the Nth bend.

75. The system according to claim 72, wherein said one or more operations of a given bend comprise moving the workpiece from a tooling stage location of a preceding bend to a tooling stage location of the given bend.

76. The system according to claim 72, wherein said one or more operations of a given bend comprise installing, when setting up the bending apparatus, an additional tooling stage that will be needed to perform the given bend.

77. The system according to claim 72, wherein said one or more operations of a given bend comprise repositioning of the hold of the gripper on the workpiece before performing the given bend.

78. The system according to claim 73, wherein said one or more operations of a given bend comprise moving the workpiece from a tooling stage location of a preceding bend to a tooling stage location of the given bend.

79. The system according to claim 73, wherein said one or more operations of a given bend comprise initialing, when setting up the bending apparatus, an additional tooling stage that will be needed to perform the given bend.

* * * * *

UNITED STATES PATENT AND TRADEMARK OFFICE
CERTIFICATE OF CORRECTION

PATENT NO. : 6,341,243 B1
DATED : January 22, 2002
INVENTOR(S) : D.A. Bourne et al.

It is certified that error appears in the above-identified patent and that said Letters Patent is hereby corrected as shown below:

<u>Title page,</u>
Item [56], References Cited, the following OTHER PUBLICATION was omitted and should be included:
-- Gursoz, E. Levent, "Reference Manual for the "NOODLES" Library," Engineering Design Research Center, Carnegie Mellon University (May 1991). --

Signed and Sealed this

Seventeenth Day of December, 2002

JAMES E. ROGAN
*Director of the United States Patent and Trademark Office*